US008494663B2

(12) United States Patent
Lamoree et al.

(10) Patent No.: US 8,494,663 B2
(45) Date of Patent: Jul. 23, 2013

(54) SYSTEM AND METHOD FOR AN ELECTRONIC INTERACTIVE SWITCH

(75) Inventors: Bret L. Lamoree, Woodinville, WA (US); Dennis C. Lin, Shoreline, WA (US); Heidi J. Kneller, Bellevue, WA (US); Henry V. Fletcher, Everett, WA (US); Brock J. Prince, Seattle, WA (US); Phillip J. Ayoub, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/620,847

(22) Filed: Nov. 18, 2009

(65) Prior Publication Data

US 2010/0187080 A1 Jul. 29, 2010

Related U.S. Application Data

(63) Continuation of application No. 11/510,787, filed on Aug. 25, 2006, now abandoned.

(51) Int. Cl.

| | |
|---|---|
| ***A47B 67/02*** | (2006.01) |
| ***A47B 81/00*** | (2006.01) |
| ***A47F 5/08*** | (2006.01) |
| ***B64C 1/20*** | (2006.01) |
| ***G01D 11/28*** | (2006.01) |
| ***G05B 11/01*** | (2006.01) |
| ***G05B 15/00*** | (2006.01) |
| ***H01H 3/00*** | (2006.01) |
| ***H01H 9/00*** | (2006.01) |
| ***H01R 39/00*** | (2006.01) |

(52) U.S. Cl.
USPC ................ 700/83; 700/17; 200/17 R; 200/18; 200/292; 244/118.1; 312/24; 312/27; 312/242; 312/248; 362/27; 362/29; 362/30; 439/1; 439/13

(58) Field of Classification Search
USPC .................. 700/17, 83; 200/17 R, 18, 61.58, 200/292; 244/118.1; 312/24, 27, 242, 248; 362/27, 29, 30; 439/1, 13
See application file for complete search history.

(56) References Cited

U.S. PATENT DOCUMENTS 2,445,399 A 7/1948 Johnson
3,213,269 A * 10/1965 Melvin et al. ................ 362/293
4,597,599 A 7/1986 Bisbing
(Continued)

FOREIGN PATENT DOCUMENTS

WO WO9518040 7/1995

*Primary Examiner* — Mohammad Ali
*Assistant Examiner* — Jennifer L Norton
(74) *Attorney, Agent, or Firm* — Harness, Dickey & Pierce, P.L.C.

(57) ABSTRACT

An interactive switch system for a stowage compartment system for a mobile platform (for example, commercial aircraft) is provided. The switch system is mounted to a moveable structure, such as an overhead stowage bin, and is responsive to a local input from a user, as well as to a remote input from an external control/monitoring panel. The switch system has at least one indicator surface responsive to the local input and the remote input to display indicator data. The indicator surface has a portion that forms at least one user input device for enabling the local input. The switch system further comprises a control system disposed behind the indicator surface. The control system is responsive to the local input and the remote input to transmit the indicator data to the indicator surface.

10 Claims, 89 Drawing Sheets

U.S. PATENT DOCUMENTS 4,766,524 A * 8/1988 Ogawa et al. .................. 362/29
5,045,656 A 9/1991 Kojima
5,398,783 A 3/1995 Jacoby
5,441,218 A 8/1995 Mueller et al.
5,456,529 A 10/1995 Cheung
5,557,300 A * 9/1996 Satoh ............................ 345/170
5,668,656 A * 9/1997 Fujinawa et al. .......... 359/208.1
5,988,724 A 11/1999 Wolda
6,230,847 B1 * 5/2001 Skolnick ....................... 187/395
6,318,671 B1 11/2001 Schumacher et al.
6,527,325 B2 3/2003 Steingrebe et al.
6,598,829 B2 7/2003 Kamstra
6,684,324 B2 * 1/2004 Floman et al. .................... 713/1
6,765,159 B1 * 7/2004 Uebelein et al. ............ 200/17 R
6,794,989 B2 * 9/2004 Naegely et al. ............ 340/573.1
6,899,299 B2 5/2005 Ritts
7,182,501 B2 * 2/2007 Jang et al. ..................... 362/651
7,209,985 B2 * 4/2007 Hayamizu et al. .............. 710/67
7,229,007 B1 * 6/2007 Swaine et al. ................ 235/379
7,246,771 B2 * 7/2007 Wisch et al. ............... 244/118.5
D562,779 S 2/2008 Lamoree et al.
7,460,933 B2 * 12/2008 Chapman et al. ............. 700/300
7,601,004 B2 10/2009 Lamoree et al.
7,641,360 B2 * 1/2010 Chou et al. .................... 362/235
7,723,935 B2 * 5/2010 Kneller et al. ................ 318/286
7,760,286 B2 * 7/2010 Sudo ............................... 349/58
7,878,586 B2 * 2/2011 Kneller et al. ............. 297/217.6
7,894,941 B2 * 2/2011 Ogawa et al. ................. 700/258
7,937,169 B2 * 5/2011 Kneller et al. .................. 700/83
7,946,726 B1 * 5/2011 Chiang et al. ................. 362/237
7,962,259 B2 * 6/2011 Schafer et al. .................. 701/36
7,965,200 B2 * 6/2011 Lamoree et al. .............. 340/945
2003/0201916 A1 * 10/2003 Nathan ........................... 341/22
2006/0025874 A1 * 2/2006 Huffington et al. ............. 700/44
2006/0097034 A1 5/2006 Rudduck et al.
2006/0190836 A1 * 8/2006 Ling Su et al. ............... 715/773
2010/0284171 A1 * 11/2010 Kang et al. ................... 362/97.1
2011/0068225 A1 * 3/2011 Curry et al. ................ 244/118.1
2011/0122637 A1 * 5/2011 Futami .......................... 362/519

* cited by examiner

SOFTWARE TEST PROCEDURE (CON'T)

VOLUME SENSING PROCEDURE

COMPARTMENT RANGE OF MOTION

SYSTEM SHUTDOWN PROCEDURE

SYSTEM AND METHOD FOR AN ELECTRONIC INTERACTIVE SWITCH

CROSS-REFERENCE TO RELATED APPLICATIONS

The present application is a continuation of U.S. patent application Ser. No. 11/510,787, filed Aug. 25, 2006, entitled "System and Method for an Electronic Interactive Switch," assigned to The Boeing Company, and hereby incorporated by reference in its entirety into the present application. The present application is also related in general subject matter to pending U.S. patent application Ser. No. 11/510,779, filed Aug. 25, 2006, entitled "System and Method for a Power-Assisted Compartment," assigned to The Boeing Company, and hereby incorporated by reference in its entirety into the present application. The present application is further related in general subject matter to pending commonly assigned U.S. patent application Ser. No. 11/510,821, filed Aug. 25, 2006, entitled "System and Method for Pivot for Stowage Compartments or Rotating Items," hereby incorporated by reference in its entirety into the present application. Additionally, the present application is related in general subject matter to pending commonly assigned U.S. patent application Ser. No. 10/905,502, filed on Jan. 7, 2005, entitled "System and Method for Pivot for Stowage Compartments or Rotating Items," (now U.S. Pat. No. 7,601,004) hereby incorporated by reference in its entirety into the present application.

The present application is also related in general subject matter to pending commonly assigned U.S. patent application Ser. No. 11/510,788, filed Aug. 25, 2006, entitled "System and Method for Compartment Control," hereby incorporated by reference in its entirety into the present application. In addition, the present application is also related in general subject matter to pending commonly assigned U.S. patent application Ser. No. 11/510,790, filed Aug. 25, 2006, entitled "System and Method for Compartment Control," hereby incorporated by reference in its entirety into the present application. The present application is also related in general subject matter to pending commonly assigned U.S. patent application Ser. No. 11/510,792, filed Aug. 25, 2006, entitled "System and Method for Electronically Latching Compartments," hereby incorporated by reference in its entirety into the present application.

FIELD

The present disclosure relates generally to a switch, and more particularly to an electronic communicative switch.

BACKGROUND

The statements in this section merely provide background information related to the present disclosure and may not constitute prior art.

Many mobile platforms (such as trains, ships, aircraft and automobiles) employ stowage compartments in a cabin of the mobile platform to enable stowage of passenger items, such as carry-on baggage. With regard to commercial passenger aircraft, increased baggage stowage demands have required the stowage compartments to increase in size and load capacity. In addition, there is a drive to increase passengers "personal space" (i.e., headroom) in the cabin of the aircraft. The desire for increased "personal space" in the cabin has resulted in higher ceilings and the placement of storage compartments higher in the cabins.

The increased size and load capacity of the stowage compartments coupled with the higher cabin ceilings and higher stowage compartment placement in the cabins can make it difficult for some passengers to close the door on the overhead stowage compartments. Further, the higher placement of the compartments can make it difficult for a passenger to easily determine the status of the compartment, i.e. fully loaded, locked, or overweight. Accordingly, it would be desirable to have an electronic switch system that is capable of displaying data regarding the compartments, while facilitating easier opening and closing of the compartments.

SUMMARY

A system and method for an interactive switch system adapted for use on a moveable component is provided. The interactive switch system comprises an indicator surface including first and second opposing sides, and a first portion forming a user engageable surface for enabling a user to generate a local input signal by pressing against the first side of the indicator surface. The indicator surface also includes a second portion forming a display surface for displaying information to the user concerning operation of the moveable component. The switch system further comprises a control system disposed adjacent the second side of the indicator surface. The control system includes a controller for receiving the local input signal and a remote input signal from an external system remotely located from the switch system and at least one light generating element responsive to the controller. The light generating element is disposed adjacent the second side of the indicator surface, in order to generate light that is transmitted via the display surface to the user to apprise the user of an operational condition of the moveable component.

In one embodiment, the system includes a switch that is mounted to a moveable structure, and responsive to a local input and a remote input. The switch comprises at least one indicator surface responsive to the local input and the remote input to display indicator data. The indicator surface includes at least one user input device for enabling the local input. The switch further comprises a printed circuit board disposed behind the indicator surface. The printed circuit board is responsive to the local input and remote input to transmit the indicator data to the indicator surface.

In one embodiment, the present disclosure further provides a mobile platform including a body structure having an interior cabin area, and an overhead stowage compartment system mounted within the interior cabin area. The overhead stowage compartment system includes at least one stowage compartment and a controller in communication with the stowage compartment. The controller is responsive to a movement of the stowage compartment to generate data. The overhead stowage compartment system also includes a switch system including an indicator surface. The switch system is coupled to the stowage compartment and enables the generation of a signal to move the stowage compartment. The switch system is also in communication with the controller to transmit the signal and to receive the data, with the switch displaying the data on the indicator surface.

The present teachings also provide a method for operating an overhead stowage compartment in an interior area of a mobile platform using a switch. The method comprises proving a switch system coupled to a stowage compartment and transmitting an operational signal to the switch system. The method also comprises displaying the operational signal on an indicator surface of the switch system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is not intended to limit the present disclosure, application, or uses. Although the following description is related generally to a power-assisted compartment for a mobile platform (such as an aircraft, ship, spacecraft, train or land-based motor vehicle), it will be understood that the electronic indicative switch, as described and claimed herein, can be used with any appropriate application where it would be useful to have an electronic indicative switch. Therefore, it will be understood that the following discussion is not intended to limit the scope of the appended claims to only mobile platforms and overhead stowage systems on mobile platforms.

Figure 1:
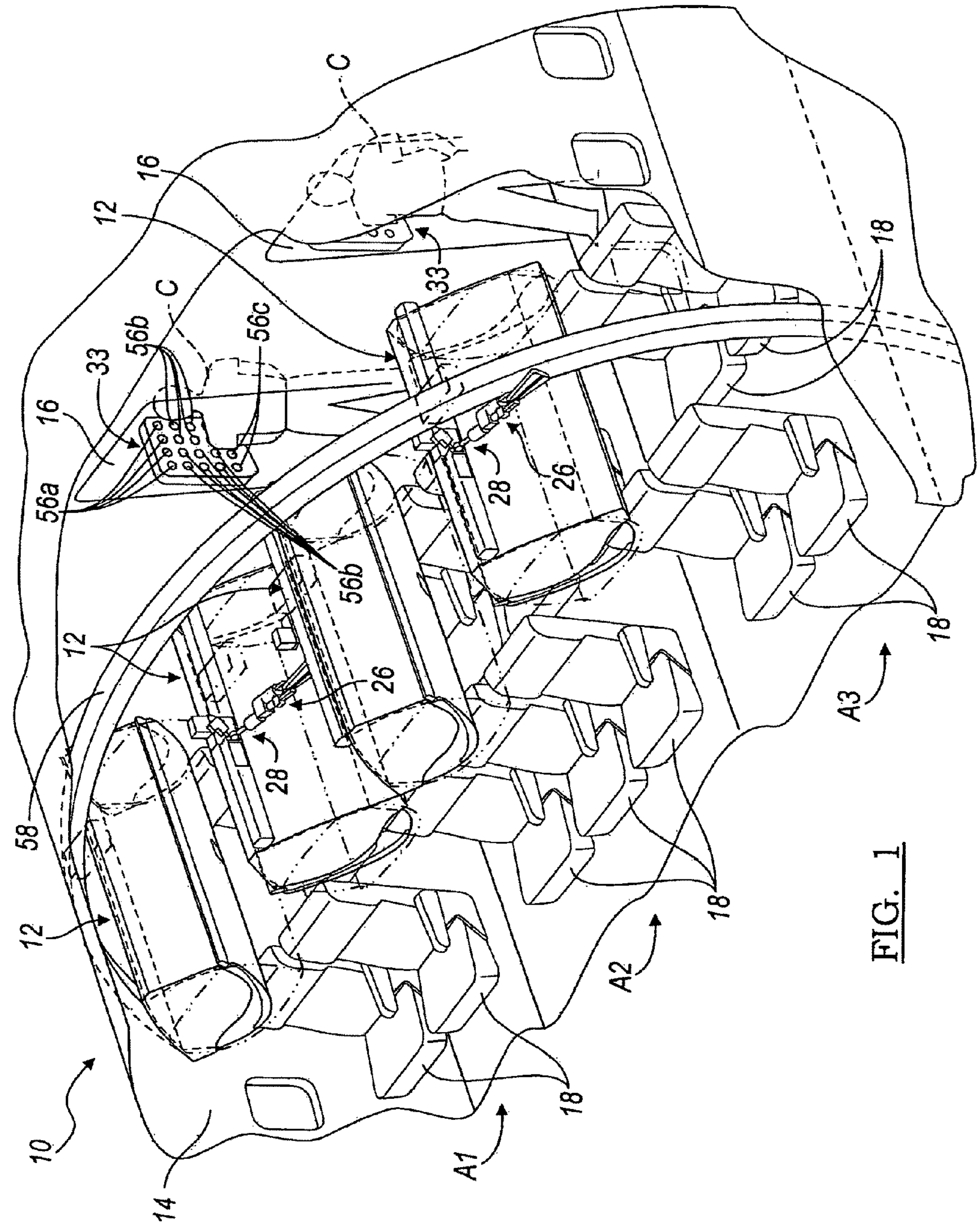
FIG. 1 is a perspective view of a portion of a mobile platform incorporating one exemplary embodiment of the system and method for a power-assisted compartment, and illustrating a plurality of power-assisted compartments according to the present disclosure.

With reference to FIG. 1, an exemplary mobile platform 10 employing a power-assisted compartment system 12 is shown. The mobile platform 10, in this example, is a passenger aircraft including a cabin 14 and a crew area 16. The mobile platform 10 includes two rows, seven abreast, of passenger seating 18 with one row of four power-assisted compartment systems 12; however, any number of power-assisted compartment systems 12 or rows of seating 18 could be employed.

Figure 2:
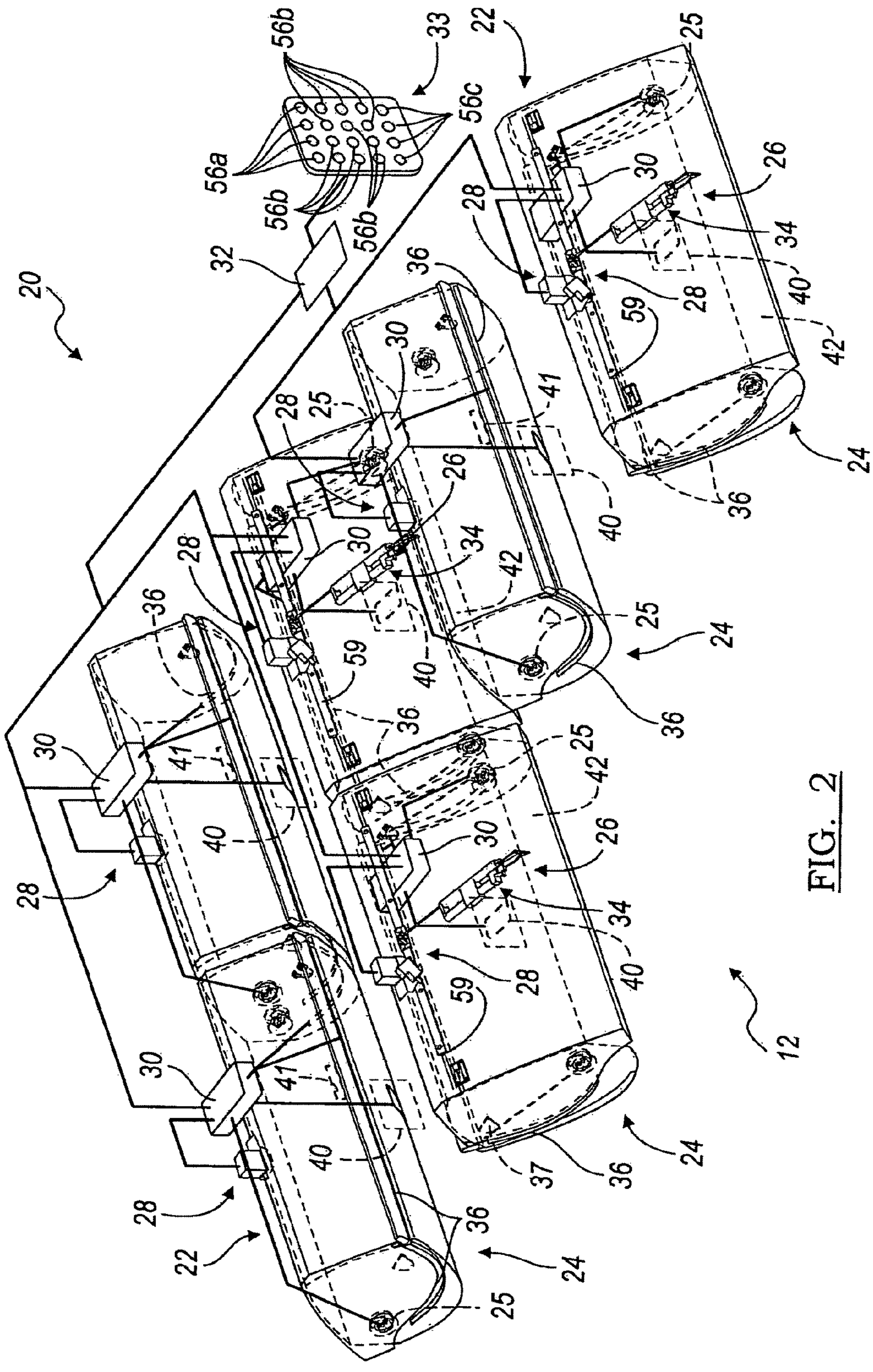
FIG. 2 is a schematic diagram of a control system for the plurality of power-assisted compartments of FIG. 1.
Figure 5:
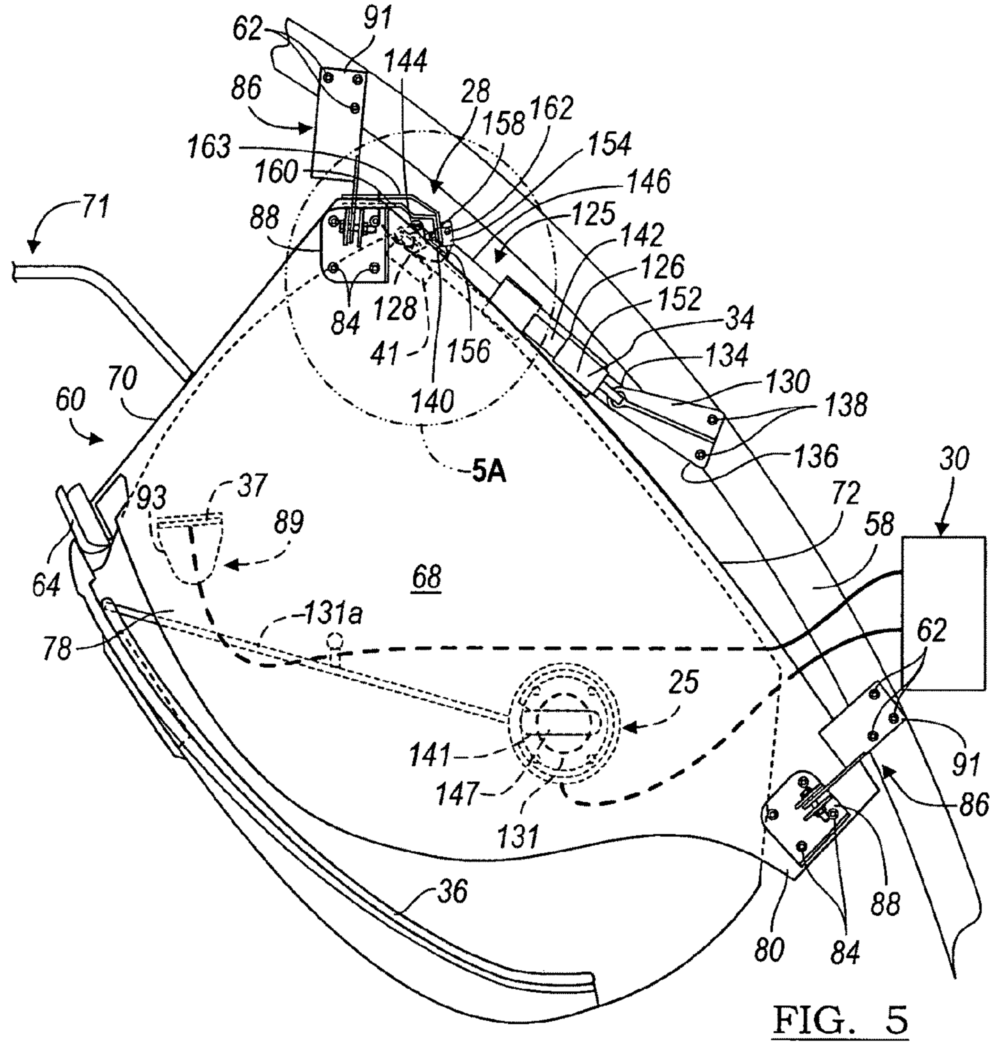
FIG. 5 is a side view of the power-assisted compartment of FIG. 3 illustrating the power-assisted compartment in a closed and latched position.
Figure 5A:
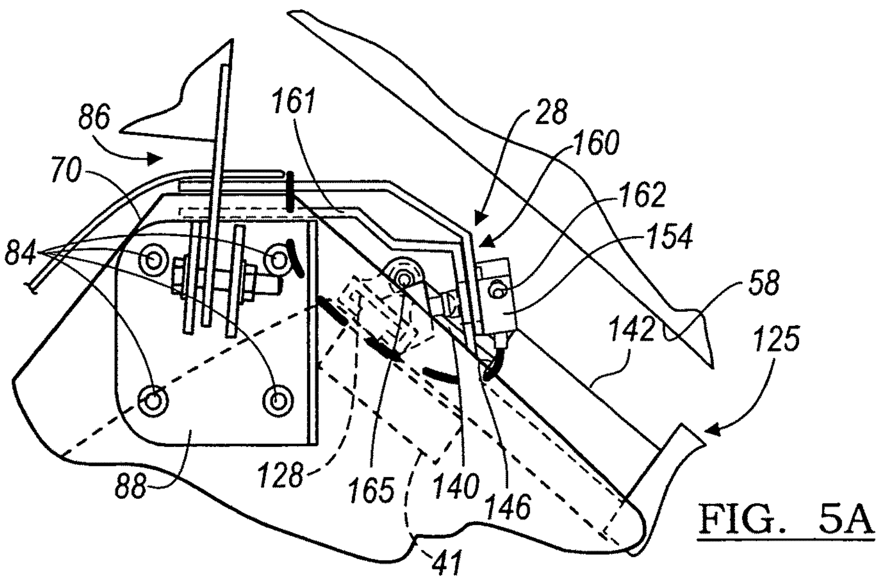
FIG. 5A is a detail side view of a portion of the power-assisted compartment of FIG. 5.

With additional reference to FIG. 2, the power-assisted compartment system 12 includes a control system 20, a support structure or system 22, at least one or a plurality of compartments 24, a pivot system 25, an actuator system 26 and a latching system 28. It will be understood that although the present disclosure illustrates a plurality of compartments 24, the present disclosure could involve any number of compartments 24, and may just include one compartment 24 if desired. Furthermore, it will be understood that although the description herein of the support system 22, actuator system 26 and latching system 28 is directed towards an outboard compartment 24, the principles disclosed herein can be applied to any suitable compartment 24 in any orientation, such as inboard. Generally, each of the compartments 24 is in communication with the control system 20, and the control system 20 is responsive to each of the compartments 24. The support system 22 supports the compartments 24 in the cabin 14. The actuator system 26 is coupled to each of the compartments 24 to enable the compartments 24 to rotate into an opened position (FIGS. 3, 6 and 7) and a closed position (FIG. 5). It will be understood, however, that although the compartments 24 are described herein as rotating between an opened and closed position the compartments 24 could also pivot, articulate or translate between the opened and closed position depending upon how the actuator system 26 is coupled to the compartments 24. The latching system 28 is also coupled to each of the compartments 24 and the support system 22 to secure the compartments 24 in closed positions, or to permit the compartments 24 to be rotated into their opened positions. In addition, it will be understood that although the actuator system 26 and latching system 28 are illustrated and described as separate components, these systems could be integrated if desired.

With reference to FIG. 2, a schematic of the control system 20 is illustrated. The control system 20 includes a plurality of first controllers or compartment controllers 30, a plurality of first or amperage sensors 34 (shown in phantom), a plurality of second or obstruction sensors 36 (shown in phantom), a plurality of third or open sensors 37, a plurality of fourth or position sensors 139, a plurality of switch system(s) 40 each coupled to each of the compartments 24, a plurality of fifth or volume sensors 41, and a second controller or central controller 32 coupled to a multi-purpose control panel 33. Each of the compartment controllers 30 are coupled to the compartments 24 at any desired location, but are preferably coupled to the compartments 24 at a location not visible to passengers within the cabin 14. It should be noted that although the following discussion describes the compartments 24 as each having a compartment controller 30, one compartment controller 30 could be in communication with and responsive to a plurality of compartments 24. The compartment controllers 30 are in communication with and responsive to the amperage sensors 34, obstruction sensors 36, open sensors 37, switch system(s) 40 and central controller 32. The compartment controllers 30 are also responsive to and in communication with the actuator system 26 and the latching system 28 to move the compartment 24 from an open and a closed position, and also to latch and unlatch the compartment 24, as will be described in greater detail herein. The compartment controllers 30 receive power from a main power source of the aircraft (not shown). The compartment controllers 30 manage and distribute energy to the actuator system 26 and the latching system 28. The compartment controllers 30 are in communication with and responsive to the amperage sensors 34, obstruction sensors 36, open sensors 37, position sensors 139, switch system(s) 40, volume sensors 41, central controller 32, actuator system 26 and latching system 28 through either a wired, wireless or plumbed connection or any combination thereof.

Figure 3:
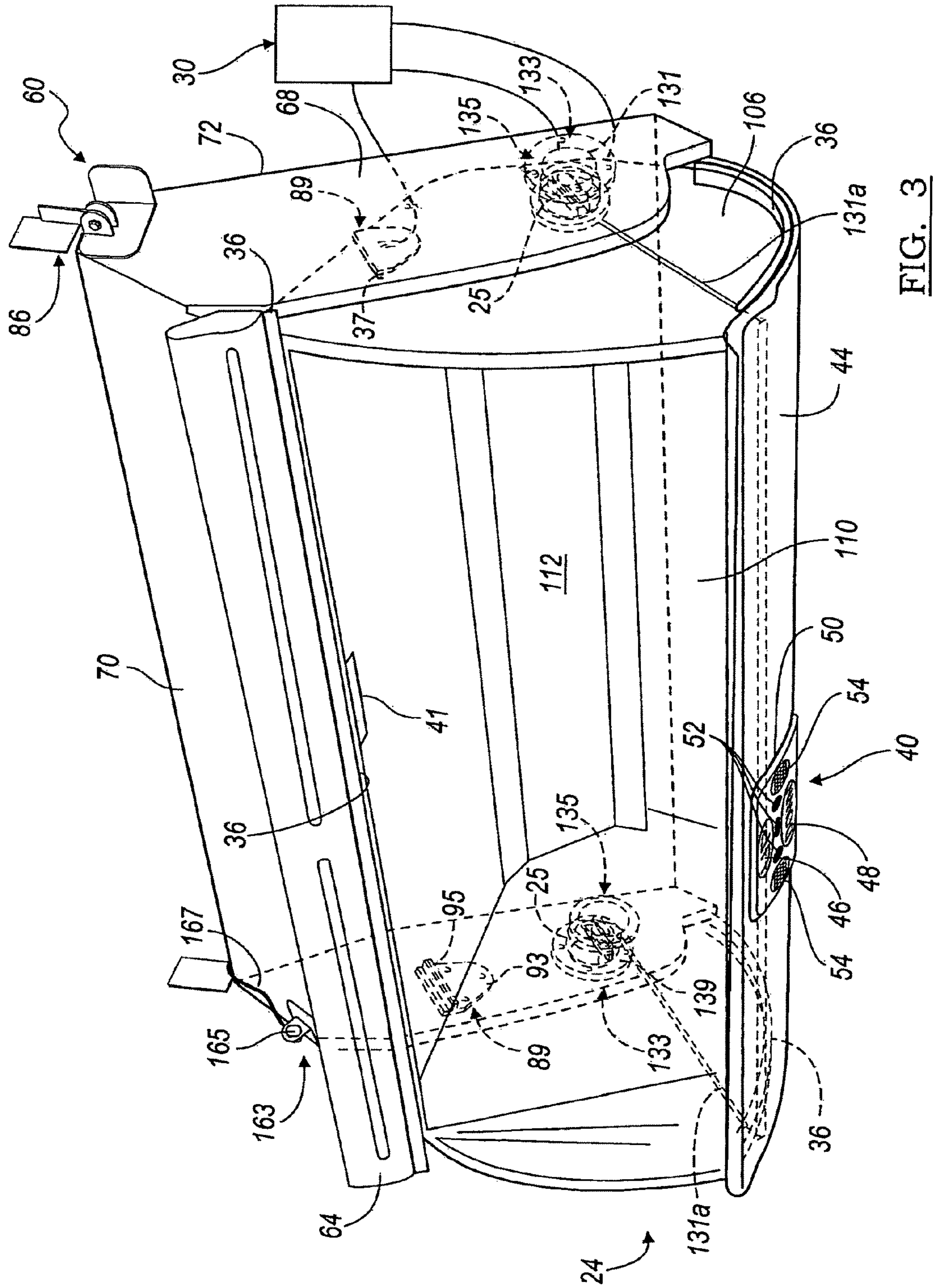
FIG. 3 is a perspective view of a single power-assisted compartment according to one embodiment of the present disclosure in an opened and unlatched position.
Figure 4:
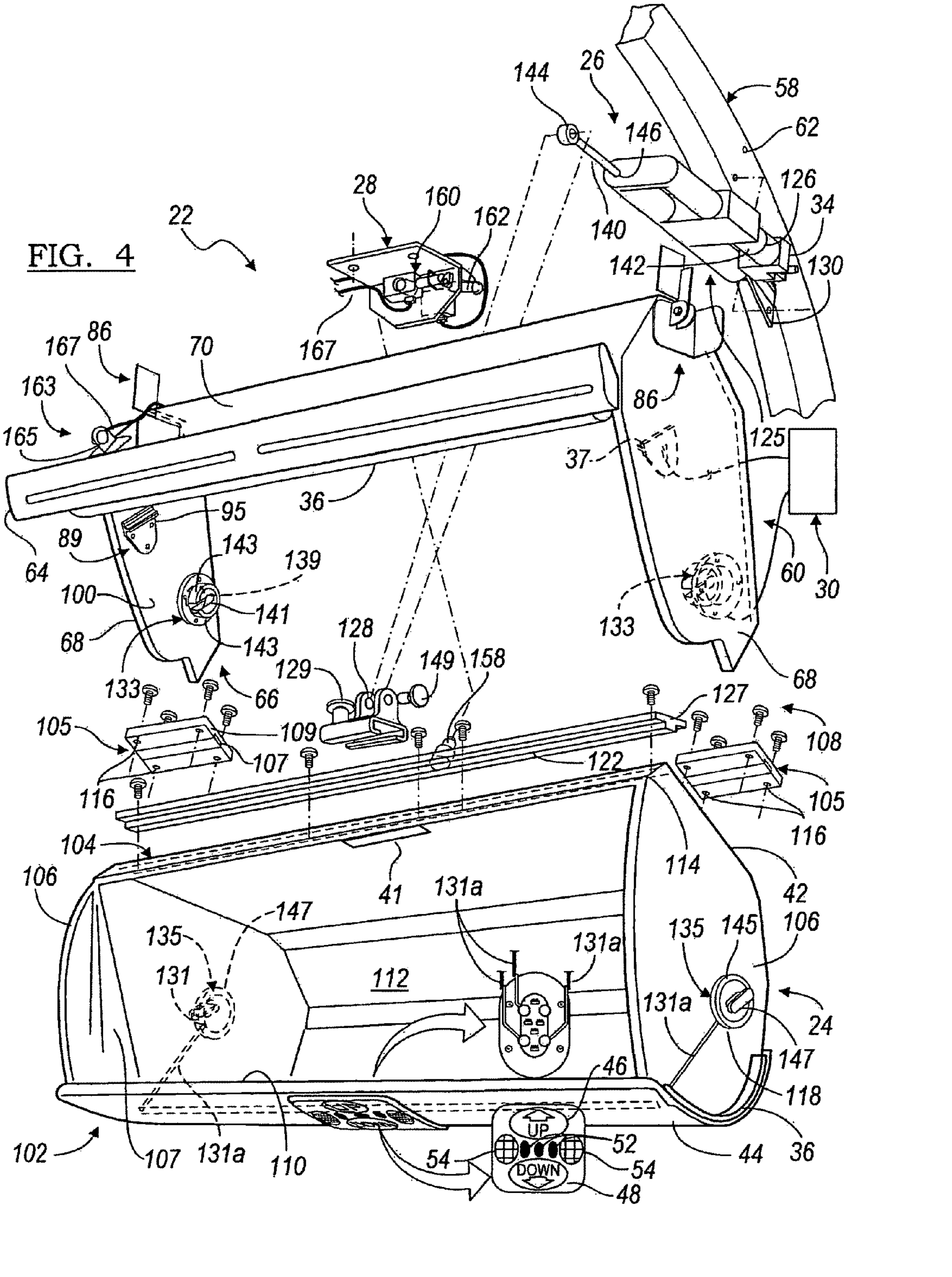
FIG. 4 is an exploded perspective view of the power-assisted compartment of FIG. 3.

With additional reference to FIGS. 3 and 4, the amperage sensors 34 generally monitor a weight of the compartment 24. Typically, the first amperage sensors 34 are mounted with the actuator system 26 such that the amperage sensors 34 receive accurate measurements associated with the weight of the compartment 24. The amperage sensors 34 are in communication with the compartment controller 30 through either wired, wireless or plumbed communication to transmit the data regarding the weight of the compartment 24 to the compartment controller 30. The amperage sensors 34 receive power from the compartment controller 30. The amperage sensors 34 can be any appropriate sensor for measuring weight or load on the compartments 24, such as, a strain gage, power sensor or load sensor. If an amperage sensor is used, the amperage sensor is coupled to the actuator motor system 126, as will be discussed in greater detail herein. If the weight of the compartment 24 received from the amperage sensors 34 is greater than a predetermined acceptable loading weight, the compartment controller 30 can either prevent the movement of the compartment 24 and/or issue a warning that the compartment 24 is overloaded, as will be discussed in greater detail herein. Primary obstruction detection is also accomplished by a combination of the amperage sensors 34 and the position sensor 139. In particular, the amperage sensors 34 provide an accurate data measurement associated with the load on the compartments 24, and a sudden increase in the load with reduced movement of the compartments 24 indicates an obstruction in the movement of the compartment 24. The position sensor 139 will be discussed in greater detail herein with reference to the pivot system 25.

The obstruction sensors 36 are in communication with the compartment controllers 30 to provide the compartment controllers 30 with a signal if the movement of the compartment 24 is obstructed, as best shown in FIG. 5. The obstruction sensors 36 provide secondary obstruction detection. Generally, the obstruction sensors 36 are pinch strips that, as generally known, include two separated conductive surfaces that transmit a signal when they are forced together. The obstruction sensors 36 receive power from the compartment controller 30, and alternatively through the pivot system 25, as will be discussed in greater detail herein. It will be understood, however, that any other electro-mechanical device could be used to generate a signal based on an obstruction, and further, the actuator system 26 can be configured to further monitor for an obstruction, as will be discussed herein. The obstruction sensors 36 are generally coupled to the support system 22 and the compartment 24, as will be discussed in greater detail herein. It should be noted that although three obstruction sensors 36 are illustrated, any number of obstruction sensors 36 could be employed.

The open sensors 37 are coupled to the support system 22 and are adapted to be in communication with the compartment 24. The open sensors 37 are in wired and/or wireless communication with the compartment controllers 30 to provide the compartment controllers 30 with a signal if the compartment 24 is in the full opened position. Generally, the compartment 24 rests on the open sensors 37 when the compartment 24 is in the full open position, as will be described in greater detail herein.

The switch system(s) 40 can be coupled to each of the compartments 24, and are generally mounted on a front surface 44 of the compartments 24, such that the switch system(s) 40 face into the cabin 14 of the mobile platform 10. The switch system(s) 40 includes a first, or "OPEN", or "DOWN," switch contact or button 46 and a second, or "CLOSE" or "UP," switch contact or button 48 arranged about an indicator surface 50. It should be noted, however, that the switch system(s) 40 shown are for illustrated purposes, as any appropriate switch with any appropriate number of buttons could be employed. In addition, the OPEN button 46 and CLOSE button 48 could be placed in any appropriate orientation with respect to each other, and with respect to the indicator surface 50, such as adjacent to each other. Typically, the switch system(s) 40 is in wired and/or wireless communication with the compartment controllers 30. The switch system(s) 40 receive power from the compartment controller 30, and alternatively through the pivot system 25, as will be discussed in greater detail herein. In addition, the switch system(s) 40 can be energy harvesting switches such that the switch system(s) 40 do not require an external source of power from the mobile platform 10 to function.

When the OPEN button 46 is depressed by a user, it sends a signal to the compartment controller 30 to appropriately operate the compartment 24. For instance, if the compartment 24 is already in the fully closed position, depressing the OPEN button 46 or CLOSE button 48 will cause the compartment controller 30 to lower the compartment 24. Further, if the OPEN button 46 or CLOSE button 48 is depressed while the compartment 24 is in the process of moving from the opened to the closed position or vice versa, a signal will be sent to the compartment controller 30 to stop the operation or movement of the compartment 24. In order to resume operation or movement of the compartment 24, the user can then press either the OPEN button 46 or the CLOSE button 48 for the respective movement of the compartment 24. In addition, the OPEN button 46 and CLOSE button 48 could each be programmable to send a series of signals to the compartment controller 30, so that the compartment controller 30 performs a specific operation, such as preventing the operation of the compartment 24.

The indicator surface 50 is disposed between the OPEN button 46 and the CLOSE button 48, and comprises at least one or a plurality of light emitting diodes (LEDs) 52. Generally, the indicator surface 50 comprises three LEDs 52, each of which are in communication with and responsive to the compartment controller 30. The LEDs 52 can be in wired and/or wireless communication with the compartment controller 30. Typically, the LEDs 52 can be different colors to indicate the status of the compartment 24, such as latched, unlatched, overloaded, available for operation, operating, delayed, disabled, and if the movement of the compartment 24 is obstructed. A first LED 52*a* can be red in color and a second LED 52*b* can be blue in color. Alternatively, an LCD monitor type display could be used. Optionally, the indicator surface 50 includes a speaker 54 in communication with and responsive to the compartment controller 30 to announce an audible status condition and/or audible messages regarding the compartment 24 and/or the mobile platform 10, such as "Warning: Compartment Overloaded," "Obstruction," "Wait for Attendant Assistance," or "Operation Pending, Please Stand By," for example. The indicator surface 50 receives power from the compartment controller 30, or alternatively through the pivot system 25, as will be discussed in greater detail herein.

A fifth or volume sensor 41 is coupled with the compartment 24 which monitors the occupied volume within the compartment 24. Information from this sensor is transmitted to compartment controller 30 which then transmits a signal to the LEDs 52 on the indicator surface 50 to indicate the bin is full. This information may only be displayed when the compartment 24 is closed at certain times of utilization. The volume sensor 41 can be any sensor capable of sensing a volumetric capacity, and can employ an infrared, laser or sonic device to determine a volume of the compartment 24. The volume sensor 41 is coupled to the compartment 24 such that it can monitor the volume of the compartment 24, and is preferably recessed or mounted flush with respect to the surface of the compartment 24.

With reference to FIGS. 1 and 2, the central controller 32 is in communication with and responsive to the compartment controllers 30 and the control panel 33. It should be noted that although two central controllers 32 and two control panels 33 are shown, the two central controllers 32 could be combined into one subassembly, as could the two control panels 33. In addition, the central controllers 32 and the control panels 33 could be combined into a single unit. The central controller 32 relays signals from its associated compartment controllers 30 to its associated control panel 33, and potentially wireless crew devices (not specifically shown), as well as from the control panel 33 to the compartment controllers 30. The control panel 33 comprises at least one or a plurality of user input devices 56, such as buttons or a touch screen, to enable a crew member C to control the operation of the compartments 24 (FIG. 1). In addition, the central controller 32 is capable of notifying crew member C via the control panel 33 that certain compartments 24 should be disabled due to performance issues such as system faults. It will be understood that the user input devices 56 are shown as buttons for illustration purposes only, as any number of user input devices (such as a laptop computer or an integrated attendant panel running a software system) could be employed. In addition, if a software system is employed, the software system could control the calibration of the actuator system 26 by use of the position sensor 139, as will be discussed herein. Through the control panel 33, the crew member C can send a signal to the central controller 32, which sends the signal to the compartment controllers 30, to unlatch and move the selected compartments 24.

In addition, the control panel 33 can include at least one or a plurality of user input devices 56*a*, which correspond to a selected area $A_1, A_2 \ldots A_n$ of the cabin 14 of the mobile platform 10, as best shown in FIG. 1. Thus, when the crew member C activates the user input devices 56*a*, a signal is sent to the central controller 32, which sends the signal only to the compartments 24 in the selected area $A_1, A_2 \ldots A_n$ in the cabin 14. Further, the control panel 33 can include a plurality of user input devices 56*b* that correspond to each of the compartments 24. The control panel 33 can also include at least one or a plurality of functional user input devices 56*c*, such as "LATCH," "UNLATCH," "DISABLE," and the like, which can be used with the user input devices 56*a* and 56*b* to control specific functions for specific compartments 24 to the central controller 32. In addition, the control panel 33 can also include user input devices 56*c*, which are capable of controlling the operation of all of the compartments 24, such as an "ALL CLOSED" OR "ALL OPEN" user input device (not specifically shown). It should be noted that the above control panel 33 could also comprise a computer-based software program that allows user input in this fashion. The control panel 33 can also be an access panel for maintenance purposes including retrieving built-in test equipment data, deactivation of specific compartments 24 if required, and retrieval of data log information as a history of performed operations.

With continuing reference to FIGS. 1 and 2, and with additional reference to FIGS. 3-5, the support system 22 includes a frame 58 and a plurality of housings 60. The frame 58 is preferably a rigid, strong structural member that forms a portion of the frame of the mobile platform 10, and is typically arcuate. The frame 58 may be comprised of a lightweight material, such as aluminum, a composite material, or any other lightweight, suitably strong material. The frame 58 spans the cabin 14 of the mobile platform 10 and includes various mounting points or apertures 62 for coupling the housings 60, the actuator system 26 and the latching system 28 to the frame 58 (FIG. 4). The housings 60 are generally rectangular and include a mating ledge 64, a shell 66 and a pair of sidewalls 68. The mating ledge 64 is coupled to the shell 66 and provides a surface for the obstruction sensor 36. The mating ledge 64 is preferably configured to aesthetically corresponding to the cabin 14, and also serves to seal the compartment 24 against the housing 60 when the compartment 24 is in the closed position, as will be discussed further herein.

Figure 6:
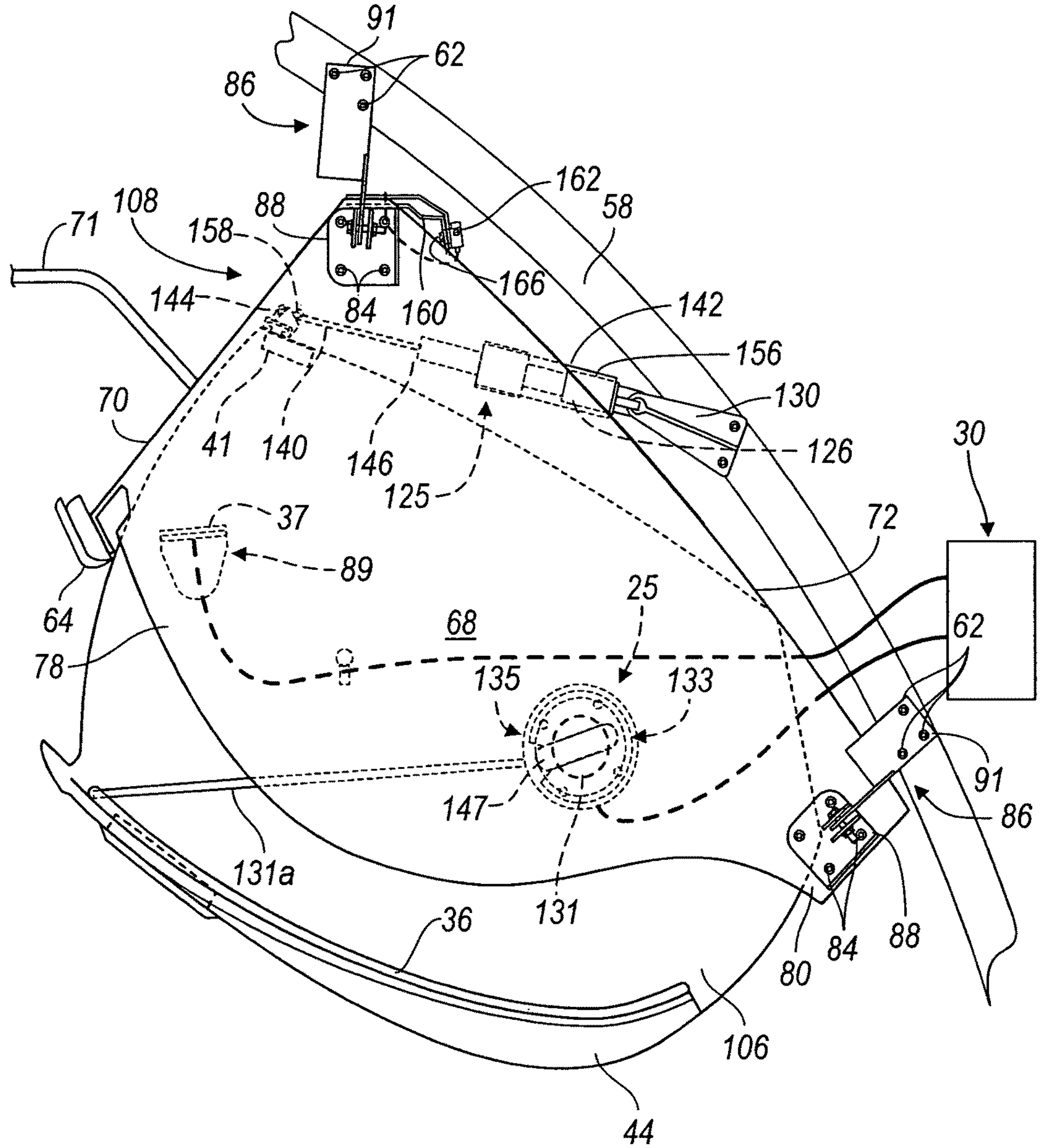
FIG. 6 is a side view of the power-assisted compartment of FIG. 3, illustrating the power-assisted compartment in a partially opened and unlatched position.

The shell 66 typically defines a cabin forward panel 70 and a rear panel 72. The cabin forward panel 70 is preferably not visible to passengers within the cabin 14 and supports the mating ledge 64. The cabin forward panel 70 also provides a mounting point for a ceiling panel 71 as shown in FIGS. 5 and 6. The ceiling panel 71 substantially covers the cabin forward panel 70. The cabin forward panel 70 is coupled to or integrally formed with the rear panel 72. The sidewalls 68 are coupled to or integrally formed with the cabin forward panel 70 and the rear panel 72.

Each of the sidewalls 68 includes a first end 78 and a second end 80. The first end 78 of the sidewall 68 is coupled to the shell 66. The first end 78 also includes a flange 89. The flange 89 is generally triangular, with a base 93 and a shelf 95. The base 93 is generally integrally formed with the shelf 95 and can define apertures to couple the flange 89 to the first end 78 via mechanical fasteners, however, any other mechanism could be used such as adhesives and/or welding. The shelf 95 extends generally perpendicular to the base 93 to form a surface for possible receipt of the open sensor 37, while also providing a catch for stopping the compartment 24 once the compartment 24 has reached the full opened position. Generally, only one open sensor 37 is required per compartment 24. The first end 78 and the second end 80 each include a mounting point or apertures 84 and a mounting flange 86. The mounting flange 86 includes a first end 88 and a second end 91. The first end 88 of the mounting flange 86 is coupled to the first end 78 of the sidewall 68 through at least one or a plurality of mechanical fasteners, such as screws, which are received through corresponding apertures in the first end 88 of the mounting flange 86 and into the apertures 84 in the sidewall 68. It should be understood that any suitable fastener could be used and, in the alternative, the mounting flange 86 could be coupled to the sidewall 68 by welding and/or adhesives.

The second end 91 of the mounting flange 86 is coupled to apertures 62 in the frame 58. Generally, the second end 91 of the mounting flange 86 is coupled to the frame 58 via a plurality of fasteners, such as screws, linkages, brackets, bridges and/or pins; however, it will be understood that any suitable fastener could be used and, in the alternative, the mounting flange 86 could be coupled to the frame 58 by welding and/or adhesives. The second end 80 of the sidewall 68 also includes a plurality of apertures 84 for coupling a mounting flange 86 to the sidewall 68 to further couple the housing 60 to the frame 58. As the mounting flange 86 of the second end 80 is substantially similar to the mounting flange 86 of the first end 78, it will not be discussed further herein with regard to the second end 80. The pivot system 25 is coupled to the sidewall 68, typically adjacent to the second end 80 of the sidewall 68.

The compartments 24 are rotatably coupled to the housing 60 via the pivot system 25. Each of the compartments 24 includes a cabin forward panel 102, a rear panel 104, a stop 105, and sidewalls 106 disposed between the cabin forward panel 102 and the rear panel 104. The compartments 24 form a structure for receiving passenger items through an aperture 107 defined between the cabin forward panel 102 and the rear panel 104. Each of the compartments 24 also includes an adjustable ledger 108 for coupling the compartments 24 to the actuator system 26 and the latching system 28. The cabin forward panel 102 and rear panel 104 are generally mounted to each other and the sidewalls 106 through a plurality of mechanical fasteners, such as screws or rivets (not shown); however, any suitable technique could be used to form the compartments 24, such as molding, welding and/or adhesives. The cabin forward panel 102 includes the front surface 44 and an interior surface 110. The front surface 44 includes a mounting point for the switch system(s) 40, such as at least one or a plurality of apertures (not shown). The interior surface 110 provides a surface for receiving passenger items. The interior surface 110 is also coupled to the sidewalls 106 such that the interior surface 110 extends a distance beyond the sidewalls 106 for receipt of one of the obstruction sensors 36. Generally, two of the obstruction sensors 36 are mounted opposite each other on the portion of the interior surface 110 that extends beyond the sidewalls 106. The rear panel 104 includes an interior surface 112 and the rear surface 42. The interior surface 112 also provides a surface for receiving passenger items, and with the interior surface 110 of the cabin forward panel 102 forms an interior of the compartment 24. An edge 114 of the rear surface 42 provides a mounting point, such as apertures 116, for coupling the stop 105 and the adjustable ledger 108 to the rear panel 104. The stop 105 includes a housing 109 and a lever 111. The housing 109 includes a slot 113 for receipt of the lever 111. The lever 111 includes a handle 115 coupled to or integrally formed with a base 117. The handle 115 extends from the housing 109, while the base 117 of the lever 111 is sized to slideably engage the slot 113 such that the base 117 translates within the slot 113 from an extended position to a retracted position upon the movement of the handle 115. In the extended position, the base 117 can contact the shelf 95 of the flange 89 of the housing 60 to stop the movement of the compartment 24 when the compartment 24 reaches the full opened position. In the retracted position, the base 117 is retained within the housing 109 of the stop 105 such that the compartment 24 is able to rotate beyond the full opened position. When the compartment 24 rotates beyond the full opened position, the compartment 24 can be removed from the pivot system 25 of the housing 60 of the support system 22.

The sidewalls 106 are generally configured to mate with the cabin forward panel 102 and the rear panel 104. The sidewalls 106 also couple the pivot system 25 to the compartment 24 to enable the compartment 24 to pivot with respect to the housing 60. The adjustable ledger 108 is coupled to the edge 114 of the rear panel 104 via at least one or a plurality of fasteners, such as screws or rivets. It should be understood, however, that the adjustable ledger 108 could be coupled to the rear panel 104 via any suitable technique, such as molding, welding and/or adhesives. The adjustable ledger 108 includes a first surface 122 and a second surface 124. The first surface 122 is coupled to the rear panel 104 of the compartment 24. The second surface 124 preferably includes rails 127 to couple the actuator system 26 and latching system 28 to the compartment 24.

With reference to FIG. 4, the pivot system 25 is coupled to each of the sidewalls 68, 106 of the housing 60 and compartment 24, respectively. The pivot system 25 includes at least one conductor 131, a housing pivot 133, a compartment pivot 135, a bushing 137, and a position sensor 139. The conductor 131 is in communication with and receives power from the compartment controller 30. The conductor 131 is preferably an embedded foil conductor, available from 3M. The conductor 131 is coupled to the housing 60 and enables the pivot system 25 to transfer power between the housing 60 and the compartment 24. Preferably, one of the conductors 131 of the two pivot systems 25 coupled to the housing 60 and compartment 24 has a positive charge, while the other conductor 131 of the opposite pivot system 25 has a negative charge. The housing pivot 133 is disposed on the conductor 131 and is coupled to the sidewall 68 of the housing 60. The housing pivot 133 is generally composed of a conductive material, such as a metal or metal alloy, to transfer power from the conductor 131 to the compartment pivot 135. The housing pivot 133 is generally annular and includes a radial space for a bushing 137, which includes a slot 141. Between each moving component (from the housing pivot 133 to the bushing 137 to the compartment pivot 135) at least one conductive spring plunger 143 is used. The slot 141 is sized to slideably engage the compartment pivot 135, and the spring plunger 143 is disposed within the housing pivot 133 to maintain electrical contact between the housing pivot 133, the bushing 137 and the compartment pivot 135.

The compartment pivot 135 includes an annular base 145 with a T-shaped protrusion 147. The annular base 145 couples the compartment pivot 135 to the sidewall 106 of the compartment 24, while the T-shaped protrusion 147 is sized to slideably engage the slot 141 of the pivot bushing 137 of the housing pivot 133. The compartment pivot 135 is generally composed of a conductive material, such as a metal or metal alloy, to enable the transmission of power from the housing pivot 133 to the compartment pivot 135 via the pivot bushing 137. The compartment pivot 135 is also coupled to various conductors **131*a* to enable the transmission of data and/or power to the obstruction sensor 36 and the switch system(s) 40**.

The pivot bushing 137 enables the compartment pivot 135 to rotate within the housing pivot 133 to allow the compartment 24 to pivot with respect to the housing 60. The pivot bushing 137 is generally rotatably engaged to the inside of the housing pivot 133. The position sensor 139 is installed on the housing 60 such that the spring plunger 143 contained in the pivot busing 137 applies a pressure to the position sensor 139 to send a signal to the compartment controller 30 regarding the degree of rotation of the compartment 24. Only one of the two pivot systems 25 on each compartment 24 requires this position sensor 139. The position sensor 139 can be a radial potentiometer, but any other suitable position sensor could be employed. Further detail regarding the pivot system 25 is outside the scope of the current disclosure, but is disclosed in greater detail in pending commonly assigned U.S. patent application Ser. No. 11/510,821, filed Aug. 25, 2006, entitled "System and Method for Pivot for Stowage Compartments or Rotating Items," which is incorporated by reference herein in its entirety.

Figure 7:
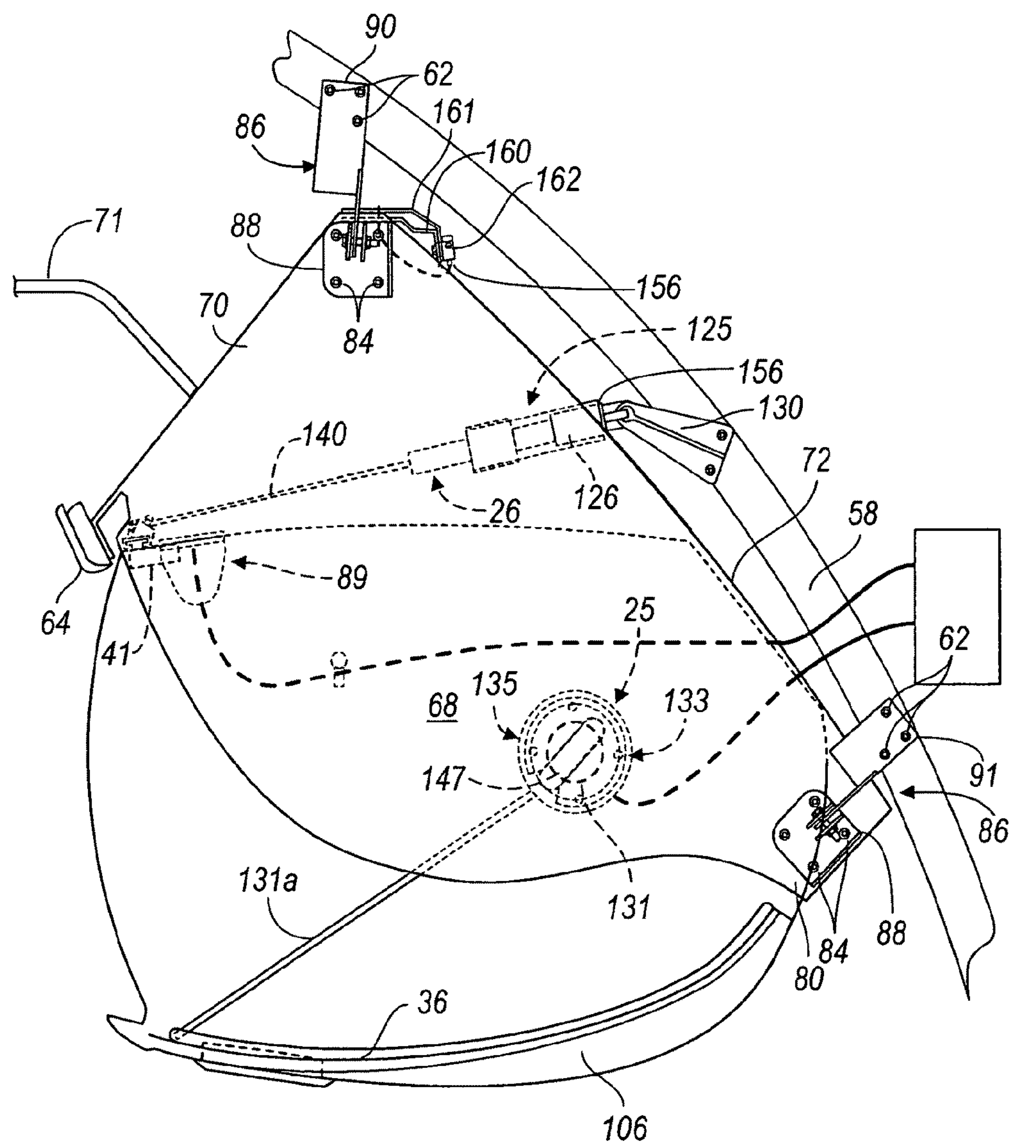
FIG. 7 is a side view of the power-assisted compartment of FIG. 3 in an opened and unlatched position.
Figure 7A:
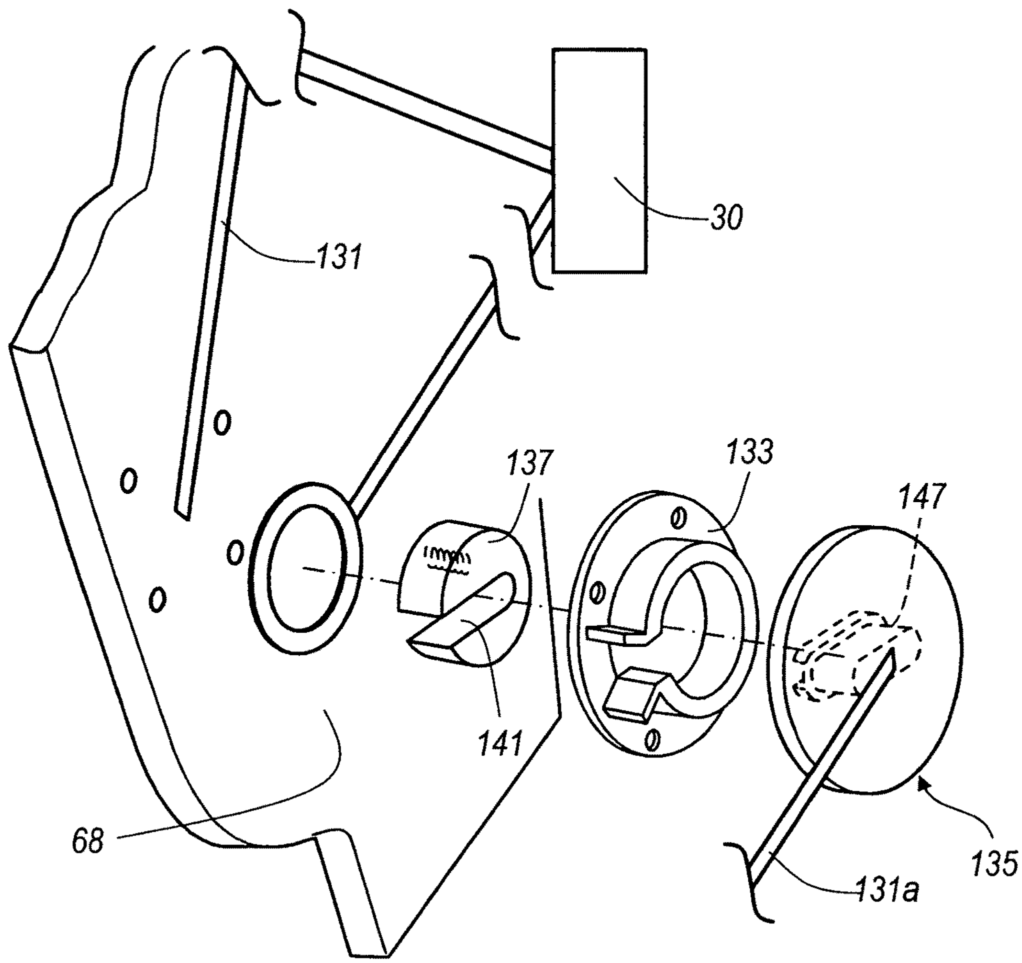
FIG. 7A is an exploded detail view of a pivot system employed by the power-assisted compartment of FIG. 1.
Figure 8:
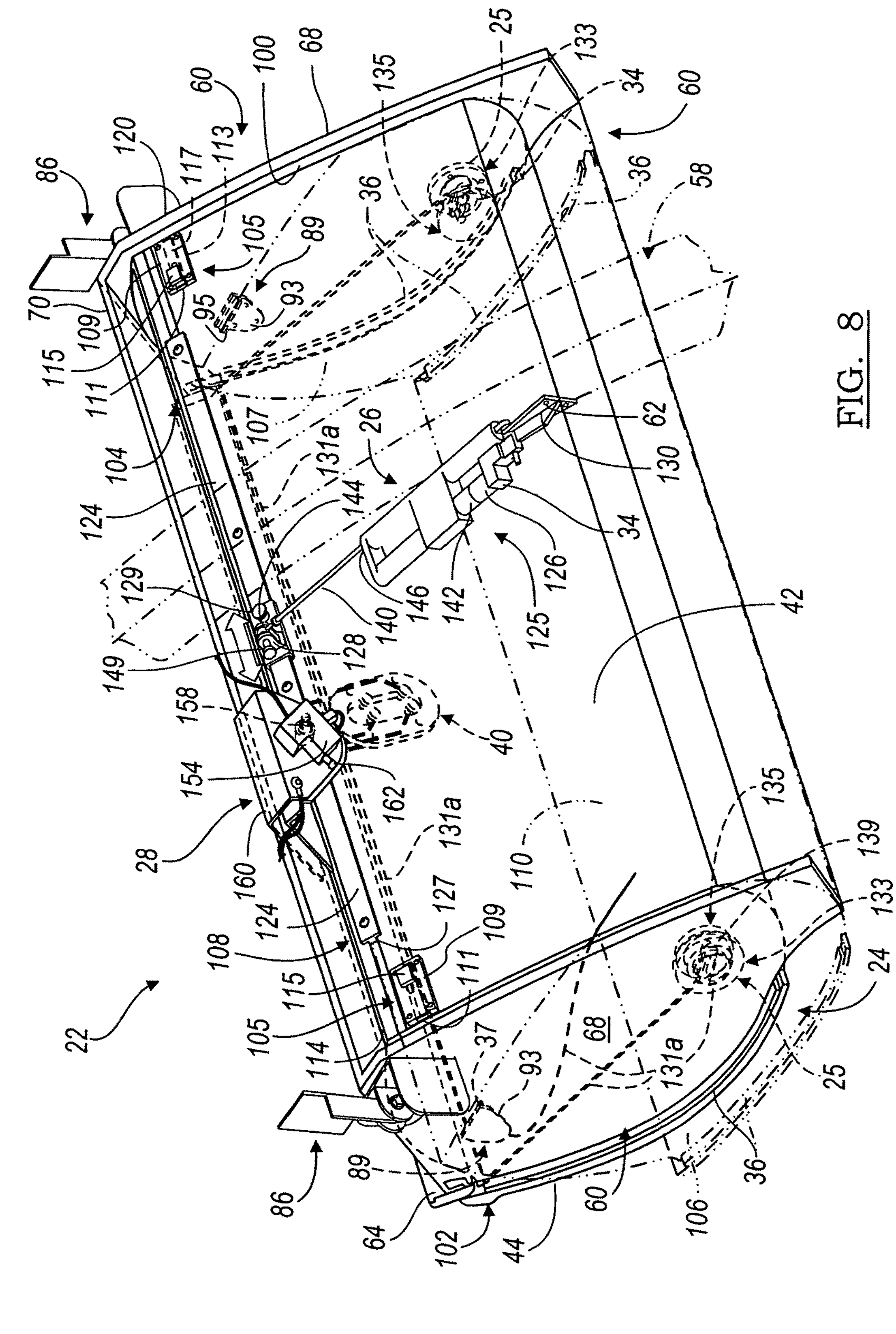
FIG. 8 is a rear view of the power-assisted compartment of FIG. 3.

The actuator system 26 includes an actuator 125 and a motor 126 coupled to the actuator 125. The actuator 125 is produced by M-Mac of Vancouver, British Columbia, Canada. The motor 126 is produced by Maxon Motors of Burlingame, Calif., USA. The motor 126 coupled with the actuator 125 comprise an electro-hydraulic linear actuator. As will be appreciated, the actuator system 26 provides a direct drive system for moving the compartment 24 and does not require additional cables or rigging of the compartment 24. The actuator system 26 is pivotably coupled to the adjustable ledger 108 of the compartment 24 via a first mounting flange 128, and is pivotably coupled to the frame 58 via a second mounting flange 130. The first mounting flange 128 comprises a car which slidably engages the rails 127 of the adjustable ledger 108. The first mounting flange 128 includes a U-shaped flange for receipt of a mechanical fastener for pivotably coupling the actuator 125 to the first mounting flange 128. The first mounting flange 128 is secured to the adjustable ledger 108 via a quick release fastener, such as a pin 129. By slideably engaging the adjustable ledger 108, the first mounting flange 128 enables the actuator system 26 to be positioned such that the actuator system 26 can be coupled to the compartment 24 generally perpendicular to the rear panel 104 in cases when the attachment of the actuator system 26 to the frame 58 is offset from the compartment 24 centerline, such as in tapered sections of the mobile platform 10. The second mounting flange 130 is generally triangular, with a first end 134 for pivotably coupling the second mounting flange 130 to the actuator system 26 and a second end 136 defining at least one or a plurality of apertures 138 for receipt of mechanical fasteners, such as screws or rivets, to couple the second mounting flange 130 to the frame 58 via the apertures 62, as best shown in FIGS. 5-7. It will be understood, however, that any appropriate mechanism or technique could be employed to couple the actuator system 26 to the compartment 24 and the frame 58, such as welding and/or adhesives.

The actuator 125 includes a rod 140 and a hydraulic pump 142. The rod 140 includes a first end 144 and a second end 146. The first end 144 includes a bearing (not specifically shown) that defines an aperture (not specifically shown) for receipt of a mechanical fastener to couple the rod 140 to the first mounting flange 128. Typically, the fastener that couples the rod 140 to the first mounting flange 128 is a quick-release fastener. The use of a quick-release fastener enables the rod 140 to be disconnected from the compartment 24 without additional disassembly. The second end 146 of the rod 140 is affected by the hydraulic pump 142 (specific attachment not shown). The hydraulic pump 142 drives the second end 146 of the rod 140 linearly upon the receipt of pressure from the hydraulic pump 142 as a result of torque from the motor 126, as is generally known in the art. It should be noted, however, that in the case of a power outage, for example, the rod 140 can act as a traditional snubber to enable the compartment 24 to be manually opened or closed, if necessary. The hydraulic pump 142 forms a closed loop system such that the actuator 125 is not affected by changes in the pressure of the cabin 14 and is a low pressure hydraulic system.

The motor 126 is coupled to the hydraulic pump 142 and communicates with and receives power from the compartment controller 30. The compartment controller 30 provides signals to the motor 126 upon the receipt of a signal to operate the compartment 24, as will be discussed in greater detail herein. More specifically, the compartment controller 30 signals the motor 126 so that the motor 126 drives the linear actuator as needed to manage the compartment 24 movement. A software system may be employed to enhance the operation of the power-assisted compartment system 12. When the motor 126 is energized, the motor 126 drives the hydraulic pump 142, which in turn drives the rod 140 to extend or retract the rod 140, depending upon the rotation of the motor 126, as is generally known in the art. The motor 126 further includes the amperage sensor 34 for monitoring an amperage, as described herein. The amperage sensor 34 is in communication with the compartment controller 30 such that the compartment controller 30 can determine, based on the motor amperage, if there is an obstruction to the movement of the compartment 24. If there is a rapid change in the sensed motor amperage, the compartment controller 30 senses that an obstruction to the movement of the compartment 24 has occurred, and the compartment controller 30 can then reverse and/or stop the motor 126 in a predetermined fashion.

If the motor amperage exceeds a predetermined maximum during initial closing efforts, the compartment controller 30 senses excessive load or weight in the compartment 24 and commands the actuator to reverse and/or stop the motor 126 while also sending signals to the indicator surface 50 of the switch system(s) 40 and the control panel 33 to indicate an overloaded or obstructed condition as applicable.

The latching system 28 includes a latch 154 and a latch sensor 156, and is in communication with and responsive to the compartment controller 30. The latching system 28 is in either wired and/or wireless communication with the compartment controller 30. The latch 154 can be formed by any suitable latch mechanism. Briefly, however, the latch 154 includes a pin 158, a receiver assembly 160, a solenoid 162, and a manual release 163. The pin 158 is coupled to the adjustable ledger 108 of the compartment 24 via mechanical fasteners (not specifically shown), such as screws; however, the pin 158 could be coupled to the compartment 24 and/or adjustable ledger 108 via molding, welding and/or adhesives. The receiver assembly 160 is coupled to the housing 60 through a mounting flange 161 via mechanical fasteners (not specifically shown); however, any suitable technique could be employed to couple the receiver assembly 160 to the housings 60 or frame 58. The receiver assembly 160 is configured to secure the pin 158 to the receiver assembly 160 to hold the compartment 24 in the closed position. The receiver assembly 160 is responsive to the solenoid 162 via a lever (not shown). The lever is pivoted by the solenoid 162 to release the pin 158 from the receiver assembly 160, as will be discussed herein.

The solenoid 162 is in communication with and responsive to the compartment controller 30 to receive power from the compartment controller 30. When the solenoid 162 receives power from the compartment controller 30, the pin 158 is released. When the pin 158 re-engages the receiver assembly 160, the pin 158 is recaptured and secured. An exemplary latch is disclosed in greater detail in U.S. Pat. No. 4,597,599, assigned to and commercially available from Southco., Inc. of Concordville, Pa., and incorporated by reference herein in its entirety. The solenoid 162 is also coupled to the manual release 163. The manual release 163 includes a push-button 165 and a cable 167. The push-button 165 can be accessible by a crewmember C in the cabin 14 to enable the release of the compartment 24 in cases of a power outage or system failure, for example. The push button 165 is coupled to the cable 167. The cable 167 is in turn coupled to the receiver assembly 160. In the case where manual release of the compartment 24 is necessary, the depression of the push-button 165 causes the cable 167 to release the pin 158.

Based on the position of the pin 158, the compartment controller 30 also determines whether the latching system 28 is latched or unlatched. The latch sensor 156 is comprised of multiple micro-sensors (not shown) to verify that the pin 158 has securely entered the latch engagement device (not shown) of the receiver assembly 160. In addition, the latch sensor 156 is in wired and/or wireless communication with the compartment controller 30 to send a signal if the pin 158 is not fully engaged and secured in the receiver assembly 160.

In order to operate one of the compartments 24, when the compartment 24 is in the closed and latched position, an operator in the cabin 14 depresses the switch system(s) 40 or applicable control panel 33 button, as shown in FIGS. 1 and 4. This sends a signal to the compartment controller 30 that a request to open the compartment 24 has been made. The compartment controller 30 then supplies power to the solenoid 162, which causes the pushrod 166 of the solenoid 162 to release the pin 158. Once the compartment 24 is unlatched, the compartment controller 30 provides power to the motor 126 of the actuator system 26. The torque from the motor 126 then drives the hydraulic pump 142, which drives the actuator 125 to extend the rod 140 and, thus, lower the compartment 24 into the full opened position (FIG. 7). When the compartment 24 reaches the full opened position, the open sensor 37 sends a signal to the compartment controller 30 to indicate that the compartment 24 has reached the full opened position. When the compartment 24 is in the opened position, the operator may then place his/her items into the compartment 24.

When the compartment 24 is in an opened position, the compartment 24 is commanded to close by pressing the appropriate switch system(s) 40. This sends a signal to the compartment controller 30 that a request to raise the compartment 24 has been made. Alternatively, the compartment 24 can be commanded to close by the user pressing up on the compartment 24. By pressing up on the compartment 24 when in the full open position, the open sensor 37 sends a signal to the compartment controller 30 that the compartment 24 is no longer in the full opened position. Based on the signal from the open sensor 37, the compartment controller 30 signals the actuator system 26 to raise the compartment 24. If the compartment 24 is not fully open or closed, pressing up or pulling down on the compartment 24 would transmit a signal via the one or a combination of many sensors, such as the amperage sensor 34 or position sensor 139, to signal the compartment controller 30 to send a signal to the actuator system 26 to raise or lower the compartment 24, respectively.

In any event, when the compartment controller 30 determines that the compartment 24 should be raised, the compartment controller 30 supplies power to the motor 126 of the actuator system 26 (FIG. 2). The torque from the motor 126 drives the hydraulic pump 142, which drives the actuator 125 to retract the rod 140 and thus raise the compartment 24. If the load of the items contained in a single compartment 24 exceed a predetermined threshold as determined by the amperage sensor 34, then a signal is sent to the compartment controller 30 to reverse and/or stop the motor 126 and indicate that the allowable weight of the compartment 24 has been exceeded. The compartment controller 30 then sends a signal to the speaker 54 of the indicator surface 50 to announce that the weight has been exceeded, and a signal to the LEDs 52 on the indicator surface 50 to illuminate to signal a compartment overloaded condition (FIG. 4). In addition, a notification will be provided to the control panel 33 for annunciation.

Once the passenger has loaded his/her personal items, the operator depresses the switch system(s) 40 (FIGS. 1 and 4). This sends a signal to the compartment controller 30 that a request to raise the compartment 24 has been made. The compartment controller 30 then supplies power to the motor 126 of the actuator system 26 (FIG. 2). The torque from the motor 126 drives the hydraulic pump 142, which drives the actuator 125 to retract the rod 140 and thus raise the compartment 24. As the compartment 24 is moved into the closed position, the pin 158 of the latching system 28 enters into the receiver assembly 160 (FIG. 5). The pin 158 moves into the receiver assembly 160 until the latch sensor 156 detects a closed position, then the compartment controller 30 discontinues the supply of power to the motor 126 of the actuator system 26. If, however, the pin 158 is not fully secured in the receiver assembly 160, then the latch sensor 156 will send a signal to the compartment controller 30 that the compartment 24 is not properly latched. Based on this signal from the latch sensor 156, the compartment controller 30 will then send a signal to the speaker 54 of the indicator surface 50 to announce that the compartment 24 is not properly latched, and send a signal to the LEDs 52 on the indicator surface 50 to illuminate to signal an incorrectly latched compartment condition (FIGS. 2 and 4). In addition, a notification will be provided to the control panel 33 for annunciation.

If, during travel of the compartment 24, the compartment 24 encounters a sudden change in loading (primary obstruction detection) as determined by the amperage sensor 34, a signal is sent to the compartment controller 30 to reverse and or stop the direction of the motor 126. The compartment controller 30 then reverses or stops the motor 126 by altering or discontinuing the supply of power to the motor 126. Based on the signal from the amperage sensor 34, the compartment controller 30 will then send a signal to the speaker 54 of the indicator surface 50 to announce that the compartment 24 has encountered an obstruction, and a signal to the LEDs 52 on the indicator surface 50 to illuminate signaling an obstructed condition of the compartment 24 (FIGS. 2 and 4). In addition, a notification will be provided to the control panel 33 for an appropriate annunciation. If, during travel of the compartment 24, the compartment 24 encounters an object as determined by one of the obstruction sensors 36, the obstruction sensor 36 will send a signal to the compartment controller 30. The compartment controller 30 then briefly reverses the direction of the motor 126 and then discontinues the supply of power to the motor 126 to stop the movement of the compartment 24. The compartment controller 30 also sends a signal to the speaker 54 of the indicator surface 50 to announce that there is an obstruction, and sends a signal to the LEDs 52 on the indicator surface 50 to illuminate to signal an obstructed condition. Upon clearing the obstruction, the user may depress either one of the OPEN or CLOSE buttons 46, 48 to operate the compartment 24 in the desired direction.

In addition, if a crew member desires to control the operation or prevent the operation of a certain compartment or compartments 24, the crew member, through the appropriate control panel 33, can manage use of any and all applicable compartment(s). In the alternative, a software program could be used to manage operation of selected compartments 24. When the associated area user input device **56*a*, specific compartment user input device 56*b* and functional user input device 56*c* are depressed, signals are sent from the control panel 33 to the central controller 32. The central controller 32 then routes the commands or signals to the affected compartment controllers 30. The compartment controllers 30 then perform the requested operation and provide annunciation on the applicable LEDs 52 on the indicator surface 50 as well as annunciation on the control panel 33**.

Thus, the present disclosure provides the power-assisted compartment system 12 with no visible mechanisms to the cabin 14 to raise and lower the compartments 24. Specifically, as the actuator system 26 is coupled to the rear wall of the compartment 24, the actuator system 26 cannot be damaged by the loading and unloading of personal items stored in the compartment 24. Further, the present disclosure requires a single attachment to the support structure instead of the two attachments typically required, such as the two latches and snubbers traditionally employed to operate the compartments 24.

Figure 9:
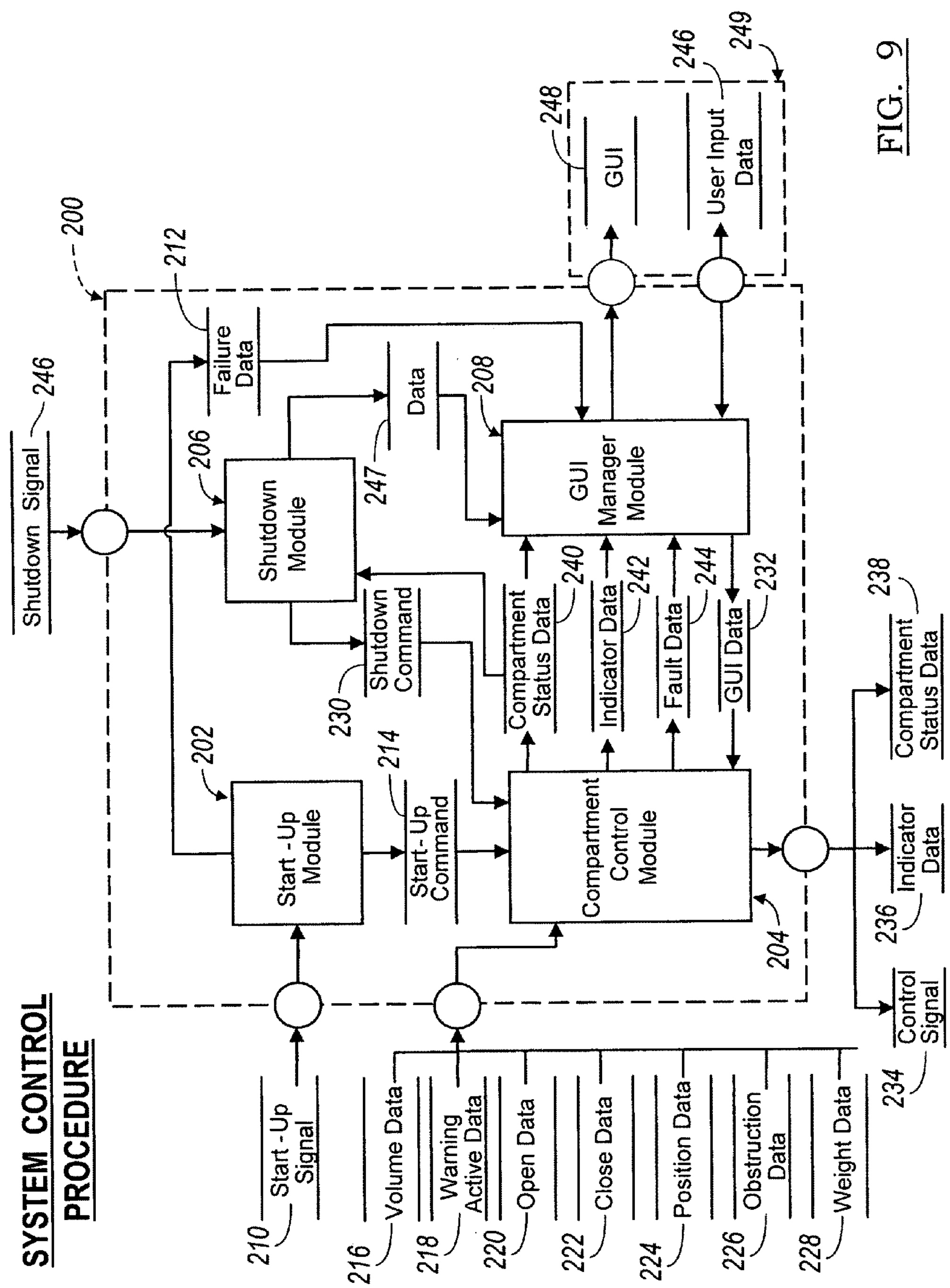
FIG. 9 (System Control Module) is a dataflow diagram illustrating an exemplary compartment control system of the present disclosure.

Referring now to FIG. 9 (System Control Module), the control system 20 includes a control module 200. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. In FIG. 9 (System Control Module), a dataflow diagram illustrates various components of a compartment control system that can be embedded within a control module 200. Various embodiments of compartment control systems according to the present disclosure may include any number of sub-modules embedded within the control module 200. The sub-modules shown may be combined and/or further partitioned to similarly monitor the compartment(s) 24. Inputs to the system may be received from the amperage sensors 34, obstruction sensors 36, open sensors 37, position sensors 139, switches 40, volume sensors 41, latch sensor 156, or other sensors (not shown), or even received from other control modules (not shown) within the mobile platform 10, and/or determined by other sub-modules (not shown) within the control module 200 (not shown). In various embodiments, the control module 200 of FIG. 9 (System Control Module) includes a start-up module 202, a compartment control module 204, a shutdown module 206, and a graphical user interface (GUI) manager module 208.

The start-up module 202 receives as input a start-up signal 210. The start-up signal 210 indicates an initiation of the control system 20. The start-up module 202 performs a start-up procedure upon receipt of the start-up signal 210 and outputs failure data 212 or sets a start-up command 214 accordingly. The compartment control module 204 receives as input the start-up command 214, volume data 216, warning active data 218, open data 220, close data 222, position data 224, obstruction data 226, weight data 228, and a shutdown command 230.

The compartment control module 204 also receives GUI data 232 as input. Based on these inputs, the compartment control module 204 determines a proper function for the compartment(s) 24, and sets control signal 234, indicator data 236 and compartment status data 238. The compartment control module 204 also sets compartment status data 240, indicator data 242, and fault data 244 for the graphical user interface (GUI) manager module 208.

The shutdown module 206 receives as input a shutdown signal 245 and compartment status data 240. The shutdown signal 245 indicates a termination of the system. The shutdown module 206 performs a shutdown procedure upon receipt of the shutdown signal 245 and outputs data 247 or sets the shutdown command 230 accordingly. The GUI manager module 208 receives as input the failure data 212, compartment status data 240, indicator data 242, fault data 244 and user input data 246. Based on these inputs, the GUI manager module 208 generates GUI information 248 for a GUI based control panel 249. The GUI manager module 208, the GUI control panel 249, the user input data 246 and the GUI information 248 can collectively be viewed as forming a graphical user interface subsystem of the control module 200.

Figure 10:
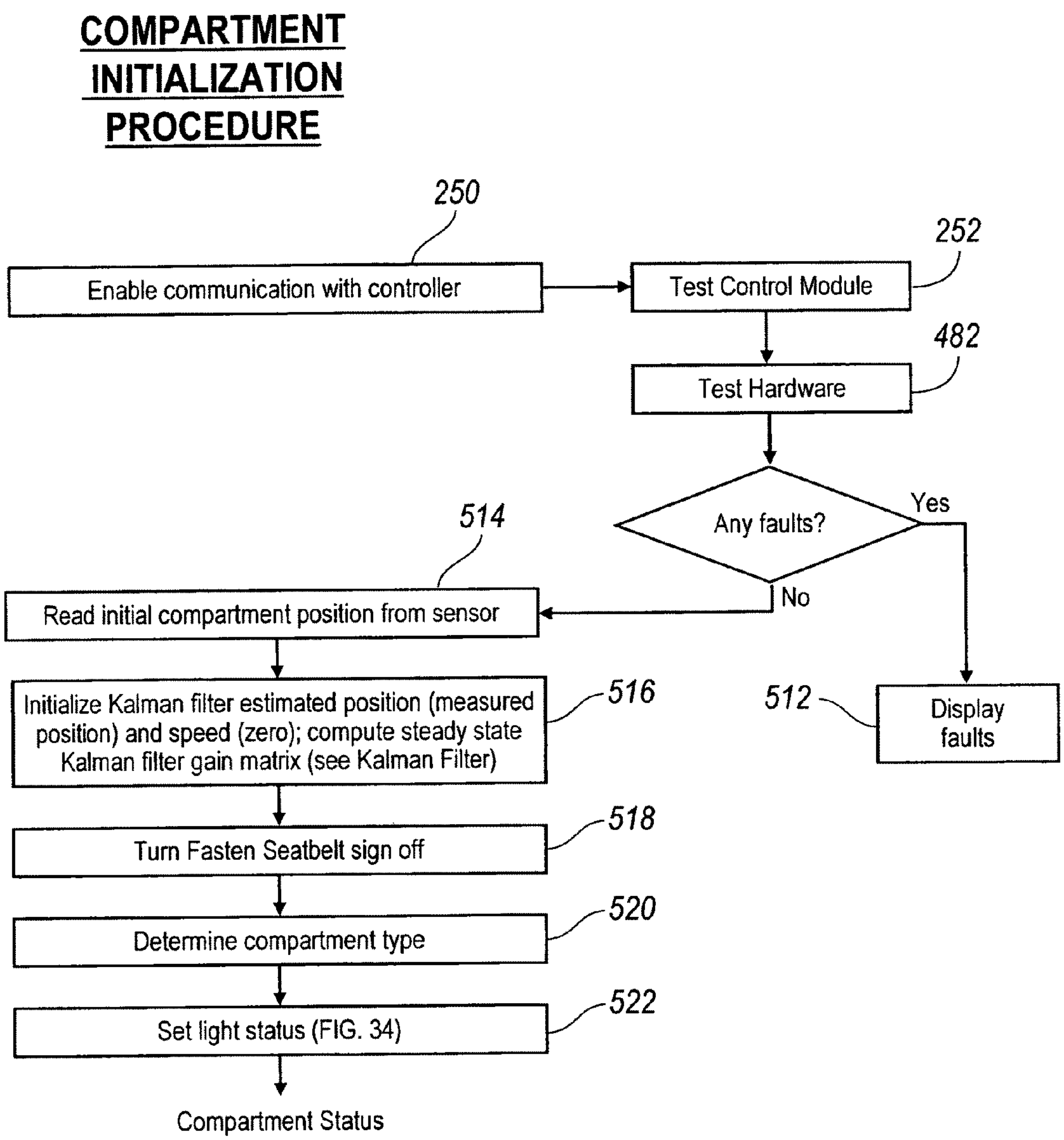
FIG. 10 (Compartment Initialization Procedure) is a flowchart illustrating a start-up method for the system of FIG. 9 (System Control Procedure)

With additional reference to FIG. 10 (Compartment Initialization Procedure), a process flow diagram illustrates a start-up sequence performed by the start-up module 202. In operation 250, communication is enabled with the compartment controller 30. In operation 252, control tests the control module 200.

Figure 11:
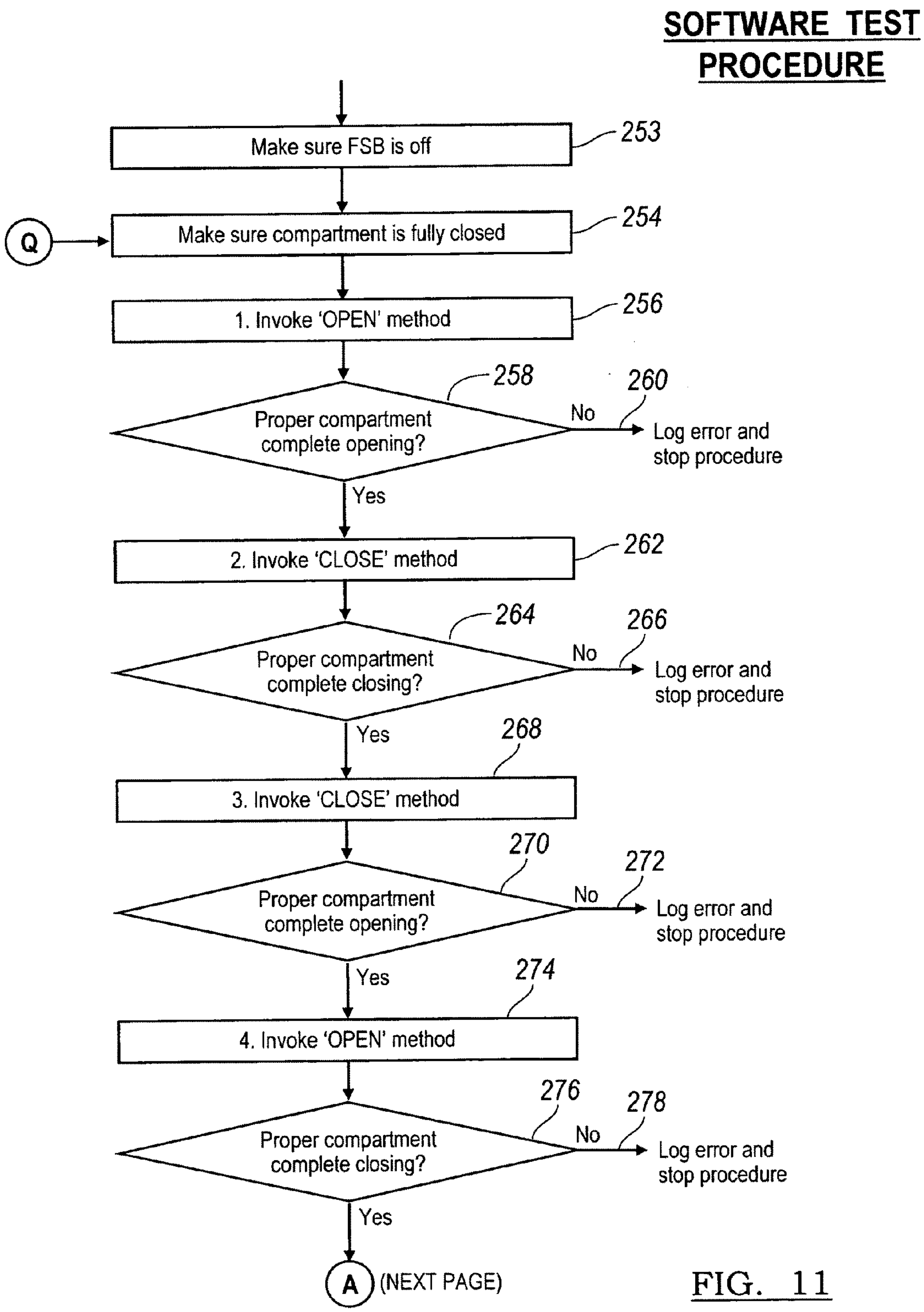
FIG. 11 (Control Module Test Procedure) is a flowchart illustrating a first method for testing the control system.

With reference now to FIG. 11 (Control Module 200 Test Procedure), a process flow diagram illustrates a method performed to test the control module 200. In operation 253, control makes sure the warning sign, such as the "Fasten Seatbelts" sign, is off. Then, in operation 254, control first makes sure the compartment 24 is fully closed. In operation 256, control tests the logic associated with the OPEN button 46 on the switch system 40. If, in operation 258, the compartment 24 unlatches and begins moving into the opening direction, and stops in the fully opened position, then in operation 262, control tests the logic associated with the CLOSE button 48 of the switch system 40. Otherwise, in operation 260, the error is logged and the control module 200 test is complete.

In operation 264, after the CLOSE button 48 test has been initiated, the compartment 24 should move into the closed position and latch. If the compartment 24 does not close and latch, in operation 266, then error is logged. Otherwise, in operation 268, control initiates the logic associated with a signal from the CLOSE button 48 of the switch system 40. The compartment 24 should unlatch and begin moving into the fully open position until the fully opened position is reached. In operation 270, if the compartment 24 has successfully opened, then, in operation 274, control initiates the logic associated with the OPEN button 46 of the switch system 40. Otherwise, in operation 272, the error is logged and the control module 200 test is complete.

With the OPEN button 46 logic test initiated, while the compartment 24 is in the fully opened position, the compartment 24 should begin moving into the closed position. If, in operation 276, the compartment 24 reaches the closed position successfully, then with reference now to FIG. 12 (Control Module 200 Test Procedure), in operation 280, with the compartment in the fully closed position, control tests the logic associated with an operator depressing the switch system 40 such that the compartment 24 moves into the opened position. Otherwise, with reference back to FIG. 11 (Control Module 200 Test Procedure), in operation 278, the error is logged and the control module 200 test is complete.

Figure 12:
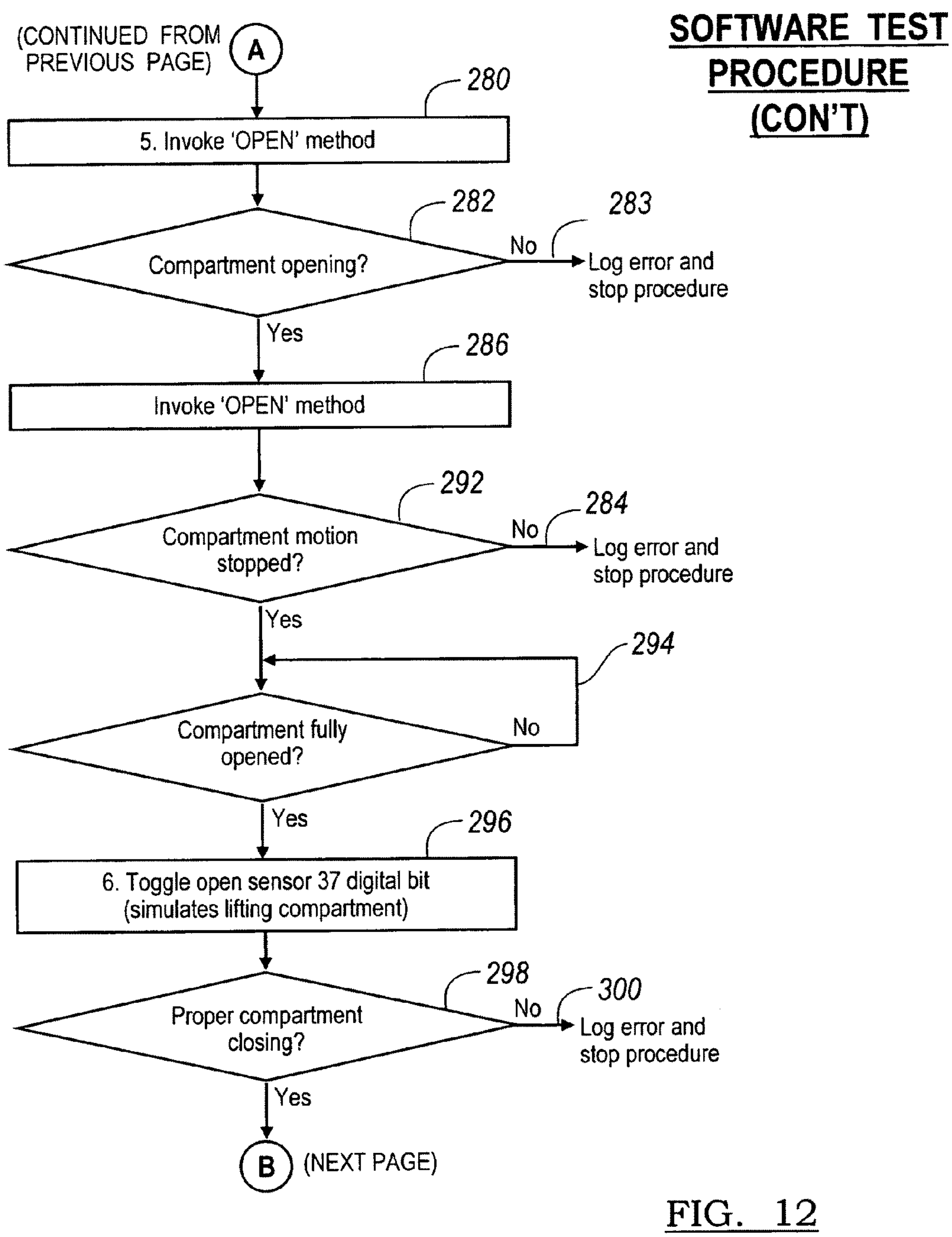
FIG. 12 (Control Module Test Procedure) is a continuation of the flowchart of FIG. 11 (Control Module Test Procedure) at A.

With reference to FIG. 12 (Control Module 200 Test Procedure), if the compartment 24 is opening in operation 282, then the control initiates the logic associated with the OPEN button 46 in operation 286 to pause the motion of the compartment 24. If the compartment 24 is not opening then in operation 283 the error is logged and the control module 200 test is complete. The motor 126 should stop and the compartment 24 should continue to open under gravity. Otherwise, the error is logged in operation 284 and the control module 200 test is complete.

If the motion of the compartment 24 has stopped, then in operation 292, the compartment 24 should be fully opened under gravity. If the compartment 24 is not fully opened under gravity, then in operation 294, control loops until the compartment 24 is fully opened. With the compartment 24 fully opened, in operation 296, control initiates the logic associated with the compartment 24 being lifted off of the open sensor 37. The compartment 24 should begin moving into the closed position. In operation 298, if the compartment 24 closes successfully, then with reference now to FIG. 13 (Control Module 200 Test Procedure), control initiates the opening of the compartment 24 by the depressing either the OPEN button 46 or the CLOSE button 48 of the switch system 40 in operation 302. Otherwise, in operation 300 the error is logged and the control module 200 test is complete (FIG. 12).

Figure 13:
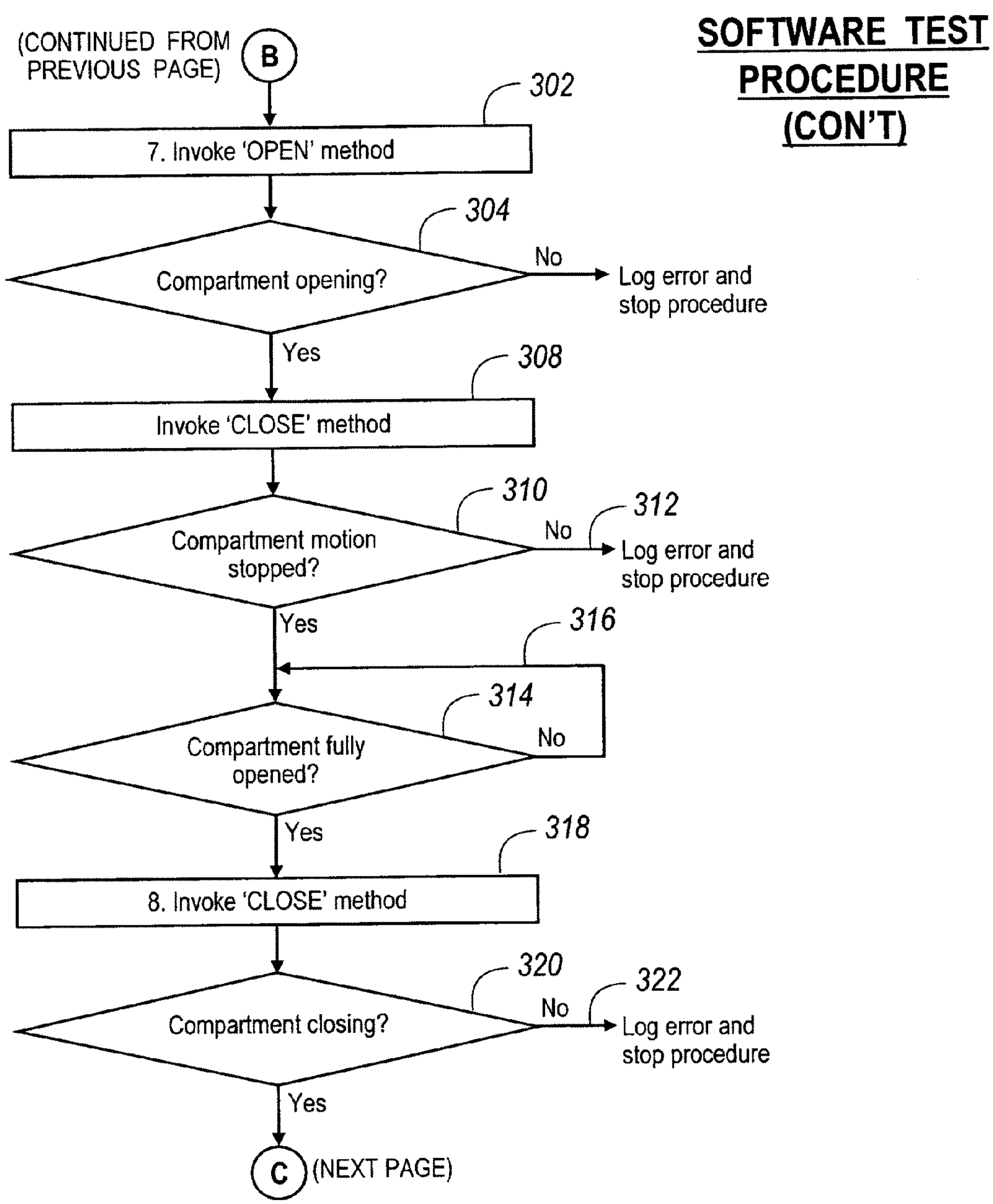
FIG. 13 (Control Module Test Procedure) is a continuation of the flowchart of FIG. 12 (Control Module Test Procedure) at B.

With continuing reference to FIG. 13 (Control Module 200 Test Procedure), in operation 304, if the compartment 24 is opening, then in operation 308 control initiates the depression of the CLOSE button 48. Then, the motor 126 should stop and the compartment 24 should continue to open under gravity. If, in operation 310, the motor 126 did not stop, then in operation 312, the error is logged and the control module 200 test is complete.

Figure 14:
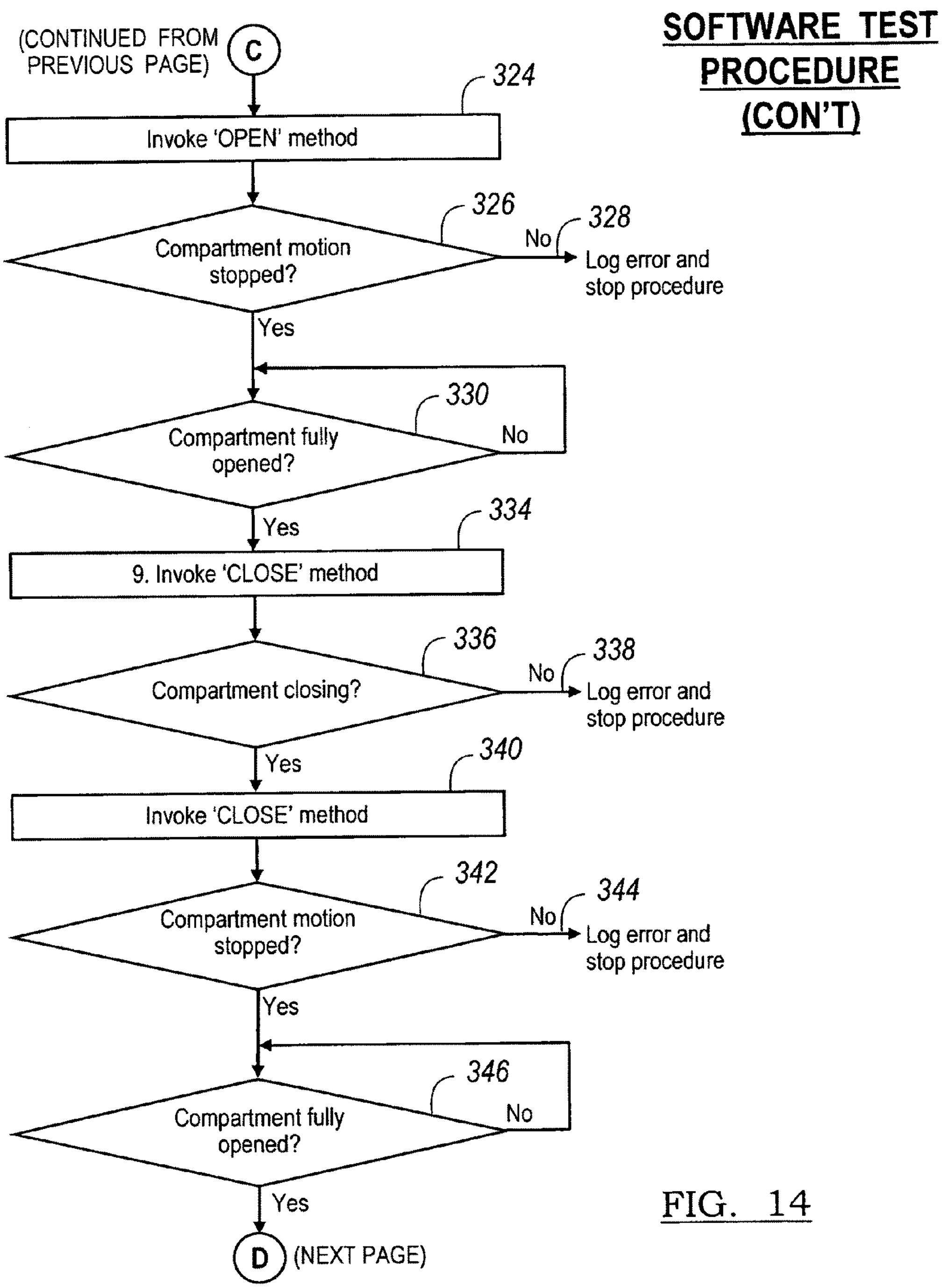
FIG. 14 (Control Module Test Procedure) is a continuation of the flowchart of FIG. 13 (Control Module Test Procedure) at C.

In operation 314, if the compartment 24 is fully opened under the power of gravity, then in operation 318, control initiates the logic associated with the depression of the CLOSE button. Otherwise, control loops in operation 316 until the compartment 24 is fully opened. After the CLOSE button 48 logic is initiated, then in operation 320, if the compartment 24 is closing, then, in operation 324, control initiates the logic associated with the OPEN button 46 being depressed as shown in FIG. 14 (Control Module 200 Test Procedure). Otherwise, if the compartment 24 is not closing, then, in operation 322 the error is logged and the control module 200 test is complete.

When the OPEN button 46 logic initiated, the motor 126 and the compartment 24 should stop, and return to the fully opened position under gravity. In operation 326, if the compartment 24 motion has stopped, and, in operation 330, if the compartment 24 is fully opened, then in operation 334, control initiates the logic associated with either the OPEN button 46 or CLOSE button 48 being depressed. Otherwise, in operation 328, the error is logged and the control module 200 test is complete.

Figure 15:
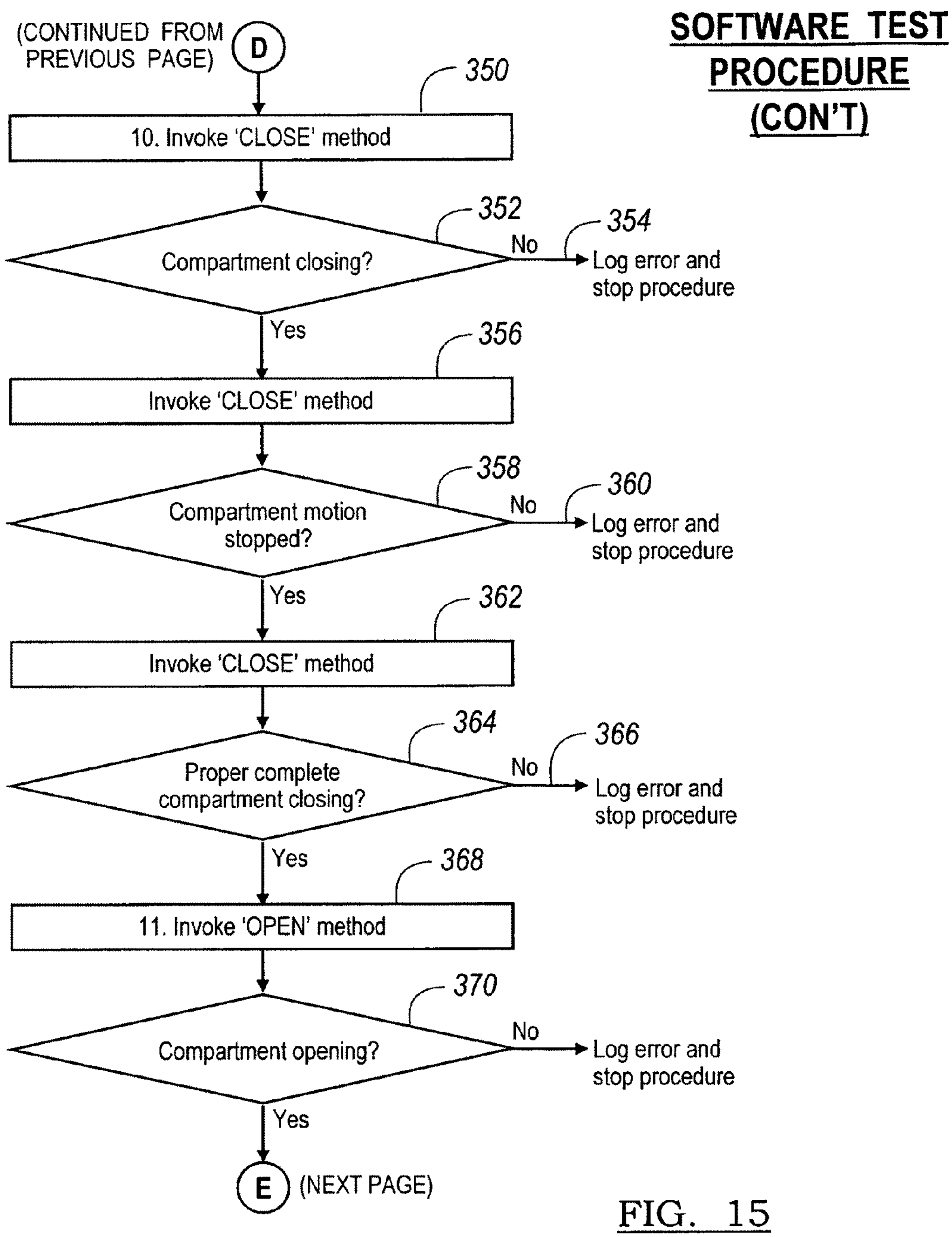
FIG. 15 (Control Module Test Procedure) is a continuation of the flowchart of FIG. 14 (Control Module Test Procedure) at D.

In operation 336, if the compartment 24 is closing, then in operation 340, control initiates the CLOSE button 48 logic. Otherwise, in operation 338, the error is logged and the control module 200 test is complete. If in operation 342 the motor 126 stops, and then control loops in operation 346 the compartment 24 opens under the power of gravity. With reference to FIG. 15 (Control Module 200 Test Procedure), once the compartment 24 is fully opened, in operation 350 control initiates the logic associated with the depression of the CLOSE button 48.

In operation 352, if the compartment 24 is closing, then in operation 356 control initiates the logic associated with either the OPEN button 46 or CLOSE button 48 being depressed. Otherwise, in operation 354 the error is logged and the control module 200 test is complete. With the logic associated with the OPEN or CLOSE buttons 46, 48 depressed initiated in operation 358, the motor 126 should stop and the compartment 24 should continue to open under gravity. If the motor 126 does not stop, then the error is logged in operation 360 and the control module 200 test is complete. If the motor 126 stops in operation 358, then in operation 362 control initiates the logic associated with the CLOSE button 48 being depressed.

Figure 16:
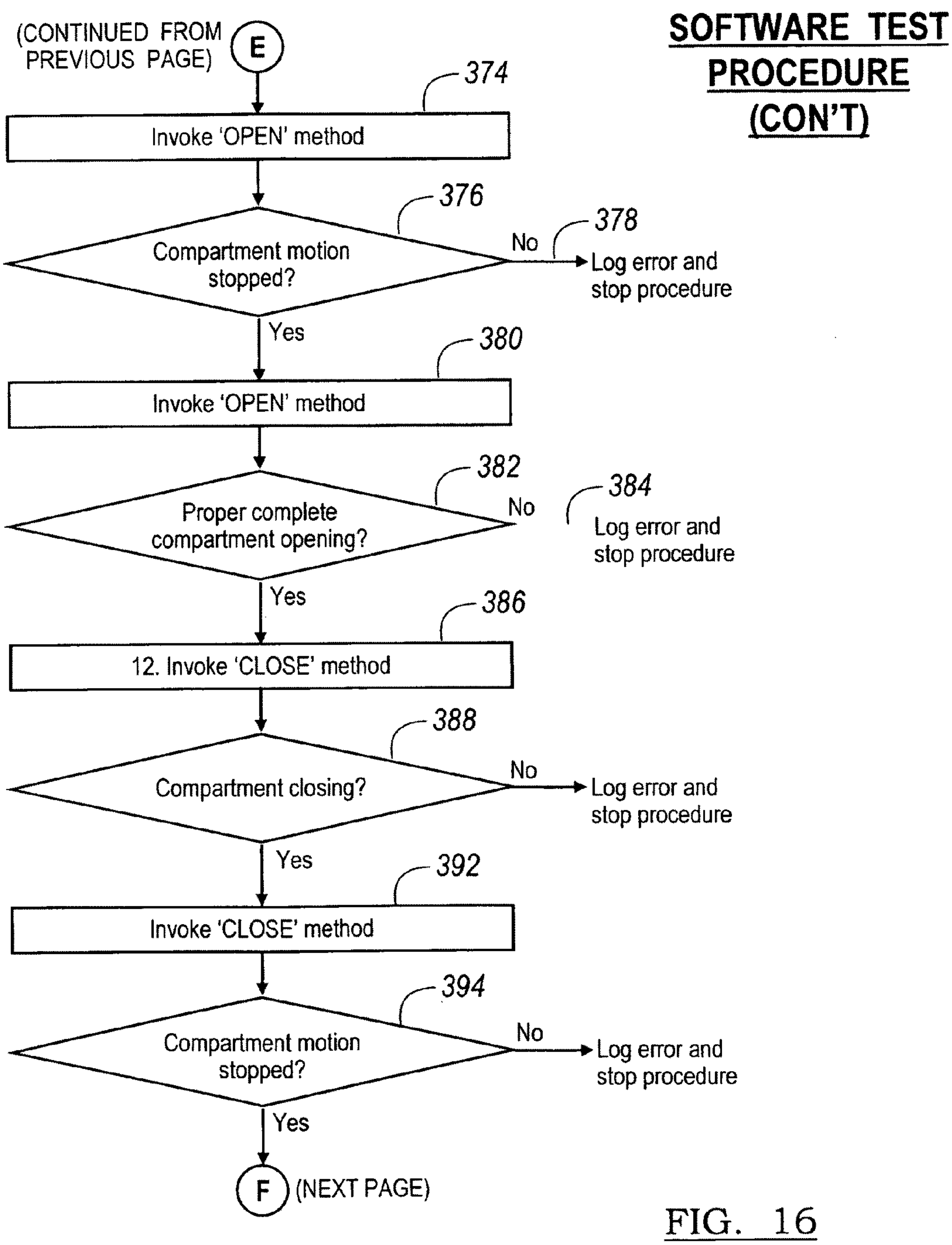
FIG. 16 (Control Module Test Procedure) is a continuation of the flowchart of FIG. 15 (Control Module Test Procedure) at E.

If in operation 364, the compartment 24 has reached the fully closed position, then in operation 368, control initiates the logic associated with the OPEN button 46 or CLOSE button 48 being depressed. Otherwise, in operation 366 the error is logged and the control module 200 test is complete. If in operation 370, the compartment 24 is opening, then with reference now to FIG. 16 (Control Module 200 Test Procedure), in operation 374 control initiates the logic associated with OPEN button 46 or CLOSE button 48 being depressed. If the compartment 24 is not opening, in operation 370, then the error is logged and the control module 200 test is complete. If in operation 376 motor 126 has stopped then, in operation 380, control initiates the logic associated with the depression of the OPEN button 46. Otherwise, the error is logged in operation 378 and the control module 200 test is complete.

Figure 17:
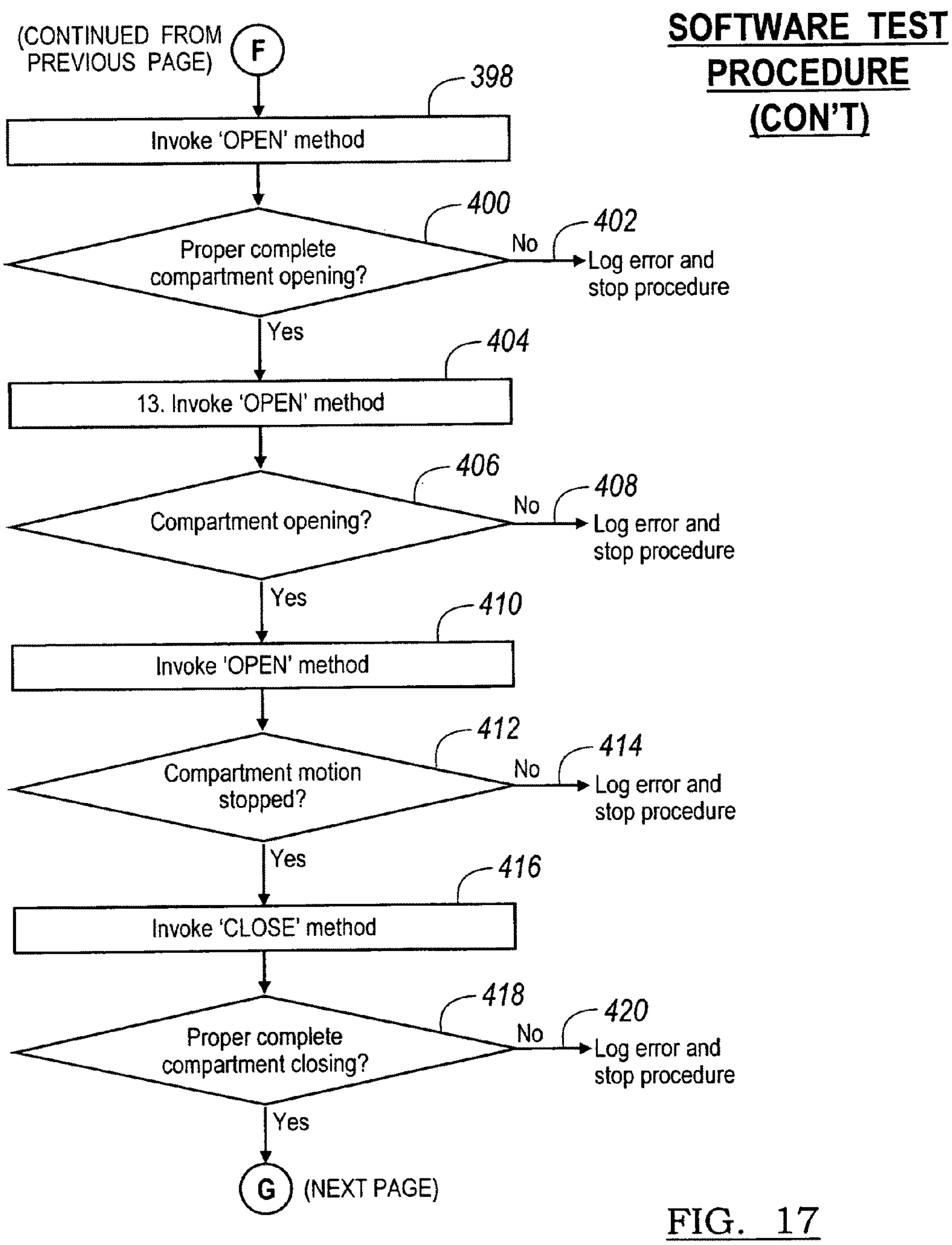
FIG. 17 (Control Module Test Procedure) is a continuation of the flowchart of FIG. 16 (Control Module Test Procedure) at F.

If in operation 382, the compartment 24 has completed opening into the fully opened position, then in operation 386 the CLOSE button 48 logic is initiated. Otherwise, the error is logged in operation 384 and the control module 200 is complete. If in operation 388 the compartment 24 is closing, then in operation 392 the control initiates the logic associated with the depression of either the OPEN button 46 or CLOSE button 48. Then in operation 394, with reference to FIG. 17 (Control Module 200 Test Procedure) if the compartment 24 has stopped moving, then in operation 398 control initiates the OPEN button 46 logic. If in operation 400 the compartment 24 completes opening into the fully opened position, then in operation 404 control initiates the logic associated with the depression of either the OPEN or CLOSE buttons 46, 48. Otherwise, the error is logged in operation 402 and the control module 200 is complete.

In operation 406, if the compartment 24 is opening, then in operation 410 control initiates the logic associated with the depression of either the OPEN or CLOSE buttons 46, 48 to pause the motion of the compartment 24. If the compartment 24 is not opening, then the error is logged and the control module 200 test is complete in operation 408.

Figure 18:
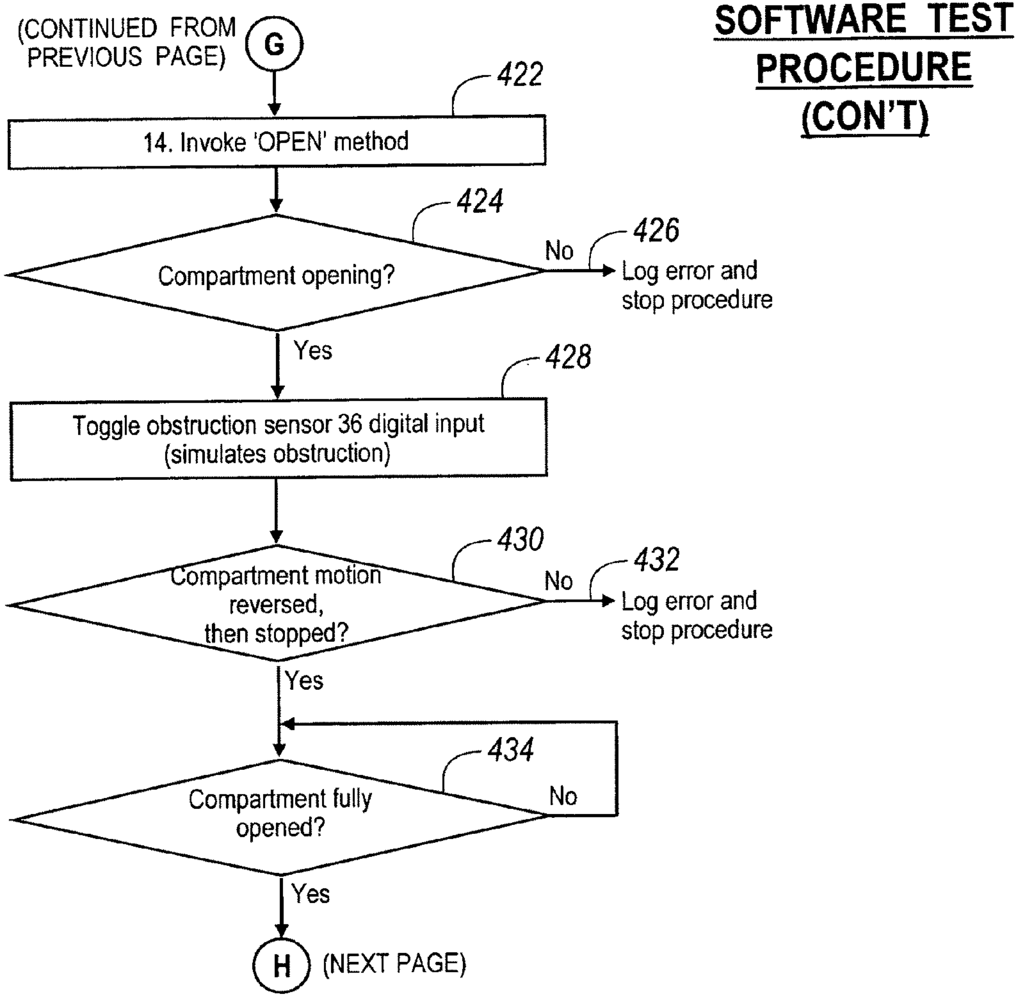
FIG. 18 (Control Module Test Procedure) is a continuation of the flowchart of FIG. 17 (Control Module Test Procedure) at G.

In operation 412, if the motor 126 has stopped, then in operation 416 the CLOSE button 48 logic is initiated. If the motor 126 does not stop, then the error is logged and the control module 200 test is complete. In operation 418, if the compartment 24 has completed closing, then with reference to FIG. 18 (Control Module 200 Test Procedure), control initiates the logic associated with the depression of either the OPEN or CLOSE buttons 46, 48 in operation 422. Otherwise, in operation 420 the error is logged and the control module 200 test is complete.

Figure 19:
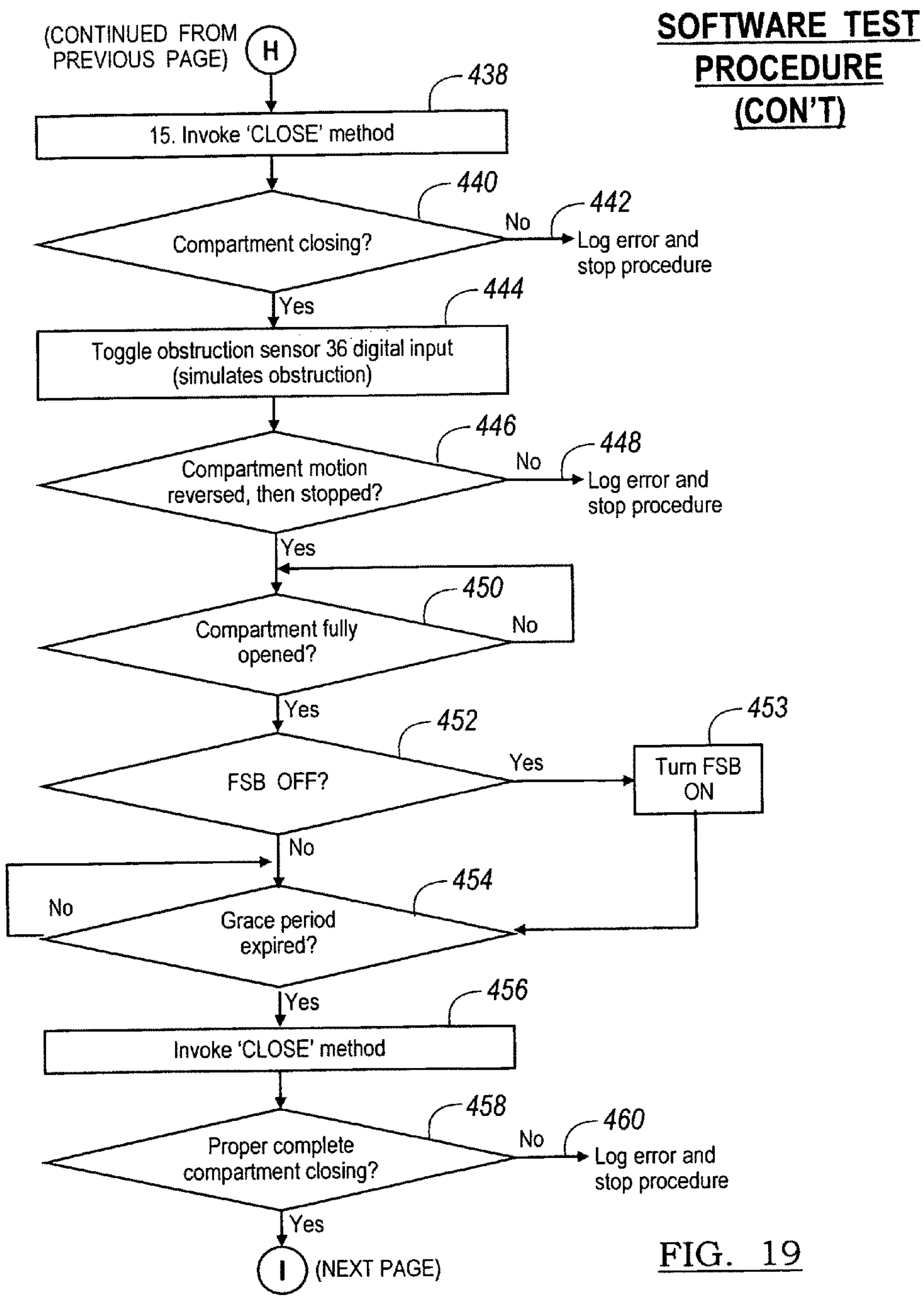
FIG. 19 (Control Module Test Procedure) is a continuation of the flowchart of FIG. 18 (Control Module Test Procedure) at H.

If in operation 424 the compartment 24 is opening, then in operation 428 control initiates the obstruction sensor 36 logic. If in operation 430 the motor 126 reverses its direction of motion and then stops, then control goes to operation 434. Otherwise, the error is logged and the control module 200 test is complete in operation 426. In operation 434, if the compartment 24 has reached the fully open position under gravity, then with reference to FIG. 19 (Control Module 200 Test Procedure), control initiates the logic associated with the depression of the switch system 40 in operation 438.

If, in operation 440, the compartment 24 is closing, then, in operation 444, control initiates the logic of a second force being applied to the obstruction sensor 36. Otherwise, the error is logged and the control module 200 test is complete in operation 442. If, in operation 446, the motor 126 reverses direction and then stops, then control goes to operation 450. Otherwise, the error is logged and the control module 200 test is complete in operation 448. In operation 450, if the compartment 24 has reached the fully opened position, then, the warning sign logic is initiated. In operation 452, control determines if the warning sign is off. If the warning sign is off, then in operation 453, control turns the warning sign on and loops to Q. If the warning sign is on, then in operation 454, control determines if the grace period has expired, and loops to operation 454 until the grace period expires. Once the grace period of the warning sign has expired, in operation 456, control initiates the logic associated with the depression of the switch system 40, and the compartment 24 should move into the closed position. If in operation 458 the compartment 24 does not reach the fully closed position, then in operation 460 the error is logged and the control module 200 test is complete.

Figure 20:
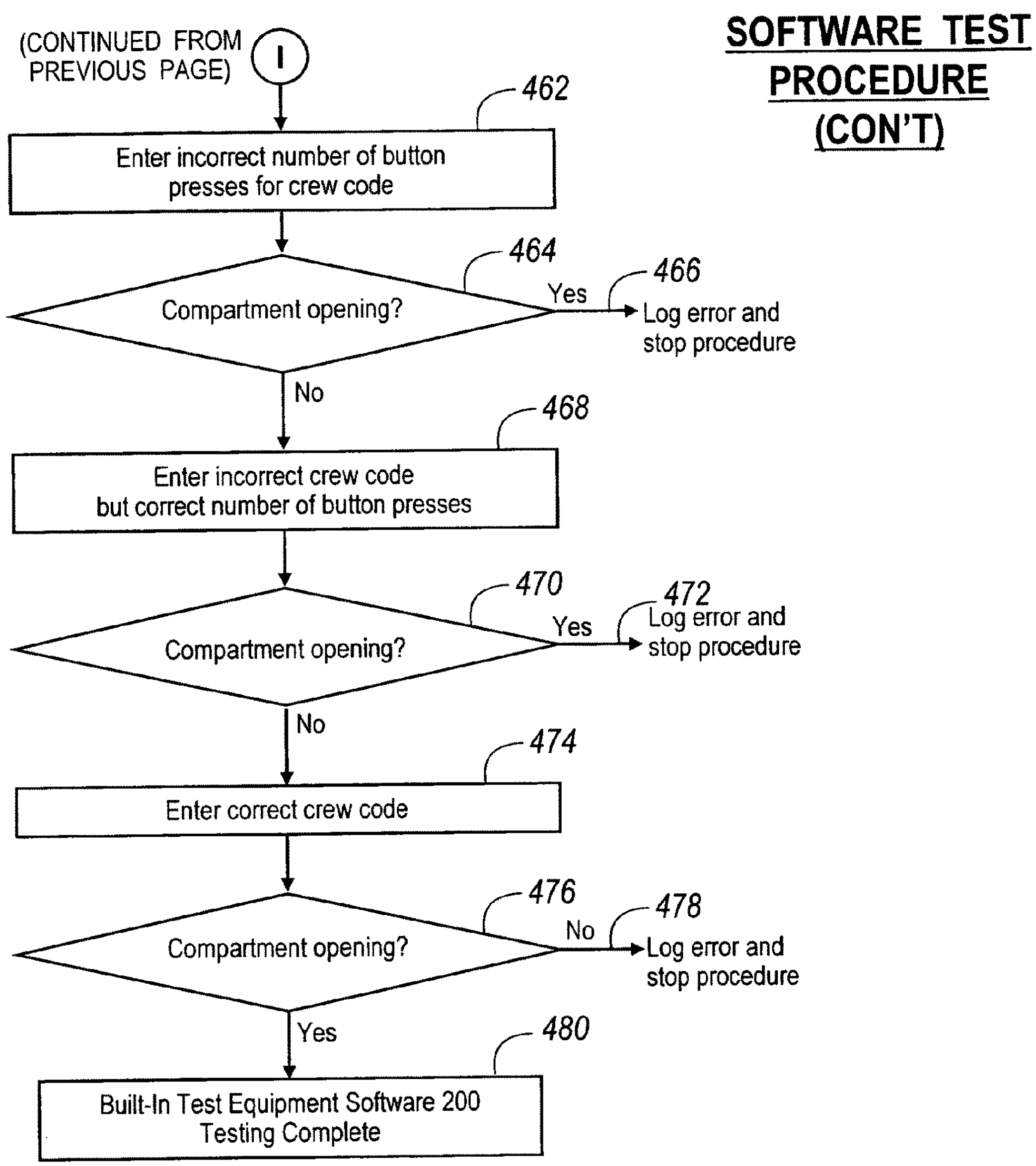
FIG. 20 (Control Module Test Procedure) is a continuation of the flowchart of FIG. 19 (Control Module Test Procedure) at I.

Once the compartment 24 is closed, with reference to FIG. 20 (Control Module 200 Test Procedure), in operation 462, control initiates the logic associated with an operator depressing the OPEN or CLOSE buttons 46, 48 an incorrect number of times for the crew code. If, in operation 464, the compartment 24 opens, then in operation 466 the error is logged and the control module 200 test is complete. Otherwise, in operation 468, control tests the logic associated with an incorrect crew code. If, in operation 470, the compartment 24 is opening, then, in operation 472, the error is logged and the control module 200 test is complete. Otherwise, in operation 474, control tests the logic of a correct crew code being entered, and if, in operation 476, the compartment 24 opens, then, in operation 480, the control module 200 test is complete. Otherwise, the error is logged in operation 478 and the control module 200 test is complete.

Figure 21:
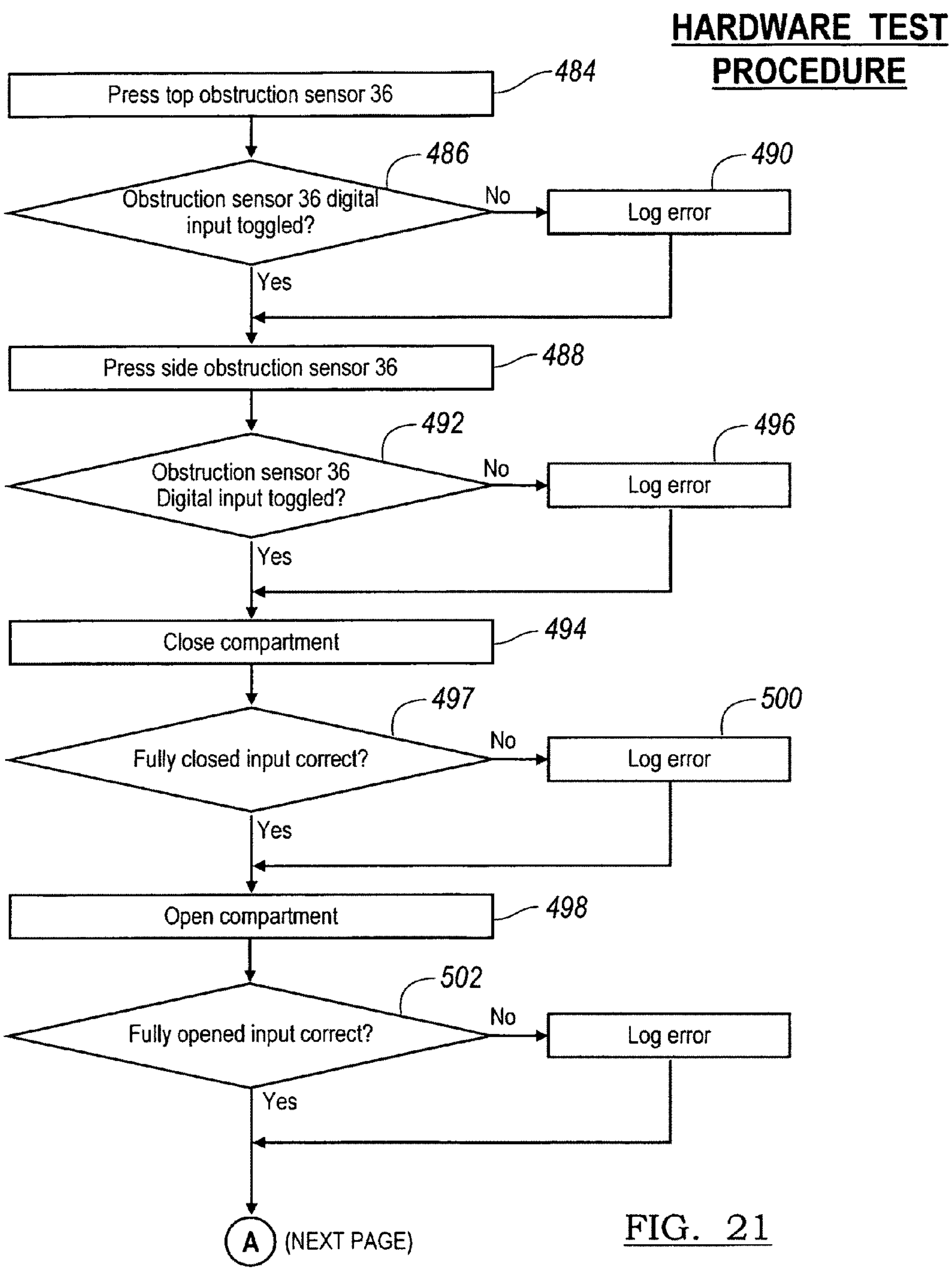
FIG. 21 (Hardware Test Procedure) is a flowchart illustrating a second method for testing the system.

With reference back to FIG. 10 (Compartment Initialization Procedure), in operation 482, the hardware is tested. With reference now to FIG. 21, a process flow diagram illustrates a method performed to test the hardware. In order to test the hardware, an operator depresses the obstruction sensor 36 in operation 484. If the obstruction sensor 36 input is sensed in operation 486, then the operator depresses the obstruction sensor 36 coupled to the sidewall 68 of the compartment 24 in operation 488. Otherwise, the error is logged in operation 490. If the side obstruction sensor 36 input is sensed in operation 492, then the compartment 24 is instructed to close in operation 494. Otherwise, the error is logged in operation 496. If in operation 497, the latch sensor 156 sends a signal that the compartment 24 is latched and closed, then in operation 498, the compartment 24 is commanded to open. Otherwise, the error is logged in operation 500. In operation 502, if the open sensor 37 does not signal that the compartment 24 is fully opened, the error is logged.

Figure 22:
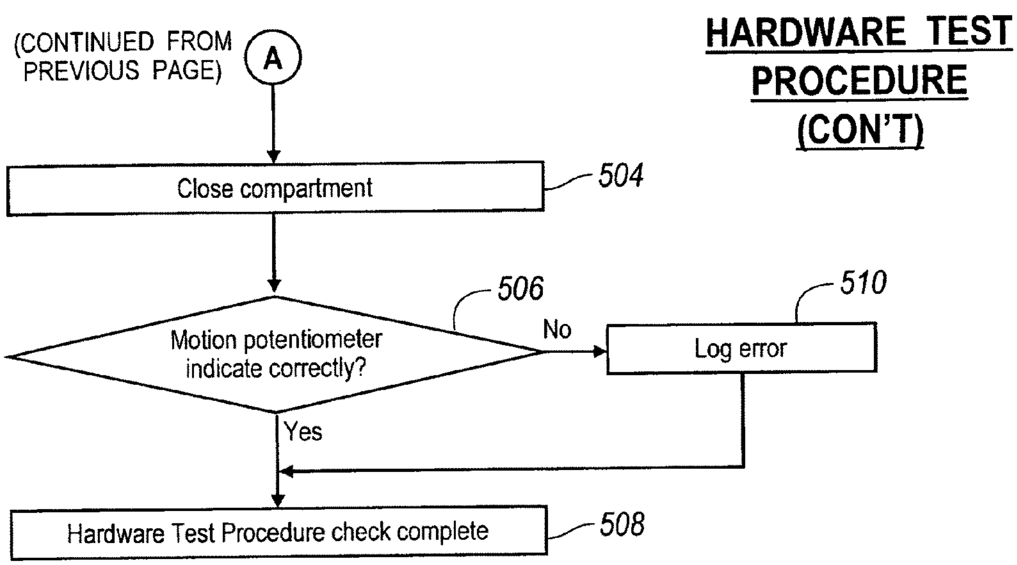
FIG. 22 is a continuation of the flowchart of FIG. 21 (Hardware Test Procedure) at A.

Next, with reference to FIG. 22, if the open sensor 37 does signal that the compartment 24 is fully opened, then the compartment 24 is commanded to close in operation 504. In operation 506, if the amperage sensor 34 provides the proper position signals, then in operation 508, the hardware check is complete. Otherwise, in operation 510 the error is logged.

With reference back to FIG. 10 (Compartment Initialization Procedure), if any errors were logged during operation 252 and operation 482, then in operation 512 the failure data 212 is transmitted to the GUI manager module 208, as will be discussed in greater detail herein (FIG. 9: System Control Module). If there are no errors logged, then in operation 514, the initial compartment 24 position is received from the amperage sensors 34. Then, in operation 516, the Kalman filter is initialized to determine the estimated position or measured position and speed of the compartment 24, and the steady state Kalman filter gain matrix is computed.

The speed of the compartment 24 is computed from the position data from the amperage sensors 34 by using a steady state, linear, discrete Kalman filter. In order to achieve these estimates, first, the measured position of the actuator system 24 is taken to be X. Then, the previous position estimate is set as $X_{old}$ and the previous speed estimate is set as $S_{old}$. The new estimates for position and speed of the compartment 24 are:

$$X_{new}=X_{old}+K_1(X-X_{old})+T(S_{old}+K_2(X-X_{old})) \quad (1)$$

$$S_{new}=S_{old}+K_2(X-X_{old}) \quad (2)$$

where $K_1$ is the first element of the steady state Kalman gain matrix and $K_2$ is the second element. Next, $X_{old}$ is replaced by $X_{new}$ and $S_{old}$ is replaced by $S_{new}$. Then, the steady state Kalman gain matrix is computed upon initialization of the actuator system 24. The computation of the Kalman gain matrix is an iterative process. The following operations are performed:

(1) Initialize 2×2 state estimate covariance matrix $P^+$ (2) Initialize 2×2 process noise covariance matrix Q (3) Initialize 1×1 measurement noise covariance matrix R.

(4) Set 2×1 saved Kalman gain matrix K to zero.

(5) Establish state transition matrix φ, where T is a measurement sampling rate:

$$\Phi = \begin{vmatrix} 1 & T \\ 0 & 1 \end{vmatrix} \quad (3)$$

(6) Establish measurement matrix H:

$$H=|10| \quad (4)$$

(7) Compute new Kalman gain matrix:

$$K=P^+H^T(HP^+H^T+R)^{-1} \quad (5)$$

(8) Determine if K is converged (with an epsilon of previous K)? If K is converged, then the computation is complete with $K_1$ as the first element of K and $K_2$ as the second element of K. Otherwise, the computed K is saved, and the process continues to operation (9).

(9) Update P matrix:

$$P^{-}=(I-KH)P^{+} \quad (6)$$

(10) Propagate P Matrix:

$$P^{+}=\phi P^{-}\phi^{T}+Q \quad (7)$$

(11) Go to Operation (7).

After the Kalman filter computed speed is determined, with continuing reference to FIG. 10 (Compartment Initialization Procedure), in operation 518 a warning sign is turned off or deactivated. The warning sign can be a “No Smoking” sign, a “Fasten Seatbelts” sign, or any other appropriate warning indicator. Then, in operation 520, the type of compartment 24 is determined, such as crew, emergency or passenger. In operation 522, the start-up command 214 is transmitted to the compartment compartment control module 204.

Figure 23:
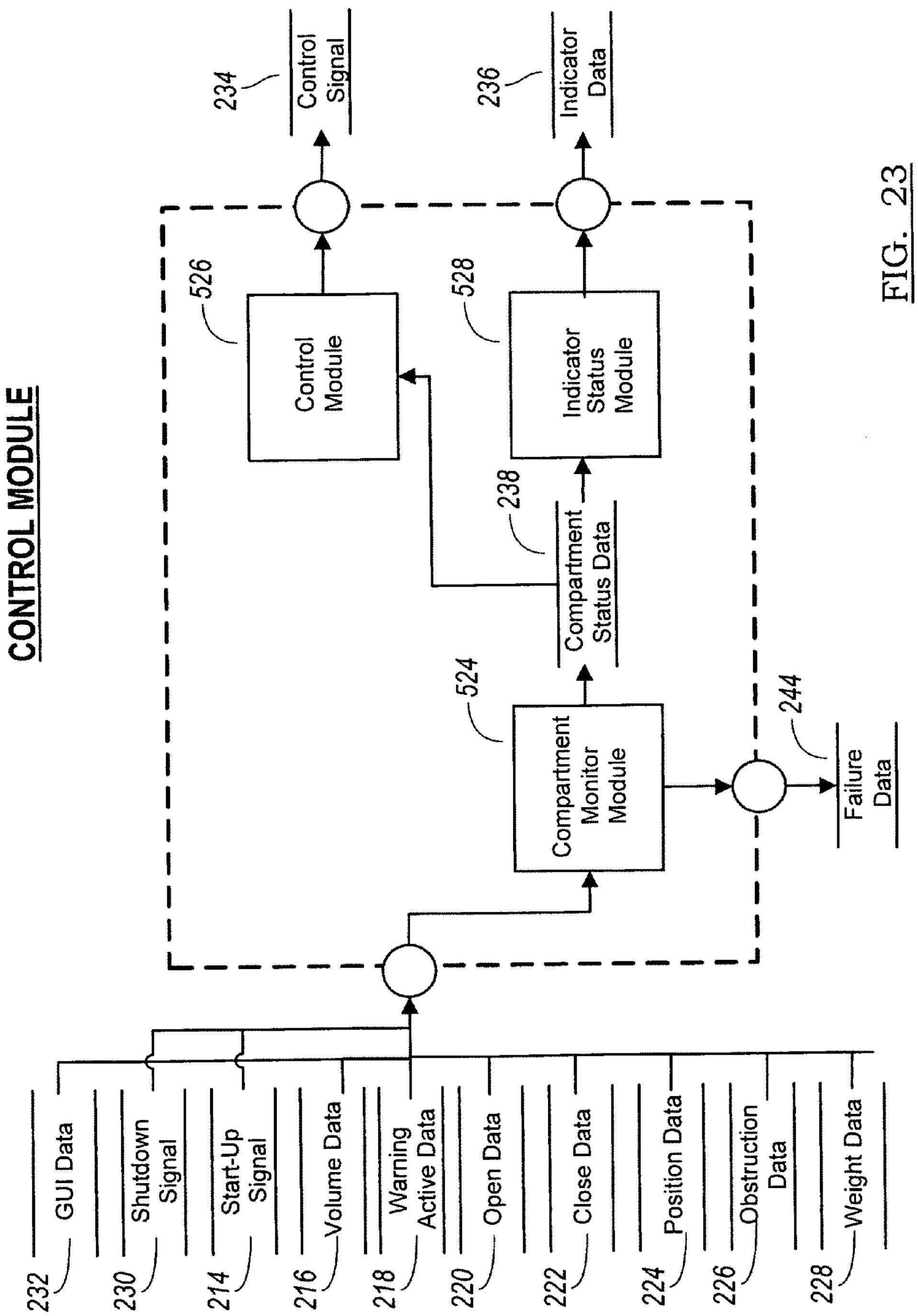
FIG. 23 (Control Module) is a dataflow diagram illustrating a compartment control module for the system of FIG. 9 (System Control Procedure)

With reference now to FIG. 23 (Control Module), a dataflow diagram illustrates various embodiments of a compartment control system that can be embedded within the compartment control module 204. In various embodiments, the compartment control module 204 includes a compartment monitor module 524, a control module 526, and an indicator module 528.

The compartment monitor module 524 receives as input the GUI data 232, start-up command 214, volume data 216, warning active data 218, open data 220, close data 222, position data 224, obstruction data 226, weight data 228, and the shutdown command 230. Based on these inputs, the compartment monitor module 524 determines a proper status for the compartment(s) 24, and sets compartment status data 238. The compartment monitor module 524 also sets the fault data 244 for the graphical user interface (GUI) module 208. The control module 526 receives as input the compartment status data 238, and based on the compartment status data 238, the control module 526 outputs the control signal 234. The indicator module 528 receives as input the compartment status data 238, and based on the compartment status data 238, the indicator module 528 outputs the indicator data 236.

Figure 24:
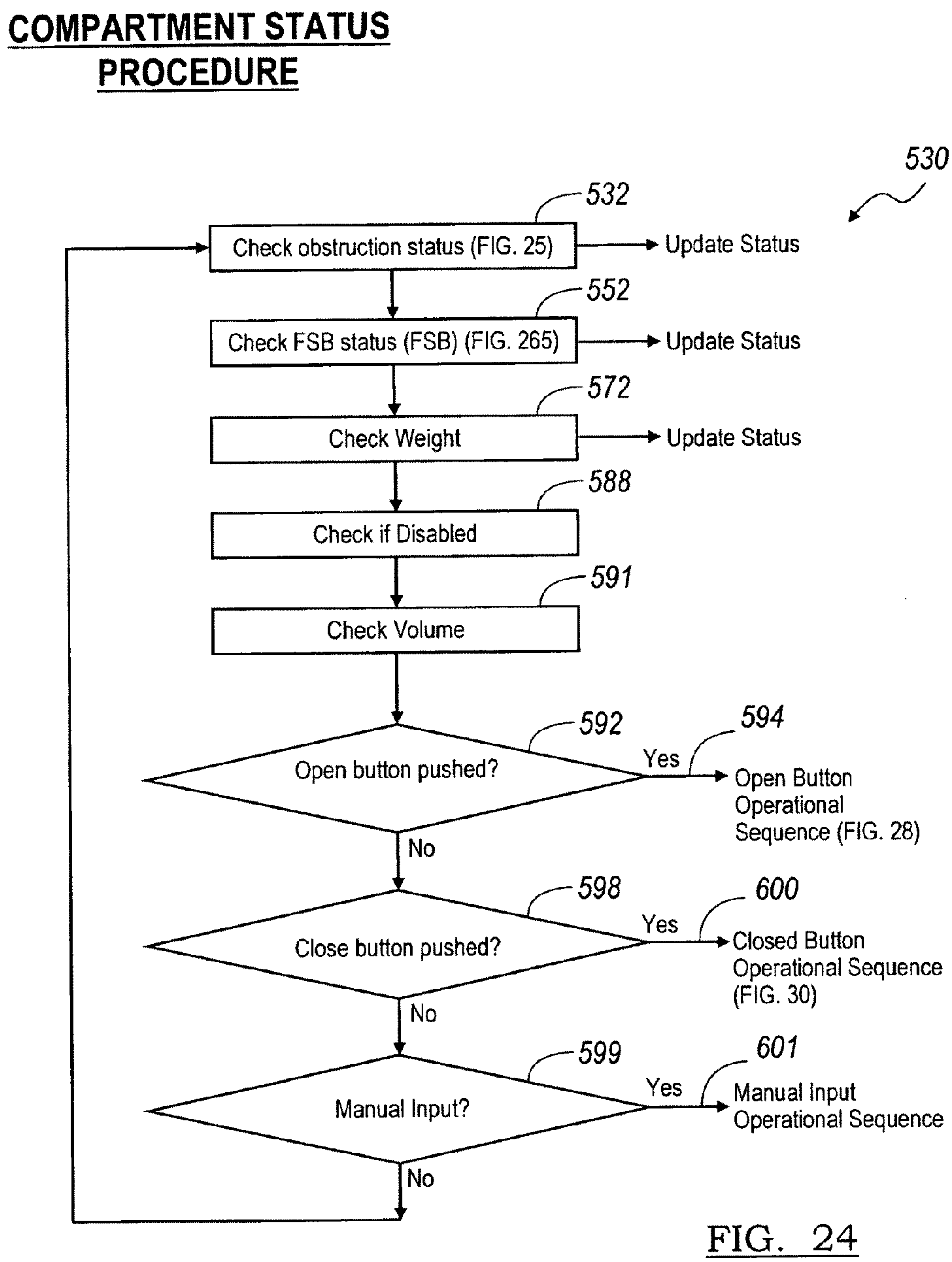
FIG. 24 (Compartment Status Procedure) is a flowchart illustrating a compartment monitoring method.
Figure 25:
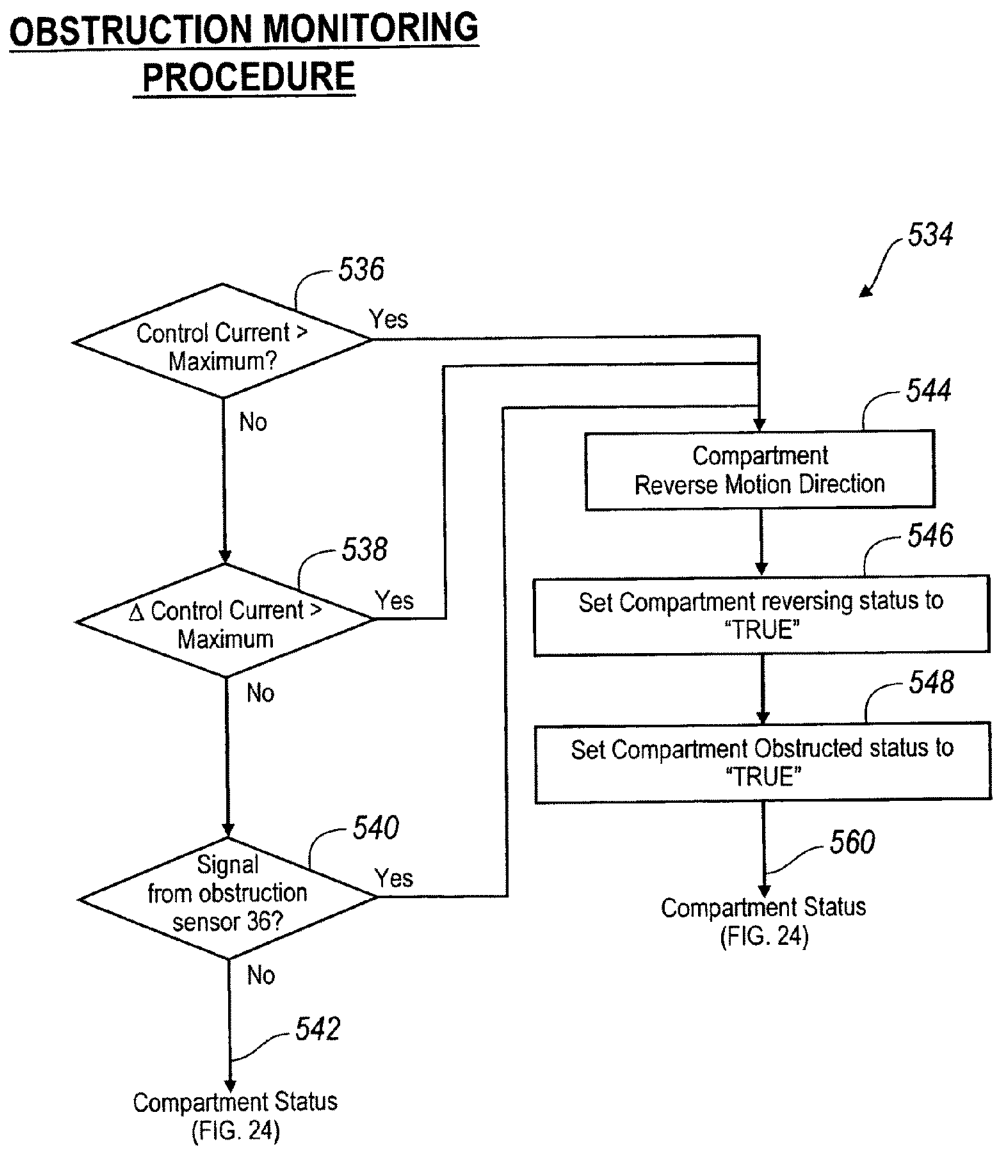
FIG. 25 (Obstruction Monitoring Procedure) is a flowchart illustrating an obstruction monitoring method.

With reference to FIG. 24 (Compartment Status Procedure), a process flow diagram illustrates a compartment status monitoring method 530 performed by the compartment monitor module 524. In operation 532, the obstruction status is checked. With reference now to FIG. 25 (Obstruction Monitoring Procedure), a process flow diagram 534 illustrates a method for checking for an obstruction. In operation 536, if the control current is less than a maximum, then in operation 538 the change in the control current is compared to the maximum. The determination of the control current will be discussed in greater detail herein. If the change in the control current is greater than the maximum, then in operation 540 control checks if a signal has been received from the obstruction sensor 36.

If no signal has been received from the obstruction sensor 36, then in operation 542 the compartment 24 is held to not be obstructed. Otherwise, if one of operation 536, 538 and 540 are true, then in operation 544 the compartment controller 30 applies a reverse current to the motor 126 such that the compartment 24 reverses its direction of motion. Then in operation 546 the compartment reversing status is set to true, and in operation 548 the compartment obstructed status is set to true. In output 550, the compartment status data 238 is output.

Figure 26:
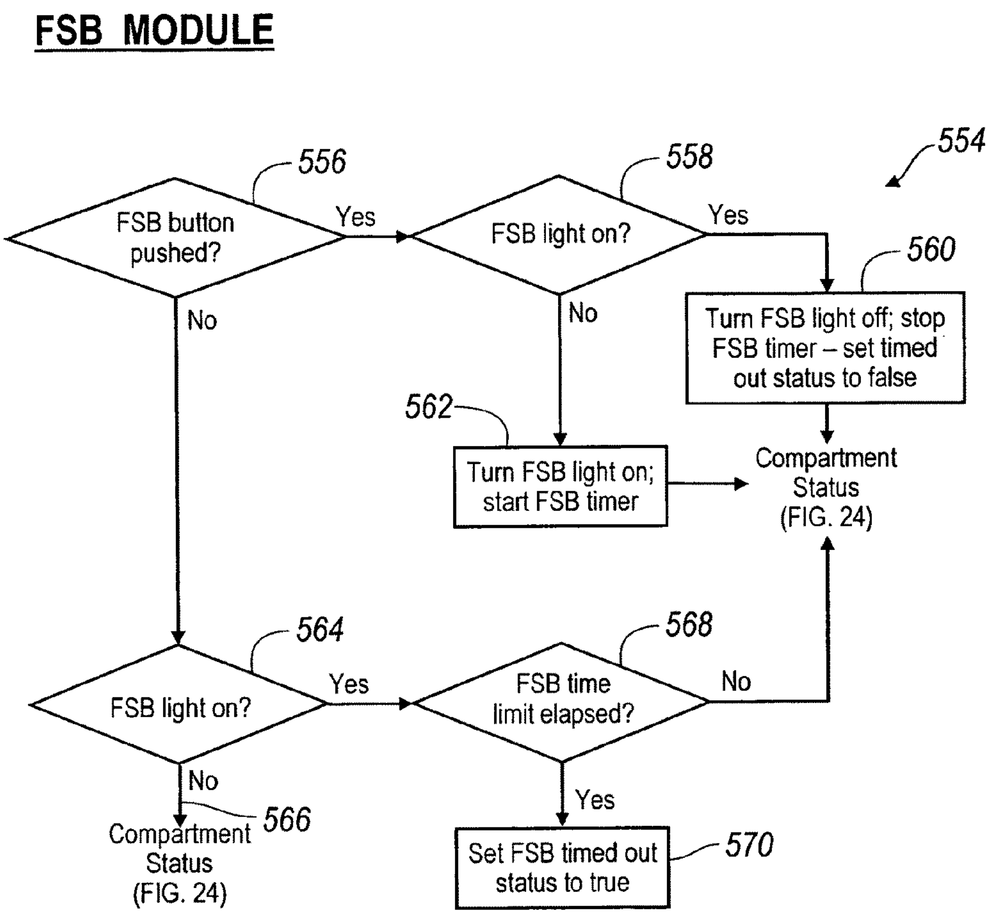
FIG. 26 (Fasten Seatbelt (FSB) Procedure) is a flowchart illustrating a warning sign monitoring method.

With reference back to FIG. 24 (Compartment Status Procedure), in operation 552 control checks to see if the warning sign is active. With reference to FIG. 26 (Fasten Seatbelt (FSB) Procedure), a process flow diagram 554 illustrates the warning sign monitoring method performed by the compartment monitor module 524. In operation 556 control checks if a signal has been received that the warning, such as the “No Smoking” sign or the “Fasten Seatbelts” sign has been activated. If the warning has been activated, then in operation 558 control determines if a warning light is on. If the warning light is on, then in operation 560 control turns the warning light off stops a warning light timer, and sets a timed-out status to false. Otherwise, if the warning light is not on, then in operation 562 control turns the warning light on and starts the warning light timer. At the end of operation 560 and 562 the compartment status data 238 is set to indicate that the warning timer is on.

If, however, the warning is not active, then in operation 564 control determines whether the warning light is on. If the warning light is not on, then control sets compartment status data 238 in operation 566 to reflect that the warning is not active. Otherwise, if the warning light is on, then in operation 568 control determines if the warning light timer has expired. If the warning light timer has expired, then in operation 570 control sets the warning timed-out status to true. Otherwise, control updates the compartment status data 238 to indicate that the warning timer is active.

With reference back to FIG. 24 (Compartment Status Procedure), operation 572 control determines the weight of the compartment 24 for the purpose of monitoring the amount of luggage or items in the compartment at any given time. The weight of the compartment 24 is computed using the deviation in actual operating speed from the expected operating speed of the compartment 24. First, the applied torque is computed, wherein the applied torque in Newton-meters (N-m) is:

$$T=K_T(\text{Control current}-I_{NL})/1000 \quad (8)$$

where $K_T$ is a torque constant (N-m/A) and $I_{NL}$ is the motor no-load current (mA). The determination of the control current will be discussed in greater detail below. After the applied torque is determined, the compartment open angle (θ) is computed based on the estimated compartment position. Then, the estimated weight of the compartment 24 is computed, wherein the weight in kilograms (kg) is:

$$W=2T/(L \sin\theta) \quad (9)$$

where L is the effective moment arm of the compartment 24 in meters (m). In our sample case, L is not perfectly a constant. The location of the center of gravity relative to the pivot system 25 varies as the compartment 24 moves through its range of motion. Also, since the compartment 24 rotates, the factor that the force of gravity places on the compartment 24 varies. These factors have been ignored in our calculation as the variances these factors would cause were determined to be negligible. This may not always be the case. If the estimated weight W is greater than the pre-designated compartment maximum load, then the compartment 24 is declared to be overweight, and with reference to FIG. 24 (Compartment Status Procedure), the compartment status is outputted as overweight.

Figure 27:
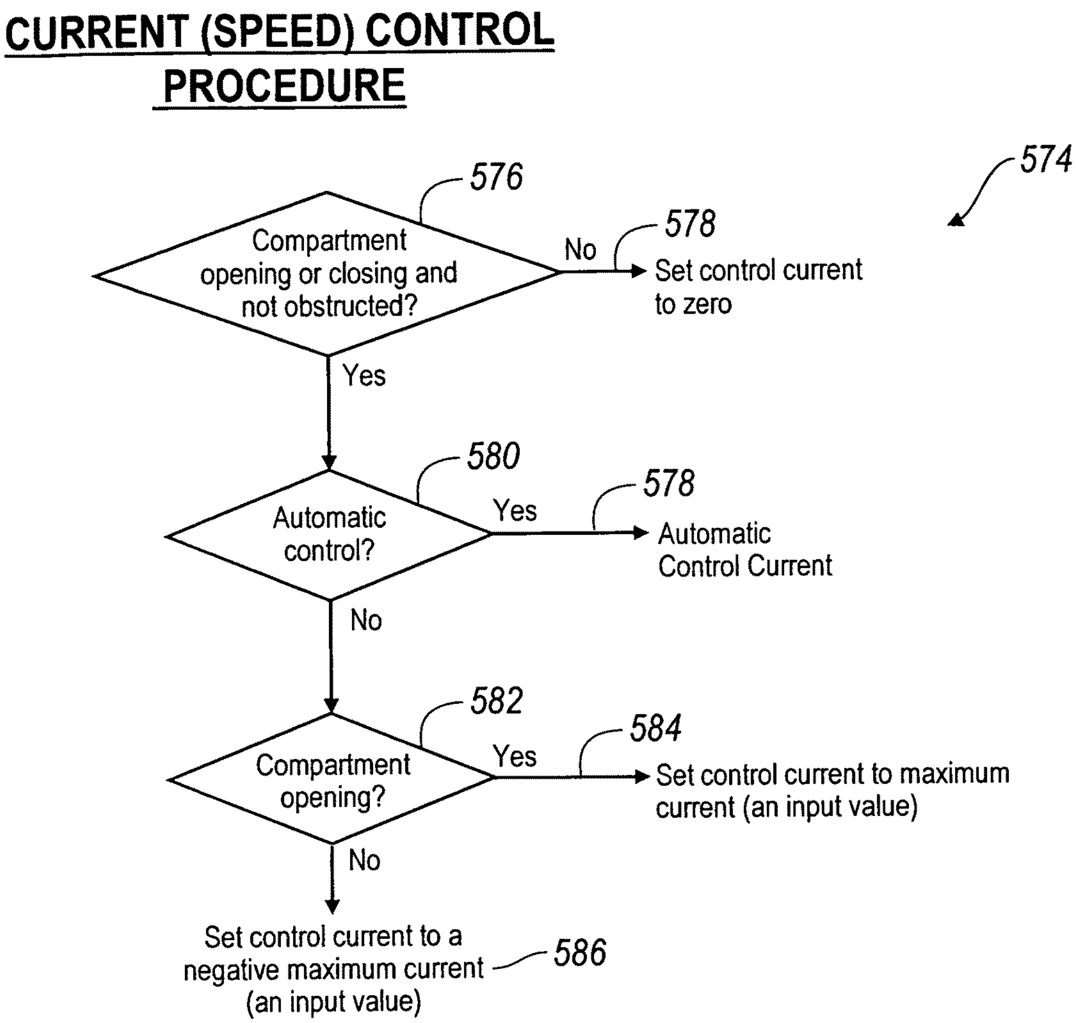
FIG. 27 (Speed (Current) Control Procedure) is a flowchart illustrating a method for determining a control current and speed of compartment movement.

With reference to FIG. 27 (Speed (Current) Control Procedure), a process flow diagram 574 illustrates how to calculate the control current for the compartment 24. In operation 526, if the compartment 24 is not opening or closing and is obstructed, then the control current is set to zero in operation 578. Otherwise, if the compartment 24 is opening or closing and not obstructed, then in operation 580 control determines if the current is set under automatic control. When operating under automatic control, the control current is computed based on speed error, based on a profile provided through the GUI data 232, as will be discussed in greater detail herein.

Based on the GUI data 232, a real-time correction is applied to the selected profile to ensure that the perceived profile is close to the selected profile. The real-time correction is applied through the following operations:

(1) Receive demand velocity D, which can be a constant or a profile. There are two possible modes for setting the demand speed used in the compartment control system—constant speed and variable speed. The constant speed mode ramps up to a constant input speed value that is used for the entire opening process and closing process. This demand speed can be different for opening and closing of the compartment 24 if desired. The ramp up time is an input value, which will be discussed in detail herein. The variable speed mode computes a demand speed profile for the compartment controller 30 to follow once an OPEN button 46 or CLOSE button 48 is pressed. This profile shape is based on several parameters such as a measured location of the compartment 24, a desired direction of motion, a desired current draw, and a desired time to reach the fully opened or fully closed position, as will be discussed in detail herein.

(2) Compute speed error E:

$$E=D-S_{new} \tag{10}$$

If, however, the compartment 24 is opening or closing, is not obstructed and is under automatic control, in operation 588 the control current is set to an automatic control current.

where $S_{new}$ is the speed estimate from the Kalman filter described herein.

(3) Compute Control Current:

$$\text{Control current} = -K_P E - K_I \sum_{i=1}^{n} E_i T \tag{11}$$

where $K_P$ is the proportional gain, $K_I$ is the integral gain, and T is the sampling interval. The second term computed in equation (11) is the summed integral errors since the motor 126 was activated to begin motion. If the current is not under automatic control, then in operation 582 control determines whether the compartment 24 is opening. If the compartment 24 is opening, then the control current is set to a maximum input value in operation 584. Otherwise, if the compartment 24 is not under automatic control and is not opening, then the control current is set to a negative maximum input value, in operation 586. The automatic mode, with its ability to ramp up to and down from the maximum speed, creates less wear and tear on mechanical components of the power-assisted compartment system 12.

Figure 26A:
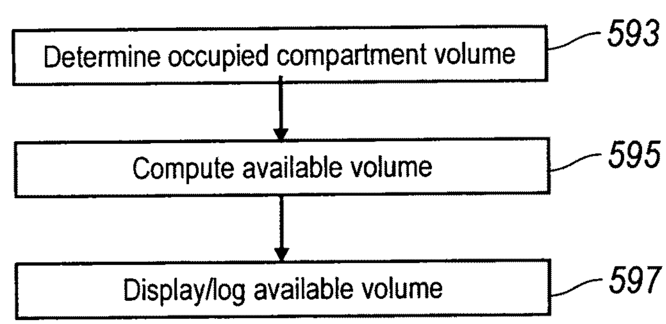
FIG. 26A (Volume Sensing Procedure A) is a flowchart illustrating a volume sensing method.

Referring back to FIG. 24 (Compartment Status Procedure), after the weight of the compartment 24 is determined, then in operation 588, control determines if the compartment 24 is disabled. Then, in operation 591, control determines if the compartment 24 is full. In order to determine if the compartment 24 is full, with reference to FIG. 26A (Volume Sensing Procedure), the occupied volume of the compartment 24 is determined in operation 593. The occupied volume of the compartment 24 can be determined through a variety of techniques, such as based on an input from the volume sensor 41. In operation 595, the available volume in the compartment 24 is computed. In operation 597, the available volume is output as compartment status data 238.

With reference back to FIG. 24 (Compartment Status Procedure), in operation 592, a check is made if the OPEN button 46 has been pushed. If the OPEN button 46 has been pushed, then in operation 594, an OPEN button operational sequence 596. Otherwise, in operation 598, a check is made if the CLOSE button 48 has been pushed. If the CLOSE button 48 has not been pushed, then a check is made in operation 599 if a manual input has been applied to the compartment 24. If no manual input has been applied, then a loop is made to operation 532. Otherwise, in operation 600, a CLOSE button operational sequence 602 is initiated, and in operation 601 a manual input operational sequence 603 is initiated, as will be discussed herein.

Figure 28:
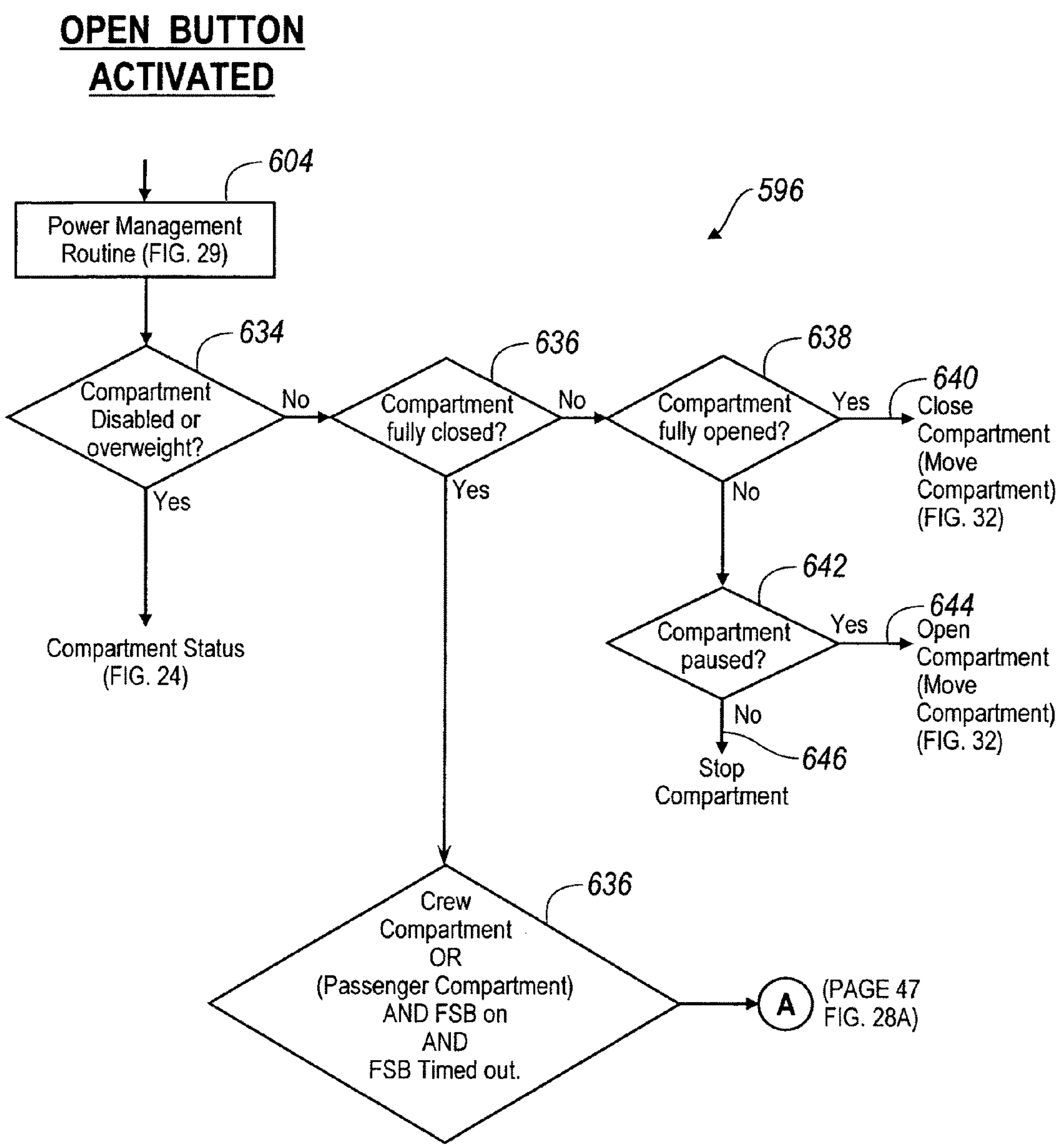
FIG. 28 ("OPEN" Button Activation Procedure) is a flowchart illustrating a method for responding to a first input.
Figure 29:
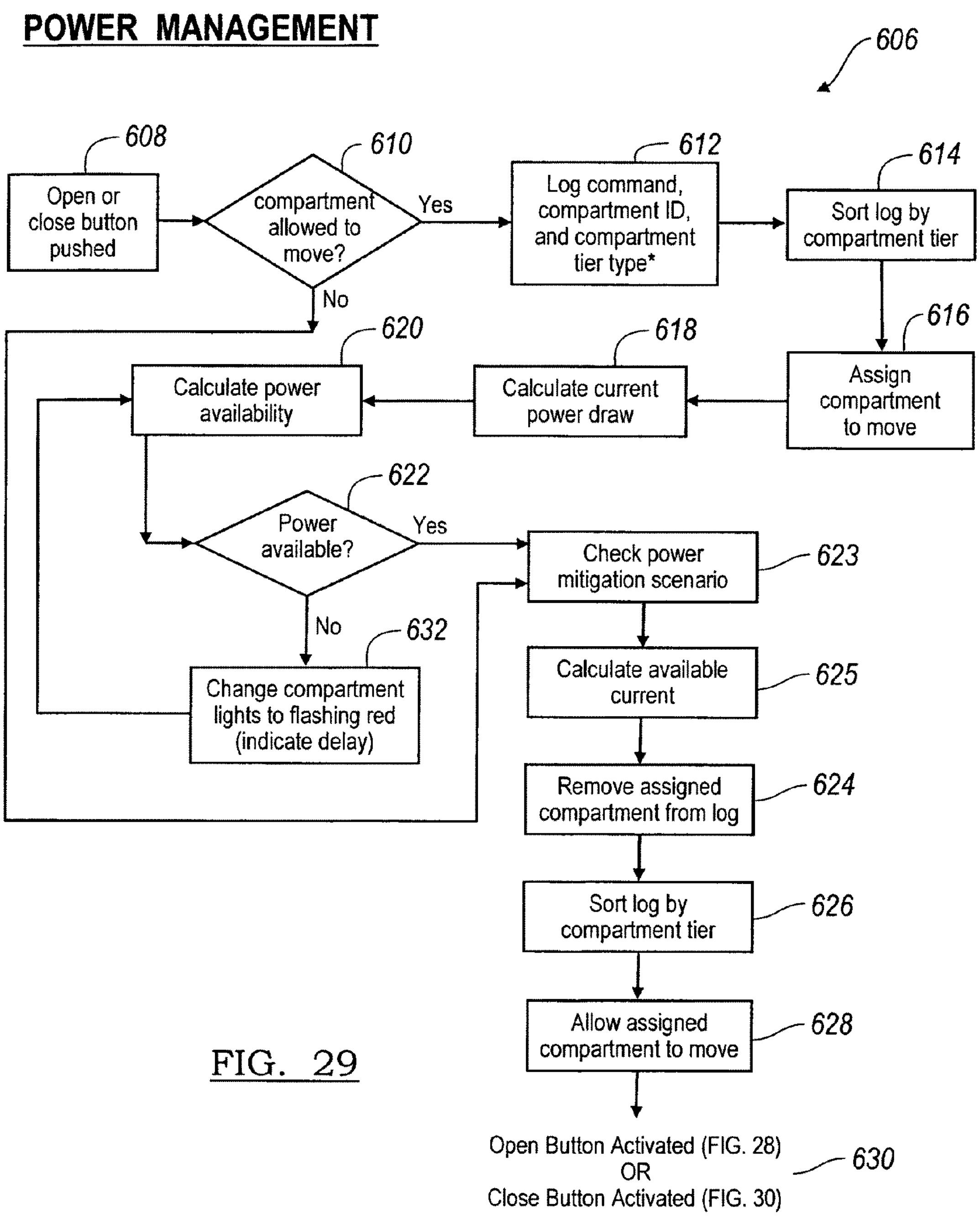
FIG. 29 (Power Management Procedure) is a flowchart illustrating a power management method.

With reference to FIG. 28 ("OPEN" Button Activation Procedure), a process flow diagram illustrates the OPEN button operational sequence 596 for the compartment 24. If the OPEN button 46 has been pushed, then in operation 604, a power management routine 606 is performed. With reference to FIG. 29 (Power Management Procedure), a process flow diagram illustrates the power management routine 606. In operation 608, if the OPEN or CLOSE button 46 or 48 is pushed, then in operation 610 control decides if the compartment 24 is allowed to move. If the compartment 24 is not allowed to move, then control loops to operation 623. Otherwise, if the compartment 24 is allowed to move, then in operation 612 control logs that a command to move the compartment 24 has been made along with the compartment identification number and the compartment tier type. The compartment tier type refers to the hierarchy of the compartments 24. For instance, emergency equipment compartments 24 may have a higher priority than crew or passenger compartments 24, and in addition, first class compartments 24 may have a higher priority than economy class compartments, however, any priority scheme is possible.

In operation 614, the move requests are sorted by the tier of compartment 24. Then, in operation 616 a specific compartment 24 is assigned to move. In operation 618, the existent power draw of the power-assisted compartment system 12 is calculated, and then in operation 620 the existent power availability is calculated. The existent power availability calculation will take into account various elements such as, but not limited to, how much power is being supplied to the mobile platform 10, how much of this power is available for the compartment 24 operation, and how much power the compartment 24 operation is already using. In operation 622, control determines if power is available. If power is available, then in operation 623 the power mitigation strategy is checked. This strategy dictates the method in which the control system 20 determines in what manner to best supply the power. These scenarios may be determined by the user. For example, in some cases where all of the compartments 24 are to be opened at once, the amount of time to required for the compartments 24 to completely open may not be an important factor. In this case the control system 20 would sacrifice the usual short opening period of several seconds and would allow all the compartments 24 to be moving at once but at a slower rate and thus supply a lower current to the moving compartment(s) 24. Once the mitigation strategy has been determined the system will calculate the available current to supply to the compartment 24 in operation 625. Then in operation 624, the compartment 24 assigned to move is removed from the log and then in operation 626 the log is resorted by the compartment tier level. In operation 628 the compartment 24 assigned to move is allowed to move, and in operation 630 control loops to either the OPEN button operational sequence 596 or the CLOSE button operational sequence 602.

However, if power is not available in operation 622, then compartment status data 238 is sent to the indicator module 528 to change the indicator surface 50 to indicate a delay. For example, the indicator surface 50 could be instructed to enable the first LED (52*a*) to flash. After the compartment status data 238 has been relayed in operation 632, control loops to operation 620 until the compartment 24 is assigned move.

Now, with reference back to FIG. 28 ("OPEN" Button Activation Procedure), if the compartment 24 is disabled or overweight, then in operation 634 the compartment status data 238 is transmitted to the indicator module 528. Otherwise, if the compartment 24 is not disabled or overweight, then in operation 636, control determines if the compartment 24 is fully closed. If the compartment 24 is not fully closed, then in operation 638 control determines if the compartment 24 is fully opened. If the compartment 24 is fully opened, then the compartment status data 238 is set to move compartment 24 into the closed position in operation 640. If the compartment 24 is not in the fully opened position, then in operation 642, control determines if the compartment 24 is in a paused position. If the compartment 24 is in a paused position, then the compartment status data 238 is set to move compartment 24 into the opened position in operation 644. If the compartment 24 is not in the paused position, then the compartment status data 238 is set to stop the movement of the compartment 24 in operation 646.

If the compartment 24 is fully closed in operation 636, then in operation 646, control determines if the compartment 24 is a crew compartment or a passenger compartment with the warning active and the warning timer expired. If the compartment 24 is a crew or passenger compartment 24 with the warning active and timer expired, then in operation 650, control determines if a correct crew code has been inputted. The correct crew code can be a series of predefined inputs to the switch system 40 that enable the compartment 24 to operate even after the warning timer has expired. If the latest input to the switch system 40 completes a correct number of crew code inputs in operation 650, then in operation 649 control checks to see if the correct crew code series has been input. If the correct crew code series input has been entered then, in operation 652, the compartment status data 238 is set to open the compartment 24. If, however, the latest input to the switch system 40 does not complete a correct number of crew code inputs, then an additional button push is added to the crew code, in operation 654. If the correct number of crew code inputs has been recorded in operation 650 but, in operation 650 were not determined to be the correct series then operation 651 control resets the compartment 24 for receipt of a new crew code. Then, in operation 656, the compartment status data 238 is set to locked and the movement of the compartment 24 is prohibited.

If in operation 648, the compartment 24 is not a crew or a passenger compartment 24 and the warning signal is active but the timer has not expired, then in operation 658 the compartment status data 238 is set to unlatch the compartment 24 and move the compartment 24 into the opened position.

Figure 30:
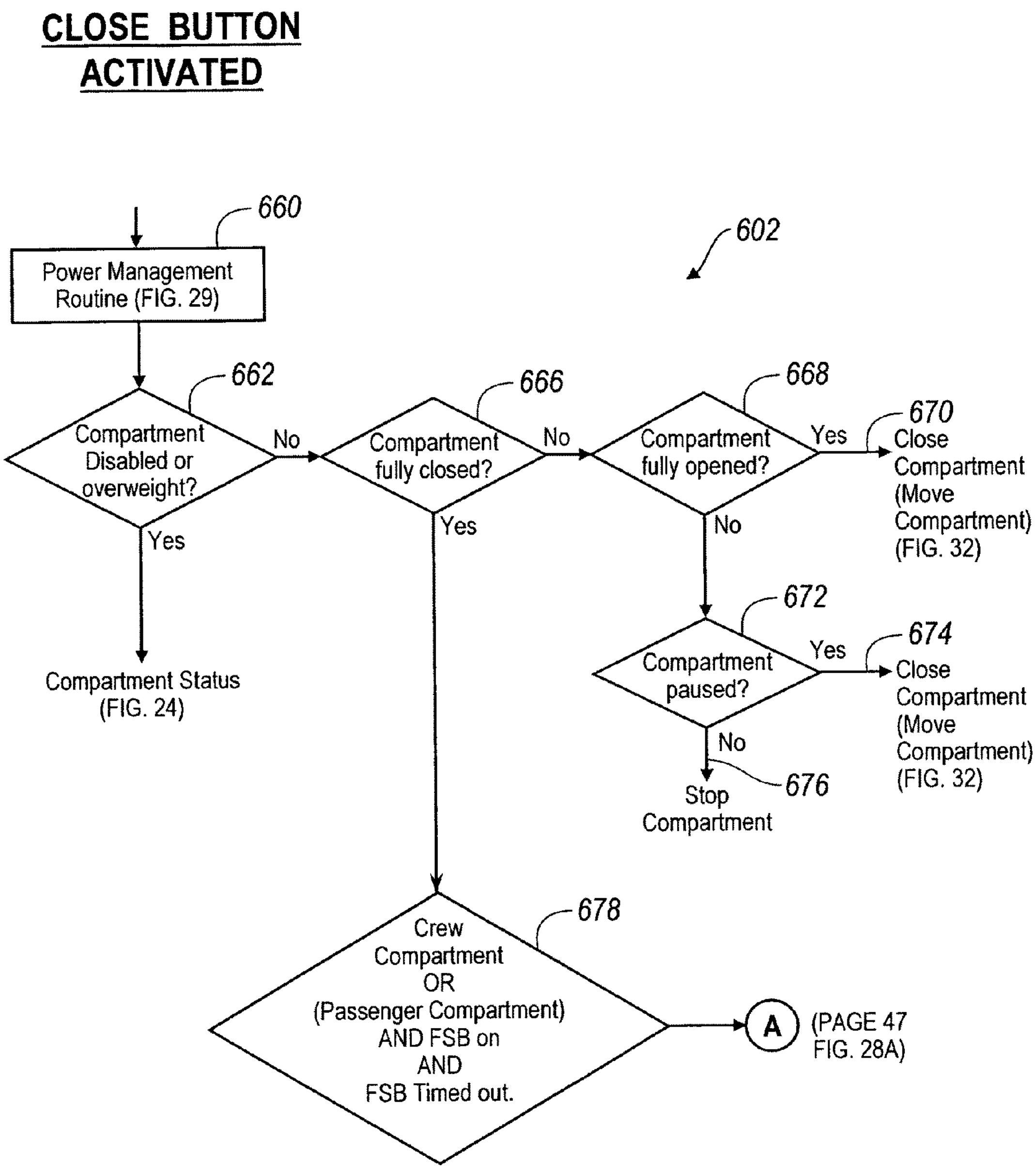
FIG. 30 ("CLOSE" Button Activation Procedure) is a flowchart illustrating a method for responding to a second input.

With reference to FIG. 24 (Compartment Status Procedure), if the CLOSE button 48 has been pushed, then with reference to FIG. 30 ("CLOSE" Button Activation Procedure), a process flow diagram illustrates the CLOSE button operational sequence 602 for the compartment 24. When the CLOSE button 48 is pushed, then in operation 660 the power management routine is performed, as discussed with regard to FIG. 28 ("OPEN" Button Activation Procedure). Next, in operation 662 control determines if the compartment is disabled or overweight. If the compartment 24 is disabled or overweight, then in operation 664 the compartment status data 238 is outputted to the indicator module 528.

Otherwise, if the compartment 24 is not disabled or overweight, then in operation 666, control determines if the compartment 24 is fully closed. If the compartment 24 is not fully closed, then in operation 668 control determines if the compartment 24 is fully opened. If the compartment 24 is fully opened, then the compartment status data 238 is set to move compartment 24 into the closed position in operation 670. If the compartment 24 is not in the fully opened position, then in operation 672, control determines if the compartment 24 is in a paused position. If the compartment 24 is in a paused position, then the compartment status data 238 is set to move compartment 24 into the closed position in operation 674. If the compartment 24 is not in the paused position, then the compartment status data 238 is set to stop the movement of the compartment 24 in operation 676 and control goes to the stop compartment operational sequence 706.

Figure 28A:
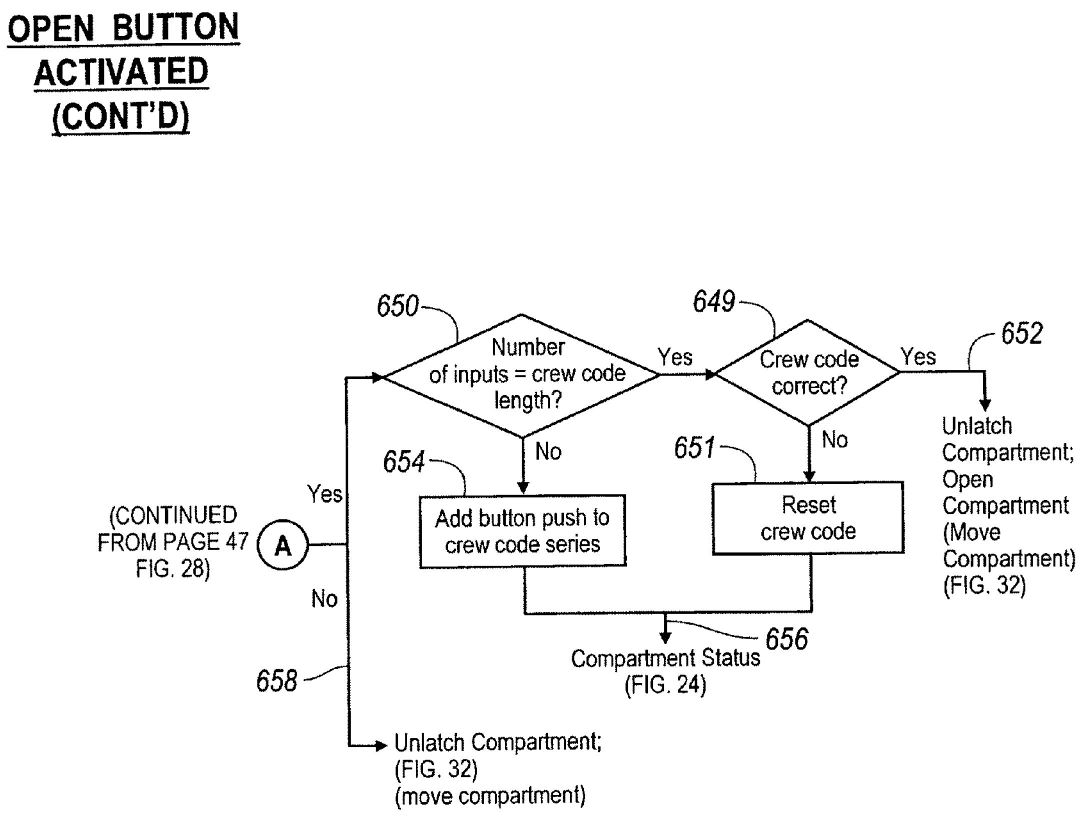

If the compartment 24 is fully closed in operation 666, then in operation 678, control determines if the compartment 24 is a crew compartment or a passenger compartment with the warning active and the warning timer expired. If the compartment 24 is a crew or passenger compartment 24 with the warning active and timer expired, then with reference to FIG. 28A, in operation 650, control determines if a correct crew code has been inputted. If the latest input to the switch system 40 computes a correct number of crew code inputs in operation 650, then in operation 649, control checks to see if the correct crew code series has been input. If the correct crew code series input has been entered then, in operation 652, the compartment status data 238 is set to open the compartment 24. If, however, the latest input to the switch system 40 does not complete a correct number of crew code inputs, then an additional button push is added to the crew code, in operation 654. If the correct number of crew code inputs has been recorded in operation 650 but, in operation 649 were not determined to be the correct series then operation 651 control resets the compartment 24 for receipt of a new crew code. Then, in operation 656, the compartment status data 238 is set to locked and the movement of the compartment 24 is prohibited.

If, in operation 678, the compartment 24 is not a crew or a passenger compartment 24 and the warning signal is active but the timer has not expired, then in operation 688 the compartment status data 238 is set to unlatch the compartment 24 and move the compartment 24 into the opened position.

Figure 31:
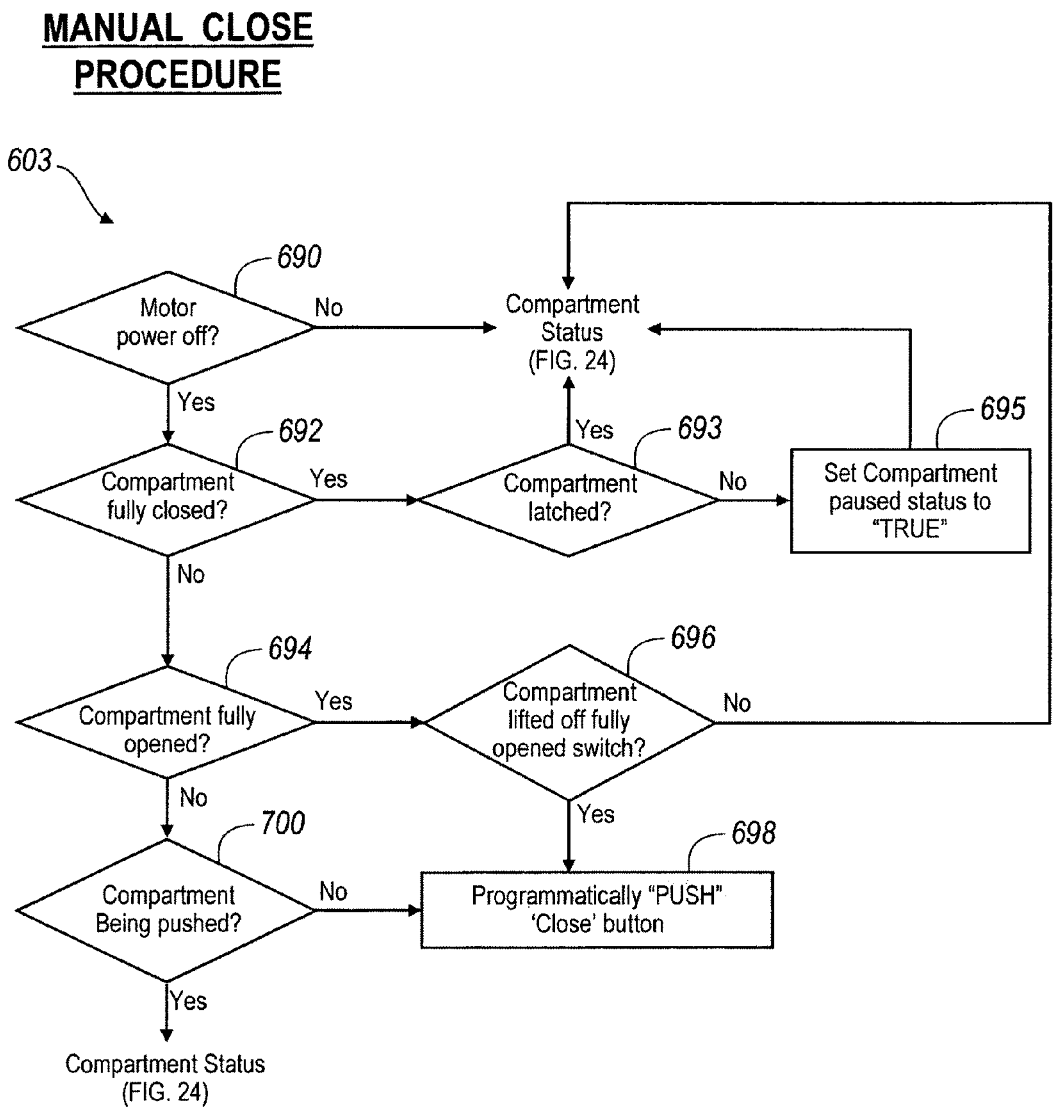
FIG. 31 (Manual Close Procedure) is a flowchart illustrating a method for responding to a third input.

With reference to FIG. 24 (Compartment Status Procedure), if the manual input has been applied to the compartment 24, then with reference to FIG. 31 (Manual Close Procedure), a process flow diagram illustrates the manual input operational sequence 603 for the compartment 24. In operation 690, control determines if current is being supplied to the motor 126. If there is current supplied to the motor 126, then the compartment status data 238 is set to moving. If there is no current being supplied to the motor 126, then in operation 692, control determines if the compartment 24 is fully closed. If the compartment 24 is fully closed, then in operation 693 control determines if the compartment 24 is latched. If the compartment 24 is latched, then the compartment status data 238 is set to closed. If the compartment 24 is not latched, then the compartment status data 238 is set to paused in operation 695. If the compartment 24 is not fully closed, then in operation 694, control determines if the compartment 24 is fully opened. If the compartment 24 is fully opened, then control determines if the compartment 24 is in contact with the open sensor 37 in operation 696. If the compartment 24 is in contact with the open sensor 37, then the compartment status data

238 is set to full opened. If, however, the compartment 24 is fully opened, but not in contact with the open sensor 37, then in operation 698 the CLOSE button operational sequence 600 is performed.

If the compartment 24 is not fully opened in operation 694, then in operation 700, control determines if the compartment 24 is manually being pushed towards the closed position. If the compartment 24 is being manually pushed towards the closed position, then the CLOSE button operational sequence 600 is performed. If the compartment 24 is not being pushed towards the closed position, then the compartment status data 238 is set to manual open.

Figure 32:
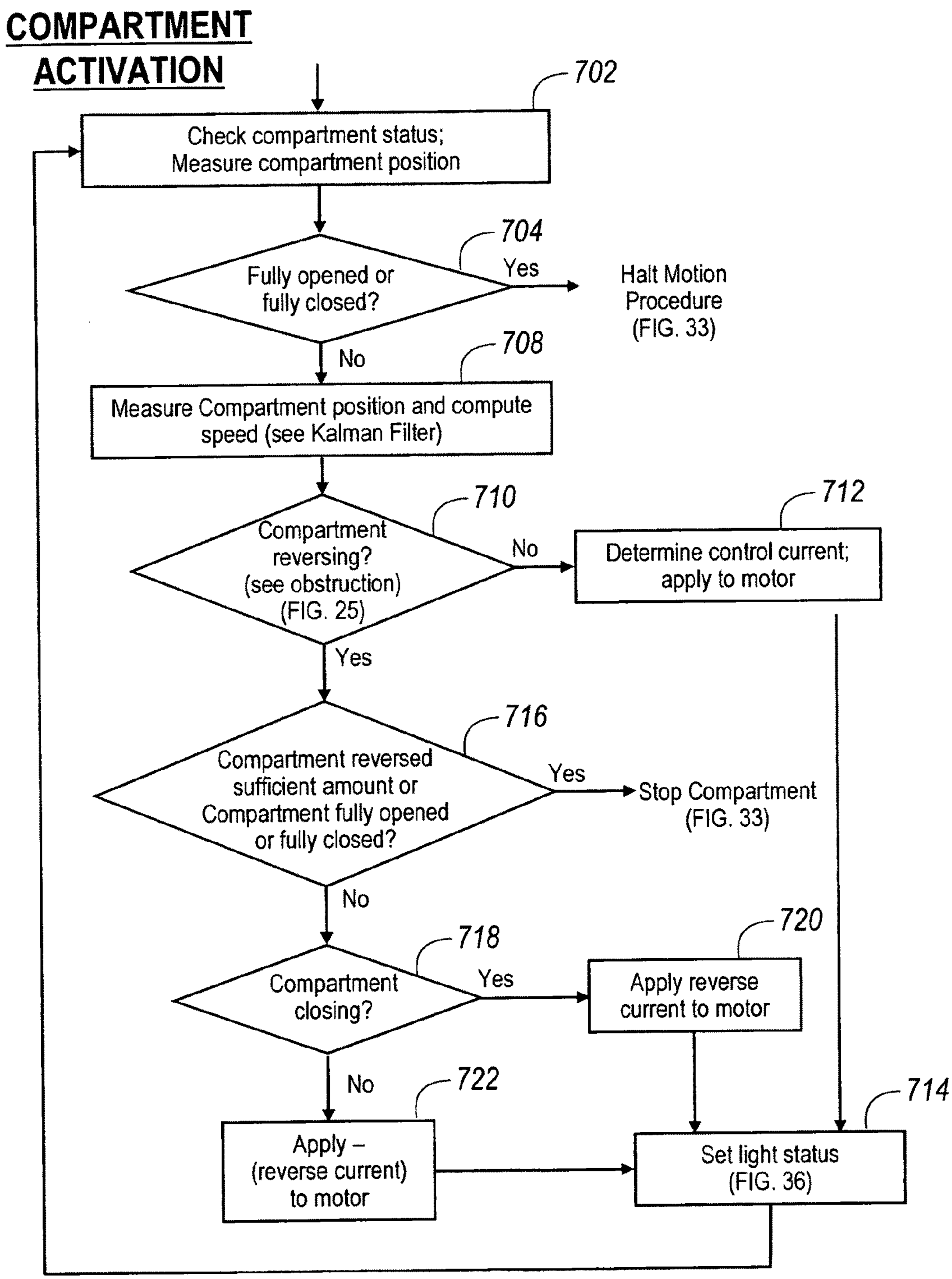
FIG. 32 (Compartment Activation Procedure) is a flowchart illustrating a first control method.

With reference to FIG. 32 (Compartment Activation Procedure), a process flow diagram illustrates a first control method performed by the control module 526 of the compartment control module 204. The first control method is performed when the compartment status data is set to move. In operation 702 control checks the compartment status data 238 and measures the position of the compartment 24 using the amperage sensors 34. Then, in operation 704, control determines if the compartment 24 is in the fully opened or fully closed position. If the compartment 24 is in the fully opened or fully closed position, then control goes to the stop compartment method 706. Otherwise, if the compartment 24 is not fully opened or fully closed, then in operation 708 the measures position of the compartment 24 and computes speed of the compartment 24 and the desired position of the compartment 24 as discussed herein. In operation 710, control determines if the compartment 24 is reversing. If the compartment 24 is reversing, then in operation 712, control determines which control current to apply to the motor 126. Then, in operation 714 the compartment status data 238 is set to moving.

If in operation 710 the compartment 24 is not reversing, then in operation 716 control determines if the compartment 24 has reversed a sufficient amount as set in the parameters of the control system 20 or if the compartment 24 is now fully opened or fully closed. If the compartment 24 has reversed a sufficient amount or is fully closed or fully opened, then control goes to the stop compartment operational sequence 706. Otherwise, in operation 718 control determines if the compartment 24 is closing. If the compartment 24 is closing, then in operation 720 control applies a reverse current to the motor 126, then, control goes to operation 714. If the compartment is not closing in operation 718, then control applies a current to the motor in operation 722. Then control goes to operation 714.

Figure 33:
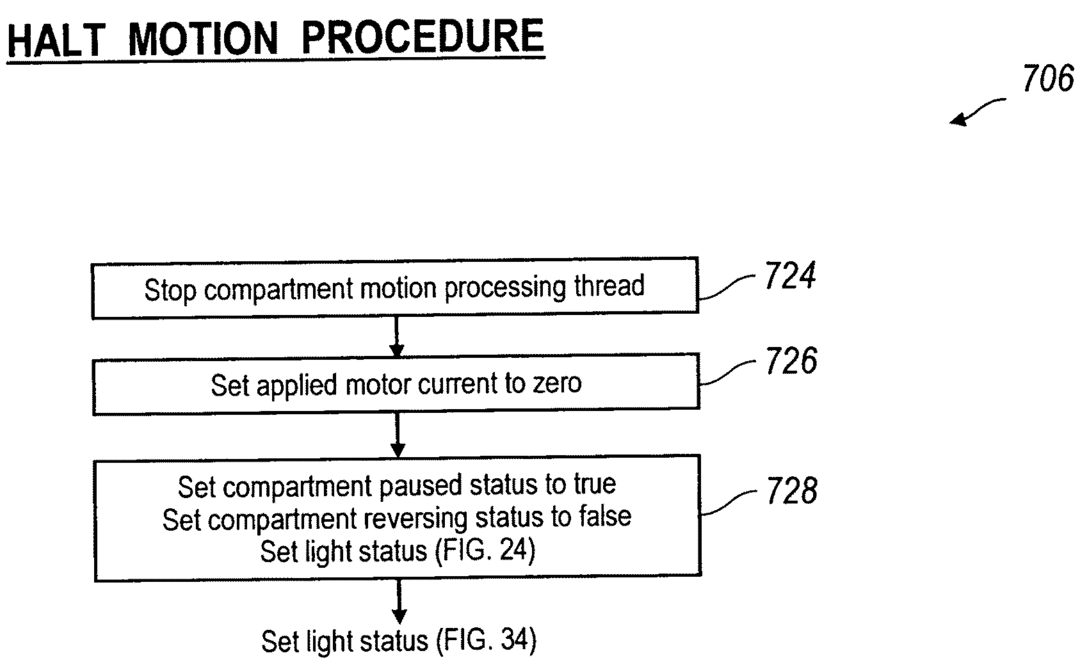
FIG. 33 (Halt Motion Procedure) is a flowchart illustrating a second control method.

With reference to FIG. 33 (Halt Motion Procedure), a process flow diagram illustrates the stop compartment operational sequence 706 performed by the control module 526 of the compartment control module 204. In operation 724 control stops the compartment 24 motion processing thread, then in operation 726 control sets the applied motor current to zero. In operation 728 control sets the compartment status data 238 to stopped.

Figure 34:
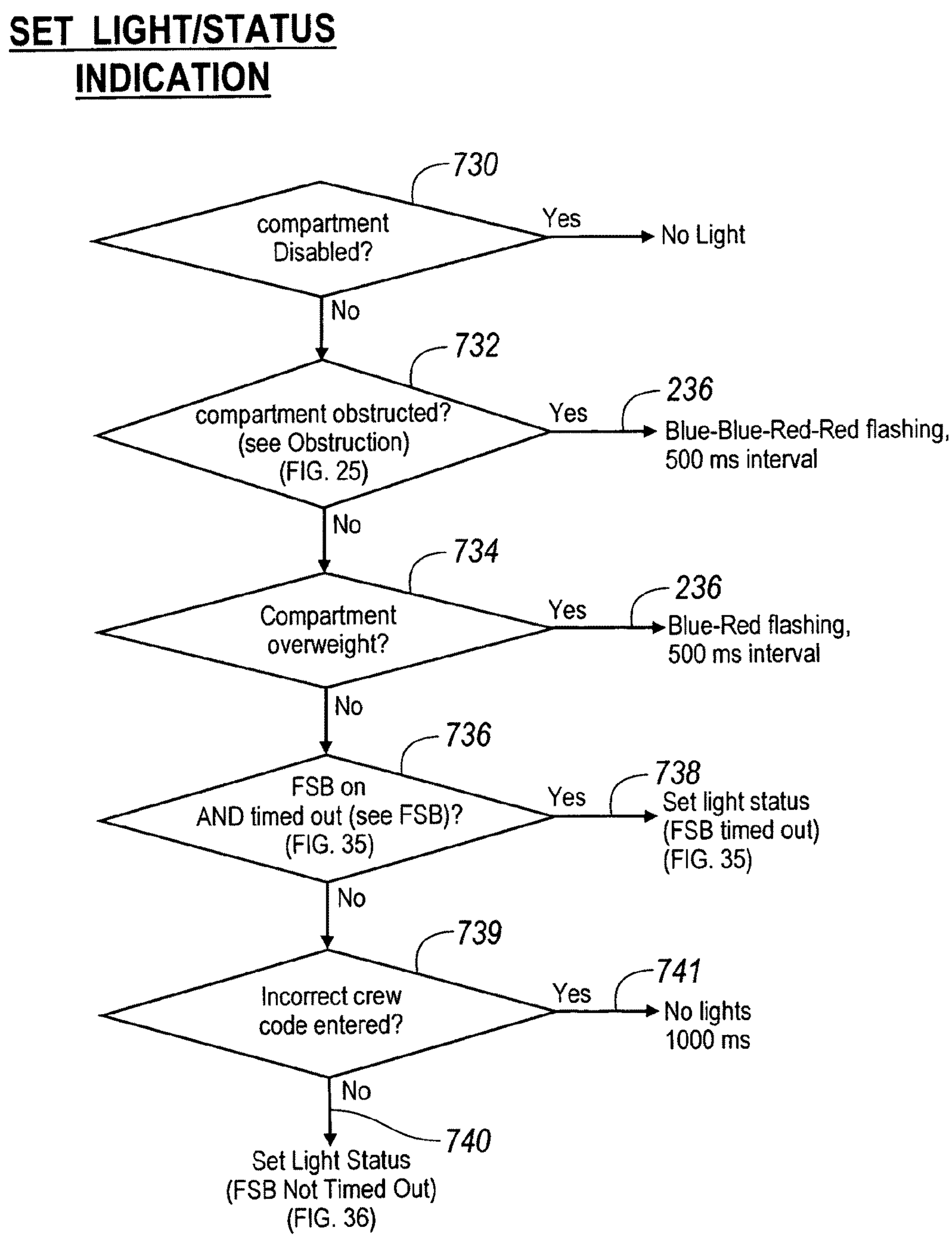
FIG. 34 (Set Light/Indication Procedure) is a flowchart illustrating a first indicator status update method.

Referring now to FIG. 34 (Set Light/Indication Procedure), a process flow diagram illustrates an indicator status method performed by the indicator module 528 of the compartment control module 204. The indicator status method determines the proper illumination of the LEDs 52 associated with the indicator surface 50.

In operation 730, control determines if the compartment 24 is disabled based on if the compartment status data 238 is set to disabled. If the compartment status data 238 is set as disabled, then there is no illumination of the LED 52 and any previous illumination is turned off. If the compartment 24 is not disabled, then in operation 732 control determines if the compartment status data 238 is set to obstructed. If the compartment status data 238 is set as obstructed, then control outputs indicator data 236. The indicator data 236 output from operation 732 can comprise a series of illuminations of the LEDs 52 such as illuminating LED 52*b*, LED 52*b*, LED 52*a*, LED 52*a* in order every 500 milliseconds. If the compartment status data 238 is not set as obstructed, then in operation 734 control determines if the compartment status data 238 is set as overweight. If the compartment status data 238 is set as overweight, then indicator data 242 is outputted in a particular pattern such as illuminating LED 52*b* and illuminating LED 52*a* in flashing intervals every 500 milliseconds. If, however, the compartment status data 238 is not overweight, then in operation 736 control determines if the warning is active and the warning timer has expired. If the warning is active and the warning timer has expired, then control checks in operation 739 to see if an incorrect crew code has been entered recently. If an incorrect crew code has been entered, then control sets the LEDs to remain unilluminated for 1000 ms in operation 741. If an incorrect crew code has not been entered, then control goes to a timed-out indicator operational sequence 738. Otherwise, if the warning is active and the warning indicator has not timed-out, then control goes to a not timed-out indicator operational sequence 740.

Figure 35:
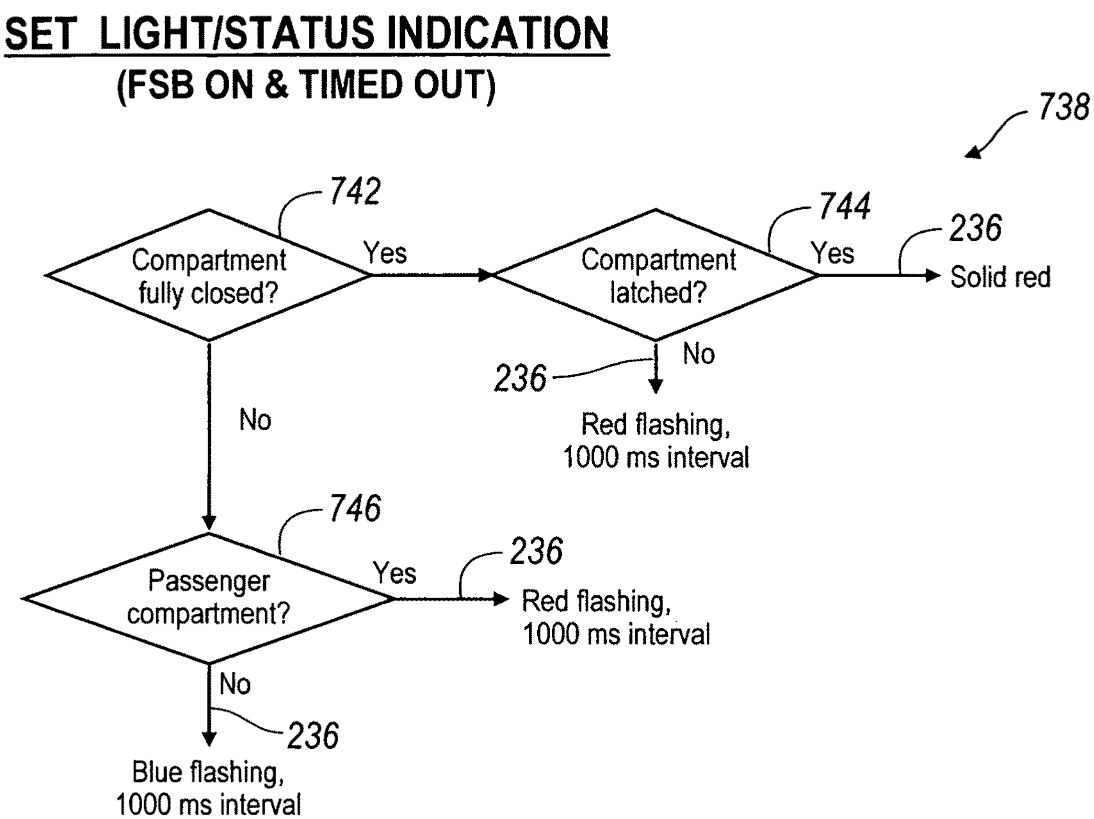
FIG. 35 (Set Light/Indication Procedure (FSB ON and Timed Out)) is a flowchart illustrating a second indicator status update.

With reference to FIG. 35 (Set Light/Indication Procedure (FSB ON and Timed Out)), a process flow diagram indicates the timed-out indicator operational sequence 738. In operation 742, control determines if the compartment status data 238 is set as fully closed. If the compartment status data 238 is set as fully closed, then in operation 744 control determines if the compartment status data 240 is set to latched. If the compartment status data 238 is set to latched, then the indicator data 242 can be set such that LED 52*a* is illuminated. If the compartment status data 238 is set to unlatched, then LED 52*a* can be set to flash at 1,000 millisecond intervals.

If in operation 742 the compartment status data 238 was not set to fully closed, then in operation 746 control determines if the compartment status data 238 indicates that the compartment 24 is a passenger compartment 24. In operation 752, if the compartment 24 is a passenger compartment, then the indicator data 236 can be set to illuminate LED 52*a* in flashing intervals of 1,000 milliseconds. Otherwise, if the compartment 24 is not a passenger compartment, then the indicator data 236 can be set to illuminate LED 52*b* in 1,000 millisecond flashing intervals.

Figure 36:
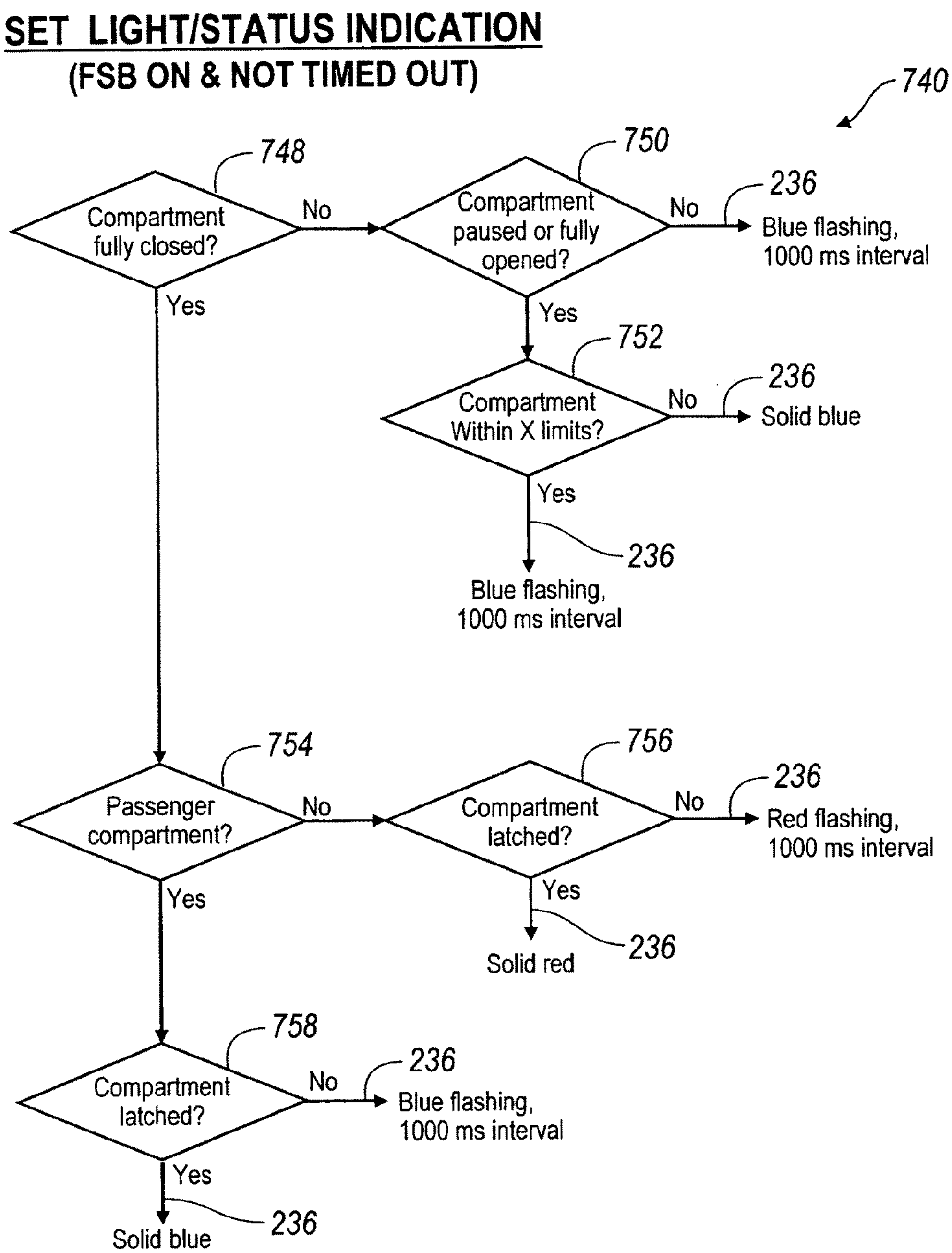
FIG. 36 (Set Light/Indication Procedure (FSB ON and Not Timed Out)) is a flowchart illustrating a third indicator status update method.
Figure 36A:
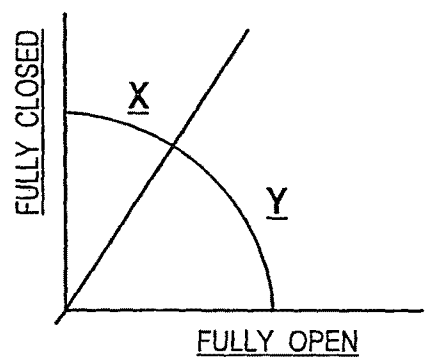
FIG. 36A (Compartment Range of Motion) is a graph of the compartment direction and motion from the fully opened to the fully closed positions.

With reference now to FIG. 36 (Set Light/Indication Procedure (FSB ON and Not Timed Out)), a process flow diagram illustrates the "not timed-out" indicator operational sequence 740. In operation 748, control determines if the compartment status data 238 is set as closed. If the compartment status data 238 is not set as closed, then in operation 750 control determines if the compartment status data 238 indicates that the compartment 24 is paused or fully opened. If the compartment 24 is not paused or fully opened, then the indicator data 236 can be set to illuminate LED 52*b* at 1,000 millisecond intervals, for example. If, however, the compartment 24 is paused or fully opened, then control determines if the compartment status data 238 indicates that the compartment 24 is operating within its "X"-range limit. Over the full range of the compartment motion there are two sections: there is the section "X" and the section "Y", as shown in FIG. 36A (Compartment Range of Motion). Section "X" is a preset percentage of the full range measured from the full closed position. This separation is to aid in the indication of the direction of the motion of the compartment 24 and location of the compartment 24, as shown in FIG. 36A (Compartment Range of Motion). In operation 752, if the compartment 24 is not operating within its "X"-range limit, then indicator data 236 can be set to illuminate LED 52*b*. Otherwise, if the compartment 24 is within its "X"-range limit, then indicator data 236 can be set to illuminate LED 52*b* in 100 millisecond flashing intervals to signify that the position of the compartment 24 is nearing fully closed. This signifies that the operation of the compartment 24 is nearing or leaving the full closed position.

If in operation 748 the compartment status data 238 is set as not closed, then in operation 754 control determines if the compartment 24 is a passenger compartment. If it is not a passenger compartment 24, then in operation 756 control determines based on the compartment status data 238 if the compartment 24 is latched. If the compartment 24 is not latched, then the indicator data 236 is set as illuminating LED 52*a* in flashing 100 millisecond intervals by designating different LED 52 signals. If the compartment 24 is latched, then the indicator data 236 can be set to illuminate LED 52*a*. If the compartment 24 is a passenger compartment 24, then in operation 758 control can determined based on the compartment status data 238 if the compartment 24 is latched. If the compartment 24 is not latched, then the indicator data 236 can be set as illuminating LED 52*b* in 100 millisecond flashing intervals. If the compartment 24 is latched, then the indicator data 236 can be set to illuminate LED 52*b*.

Figure 37:
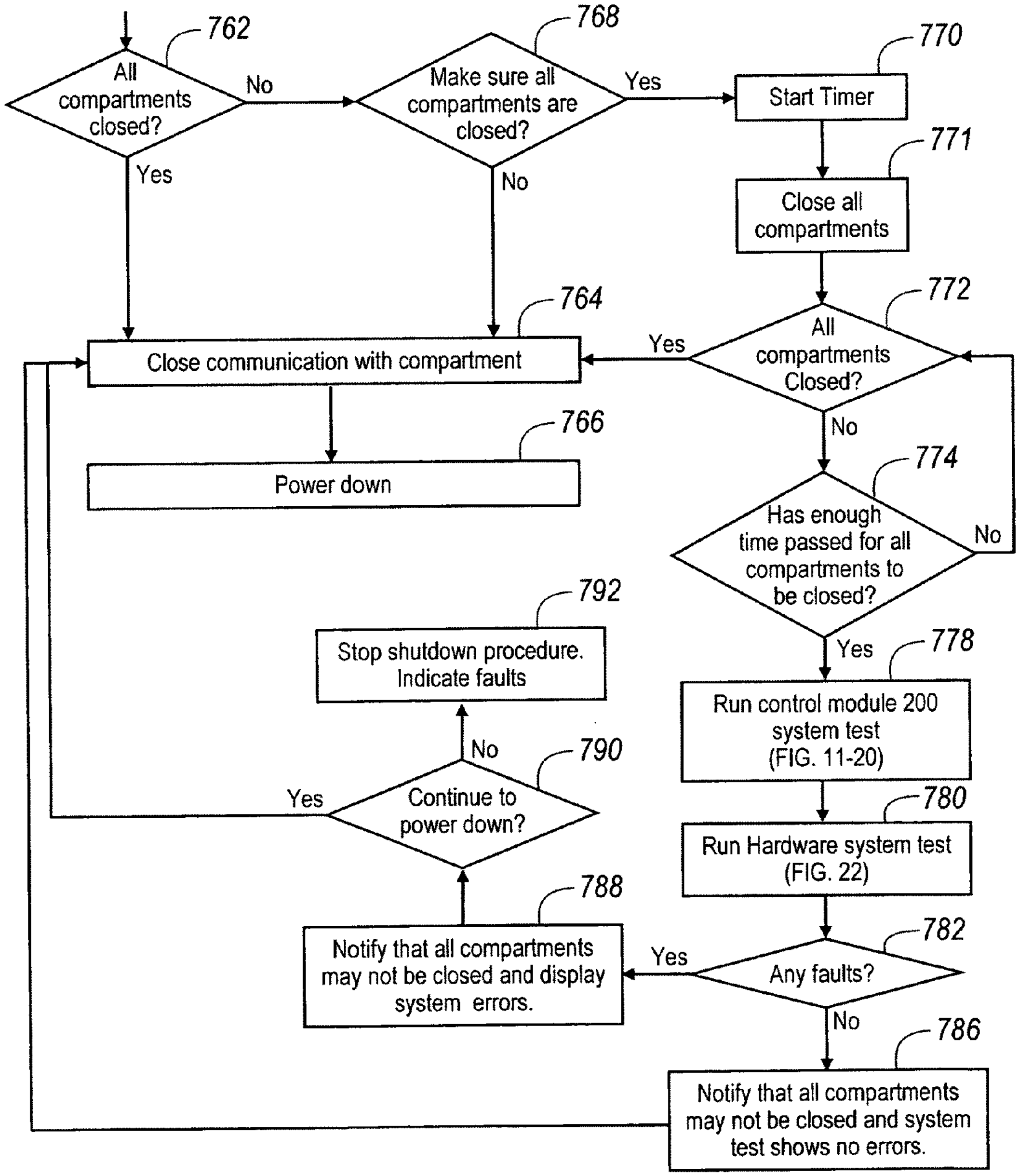
FIG. 37 (System Shutdown Procedure) is a flowchart illustrating a shutdown method.

With reference to FIG. 37 (System Shutdown Procedure), a process flow diagram illustrates a shutdown method performed by the shutdown module 206. Upon receipt of a shutdown signal 760, in operation 762 control determines if all the compartments 24 are closed based on the compartment status data 238. If all of the compartments 24 are closed, then in operation 764 control closes communication with the compartment controllers 30. Then, in operation 766 control sends a shutdown command 230 to the compartment control module 204 to power down. If all the compartments 24 are not closed, then in operation 768 control determines based on the shutdown signal 760 if it is necessary to wait to make sure all of the compartments 24 are closed. If it is not necessary to wait for all the compartments to close, such as in an emergency, then control goes to operation 764. Otherwise, if control needs to make sure all compartments 24 are closed, then control goes to operation 770.

In operation 770, control starts a timer. In operation 771, control commands all the compartments 24 to close. Then, in operation 772, control determines if all compartments 24 are closed. If all the compartments 24 are closed, then control goes to operation 764. Otherwise, if there are compartments 24 opened, then control determines if enough time has passed for all compartments 24 to be closed. In operation 774, if not enough time has passed, then control loops to operation 772. If, however, enough time has passed, then control goes to operation 778. In operation 778, control runs the test of the control system 20 as previously described herein. Then control goes to operation 780. In operation 780, the hardware system test is performed, which was previously described herein. At the end of the hardware system test, operation 782 is performed in which it is determined if there are any faults. If there are no faults detected at operation 782, then at operation 786 data is output that indicates that all compartments 24 may not be closed and the system tests show no errors. Then control loops to operation 764. If there are faults, however, in operation 788 control outputs data 247 that indicates that all compartments 24 may not be closed and also sends the system fault data. Then, in operation 790, control determines whether to control to power down based on the errors. If control decides to not power down, then in operation 792 control stops the shutdown procedure and indicates faults. Otherwise, control loops to operation 764.

Figure 38:
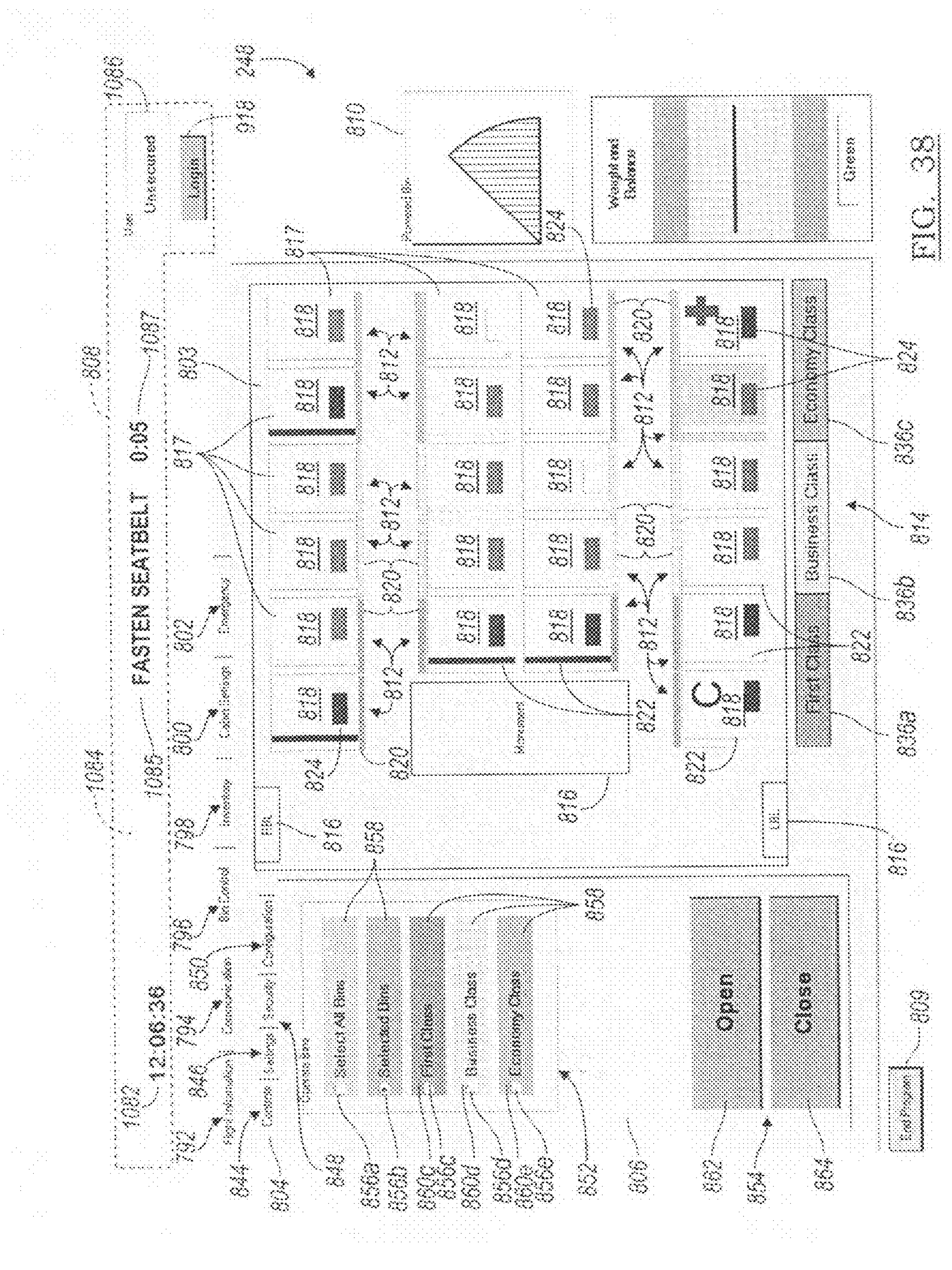
FIG. 38 illustrates a "Bin Control" screen including a "Control" screen.
Figure 39:
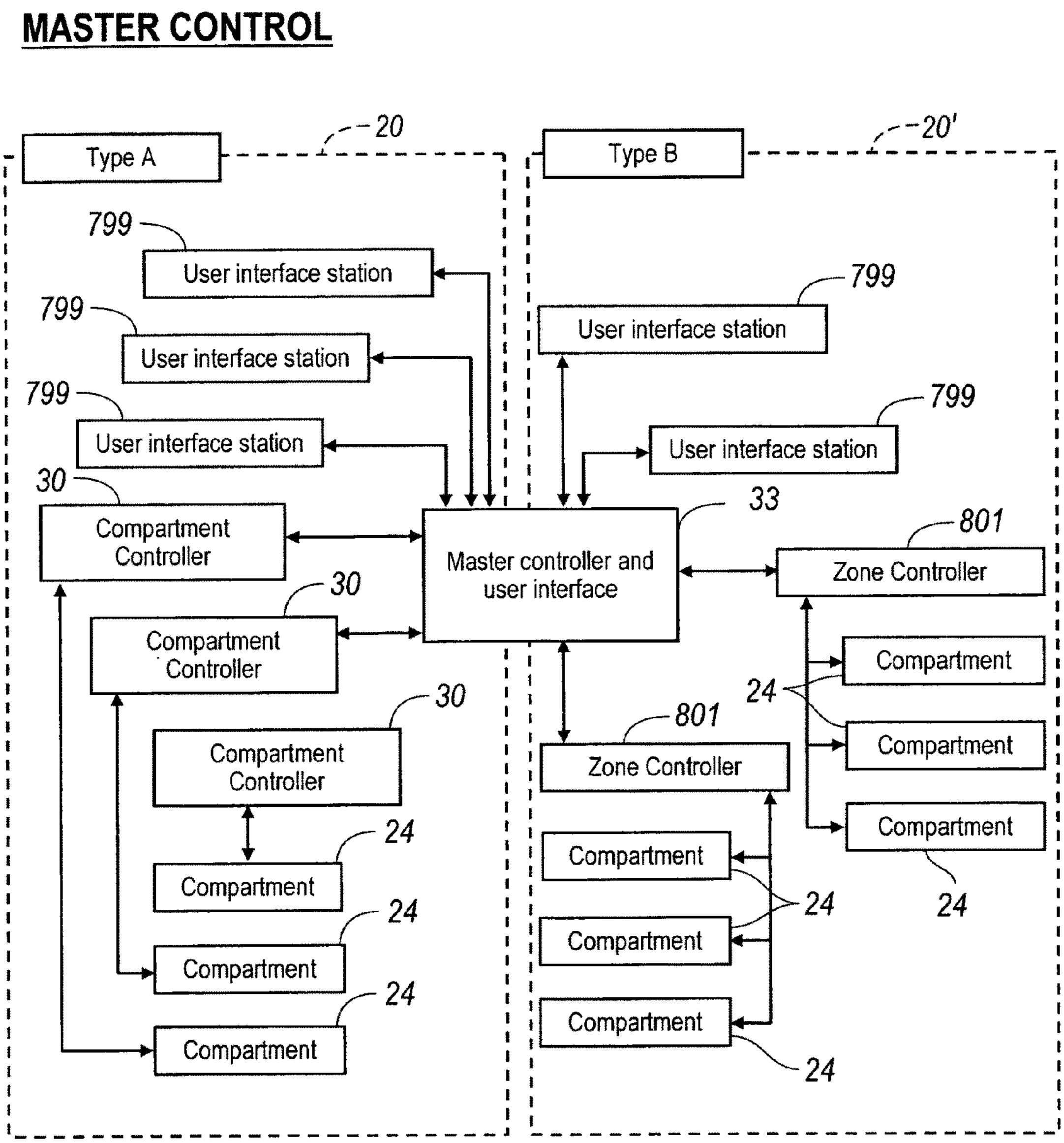
FIG. 39 illustrates a control system and an alternative control system.

With additional reference to FIG. 38, the GUI 248 information used to create the GUI control panel 249 by the GUI manager module 208 is shown. The GUI control panel 249 is preferably composed of various GUIs, such as, but not limited to, a "Flight Information" GUI 792, a "Communication" GUI 794, a "Bin Control" GUI 796, an "Inventory" GUI 798, a "Cabin Settings" GUI 800, and an "Emergency" GUI 802. As the "Bin Control" GUI 796 and the "Cabin Settings" GUI 800 are the GUIs most related to the control of the compartments 24, only these two GUIs will be discussed in detail herein. The GUIs can be selected from various menu tabs as indicated. The GUIs can be selected through any appropriate user input device, such as a touch-screen, a pointer or other device capable of providing the user input data 246. It should be noted that the GUI control panel 249 can be ran by control system 20, specifically the central controller 32 and displayed on the control panel 33, however, with reference to FIG. 39, the GUI control panel 249 could additionally be displayed at a variety of user interface stations 799 that can each interface with the central controller 32 and/or with the compartment controllers 30 interfacing directly between the compartments 24 and the central controller 32. Alternatively, a control system 20' could employ zone controllers 801 as an interface between selected compartments 24 and the central controller 32, however, any combination of control system 20, 20' could be employed.

With reference back to FIG. 38, the "Bin Control" GUI 796 includes a display screen 803, a sub-menu 804, a sub-menu display screen 806, a top display 808, an "End Program" button 809 and an indicator box 810. The display screen 803 preferably includes at least one or a plurality of compartment indicators 812, a legend 814 and location indicators 816. The compartment indicators 812 are generally arranged in a configuration corresponding to the layout of the compartments 24 in the mobile platform 10. For example, the compartments 24 are arranged in six rows of four abreast seating to correspond to the six rows of seating of the mobile platform shown in FIG. 1. The compartments 24 are illustrated as rectangles, however, any appropriate representation of the compartments 24 could be employed, such as, but not limited to, squares, ovals, trapezoids or other polygons or symbols. The compartment indicators 812 have a body 817. The body is generally configured to change color upon the selection of the compartment 24 by the indicator. For example, the body 817 of the compartment indicator 812 can change to a dark grey upon selection by the operator. The body 817 of the compartment indicators 812 includes an indicator surface 818, a first indicator 820, a second indicator 822 and a third indicator 824.

The indicator surface 818 is configured to display a designation associated with the compartment 24. For example, the indicator surface 818 could display a symbol, such as a cross, to indicate that the compartment 24 contains emergency equipment, or the indicator surface 818 could display a symbol, such as a letter "C" to indicate that the compartment 24 is designated as a compartment 24 for use by the crew, or an appropriate symbol to show that the compartment has been designated as manually disabled, such as a strikethrough. The first indicator 820 is configured to display a class or a zone that the compartment 24 is designated. For example, the classes could be first class, business class or economy class. Generally, the first indicator 820 displays a color associated with the particular class, as will be discussed herein, but the first indicator 820 could display a symbol associated with the particular class.

The second indicator 822 is configured to indicate a volume and weight of the compartment 24 based on the received compartment status data 240. The second indicator 822 is shown as a bar, however, the second indicator 822 could be any appropriate shape, such as a line. The color of the second indicator 822 indicates how full the compartment 24 is with respect to weight. If the second indicator 822 is a color yellow, then the compartment is almost full, while a color green indicates that the compartment 24 is nearly empty, and a color red indicates that the compartment 24 is at capacity with regard to weight. The length or height of the second indicator 822 indicates the volume of the compartment 24. A fully extended (high height) colored area on the second indicator 822 indicates that the compartment 24 is almost full, while a short length (low height) indicates that the compartment 24 is empty with regard to volume.

The third indicator 824 is configured to indicate a status of the indicator surface 50 based on the indicator data 242. The third indicator 824 is illustrated as rectangular, however, any appropriate shape could be used such as oval. As the third indicator 824 replicates the indicator data outputted by the indicator module 528, the third indicator 824 can alternate between the colors of the LEDs 52, such as a color red and a color blue.

The legend 814 is generally disposed near a bottom surface 836 of the display screen 803. The legend 814 is illustrated to associate the available class designation colors used with the first indicators 820 with their respective classes. For example, the legend 814 includes three panels. A first panel **836*a* is colored to match the color associated with first class by the first indicator 820 and includes the text "First Class," while a second panel 836*b* is colored to correspond to the color associated with business class and includes the text "Business Class" and a third panel 836*c* is colored to correspond with the color associated with economy class and includes the text "Economy Class." The location indicators 816 enable the operator to relate the compartment indicators 812 to the compartments 24 on the mobile platform 10. Thus, the location indicators 816 facilitate the operator's association of the compartments 24 with the configuration of the mobile platform 10. The location indicators 816 can be directional with regard to the mobile platform 10, such as right or left, and can include fixed structures to further assist in the association of the compartment indicators 812 with the compartments 24**.

The sub-menu 804 includes at least one or a plurality of sub-GUIs displayed on the sub-menu display screen 806, such as a "Controls" GUI 844, a "Settings" GUI 846, a "Security" GUI 848, a "Configuration" GUI 850 and an "Indicators" GUI 851 (FIG. 57) that can be selected via the user input data 246. The "Controls" GUI 844 includes a selection box 852, and function or operational buttons 854.

The selection box 852 is configured to enable the operator to select at least one or a plurality of compartments 24 to operate. It should be noted that although the selection box 852 is illustrated as being near a top portion of the sub-menu display screen 806, the selection box 852 could be in any desired location. The selection box 852 includes radio buttons 856, however, any type of selector could be employed. The radio buttons 856 and their associated text 858 correspond to a respective number of compartments 24 in the mobile platform 10, and can be keyed to match the compartment indicators 812. For example, a first radio button **856*a* is configured to correspond to all the compartments 24 in the mobile platform 10, and is labeled "Select All Bins," while a second radio button 856*b* is configured to enable operation of at least one or a plurality of user selected compartments 24**, and is labeled "Selected Bins."

A third radio button **856*c* is configured to correspond to all of the compartments 24 designated as "First Class" compartments 24, and includes the text "First Class" in a box 860*c* colored to correspond to the color of the legend corresponding to "First Class" and the corresponding color of the first indicator 820. A fourth radio button 856*d* is configured to correspond to all of the compartments 24 designated as "Business Class" compartments 24, and includes the text "Business Class" in a box 860*d* colored to correspond to the color of the legend corresponding to "Business Class" and the corresponding color of the first indicator 820. A fifth radio button 856*e* is configured to correspond to all of the compartments 24 designated as "Economy Class" compartments 24, and includes the text "Economy Class" in a box 860*e* colored to correspond to the color of the legend corresponding to "Economy Class" and the corresponding color of the first indicator 820**.

When the first, third, fourth and fifth radio buttons **856*a*, 856*c*, 856*d*, 856*e* are selected the body 817 of the respective compartment indicators 812 changes to a darker shade than the other unselected compartment indicators 812 to visually indicate which compartments 24 are selected. When the third radio button 856*c* is selected, the user manually inputs the desired compartments 24 via the user input data 246. This can be achieved by selecting the desired compartments 24 via the respective compartment indicators 812** through any suitable user input device.

The operational buttons 854 are configured to enable the compartments 24 selected in the selection box 852 to perform a function. It should be noted that although the operational buttons 854 are illustrated as being near a bottom portion of the sub-menu display screen 806, the operational buttons 854 could be in any desired location. For example, a first or OPEN button 862 is configured to send GUI data 232 to the compartment control module 204 to open the group of compartments 24 selected by the radio buttons 856 or the individually selected group of compartments 24 selected by the operator. A second or CLOSE button 864 is configured to send GUI data 232 to the compartment control module 204 to close the group of compartments 24 selected by the radio buttons 856 or the individually selected group of compartments 24 selected by the operator.

Figure 40:
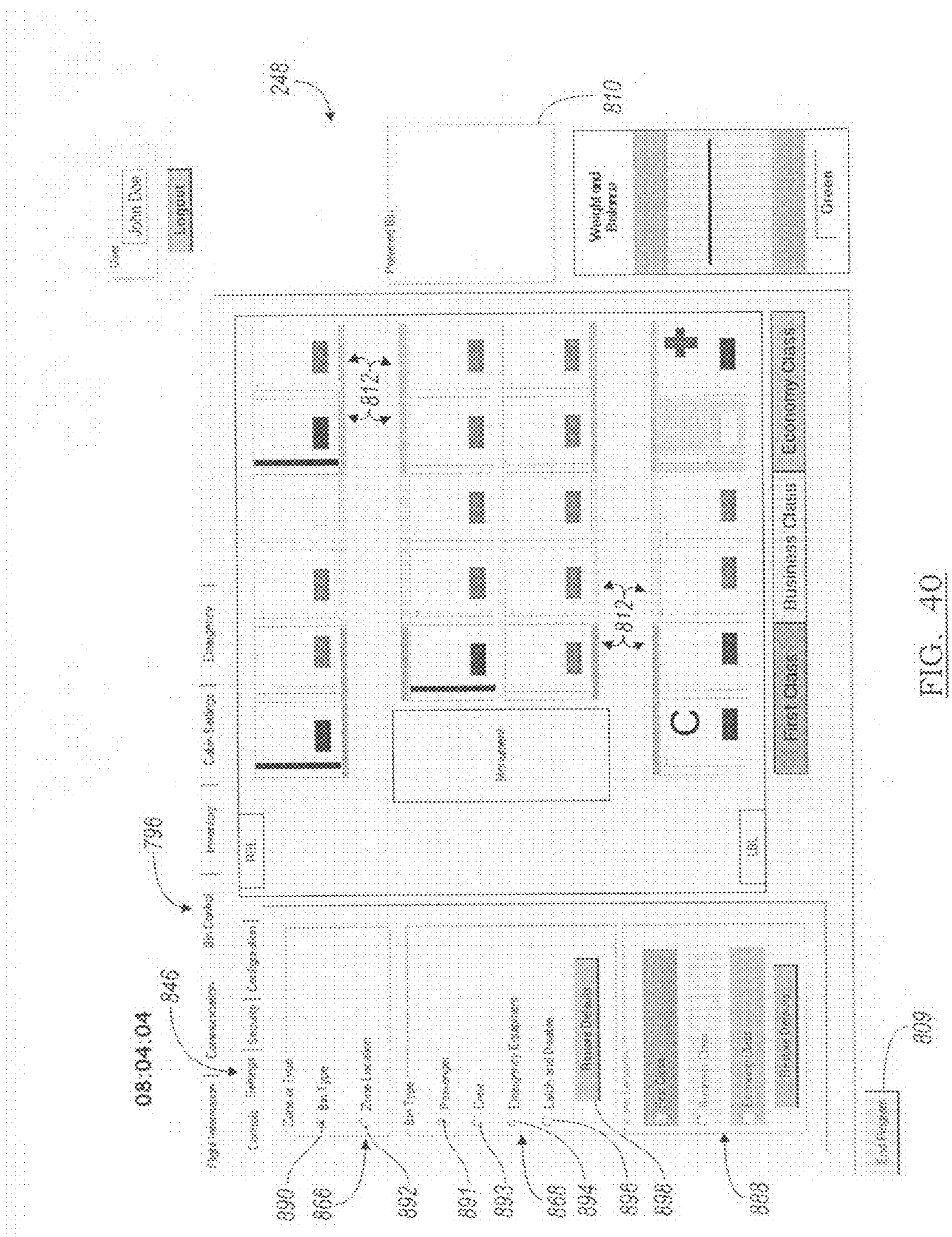
FIG. 40 illustrates a "Bin Control" screen including a "Settings" screen.

With reference to FIG. 40, the "Settings" GUI 846 includes a first selector box or "Zone/Type" selector 866, a second selector box or "Bin Type" selector 868 and a third selector box or "Zone Location" selector 888. The "Settings" GUI 846 is generally protected, as will be discussed herein. The "Zone/Type" selector 866 includes a "Bin Type" radio button 890 and a "Zone Type" radio button 892. The "Bin Type" radio button 890, once selected, enables the "Bin Type" selector 868, while the "Zone Type" radio button 892, once selected, enables the "Zone Location" selector 888. The disabled selector can appear lighter in color to the active selector.

The "Bin Type" selector 868 includes a first or "Passenger" radio button 890, a second or "Crew" radio button 892, a third or "Emergency Equipment" radio button 894, a fourth or "Latch and Disable" radio button 896, and a "Restore Defaults" button 898. While the "Passenger" radio button 890 is selected any compartment surface(s) 818 selected will designate that compartment as a passenger compartment 24 which is indicated by the lack of a crew, emergency equipment cross, disabled, or other symbol. While the "Crew" radio button 892 is selected any compartment surface(s) 818 selected will designate that compartment as a crew compartment 24, and the "Emergency Equipment" radio button 894 causes a selected compartment indicator 812 to be designated as an emergency equipment compartment 24. The "Latch and Disable" radio button 896 enables a selected compartment indicator 812 to be designated as disabled. The "Restore Defaults" button 898 resets the compartment indicators 812 to the original settings.

Figure 41:
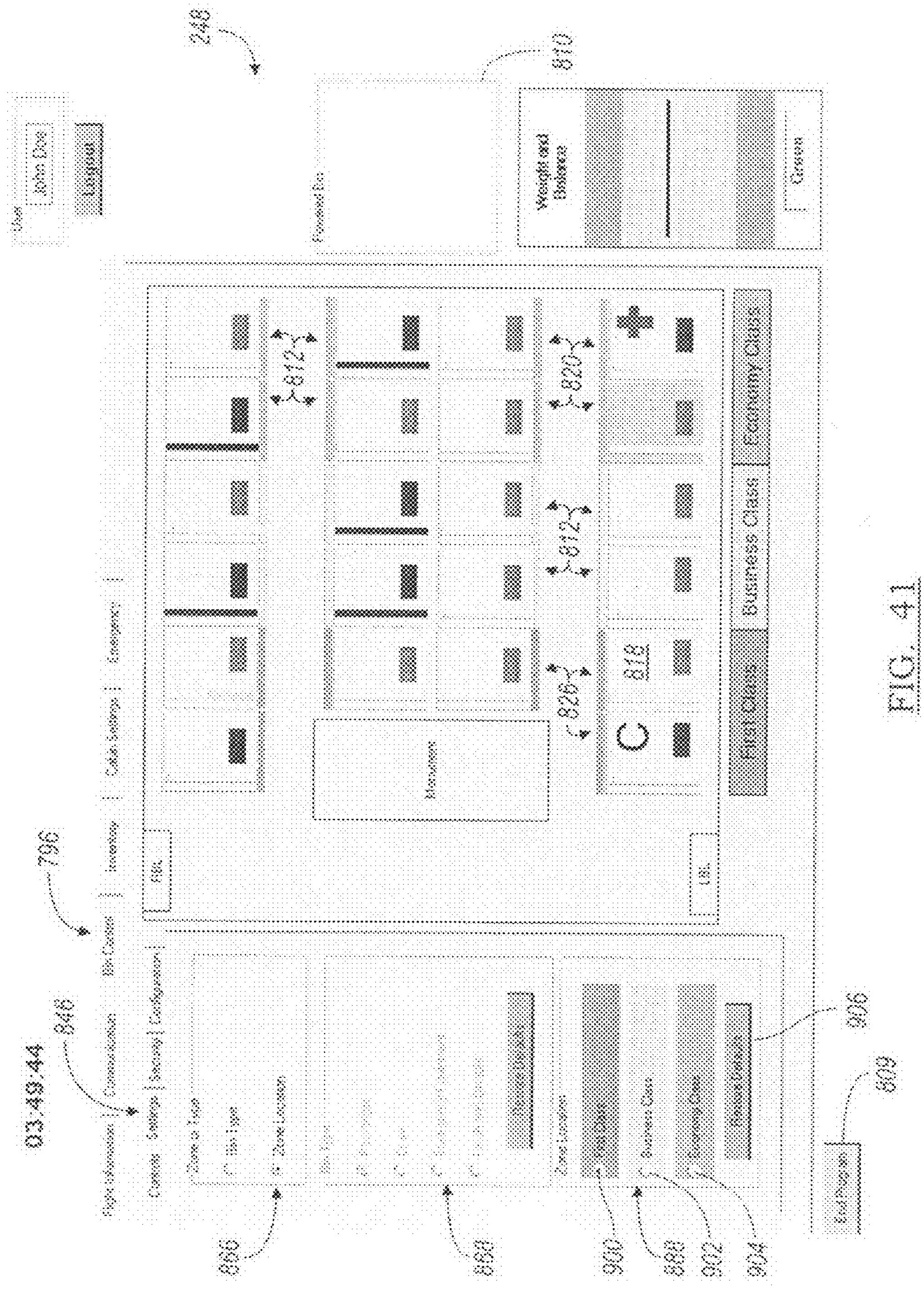
FIG. 41 illustrates a "Bin Control" screen including a "Settings" screen with a "Zone Locator" selector displayed.

With reference to FIG. 41, the "Zone Location" selector 888 includes a first or "First Class" radio button 900, a second or "Business Class" radio button 902, a third or "Economy Class" radio button 904, and a "Restore Defaults" button 906. The "First Class" radio button 900 enables an operator to associate a compartment indicator(s) 812 with First Class and changes the appropriate compartment indicators 812. The "Business Class" radio button 902 enables an operator to associate a compartment indicator(s) 812 with Business Class, and the "Economy Class" radio button 904 allows an operator to associate a compartment indicator(s) 812 with Economy Class. The "Restore Defaults" button 906 resets the compartment indicators 812 to the original settings.

In order to designate the settings of the compartments 24, one of the "Bin Type" radio button 890 and the "Zone Type" radio button 892 of the "Zone/Type" selector 866 is selected. If the "Bin Type" selector 868 is activated, then the desired radio button 890, 892, 894, 896 or the "Restore Defaults" button 906 is selected. To designate the compartment 24, after the radio button 890, 892, 894, 896 is selected, the desired compartment indicator 812 is selected.

If the "Passenger" radio button 890 is selected, then after the compartment indicator 812 is selected, the indicator 818 of the compartment indicator 812 will remain constant in color. If the "Crew" radio button 892 is selected, then after the compartment indicator 812 is selected, the indicator 818 of the compartment indicator 812 will include a "C" to designate the compartment 24 as a crew compartment 24. "Emergency Equipment" radio button 894 is selected, and after the compartment indicator 812 is selected, the indicator 818 of the compartment indicator 812 will include a cross to designate the compartment 24 as an emergency equipment compartment 24. If the "Latch and Disable" radio button 896 is selected, then after the compartment indicator 812 is selected, the indicator 818 of the compartment indicator 812 will include a strikethrough symbol.

If the "Zone Location" selector 888 is activated, as shown in FIG. 41, then the desired radio button 900, 902, 904 or the "Restore Defaults" button 906 is selected. If the "First Class" radio button 900 is selected, the operator selects the desired compartment indicator(s) 812 that are to be associated with First Class. Then, the first indicator 820 of the selected compartment indicator(s) 812 updates to correspond to the color associated with First Class. If the "Business Class" radio button 902 is selected, then the operator selects the desired compartment indicator(s) 812 that are to be associated with Business Class, and the first indicator 820 of the selected compartment indicator(s) 812 updates to correspond to the color associated with Business Class. If the "Economy Class" radio button 904 is selected, then the operator selects the desired compartment indicator(s) 812 that are to be associated with Economy Class, and the first indicator 820 of the selected compartment indicator(s) 812 updates to correspond to the color associated with Economy Class. The "Bin Type" selector 868 and "Zone Location" selector 888 can work together to allow the user to designate the compartment type or zone location of multiple compartments 24 at once.

Figure 42:
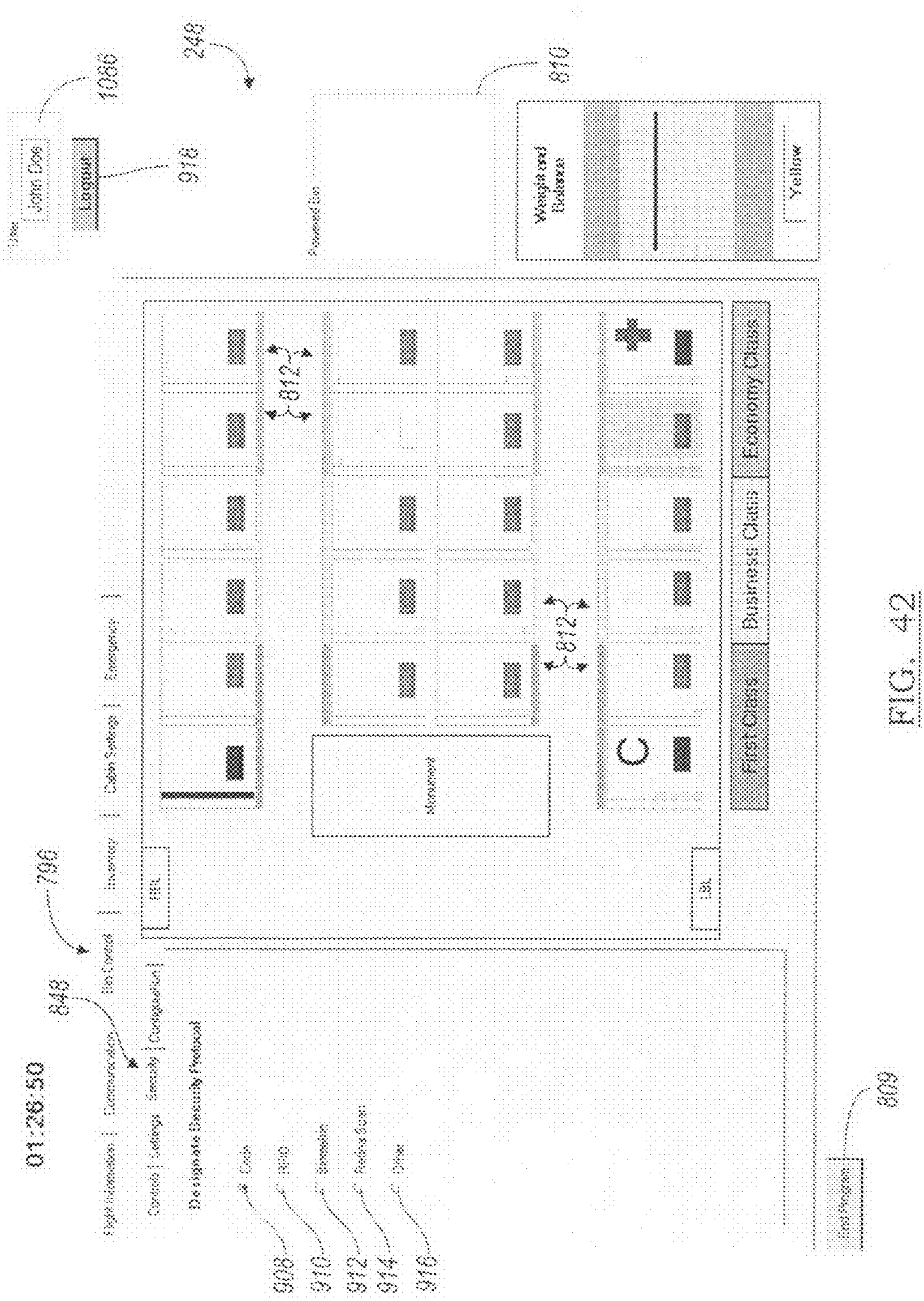
FIG. 42 illustrates a "Bin Control" screen including a "Security" screen.

With reference now to FIG. 42, the "Security" GUI 848 is illustrated. The "Security" GUI 848 designates the security protocols used to access the restricted areas of the GUI manager module 208 and is security protected itself. A user is required to be logged in to change or view these settings as will be discussed herein. The available security protocols are selected by associated radio buttons. For example, the "Security" GUI 848 includes a "Code" radio button 908, a "RFID" radio button 910, a "Biometric" radio button 912, a "Retina Scan" radio button 914, and an "Other" radio button 916. The "RFID" radio button 910, "Biometric" radio button 912, and "Retina Scan" radio button 914 are commonly known security protocols and are not discussed in detail herein.

Figure 43:
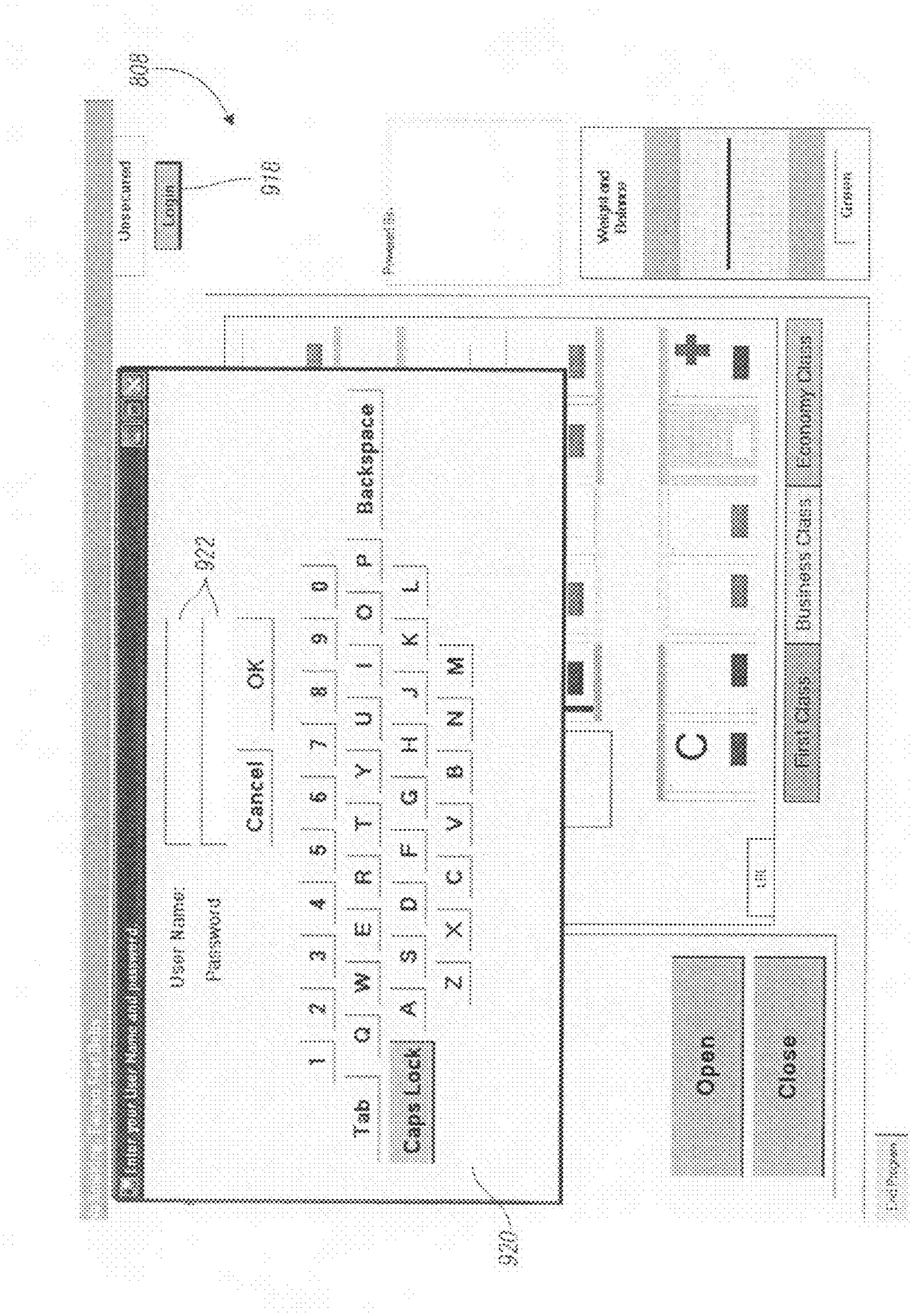
FIG. 43 illustrates a "Password" prompt screen.

The "Code" radio button 908 provides password protection to the restricted areas of the GUI manager module 208, and the "Other" radio button 916 enables client specific security protocols to be selected. If the "Code" radio button 908 is selected, then with reference to FIG. 43, in order to login to access the restricted areas of the GUI manager module 208, an operator selects a "Login" button 918 from the top display 808. A user name and password prompt screen 920 is displayed, and the operator can enter his/her user name and password in respective text boxes 922. Once the operator has logged in, then the button 918 displays "Logout" as is generally known. The control also updates the user or associated username to display the entered name of the user who is logged in. When no user is logged in the user identification box 1086 displays "unsecured". Secure operation has a timer. For example, five minutes after a user has logged in, the control resets the settings to an "unsecured" setting. This is to prevent unauthorized use of the GUI Control Panel 249.

Figure 44:
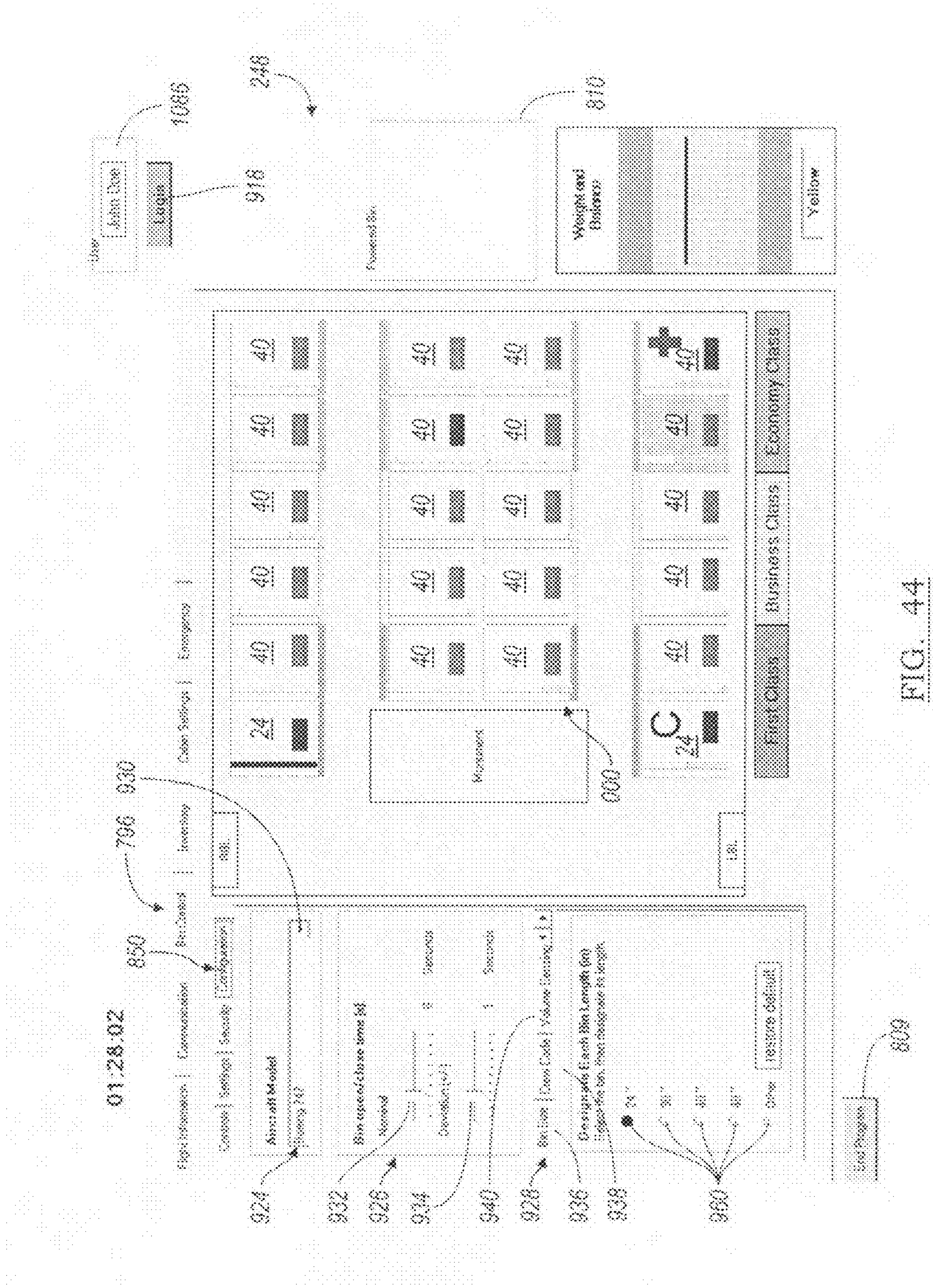
FIG. 44 illustrates a "Bin Control" screen including a "Configuration" screen.

With reference now to FIG. 44, the "Configuration" GUI 850 is illustrated. The "Configuration" GUI 850 includes a first or "Aircraft Model" selector box 924, a second or "Bin open/close time" selector box 926, and a sub-menu 928. The "Configuration" GUI 850 is restricted. The "Aircraft Model" selector box 924 enables the user to select the aircraft or mobile platform 10 to which the compartment control system 20 is employed from a drop-down menu 930. For example, a Boeing 747 can be selected. The "Bin open/close time" selector box 926 enables the user to set a nominal close time in seconds for the compartments 24 with a first scroll button 932 and a deviation for the nominal close time in seconds with a second scroll button 934; although any suitable selector could be employed.

With reference to FIGS. 44-56, the sub-menu 928 includes a "Bin Size" GUI 936, a "Crew Code" GUI 938, a "Volume Sensing" GUI 940, a "Language" GUI 942, a "Profile" GUI 944, an "Emergency Lockout" GUI 946, a "Maintenance" GUI 948, a "Weight Sensing" GUI 950, a "Feedback" GUI 952, a "Power Allocation" GUI 954 and a "Current" GUI 956. Scroll tabs 958 are used to move amongst the GUIs of the sub-menu 928.

With reference to FIG. 44, the "Bin Size" GUI 936 includes a plurality of radio buttons 960 that are each associated with a respective length in inches of the compartments 24 on the mobile platform 10. For example, five radio buttons 960 could be employed designated lengths of each selected compartment 24 of 24 inches (in.), 30 in., 40 in., 48 in., or other to enable client specific lengths to be inputted. Each compartment surface 818 will have a size designator that appears only when the "Bin Size" GUI 936 is active. A "restore defaults" button returns the compartment sizes to their original settings (not shown).

Figure 45:
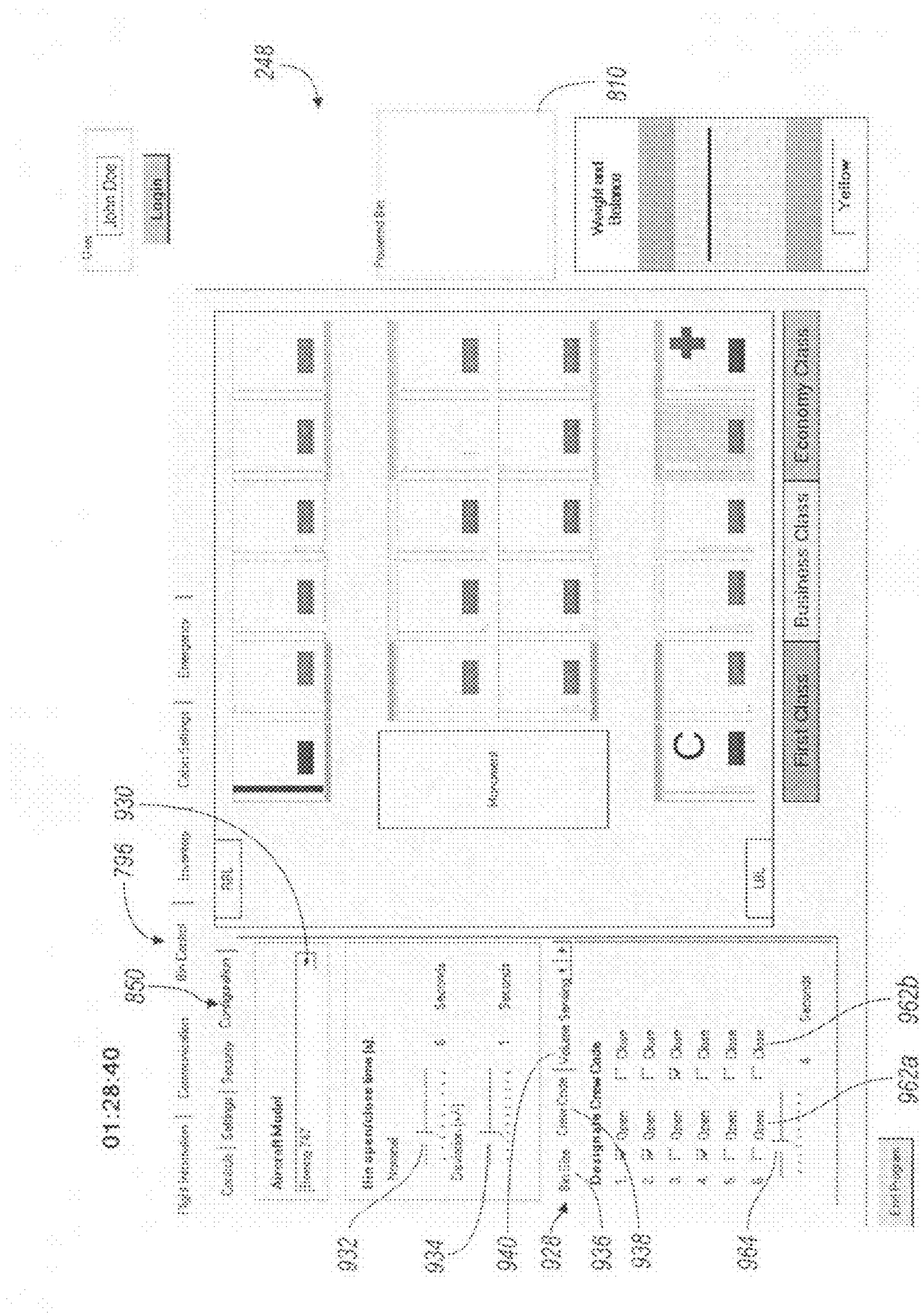
FIG. 45 illustrates a "Bin Control" screen including a first "Configuration" screen.

With reference now to FIG. 45, the "Crew Code" GUI 938 includes a plurality of check boxes 962 and a scroll bar 964. The "Crew Code" GUI 938 enables the operator to set a crew code comprised of a series of presses to the OPEN or CLOSE buttons 46, 48 of the switch to enable access to the crew compartments 24 or compartments 24 after the warning is active. A first column of check boxes 962*a* are designated as "Open" and a second column of check boxes 962*b* are designated as "Close." The check boxes 962 designated as "Open"

correspond to pressing the OPEN butting 46 and the check boxes 962 designated as "Close" correspond to pressing the CLOSE button 48.

The check boxes 962 are arranged in a plurality of numbered rows that correspond to the code sequence. For example, there can be six rows, numbered one to six, which correspond to the order in which the OPEN button 46 or CLOSE button 48 of the switch system 40 must be pressed. The scroll bar 964 enables the operator to set the amount of time permitted to enter the crew code in seconds. By sliding the scroll bar 964, the operator can vary the time as desired. For example, as illustrated in FIG. 45, the crew code requires pressing the OPEN button 46 twice and then the CLOSE button 48, and then the OPEN button 46 within four seconds to gain access to crew compartments 24 or compartments 24 after the warning is active, as discussed herein.

Figure 46:
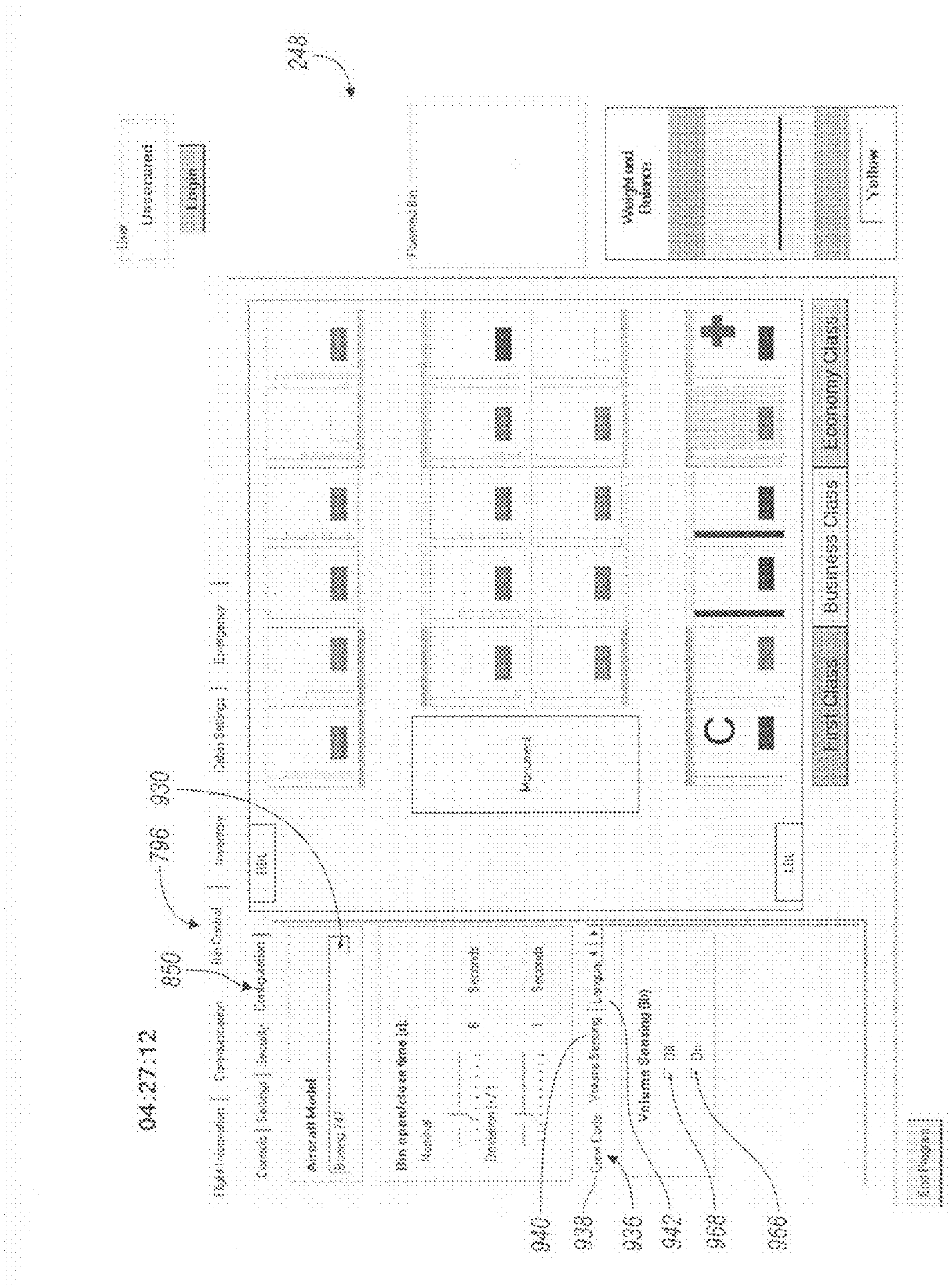
FIG. 46 illustrates a "Bin Control" screen including a second "Configuration" screen.
Figure 47:
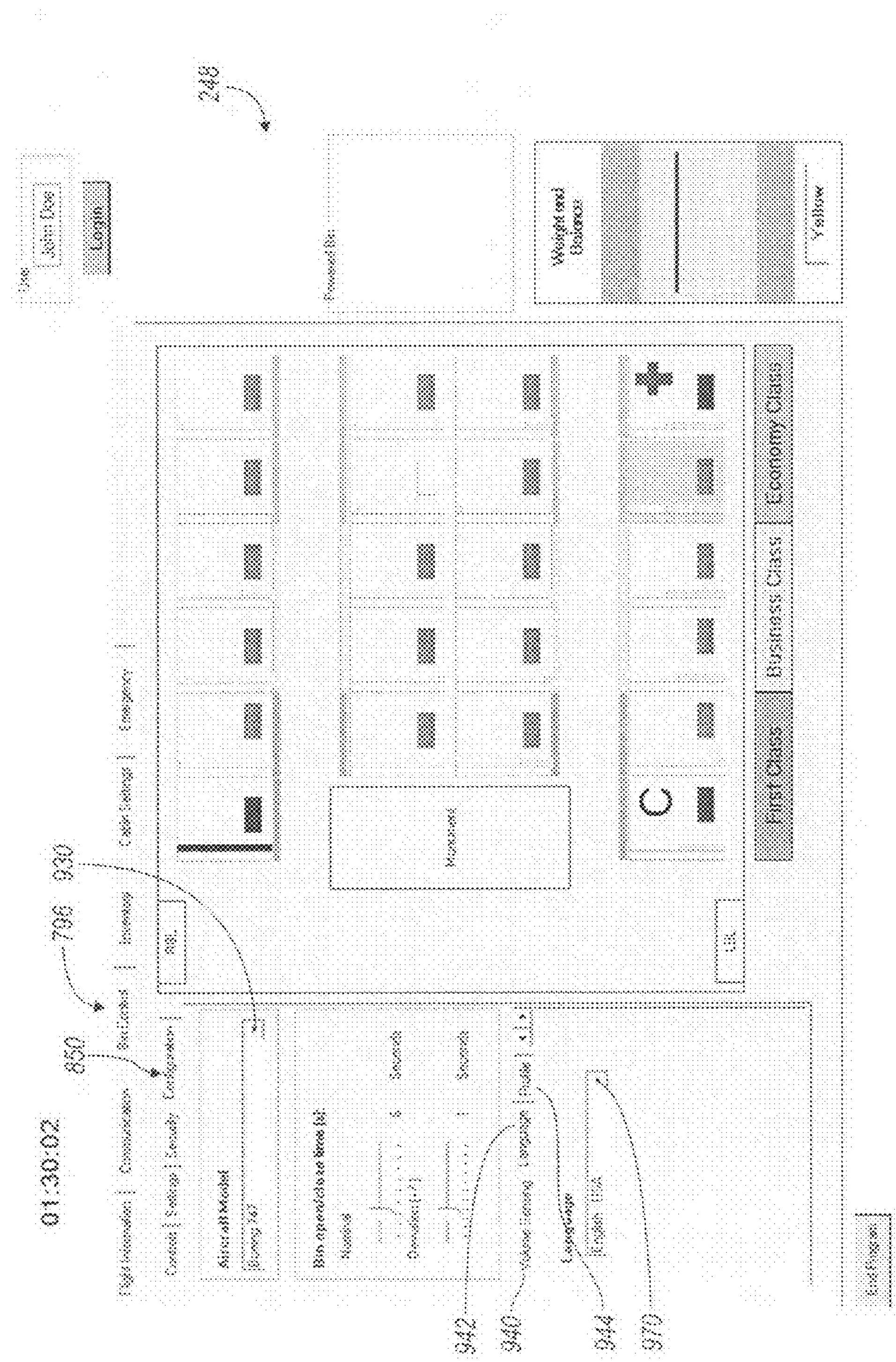
FIG. 47 illustrates a "Bin Control" screen including a third "Configuration" screen.

With reference to FIG. 46, the "Volume Sensing" GUI 940 is illustrated. The "Volume Sensing" GUI 940 includes a "On" radio button 966 and an "Off" radio button 968 to enable the operator to turn the volume/compartment capacity sensing on and off. With reference to FIG. 47, the "Language" GUI 942 is illustrated. The "Language" GUI 942 includes a drop-down menu 970 to enable the operator to set the language for GUI 248 generated by the GUI manager module 208.

Figure 48:
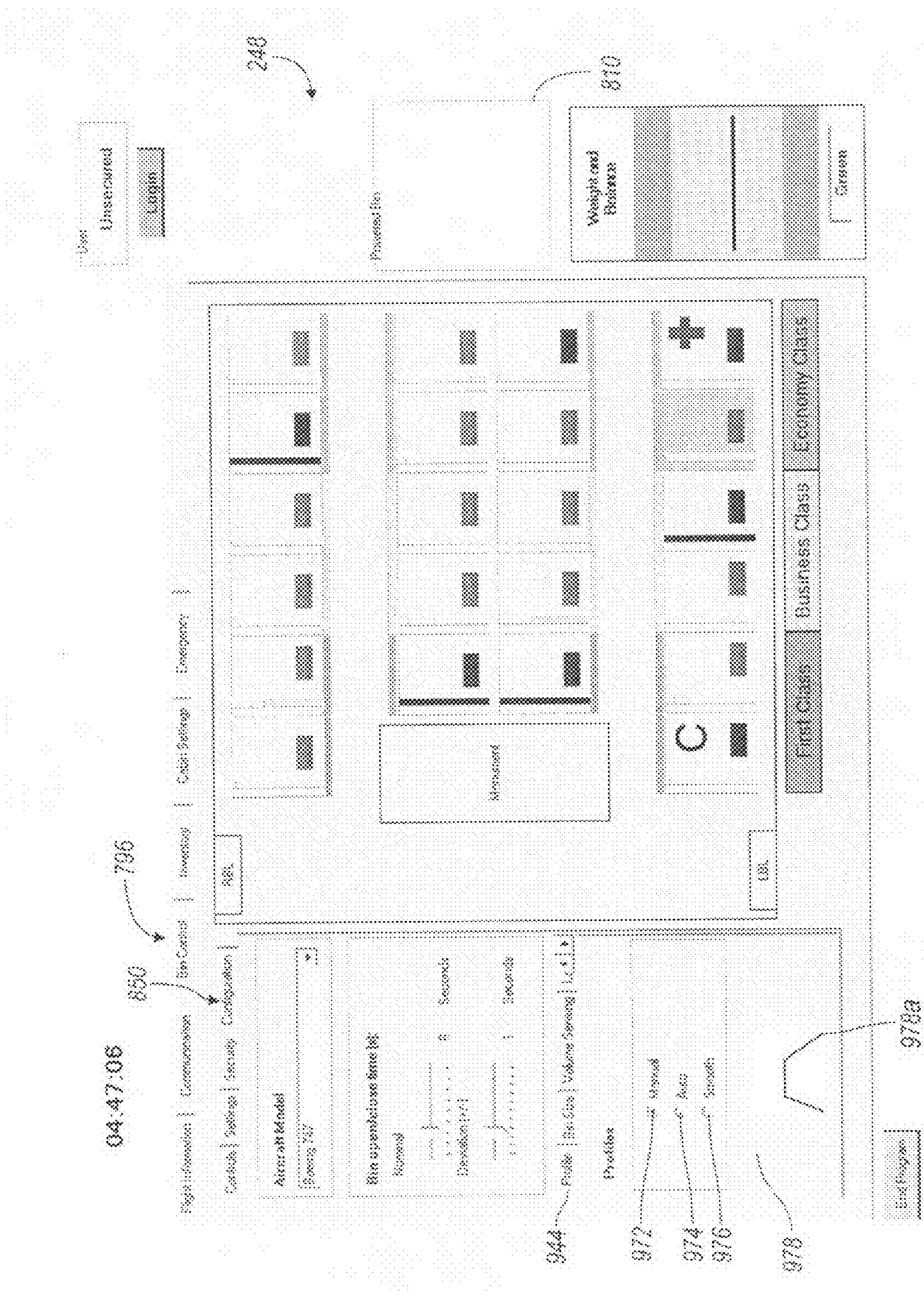
FIG. 48 illustrates a "Bin Control" screen including a fourth "Configuration" screen.

Referring to FIG. 48, the "Profile" GUI 944 is illustrated. The "Profile" GUI 944 includes a first or "Manual" radio button 972, a second or "Auto" radio button 974, a third or "Smooth" radio button 976, and a display 978. The "Profile" GUI 944 enables the operator to select the desired opening and closing motion profile for the actuator system 26 of the compartments 24. The profiles are set as desired to provide an aesthetically pleasing movement of the compartments 24 within the cabin 14. The profile for each radio button 972, 974, 976 is illustrated in the display 978 upon the selection of the radio buttons 972, 974, 976.

The "Manual" radio button 972 provides a manual motion profile 978*a* as illustrated in FIG. 48. The manual motion profile 978*a* is characterized by a sharp beginning and ending motion. The manual mode is run off a calculated maximum velocity of the motor 125. Based on the computed maximum velocity of the motor 125, control accelerates and decelerates the compartment 24 to the maximum velocity using a ramp function. The discontinuities within the profile can create additional wear on the mechanical components of the power-assisted compartment system 12 but result in quick motion changes. The time from start to maximum velocity and from maximum velocity to full stop is very short. The manual motion profile 972*a* is a precalculated preset mode with no real-time updating or adjustment to compensate for factors that may make the compartment 24 travel less than optimally.

Figure 49:
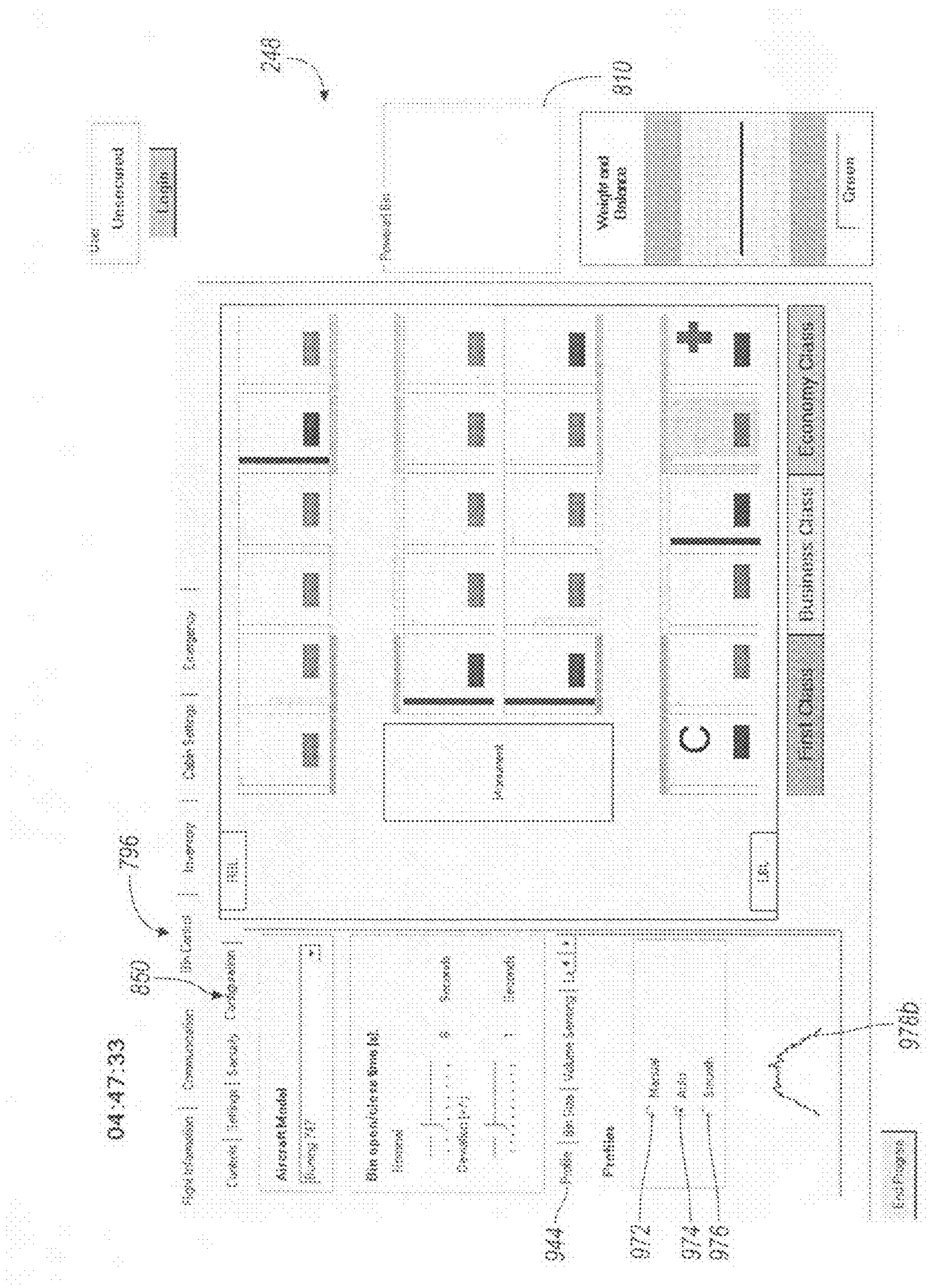
FIG. 49 illustrates a "Bin Control" screen including a fifth "Configuration" screen.
Figure 49A:
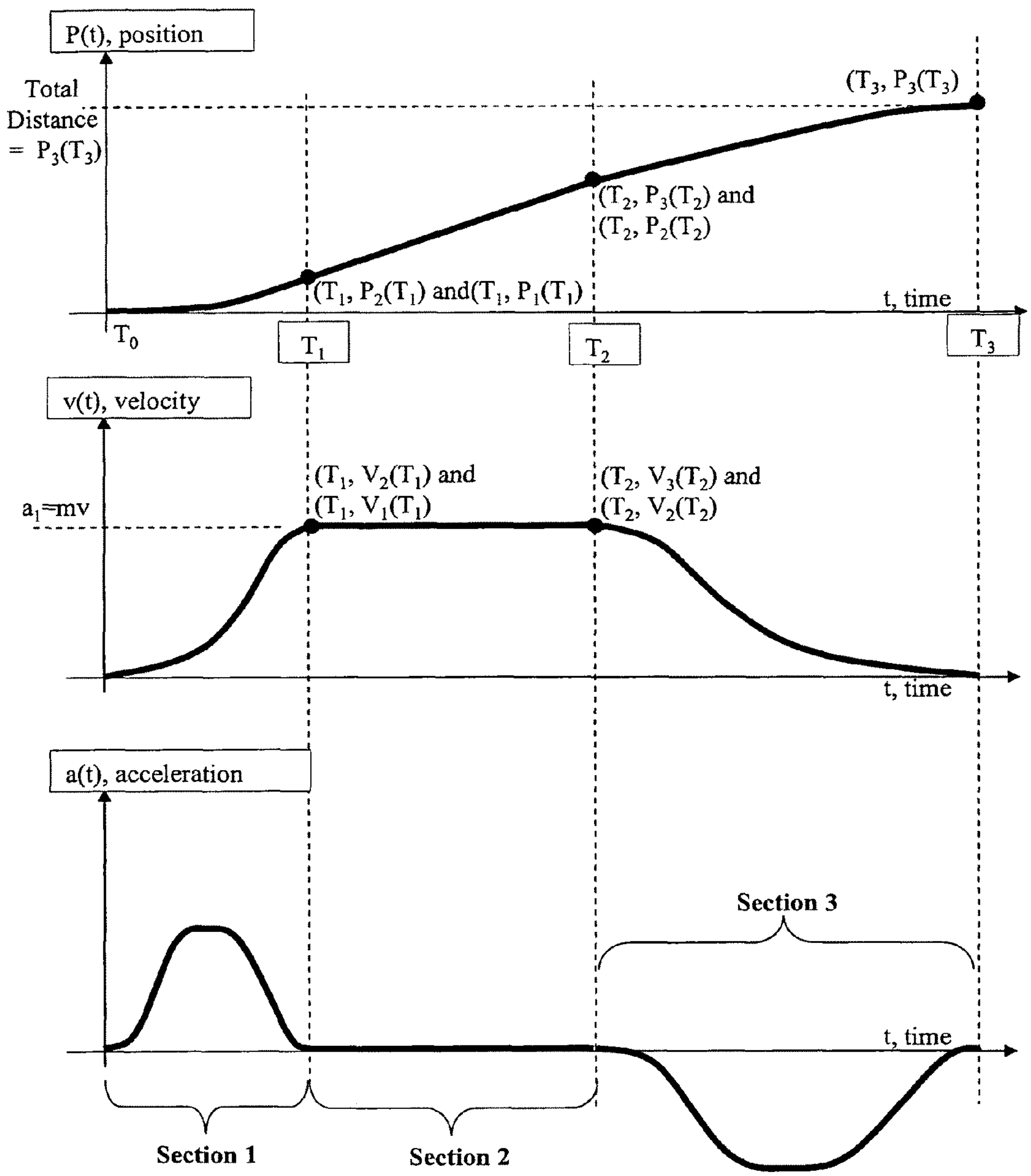
FIG. 49A is a graph of the position, velocity and acceleration according to an Automatic profile.

With reference to FIG. 49, the "Smooth" radio button 976 provides an automatically computed motion profile 978*b* as illustrated. The automatically computed motion profile 978*b* is more smooth than the other motion profiles and creates the most aesthetic motion and causes the least wear on mechanical components of the power-assisted compartment system 12. The smooth mode would provide a smooth moving profile for the compartment 24 based off a desired time for the compartment 24 to move from closed to fully opened using input values for the percentage of time to accelerate and the percentage of time to decelerate. In order to minimize wear on the motor 126, the smooth mode is computed to create smooth position, velocity, and acceleration profiles, as shown in FIG. 49A. As referred to herein, the first section is characterized by the beginning of movement or acceleration of the compartment 24, the second two is characterized as the mid-range movement, or constant velocity section, of the compartment 24, and section three is the ending of the movement of the compartment 24. In order to compute the smooth position, velocity and acceleration profiles, the following parameters are inputted:

(1) $T_3$, wherein $T_3$ is the desired amount of time for a full cycle (i.e. fully opened to closed or vice versa);

(2) $P_3(T_3)$, wherein $P_3(T_3)$ is the total distance, and can be a radial measurement representing the full sweep of the compartment 24 (i.e. the angular displacement from fully opened to fully closed);

(3) AP, where AP is a percentage of the total time required to accelerate and is used to compute the duration for section one of the profile, where the duration for section one of the profile is equal to:

$$T_1=T_3*AP/100. \quad (12)$$

(4) The duration of sections two and three of profile is computed using AD, wherein AD is a percentage of the total time required to decelerate, amounting to the duration for sections two and three of the profile, and is equal to:

$$\text{Section}_3=T_3*DP/100;\ T_2=T_3-\text{Section}_3 \quad (13)$$

Variables of the automatic mode computation include MV, wherein MV is equal to the maximum velocity. The maximum velocity is determined from a trigonometric function. The basic trigonometric function form is used, wherein:

$$a*\sin^2(b*t+c) \quad (14)$$

The basic trigonometric function maximizes profile continuity and smoothness, while potentially minimizing acceleration and deceleration intervals.

wherein a represents the function amplitude, b represents the function period, and c represents the horizontal shift of an equation to maintain continuity. The base trigonometric function for the velocity profile is in the form of:

$$MV=a*\sin^2(b*t) \quad (15)$$

wherein a is equal to the amplitude, which is equal to MV, the maximum velocity. In order to calculate the velocity profile, the following equations are derived and used:

$$V_1(t)=MV*\sin^2(b_1*t) \quad (16)$$

$$V_2(t)=MV \quad (17)$$

$$V_3(t)=MV*\sin^2(b_3*t+c_3) \quad (18)$$

wherein $b_1$ is the b constant of the velocity function for section one of the motion profile, $b_3$ is the b constant of the velocity function for section three of the motion profile, and $c_3$ is the c constant of the velocity function for section three of the motion profile, $V_1(t)$ is the velocity equation for section one, $V_2(t)$ is the velocity equation for section two, and $V_3(t)$ is the velocity equation for section three.

In order to compute the motion profile for the position, the following equations are used:

$$P_1(t)=\int V_1(t)dt=MV\int\sin^2(b_1*t)dt \quad (19)$$

$$P_1(t)=MV/(2*b_1)*[b_1*t-\sin(2*b_1*t)/2]+D_1 \quad (20)$$

wherein $D_1$ is the constant for section one, and is introduced when the velocity equation is integrated to determine the position equation. Further, it will be noted that t=0 at the start of section one, and therefore $P_1(t)=0$, and $D_1=0$. In order to determine the motion profile for the position at section two, the following equation is used:

$$P_2(t)=MV*(t-T_1)+P_1(T_1) \quad (21)$$

In order to determine the motion profile for the position at section three, the following equation is used:

$$P_3(t) = \int V_3(t)dt = MV / b_3 \int \sin 2(b_3 * t + c_3) d(b_3 * t + c3) \quad (22)$$

$$= MV / (2 * b_3) * [(b_3 * t + c_3) - \sin(2 * b_3 * t + 2 * c_3) / 2) + D_3 \quad (23)$$

wherein at $t=T_3$ and $P_3(t)=P_3(T_3)$, then $D_3$ can be computed using the following equation:

$$D_3=P_3(T_3)-MV/(2*b_3)*[b_3*T_3+c_3-\sin(2*b_3*T_3+2*c_3)/2] \quad (24)$$

With $D_3$ computed, $D_3$ is substituted into the equation for $P_3(t)$ to arrive at:

$$P_3(t)=MV/(2*b_3)*[b_3*(t-T_3)-\sin(2*b_3*t+2*c_3)/2+\sin(2*b_3*T_3+2*c_3)/2]+P_3(T_3) \quad (25)$$

wherein $D_3$ is the constant for section three and is introduced when the velocity equation is integrated to determine the position equation, and $T_3$ is the required time for total compartment 24 movement.

In order to compute the motion profile for the acceleration of the compartment 24, the following equations are used:

$$A_1(t)=V_1(t) \quad (26)$$

$$A_1(t)=b_1*MV*\sin(2*b_1*t) \quad (27)$$

$$A_2(t)=0 \quad (28)$$

$$A_3(t)=b_3*MV*\sin(2*b_3*t+c_3) \quad (29)$$

In order to compute the maximum velocity MV, which is related to related to maximum current, and thus, system power draw and power management, the following equations are used:

$$MV=\text{rise/run} \quad (30)$$

$$MV=P_3(T_2)-P_1(T_1)/(T_2-T_1) \quad (31)$$

wherein in equation (27) the above equations are substituted in, resulting in:

$$MV = \frac{-2 * P_3(T_3)}{-T_2 - T_3 + T_1 - 1 / (2 * b_3) * [\sin(2 * (b_3 T_3 + c_3)) + \sin(2 * (b_3 * T_3 + c_3))] + \sin(2 * b_1 * T_1) / (2 * b_1)} \quad (31)$$

Additionally, based on the values received in the above equations, the following constants are computed:

$$b_1=\pi/T_1 \quad (32)$$

$$b_3=\pi/(T_3-T_2) \quad (33)$$

$$c_3=A \sin(0)-b_3*T_3 \quad (34)$$

Figure 50:
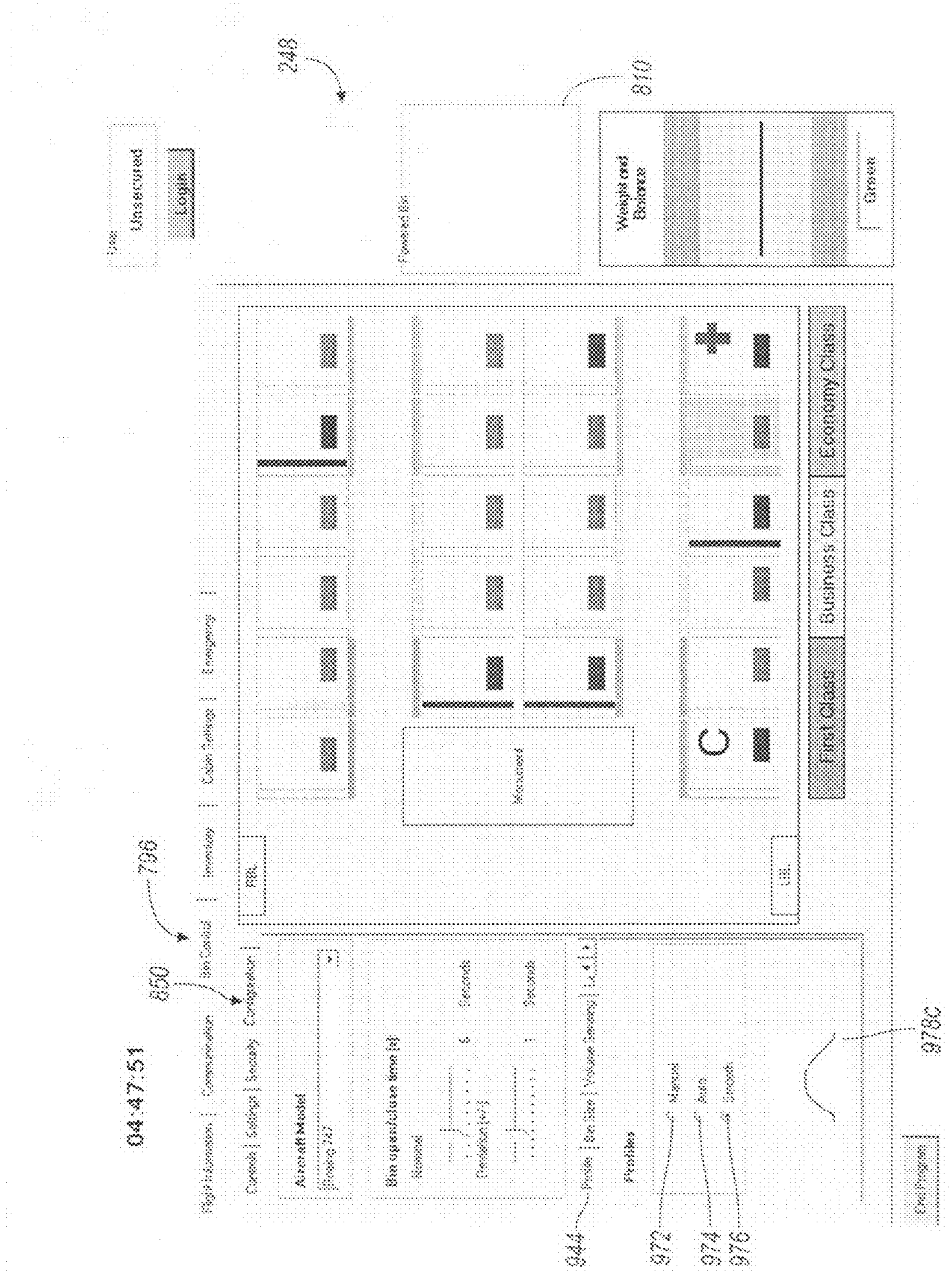
FIG. 50 illustrates a "Bin Control" screen including a sixth "Configuration" screen.

Referring now to FIG. 50, the "Auto" radio button 974 is self-updating. It is a more sophisticated version of the manual motion profile. When the "Auto" radio button 974 is selected, control operates the compartment 24 at a set velocity to maintain a set time to fully open or fully close the compartment 24. When operating on the automatic motion profile, control can instantaneously increase or decrease the supplied current, and thus the velocity of the compartment 24. A change in characteristics of the compartment 24 such as an increase in weight or a user pulling down on the compartment 24 as it is closing would cause control to instantaneously increase the supplied current to maintain the necessary velocity required to ensure that the full motion of the compartment 24 was completed within the designated time.

Figure 51:
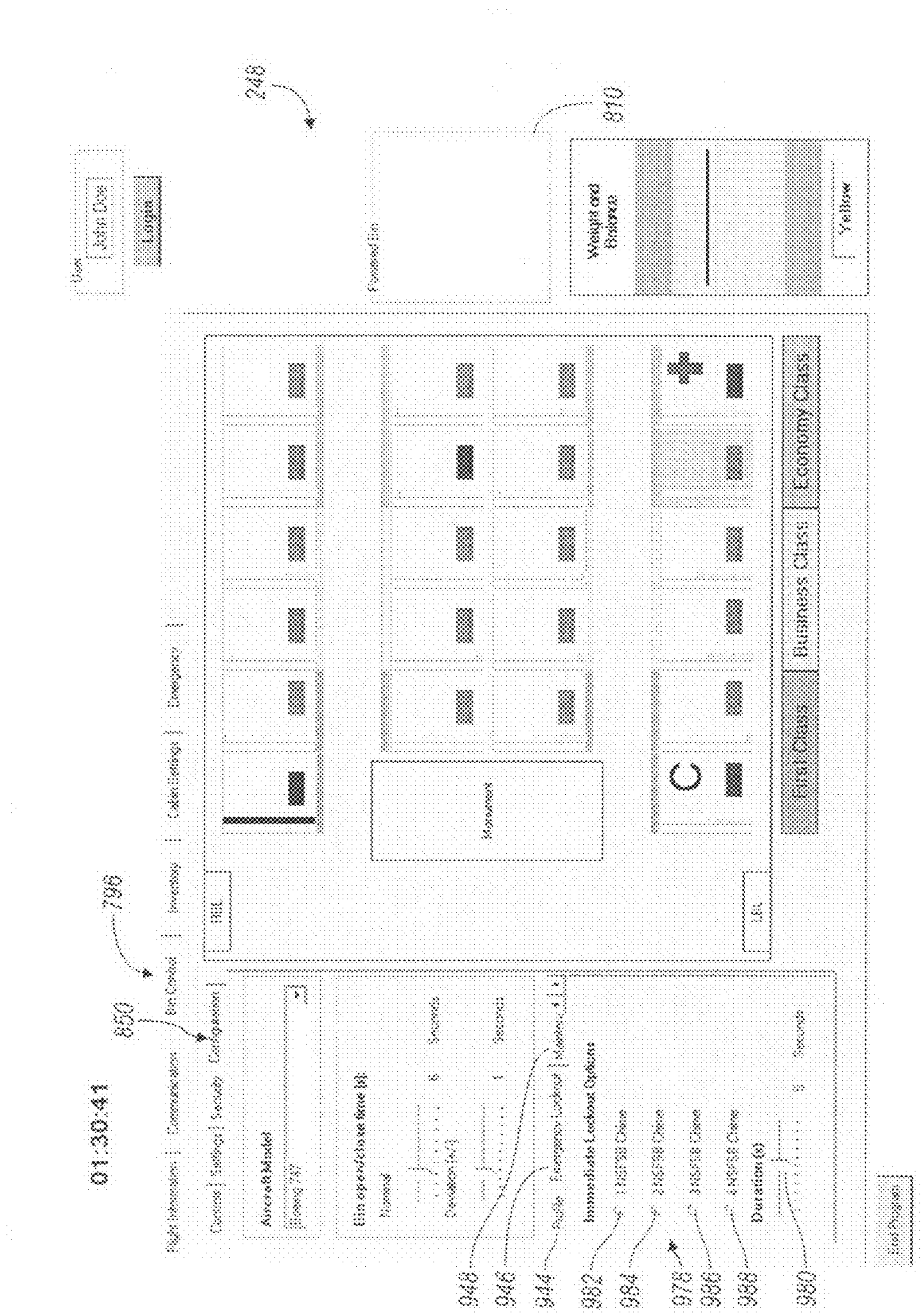
FIG. 51 illustrates a "Bin Control" screen including a seventh "Configuration" screen.

With reference to FIG. 51, the "Emergency Lockout" GUI 946 is illustrated. The "Emergency Lockout" GUI 946 includes a first or "Immediate Lockout Option" selector box 978 and a "Duration" scroll bar 980. The "Immediate Lockout Option" selector box 978 can include a first or "1 Fasten Seatbelt Chime" radio button 982, a second or "2 Fasten Seatbelt Chime" radio button 984, a third or "3 Fasten Seatbelt Chime" radio button 986 and a fourth or "4 Fasten Seatbelt Chime" radio button 988. The numerals (1, 2, 3, 4) of the radio buttons 982, 984, 986, 988 indicate the number of times the warning or Fasten Seatbelt chime has to be activated by user input data 246 from the pilot of the mobile platform 10 to result in an immediate lockout of the compartments 24. As illustrated, with the "2 Fasten Seatbelt Chime" radio button 984 selected, the pilot will need to activate the warning twice to lockout the compartments 24.

Figure 52:
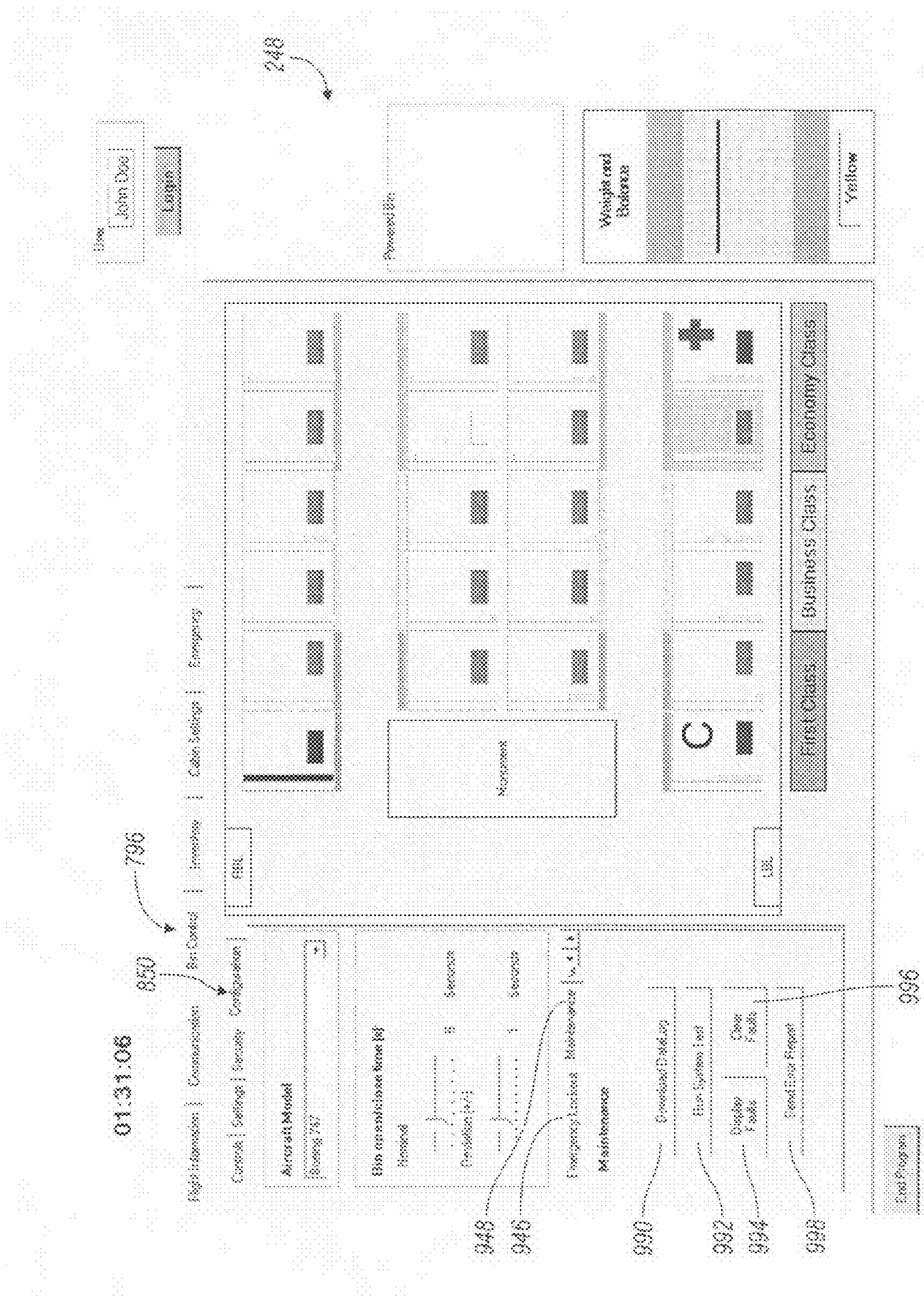
FIG. 52 illustrates a "Bin Control" screen including an eighth "Configuration" screen.

Referring now to FIG. 52, the "Maintenance" GUI 948 is illustrated. The "Maintenance" GUI 948 includes a first or "Download DataLog" button 990, a second or "Run System Test" button 992, a third or "Display Faults" button 994, a fourth or "Clear Faults" button 996 and a fifth or "Send Error Report" button 998. The "Download Data Log" button 990 sends data log information captured during the operation of the compartments 24 to a remote printer (not shown) or file. The compartment control module 204 maintains a data log of all parameters, events, and faults that occur during operation. For example, the following are some of the parameters, events, and faults that are logged and time-stamped: Compartment 24 type, OPEN button 46 pressed, CLOSE button 48 pressed, compartment 24 unlatching, compartment 24 unlatched, compartment 24 opening, compartment 24 fully opened, compartment 24 closing, compartment 24 fully closed, compartment 24 latched, compartment 24 lifted off open sensor 37, motor 126 control current, compartment 24 position, compartment 24 speed, obstruction sensor 36 pressed, motor 126 over current obstruction, compartment 24 obstructed, compartment 24 reversing direction, compartment 24 estimated weight, and LED(s) 52 color(s).

The "Run System Test" button 992 enables the operator to test the compartment control system. When the operator selects the "Run System Test" button 992, the GUI data 232 instructs the compartment control module 204 to run the hardware test and the software test to ensure all sensors and signals are running properly, as discussed herein. Report data from these tests is output to a remote printer (not shown) or file. The "Display Faults" button 994 displays any current fault data 244 from the compartment control module 204. The "Clear Faults" button 996 clears any fault data 244 from the compartment control module 204. The "Send Error Report" button 998 sends the fault data 244 to a remote system (not shown).

Figure 53:
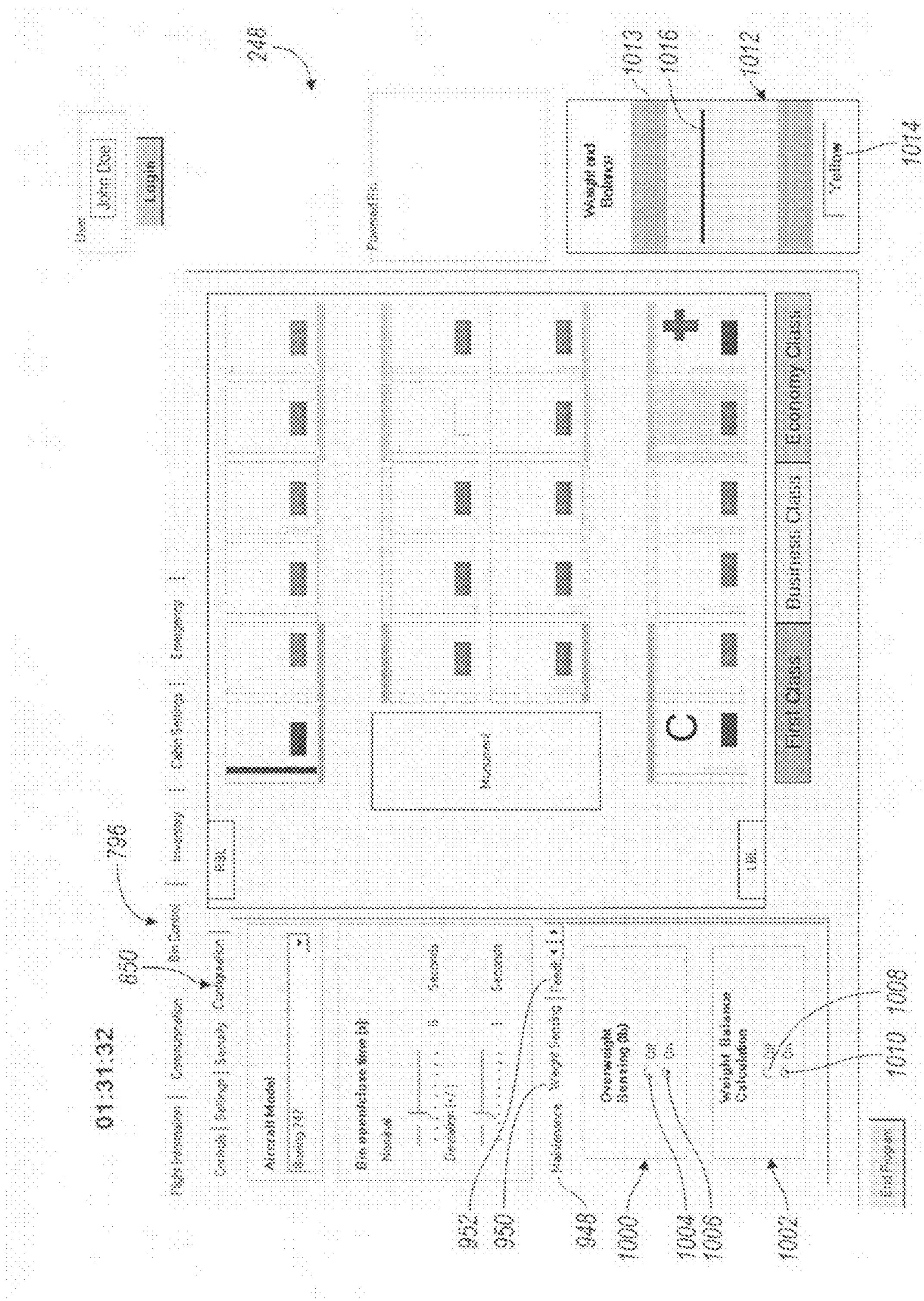
FIG. 53 illustrates a "Bin Control" screen including a ninth "Configuration" screen.

With reference to FIG. 53, the "Weight Sensing" GUI 950 is illustrated. The "Weight Sensing" GUI 950 includes a first or "Overweight Sensing" selector box 1000 and a second or "Weight Balance Calculation" selector box 1002. The "Overweight Sensing" selector box 1000 includes a first or "Off" radio button 1004 and a second or "On" radio button 1006. The radio buttons 1004, 1006 enable the operator to toggle the overweight sensing between on and off.

The "Weight Balance Calculation" selector box 1002 includes a first or "Off" radio button 1008 and a second or "On" radio button 1010. The radio buttons 1008, 1010 enable the operator to toggle the weight balance calculation between on and off. If active, the weight balance calculation generates a display 1012 that indicates whether the weight is distributed evenly over the mobile platform 10. Generally, the weight balance calculation is computed by summing the weight in each side of the compartments 24. The display 1012 includes a color indicator bar 1012, a color text box 1014 and a balance bar 1016. The color indicator bar 1012 can be tri-color to provide an indication of the weight balance and is generally configured to correspond with the display 802 of the mobile platform 10. The color text box 1014 displays the current color associated with the weight balance, such as "Yellow," "Red" or "Green." The bar 1016 indicates the current weight balance. For example, in FIG. 53, the bar 1016 indicates that the right side of the mobile platform 10 is heavier than the left side.

Figure 54:
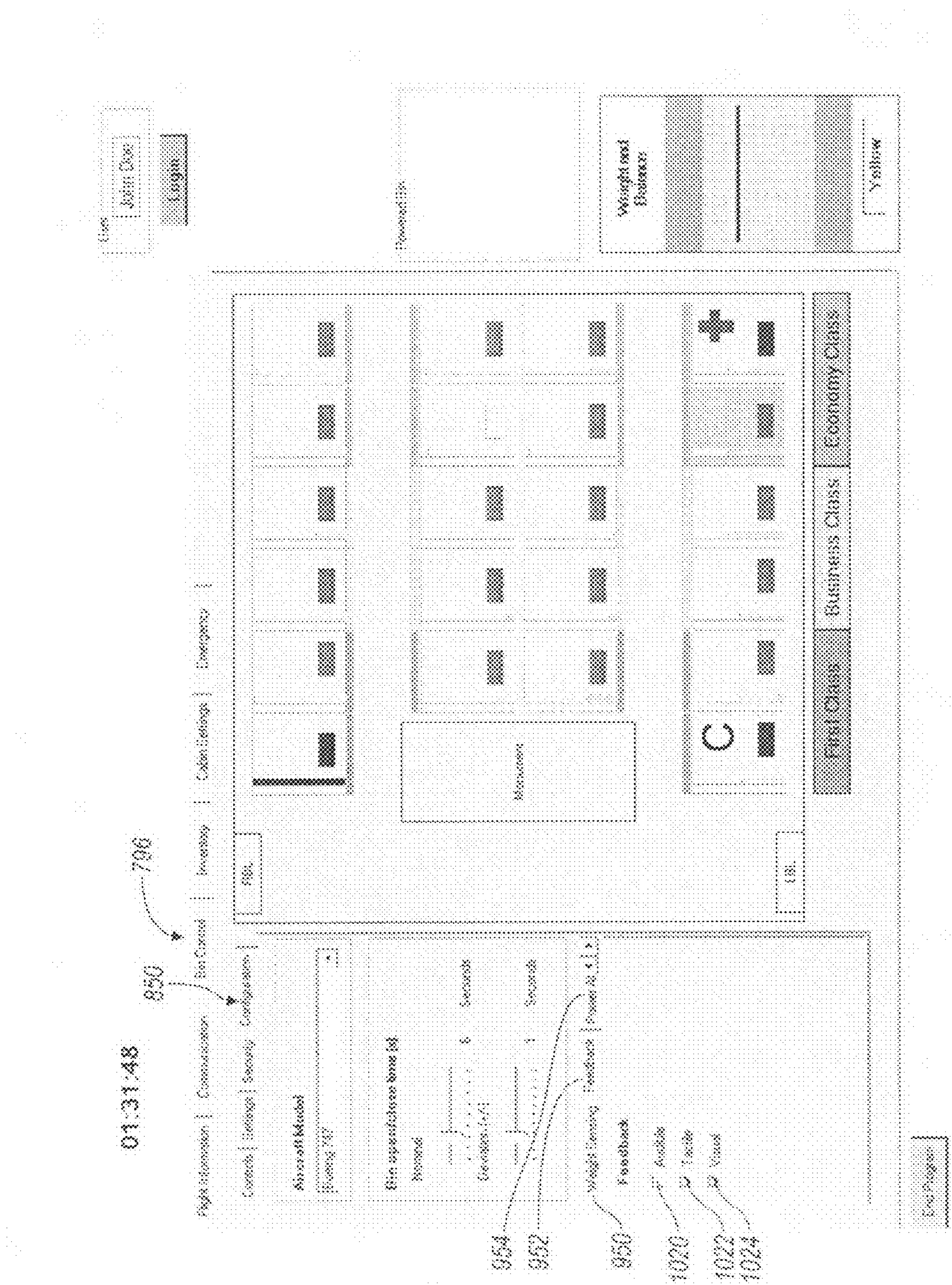
FIG. 54 illustrates a "Bin Control" screen including a tenth "Configuration" screen.

The "Feedback" GUI 952 is illustrated in FIG. 54. The "Feedback" GUI 952 includes a first or "Audible" check box 1020, a second or "Tactile" check box 1022, and a third or "Visual" check box 1024. Any number of the check boxes 1020, 1022, 1024 can be selected by the operator to customize the feedback provided by the system.

Figure 55:
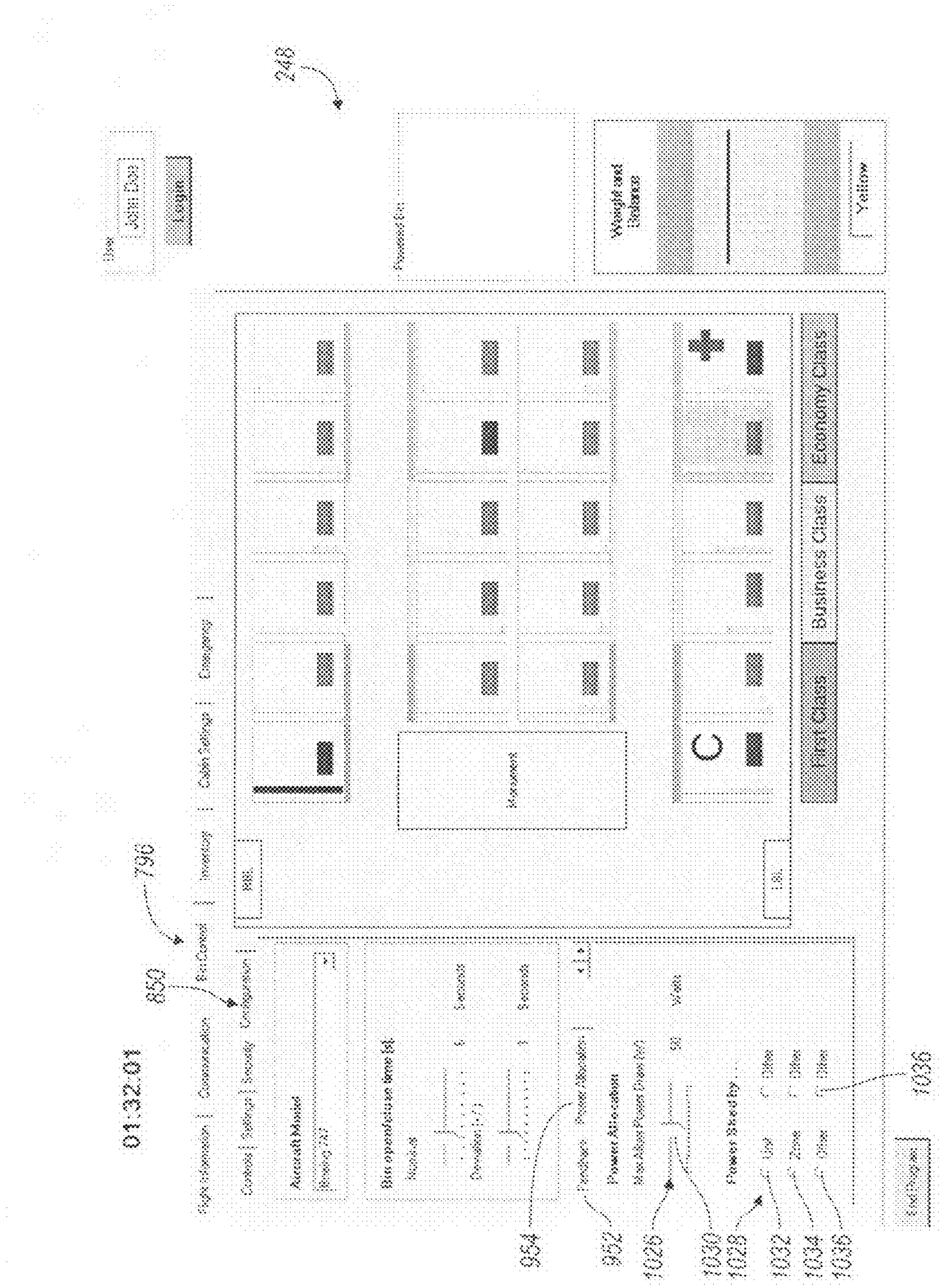
FIG. 55 illustrates a "Bin Control" screen including an eleventh "Configuration" screen.

Referring now to FIG. 55, the "Power Allocation" GUI 954 is illustrated. The "Power Allocation" GUI 954 includes a first or "Power Allocation" selector box 1026 and a second or "Power Shed by . . . " selector box 1028. The "Power Allocation" selector box 1026 includes a scroll bar 1030 to enable the operator to select the maximum instantaneous allowable power draw in watts (W) for the power-assisted compartment system 12.

The "Power Shed by . . . " selector box 1028 enables the operator to determine the manner in which the compartment control system reduces its power consumption, and include a first or "Unit" radio button 1032, a second or "Zone" radio button 1034 and at least one or a plurality of "Other" radio buttons 1036. The "Unit" radio button 1032 instructs the compartment control system to reduce power by allowing only one unit in each zone to open at a time. The "Zone" radio button 1034 instructs the compartment control system to reduce power usage by prioritizing power usage based on the zone of the compartment 24, such as first class, business class and economy class. The "Other" radio buttons 1036 enable custom client power shed mechanisms to be implemented.

Figure 56:
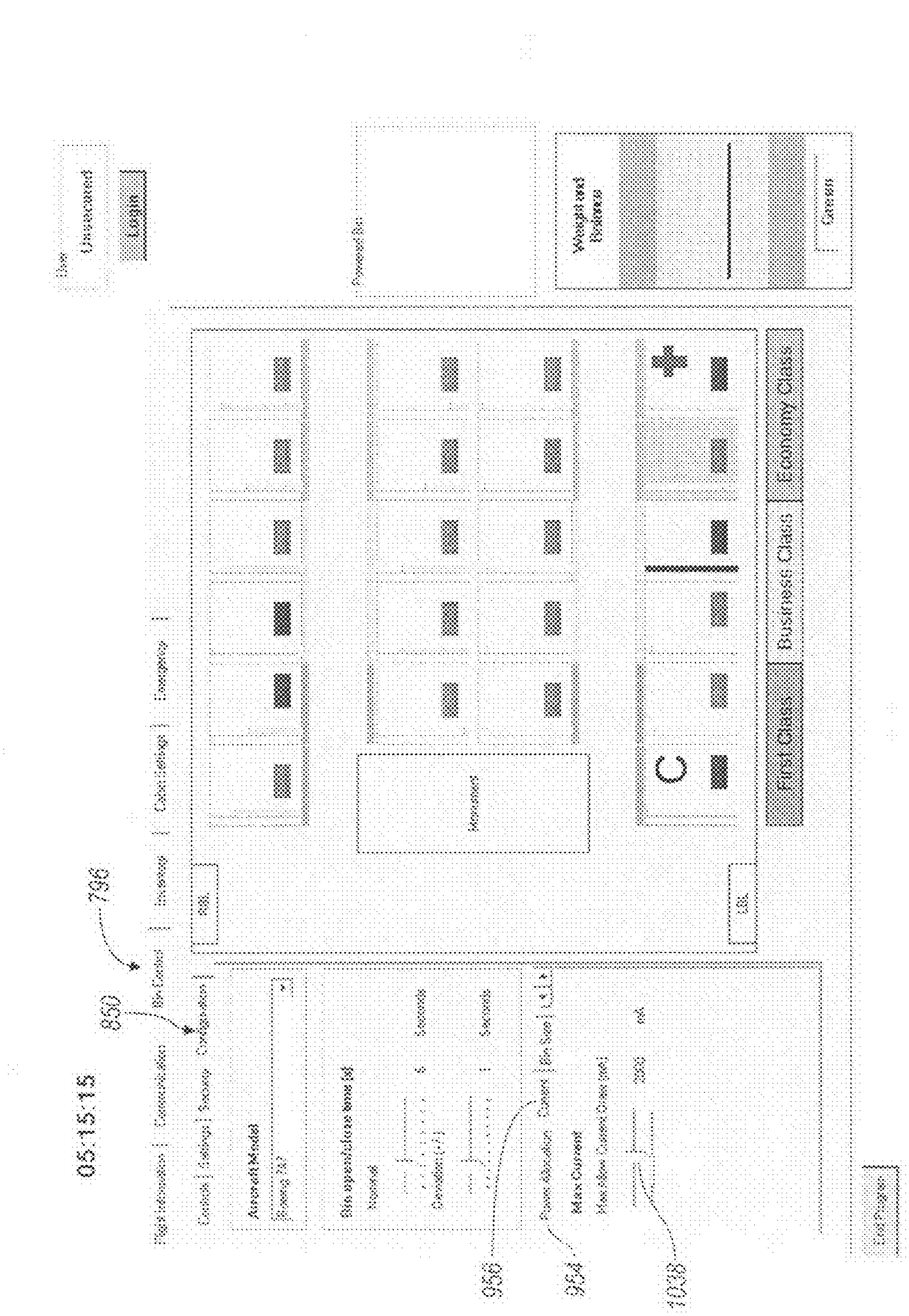
FIG. 56 illustrates a "Bin Control" screen including a twelfth "Configuration" screen.

The "Current" GUI 956 is illustrated in FIG. 56. The "Current" GUI 956 enables the operator to set the maximum allowable current draw in milli-Amperes (mA) with a scroll bar 1038. The "Current" GUI 956 thus also provides another method to control the speed of the motor 126.

Figure 57:
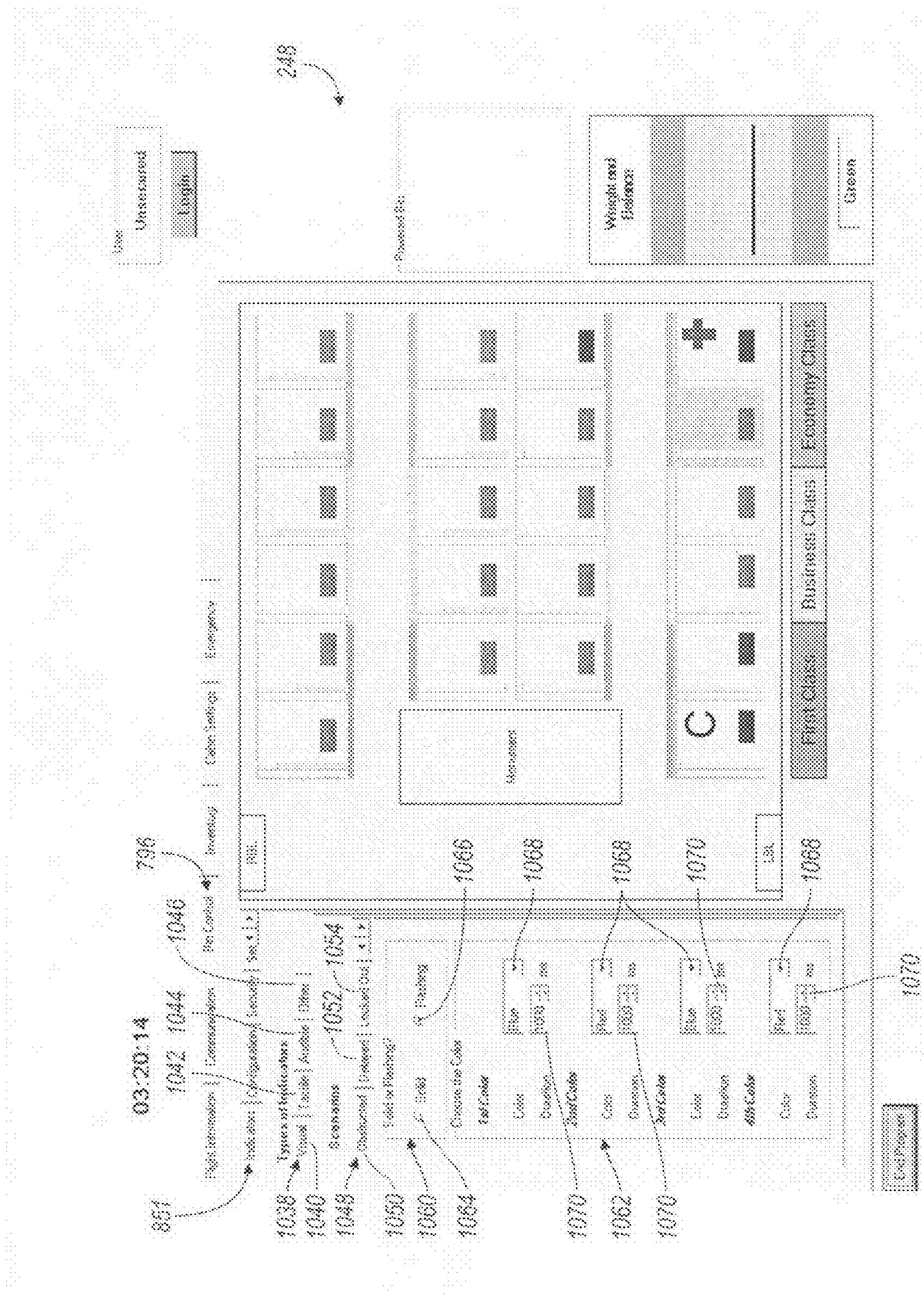
FIG. 57 illustrates a "Bin Control" screen including a first "Indicator" screen.

The sub-menu 804 further includes the "Indicator" GUI 851 as illustrated in FIG. 57. The "Indicator" GUI 851 includes a "Types of Indicators" menu 1038. The "Types of Indicators" menu 1038 includes a "Visual" GUI 1040, a "Tactile" GUI 1042, an "Audible" GUI 1044, and a "Other" GUI 1046. The "Other" GUI 1046 enables the inclusion of client specific indicators on the "Indicator" GUI 851, and will not be discussed in detail herein. Each of the GUIs 1040, 1042, 1044, 1046 include a menu 1048 to enable the selection of GUIs comprising scenarios specific to the particular indicator. For example, each of the "Visual" GUI 1040 and "Audible" GUI 1044 include an "Obstructed" GUI 1050, a "Delayed" GUI 1052, a "Locked Out" GUI 1054, an "In Motion" GUI 1056 and an "Overweight" GUI (not shown) to enable the operator to specify the look or sound associated with those compartment 24 characteristics.

With continued reference to FIG. 57, the "Obstructed" GUI 1050 for the "Visual" GUI 1040 includes a first or "Solid or Flashing?" selector box 1060 and a second or "Chose the Color" selector box 1062. The "Solid or Flashing?" selector box 1060 includes a first or "Solid" radio button 1064 and a second or "Flashing" radio button 1066 to enable the operator to select the output from the LEDs 52 of the indicator surface 50. If the operator selects the "Flashing" radio button 1066, the "Chose the Color" selector box 1062 includes a plurality of color drop-down menus 1068 and a plurality of duration selectors 1069. The color drop-down menus 1068 enable the operator to select the desired output color and output sequence associated with the particular scenario, and if the output is selected as flashing, the duration of the interval between flashes in milliseconds (ms) can be set. For example, as shown in FIG. 57, the visual output for an obstructed compartment 24 is blue (LED 56*b*), no light, red (LED 56*a*), no light, blue (LED 56*b*), no light, red (LED 56*a*) flashing at 1000 ms intervals.

Figure 58:
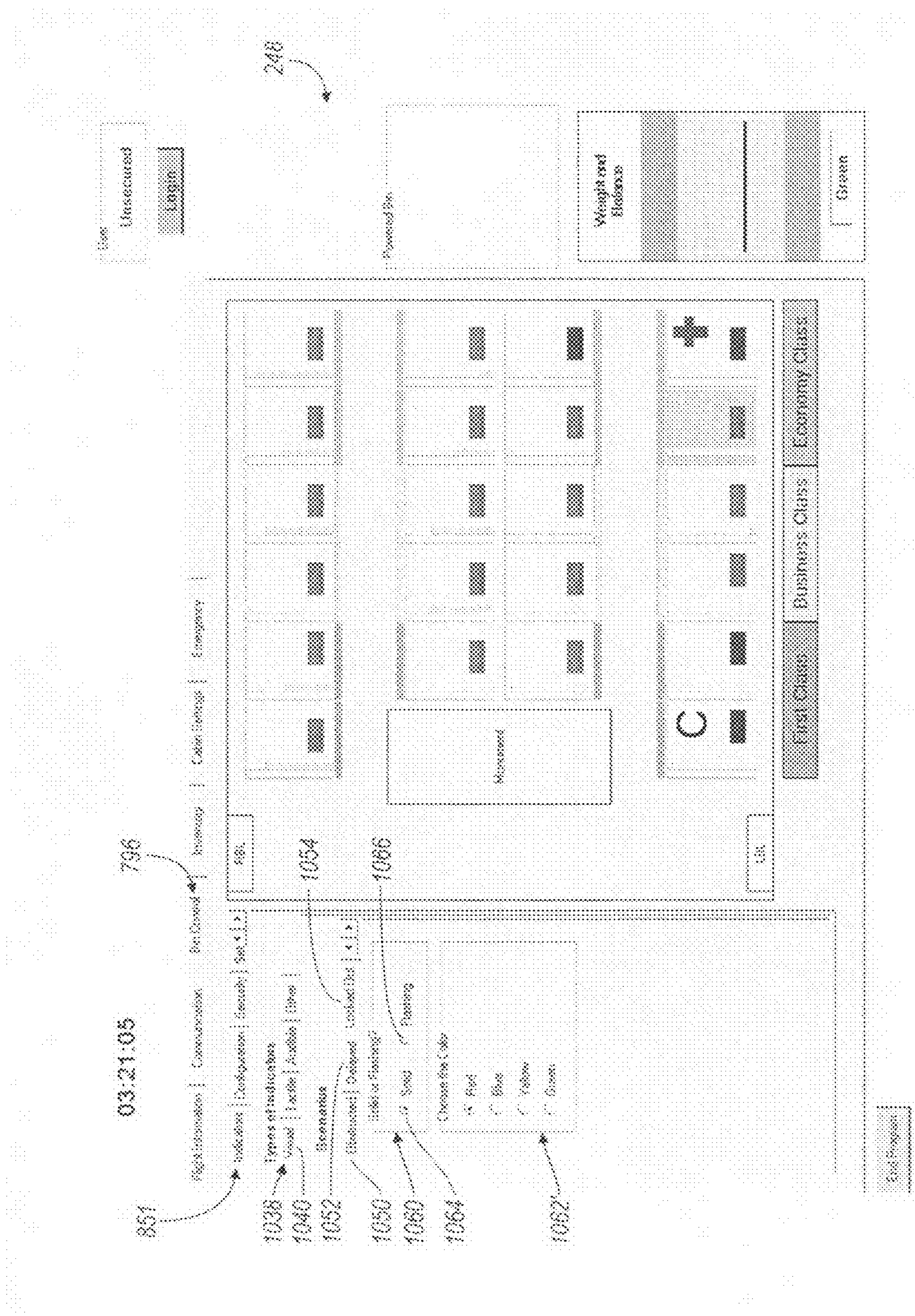
FIG. 58 illustrates a "Bin Control" screen including a second "Indicator" screen.

A further example is illustrated with reference to FIG. 58. In FIG. 58, the "Locked Out" GUI 1054 for the "Visual" GUI 1040 includes the "Solid or Flashing?" selector box 1060, and a "Chose the Color" selector box 1062'. The "Chose the Color" selector box 1062' lists a plurality of available colors for the LEDs 52, which can be selected by the operator to visually indicate that the compartment 24 is locked out. For example, as shown in FIG. 58, if the compartment 24 is locked out, the red LED 56*a* will be illuminated.

Figure 59:
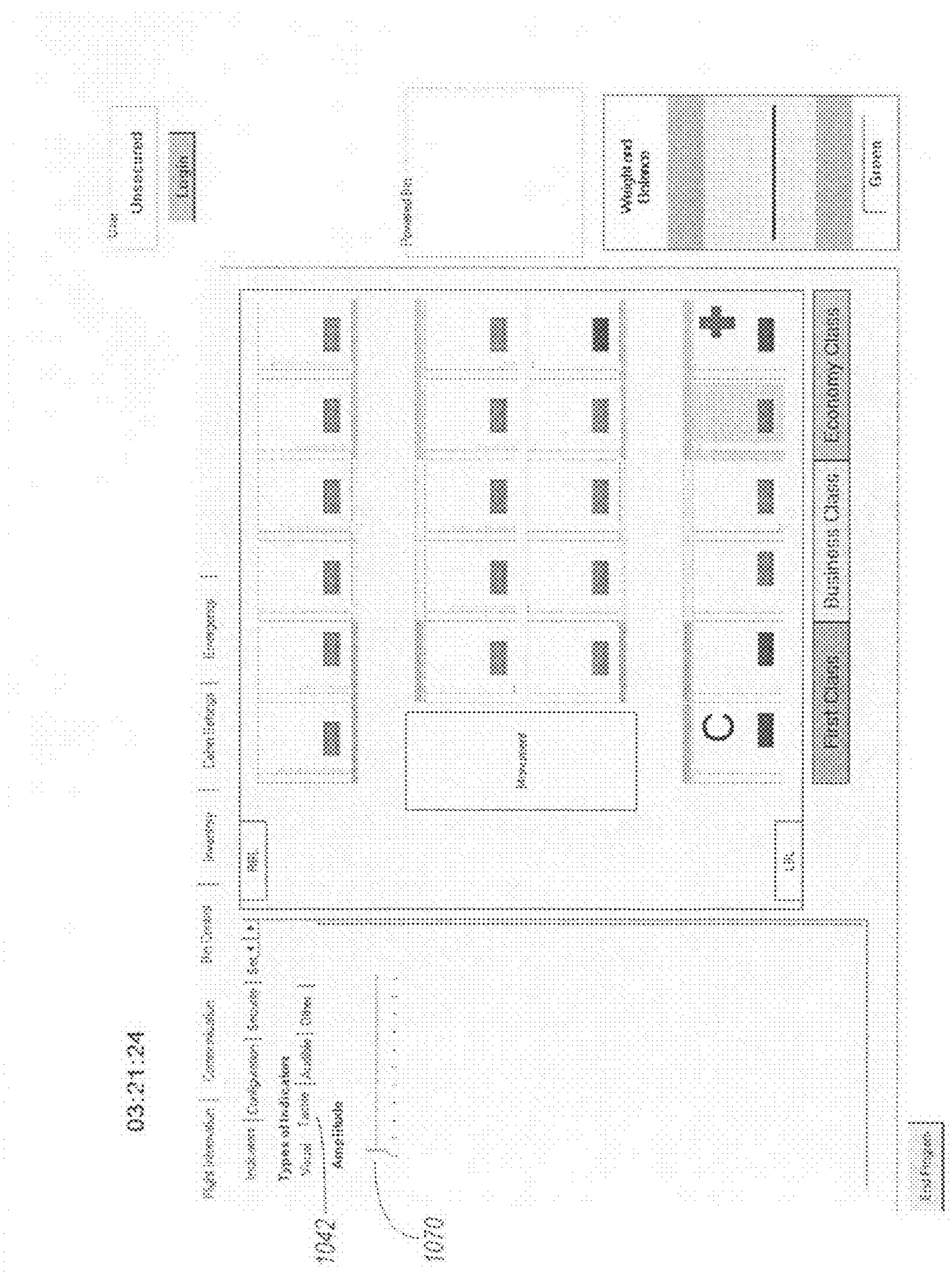
FIG. 59 illustrates a "Bin Control" screen including a third "Indicator" screen.

With reference to FIG. 59, an example of the "Tactile" GUI 1042 is shown. The "Tactile" GUI 1042 includes a scroll bar 1070 to enable the operator to set the amplitude associated with the tactile feedback. The tactile feedback is associated with the switch system 40 and the amplitude of mechanical feedback produced when the user interacts with the OPEN and CLOSE buttons 46, 48 of the switch system 40.

Figure 60:
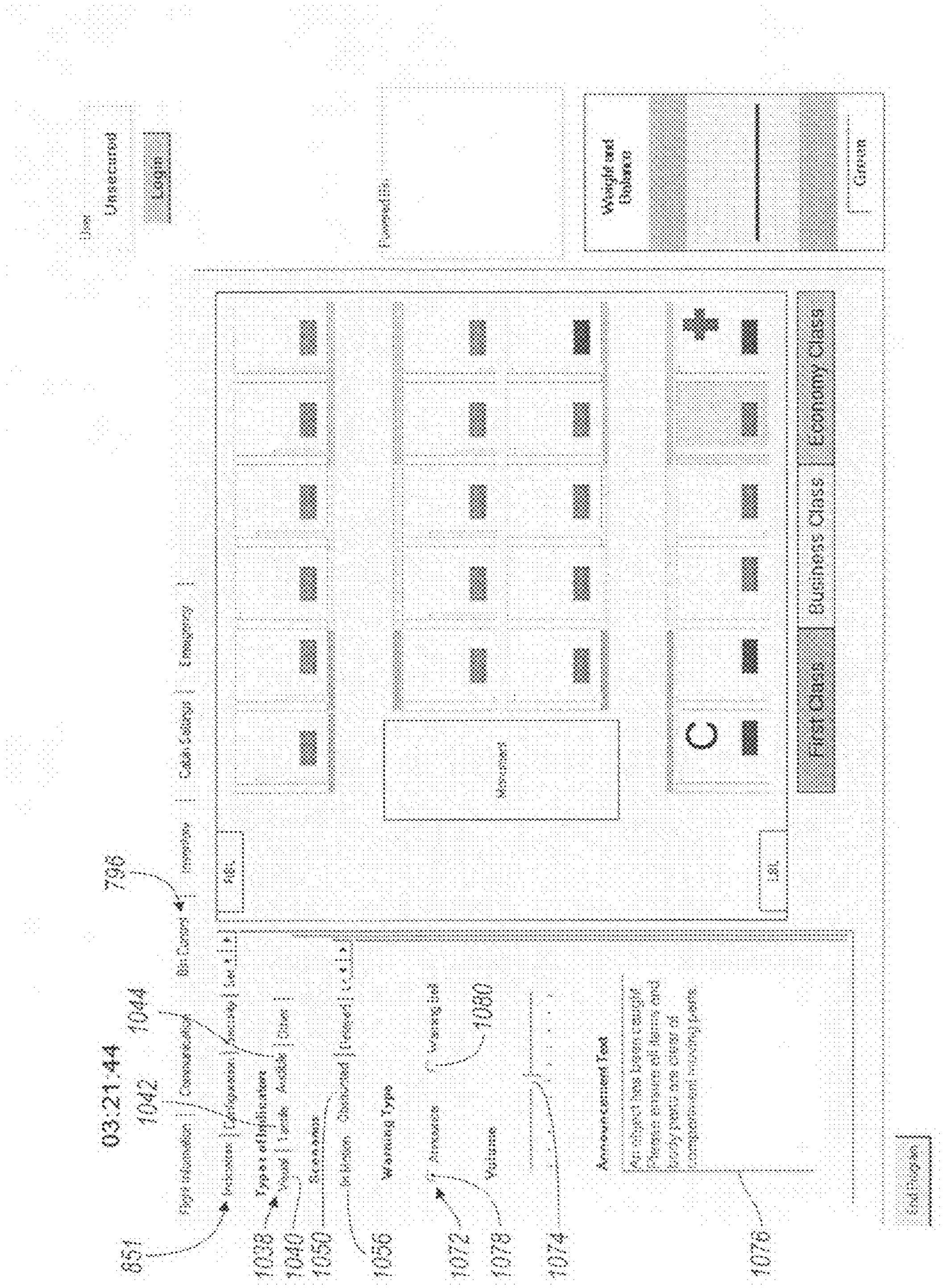
FIG. 60 illustrates a "Bin Control" screen including a fourth "Indicator" screen.

With reference to FIG. 60, an example of the "Obstructed" GUI 1050 of the "Audible" GUI 1044 is shown. The "Obstructed" GUI 1050 of the "Audible" GUI 1044 includes a "Warning Type" selector box 1072. The "Warning Type" selector box 1072 includes a first or "Announce" radio button 1078 and a second "Warning Bell" radio button 1080. The "Warning Bell" radio button 1080, if selected, sounds a warning bell. The "Announce" radio button 1078, if selected, sounds a message. If the "Announce" radio button 1078 is selected, then the "Obstructed" GUI 1050 of the "Audible" GUI 1044 includes a "Volume" scroll bar 1074 and a "Announcement Text" text box 1076. The "Volume" scroll bar 1074 enables the operator to select the volume for the announced message, and the "Announcement Text" text box 1076 enables the operator to enter the desired message for announcement.

With reference to FIG. 38, the top display 808 of the "Bin Control" GUI 796 includes a clock 1082, a warning display 1084 and a user identification box 1086. The clock 1082 displays the current time. The warning display 1084 displays a notification that indicates the warning is active 1085 and the warning timer 1087. The notification can include text such as "No Smoking Fasten Seatbelt" as shown, or could include a symbol. The user identification box 1086 displays the name of the logged in user. For example, in FIG. 45, the logged in user's identification is "John Doe".

The "Bin Control" GUI 796 also includes the end program button 809 and the indicator box 810, as shown in FIG. 38. The end program button 809 terminates the program. The indicator box 810 displays the current real-time location of the selected compartment 24 between the opened and closed positions.

Figure 61:
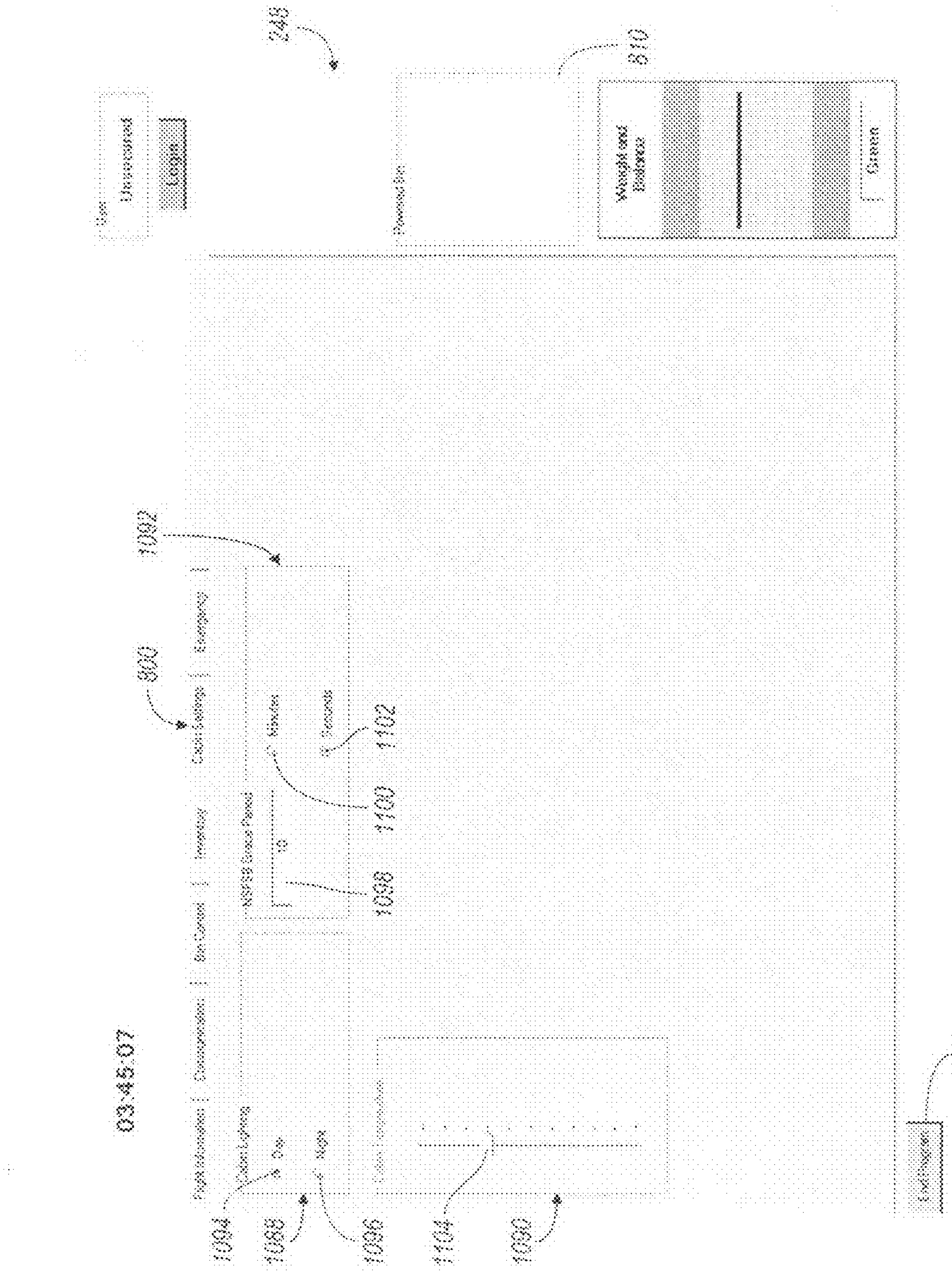
FIG. 61 illustrates a "Cabin Settings" screen.

With reference to FIG. 61, the "Cabin Settings" GUI 800 of the GUI information 248 is illustrated. The "Cabin Settings" GUI 800 is an example of other features that can be controlled by the compartment control software. The "Cabin Settings"

GUI 800 includes a first or "Cabin Lighting" selector box 1088, a second or "Cabin Temperature" selector box 1090 and a "Fasten Seatbelt Grace Period" selector box 1092. The "Cabin Lighting" selector box 1088 includes a first or "Day" radio button 1094 and a second or "Night" radio button 1096. These radio buttons 1094, 1096 control the brightness of the lights in the cabin 14 of the mobile platform 10, according to the respective day or night conditions. The "Fasten Seatbelt Grace Period" selector box 1092 includes a text box 1098, a first or "Minutes" radio button 1100 and a second or "Seconds" radio button 1102. The text box 1098 enables the operator to input the desired delay, and then select the desired unit for the delay in seconds or minutes via the radio buttons 1100, 1102. This delay represents the amount of time, or grace period, after the crew turns on the warning signal before compartments 24 are locked down for safety reasons. The "Cabin Temperature" selector box 1090 includes a scroll bar 1104 to enable the operator to adjust the temperature of the cabin 14 of the mobile platform 10.

Figure 62:
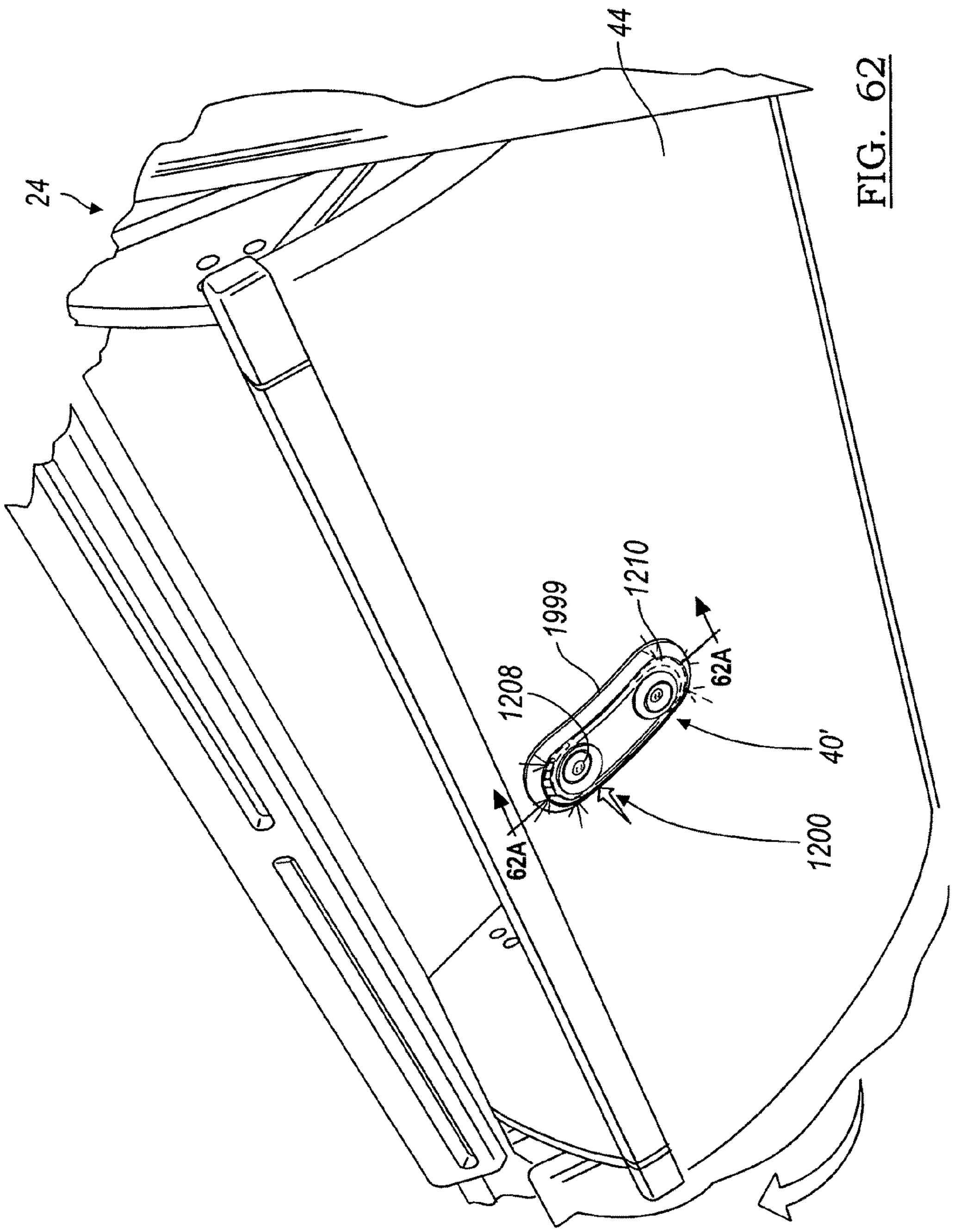
FIG. 62 is a perspective front view of a power-assisted stowage compartment including an electronic indicative switch in accordance with one embodiment of the present disclosure.
Figure 63:
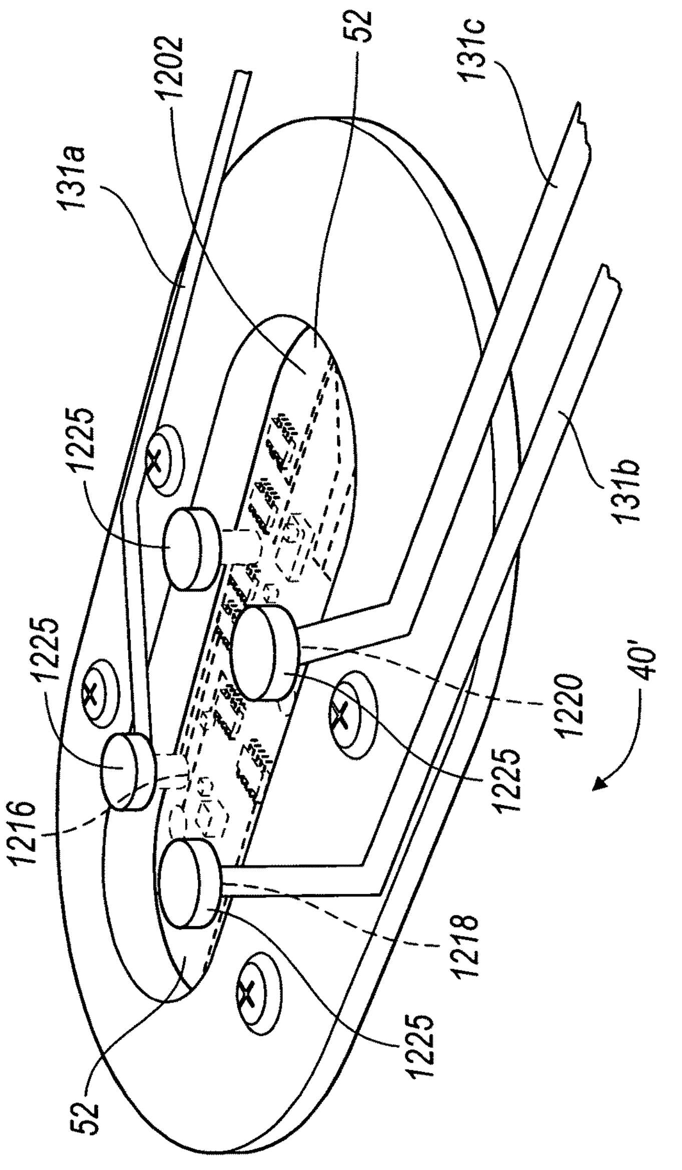
FIG. 63 is a perspective view of a rear surface of the electronic indicative switch of FIG. 62.
Figure 63A:
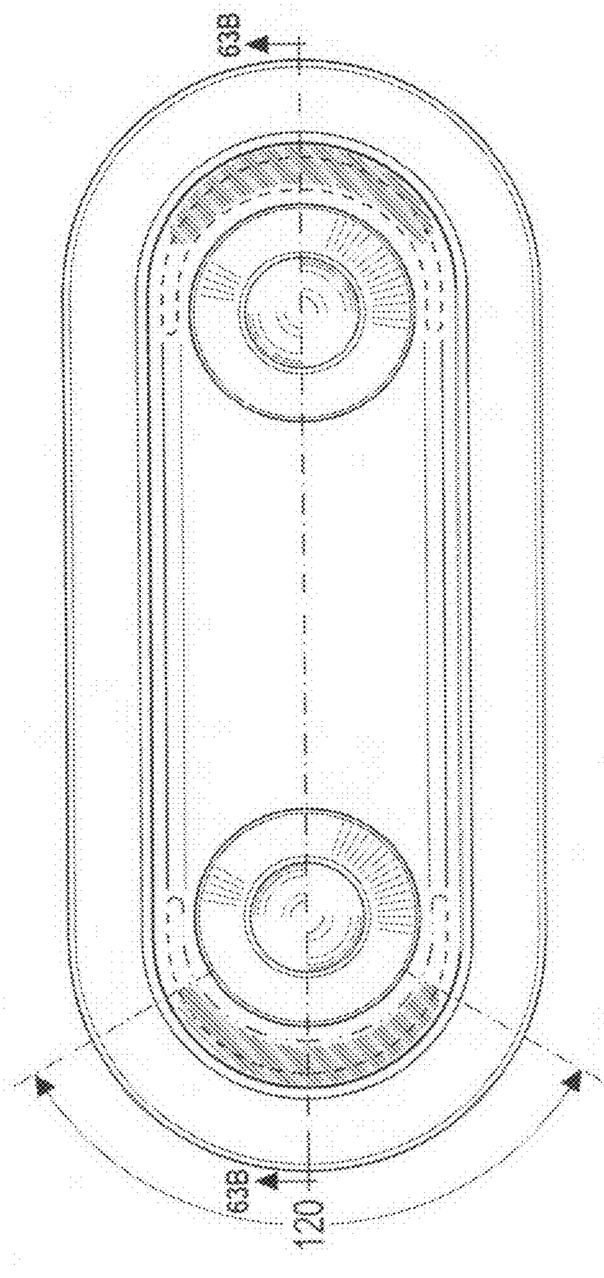
FIG. 63A is a front view of the electronic indicative switch of FIG. 62 illustrating an illumination of the electronic indicative switch according to the present disclosure.

With reference now to FIGS. 62 and 63, an alternative switch system 40' is shown. The switch system 40' can be mounted to the front surface 44 of the compartment 24, and can be sized such that the switch system 40' is retained entirely within the material thickness of the compartment 24 and thus, not visible from the interior surface 110 of the compartment 24 (not specifically shown). The switch system 40' can also be mounted with or without a bezel 1999. The switch system 40' includes an indicator surface 1200 disposed over and in communication with a control system or printed circuit board (PCB) 1202. The indicator surface 1200 displays indicator data 236 received by the PCB 1202, as will be discussed herein.

Figure 64:
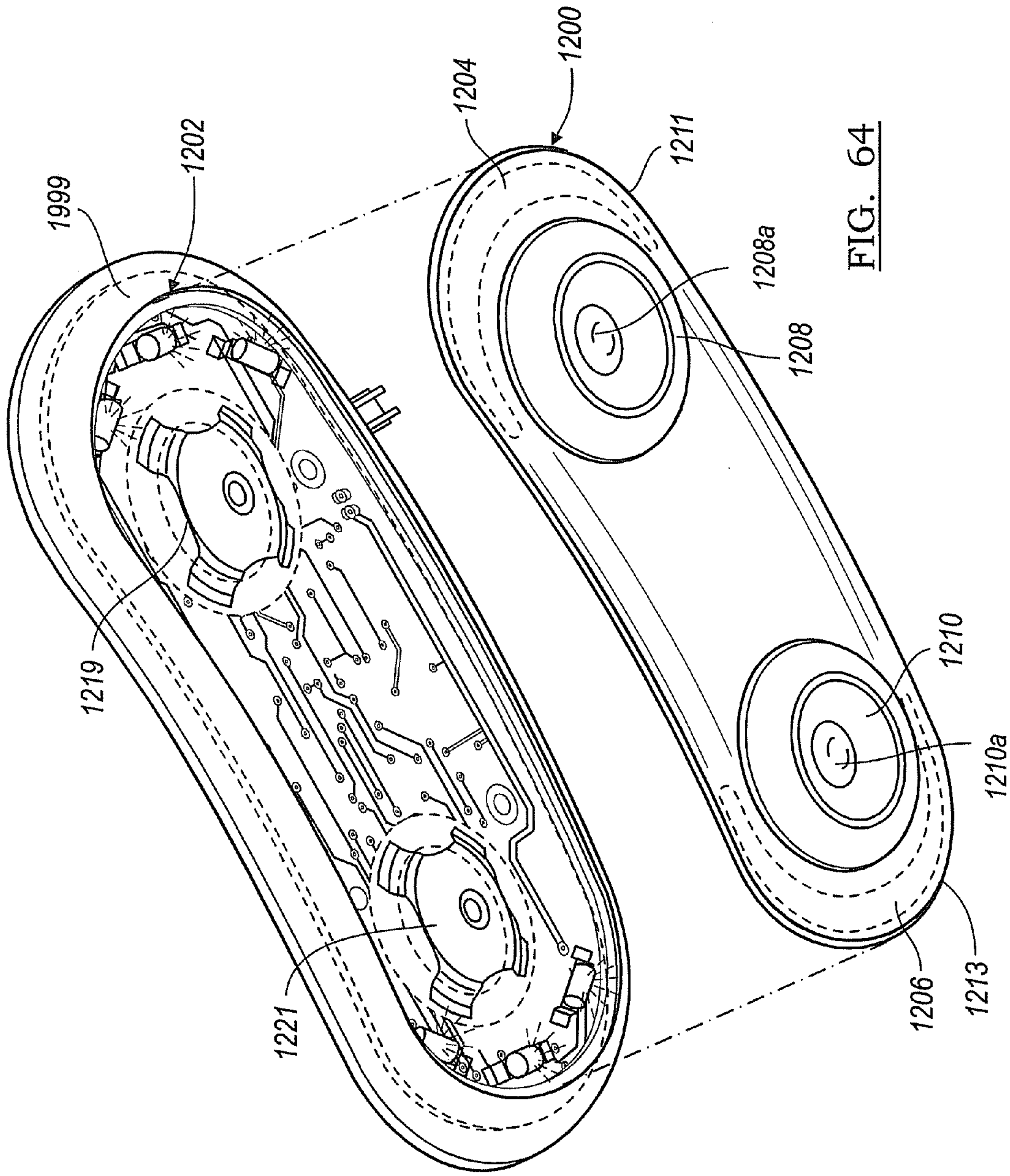
FIG. 64 is a partially exploded view of the electronic indicative switch of FIG. 62.
Figure 64A:
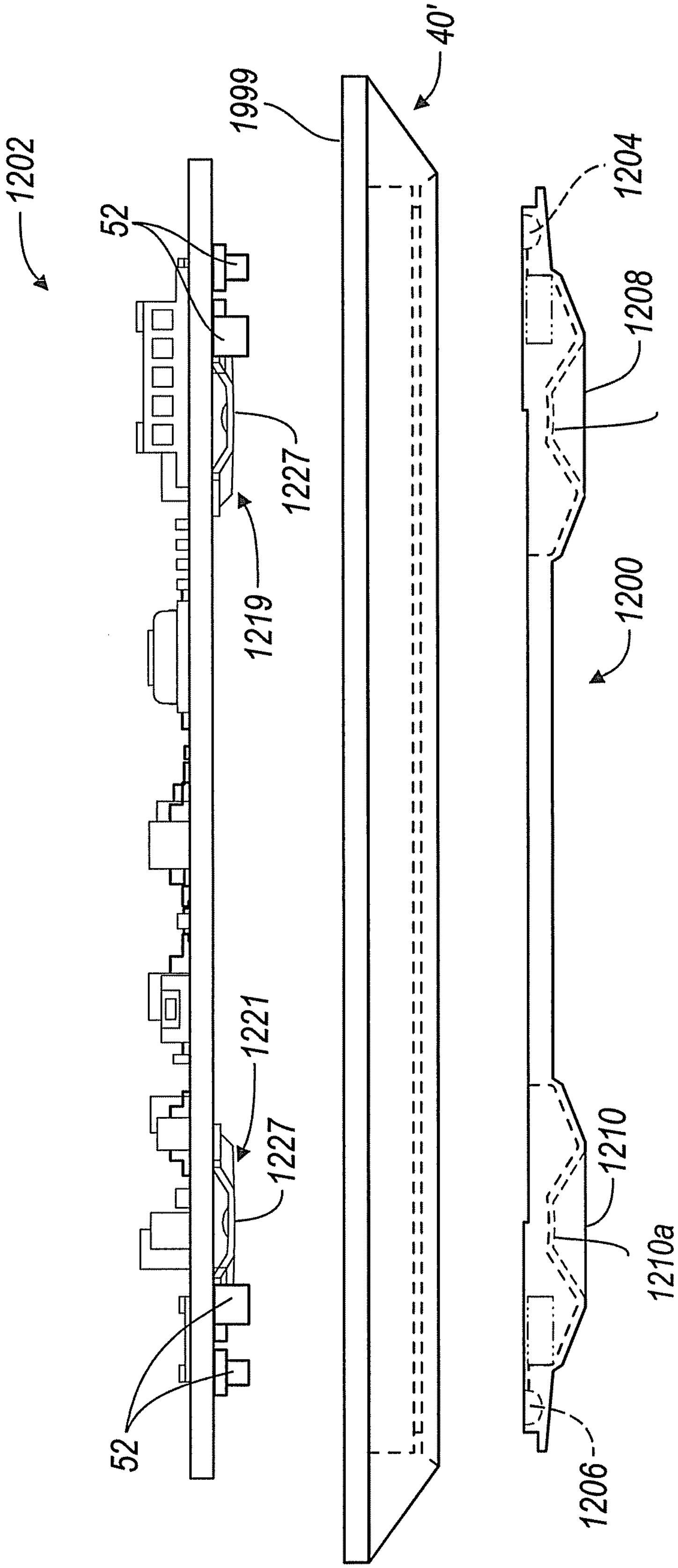
FIG. 64A is a fully exploded view of the electronic indicative switch of FIG. 62.
Figure 65:
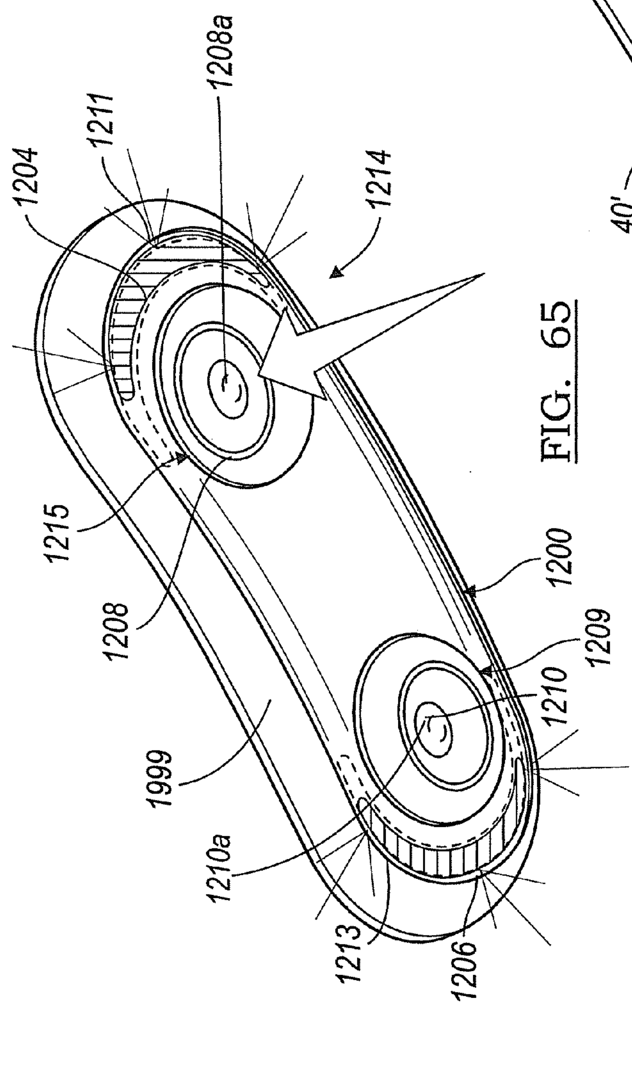
FIG. 65 is a detailed perspective view of the electronic indicative switch of FIG. 62 in a first illuminated state.
Figure 66:
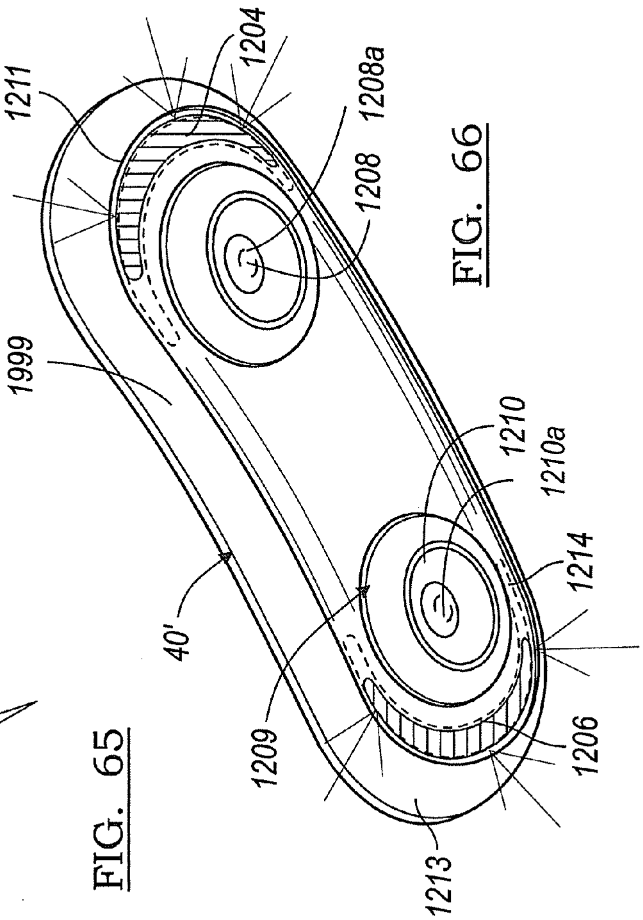
FIG. 66 is a detailed perspective view of the electronic indicative switch of FIG. 62 in a second illuminated state.

With additional reference to FIGS. 64, 65 and 66, the indicator surface 1200 includes a first indicator panel 1204, a second indicator panel 1206, a first user input device 1208 and a second user input device 1210. The first indicator panel 1204 and first user input device 1208 are each disposed at a first end 1211 of the indicator surface 1200, while the second indicator panel 1206 and second user input device 1210 are each disposed at a second end 1213 of the indicator surface 1200. The indicator surface 1200 is elliptical in shape, however, any other shape could be employed. The indicator surface 1200 is illustrated as an integral assembly, but the first and second user input devices 1208, 1210 could be formed separately and coupled to the indicator surface 1200. Preferably, the indicator surface 1200 is formed of a polymeric material, such as a silicon-based polymeric material, which is coupled to the PCB 1202. The indicator surface 1200 can be coupled to the PCB 1202 with an adhesive, such as a silicon-based cement, and includes an edge configured to engage an outer edge of the PCB 1202 to further assist in coupling the indicator surface 1200 to the PCB 1202. It should be noted that although the indicator surface 1200 is described herein as being comprised of first and second indicator panels 1204, 1206, and first and second user input devices 1208, 1210, any number of indicator panels and user input devices could be employed. In addition, the layout of the first and second indicator panels 1204, 1206 and a first and second user input devices 1208, 1210 described herein is for illustration purposes only, and is not intended to limit the scope of the present disclosure.

The first and second indicator panels 1204, 1206 are each generally contoured to match the shape of the first end 1211, and second end 1213, of the indicator surface 1200, and thus, are U-shaped. The first and second indicator panels 1204, 1206 are substantially translucent, such that light energy from specific, light generating components of the PCB 1202 are able to pass through and illuminate the first and second indicator panels 1204, 1206, as will be described herein. Preferably, the first and second indicator panels 1204, 1206 are configured such that light energy is emitted in an arcute area surrounding the first and second user input devices 1208, 1210, and covers an area of approximately 120 degrees, however, any shape or configuration could be employed, as shown in FIG. 63. The first user input device 1208 is disposed adjacent to the first indicator panel 1204 at the respective first end 1211, and the second user input device 1210 is located adjacent to the second indicator panel 1206 at the second end 1213 of the indicator surface 1200.

The first and second user input devices 1208, 1210 are preferably integrally formed with the first and second indicator panels 1204, 1206, but are slightly raised from the indicator surface 1200 such that an operator can locate the first and second user input devices 1208, 1210 by feel. Furthermore, the first user input device 1208 includes a recessed central portion **1208*a* while the second user input device 1210 includes a recessed central portion 1210*a*. The recessed central portions 1208*a*,1210*a* further help to guide a fingertip of a user to a precise spot by which the input device (1208 or 1210) can be actuated. This makes it especially easy for a person with limited arm or eye/hand coordination, seated in a seat underneath the switch system 40', to reach overhead and quickly orientate his/her fingertip at precisely the right spot. In effect, the raised configuration of the first and second user input devices 1208,1210 help the user to quickly locate the user input devices, while the recessed central portions 1208*a* and 1210*a* help to guide the user's fingertip to the precise location where the user input devices 1208 and 1210 can be actuated most easily. These features may also help the user to locate the user input devices 1208 and 1210 in the event there is limited visibility in the aircraft cabin, such as when the lighting in the cabin is very low. The above-described features also make it easier for a user to actuate the first and second input devices 1208 and 1210 while the aircraft or the switch system 40' is moving relative to the passenger's seat, for example, when the aircraft is experiencing turbulence. It should be noted, however, that the first and second user input devices 1208, 1210 could be discrete switch contacts, for example, that could be coupled individually to the indicator surface 1200. The first and second user input devices 1208, 1210 are movable from a first, raised (un-depressed) state 1209 to a second, depressed state 1215 by an operator (FIGS. 62, 65**).

Depressing the first and second user input devices 1208, 1210 changes a switch state of the device to generate a respective operational command signal. For example, depressing the first user input device 1208 enables a user to send an operational signal that the compartment 24 is to be moved into the closed position, while the second user input device 1210 can be used to allow the user to command the compartment 24 be moved into the opened position. Thus, depressing either of the first and second user input devices 1208, 1210 will send a corresponding operational signal to the PCB 1202 that a request has been made by the user to move the compartment 24 into the opened or closed position. Thus, in effect, the first user input device 1208 is equivalent to the CLOSE button 48, and the second user input device 1210 is equivalent to the OPEN button 46 (FIG. 4). In addition, as discussed, the first and second user input devices 1208, 1210 can also enable a user to input the predetermined crew code for access to restricted compartments 24.

When depressed, the first and second user input devices 1208, 1210 provide a tactile and an audible signal to the operator, such as a "click" or "pop," due to the material used to form the first and second user input devices 1208, 1210. Further, the material used to form the first and second user input devices 1208, 1210 is preferably of the type that will enable the first and second user input devices 1208, 1210 to remain in the depressed state 1215 for the duration of a depression by the user. In addition, when one of the user input devices 1208 or 1210 is depressed, additional light energy from a corresponding light generating component on the PCB 1202 passes through its associated indicator panel 1204 or 1206 to form an additional visual indicator that the selected user input device 1208 or 1210 has been depressed. Generally, the intensity of the light energy provided by the control PCB 1202 is increased by the PCB 1202 to provide a brighter visual indicator that either one of the first and second user input devices 1208 or 1210 has been depressed.

The first and second user input devices 1208, 1210 are generally configured to be opaque when they are in the first, raised (i.e., un-engaged) state 1209, such that no tangible light energy from the PCB 1202 can pass therethrough. But when placed in the depressed state 1215, the combination of the additional light energy from the PCB 1202 used to illuminate the first indicator panel 1204, and the depressed first user input device 1208, in this embodiment, forms an arrow (pointing upwardly to the right in FIG. 65, as indicated by reference numeral 1214). Conversely, the light that illuminates the second indicator panel 1206 and the second user input device 1210, when second user input device 1210 is depressed, forms an arrow pointing in the opposite direction. When the switch system 40' is mounted on the front surface 44 of the compartment 24, panel 1204 and input device 1208 cooperatively can form an upwardly pointing arrow, while input device 1210 and panel 1206 can form a downwardly pointing arrow.

With reference to FIGS. 62A-70 the PCB 1202 is shown in greater detail. The PCB 1202 includes the circuitry required to operate the switch system 40' and to enable the display of indicator data based on the local and remote inputs, as will be discussed herein. Referring specifically to FIGS. 68A and 68B, the PCB 1202 includes a first side 1215 and a second side 1217. The first side 1215 includes a first or CLOSE switch contact 1219, a second or OPEN switch contact 1221, and at least one, but more preferably a plurality, of light sources or LEDs 52. The second side 1217 includes a first or positive polarity connection 1216, a second or ground connection 1218, and a third or sensor connection 1220. The positive polarity connection 1216, ground connection 1218 and sensor connection 1220 are electrically coupled to the PCB 1202 via conductive pins (e.g., standoffs) 1223 (FIG. 63) that transfer power and/or data signals between the second side 1217 of the PCB 1202 and the respective connection 1216, 1218, 1220 (FIG. 63). Nonconductive covers 1225 are placed over the conductive pins 1223 to prevent a user from contacting the conductive pins 1223.

Figure 62A:
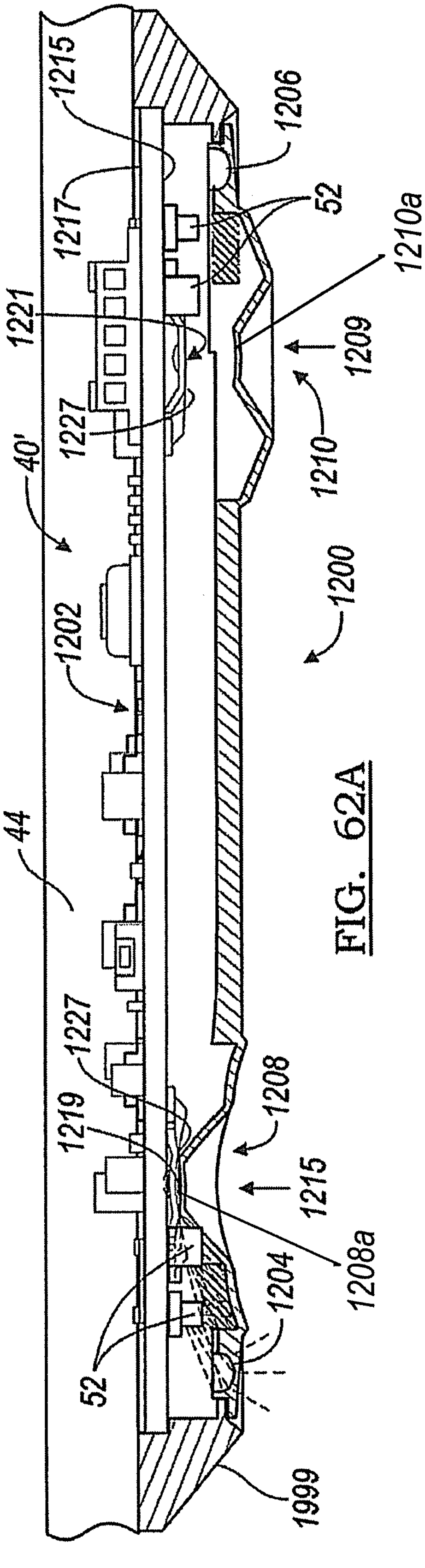
FIG. 62A is a cross-sectional view of the electronic indicative switch of FIG. 62 taken along line 62A-62A of FIG. 62.

Referring to FIG. 64, generally, the indicator surface 1200 is coupled to the first surface 1209 of the PCB 1202 such that the first user input device 1208 is disposed over the CLOSE switch 1219 and the second user input device 1210 is disposed over the OPEN switch 1221. The OPEN and CLOSE switches 1219, 1221 can be any suitable switch, and preferably are configured with a raised portion 1227 that, when depressed, completes a switch contact circuit, as is generally known, as best shown in FIG. 62A. A suitable switch is available from GM Nameplate of Seattle, Wash.

Figure 63B:
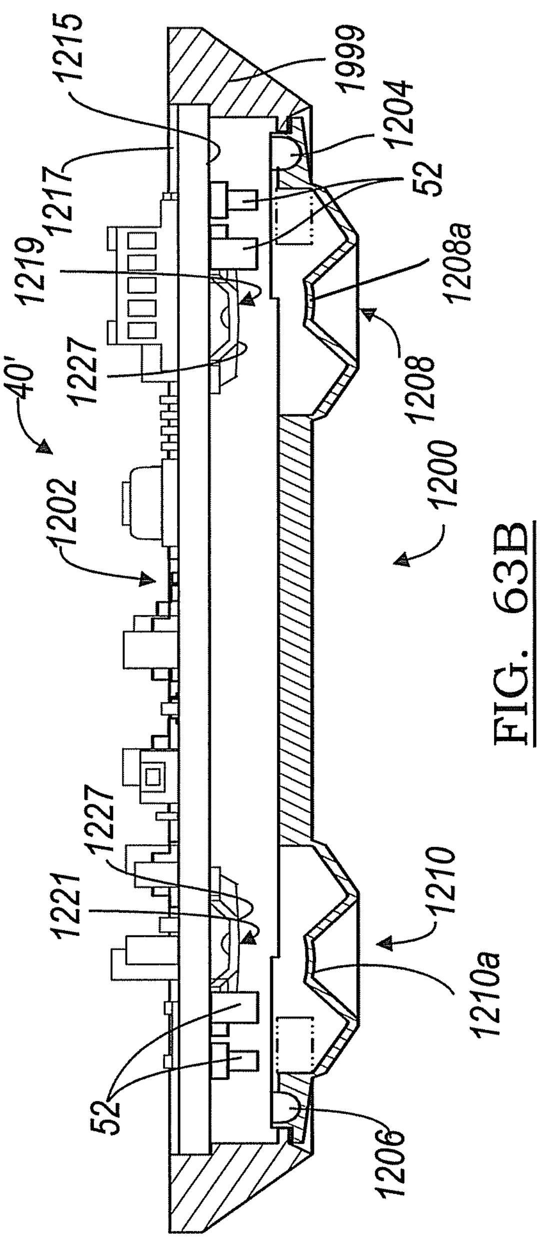
FIG. 63B is a cross-sectional view of the electronic indicative switch of FIG. 63A taken along line 63B-63B of FIG. 63A.
Figure 67:
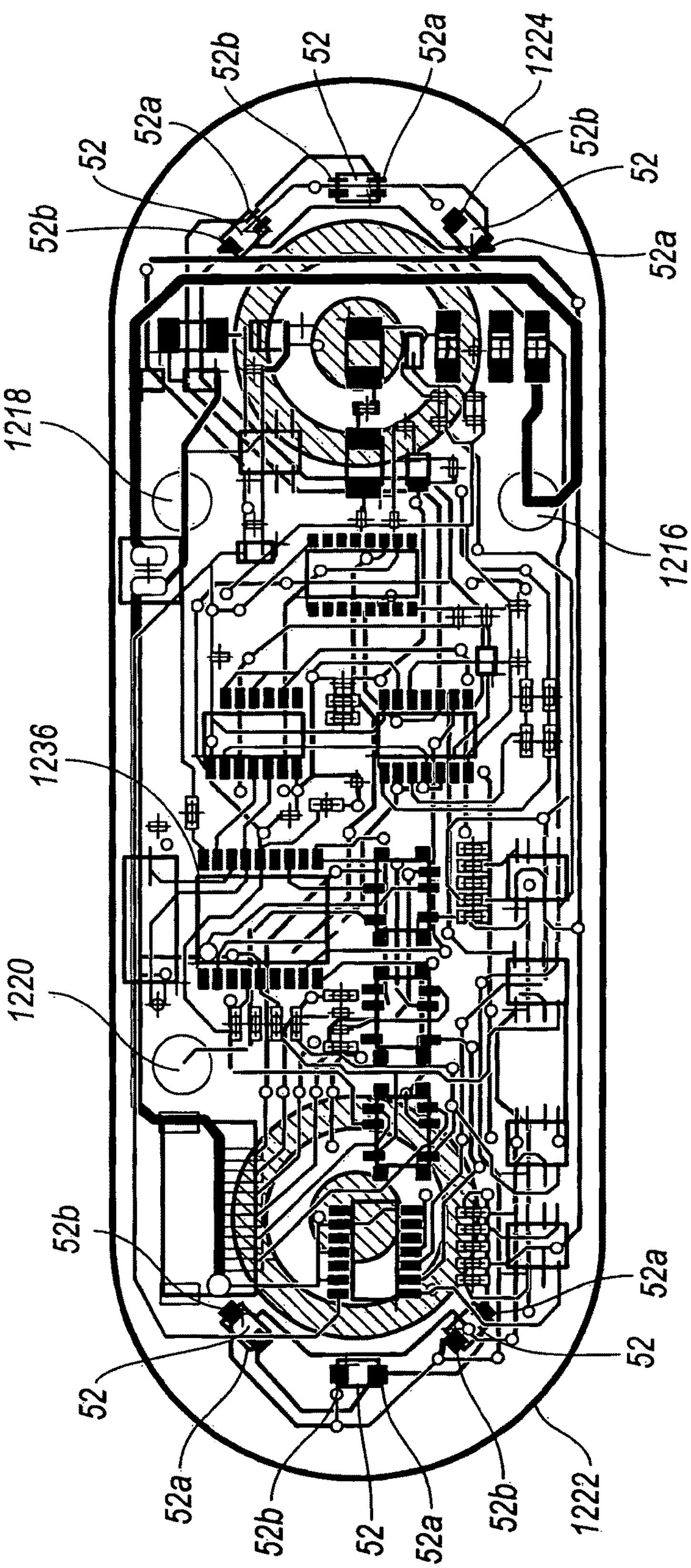
FIG. 67 is a detailed electrical schematic of a printed circuit board for the electronic indicative switch of FIG. 62.
Figure 68A:
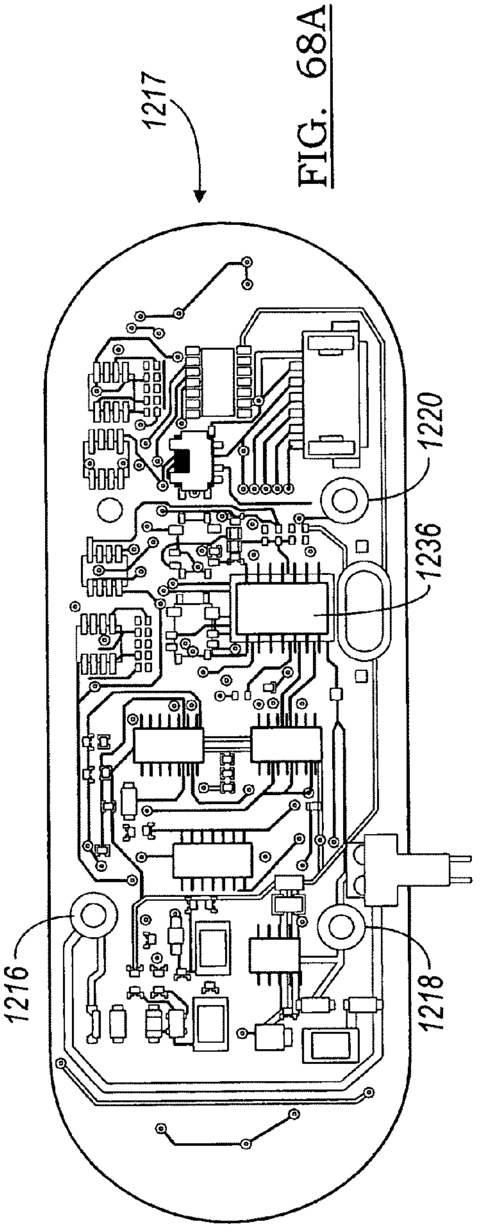
FIG. 68A is a rear view of the printed circuit board from an interior of the power-assisted stowage compartment.
Figure 68B:
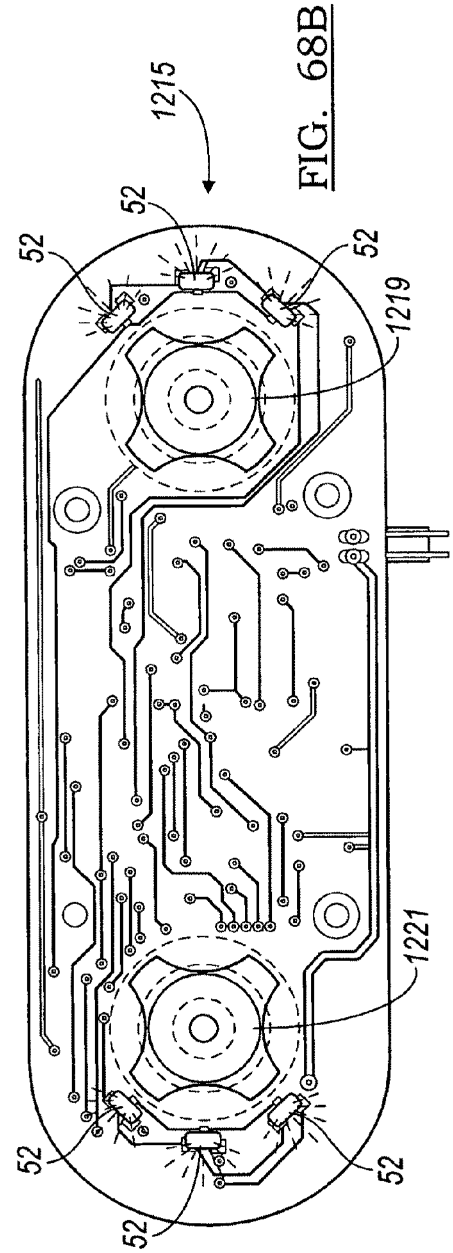
FIG. 68B is a front view of the printed circuit board from an exterior of the power-assisted stowage compartment.

The LEDs 52 are coupled to the longitudinal ends of the PCB 1202, beneath the first and second indicator panels 1204, 1206, such that the LEDs 52 can illuminate the first and second indicator panels 1204, 1206, as shown in FIGS. 62A, 63B, and 64. Preferably, the LEDs 52 comprise three first LEDs 52*a*, which may be red in color, and three second LEDs 52*b*, which may be blue in color, however, any color scheme could be employed (FIG. 67). It should be noted, that although the use of LEDs is described herein, any light emitting source, such as a light tube or fiber optics, could be employed. LEDs are particularly desirable, however, because of their long life span and relatively low power consumption.

One group of first LEDs 52*a* and one group of second LEDs 52*b* are arranged as pairs, in an arcuate pattern, around a first end 1222 of the PCB 1202 (FIG. 67). Another group of first LEDs 52*a* and a group of second LEDs 52*b* are also arranged as pairs, in an arcuate pattern, around a second end 1224 of the PCB 1202. When either one of a given LED 52*a*, 52*b* is illuminated, a uniform color light output is provided through its associated indicator panel 1204 or 1206 as shown in FIGS. 65 and 66. In FIG. 65, the LEDs 52*b* are illustrated as illuminated, and the shading denotes a blue light output. In FIG. 66, the LEDs 52*a* are illustrated as illuminated, and the shading denotes a red light output. The LEDs 52*a*, 52*b* serve as indicators of the status of the compartment 24, as discussed previously herein. In addition, as discussed, the intensity of the LEDs 52*a*, 52*b* can vary based on the lighting conditions in the cabin 14, as controlled by a user through the GUI based control panel 249, however, any suitable device could be used to correlate the intensity of the LEDs 52 to the lighting conditions in the cabin 14, such as optical sensors, for example.

In FIG. 63, the positive polarity connection 1216 provides a connection point for electrical power to be provided to the switch system 40'. Briefly, the switch system 40' receives power through a conductor 131*a* that is coupled to the positive polarity connection 1216 and incidentally coupled to the pivot system 25. In addition, through the conductor 131*a*, the switch system 40' receives indicator data 236 from the central controller 32 (remote input) (FIG. 9) via the compartment controller 30, and also transmits operational commands received by manual or local inputs to the switch system 40' to the compartment controller 30 for transfer to the central controller 32. The ground connection 1218 provides the switch system 40' with a ground connection via a conductor 131*a*. The polarity connection 1216, ground connection 1218, and sensor connection 1220 concurrently serve as an electrical system of the switch system 40' thereby eliminating the need for wired connectors.

With further reference to FIG. 63, the sensor connection 1220 enables the transfer of power to and data from the obstruction sensor 36 (FIG. 5) via a conductor 131*a*. The conductor 131*a* is coupled to the sensor connection 1220 and the obstruction sensor 36 (not specifically shown). Thus, the PCB 1202 powers the obstruction sensor 36, and also facilitates the transfer of data from the obstruction sensor 36 to the compartment controller 30 and the central controller 32. Further detail regarding the transfer of data and/or power to the compartment controller 30 and the central controller 32 through the pivot system 25 is outside the scope of the current disclosure, but is disclosed in greater detail in pending commonly assigned U.S. patent application Ser. No. 11/510,821, filed Aug. 25, 2006, entitled "System and Method for Pivot for Stowage Compartments or Rotating Items," which is incorporated by reference herein in its entirety.

Figure 69:
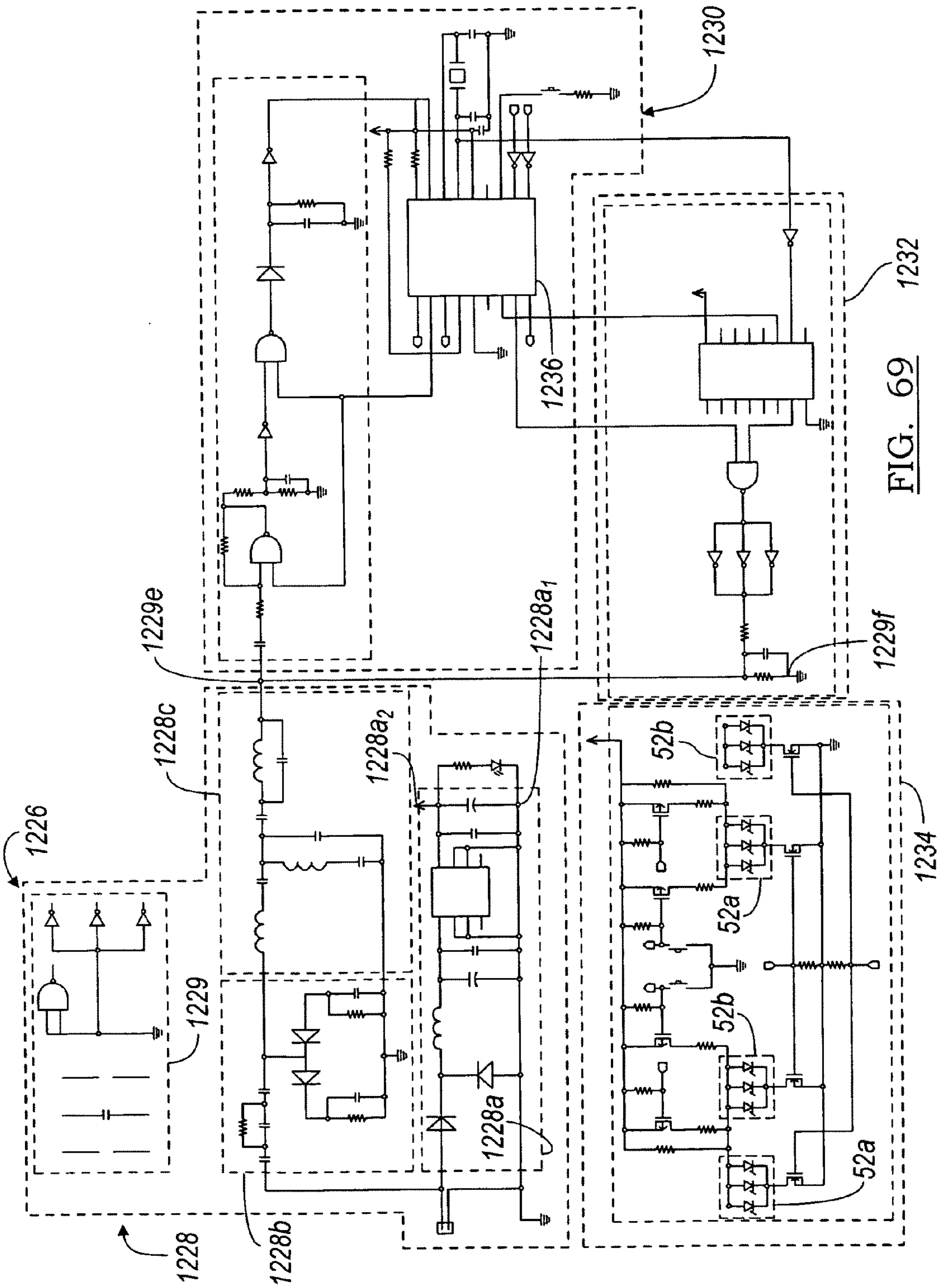
FIG. 69 is a detailed circuit diagram for the printed circuit board from a first perspective.
Figure 70:
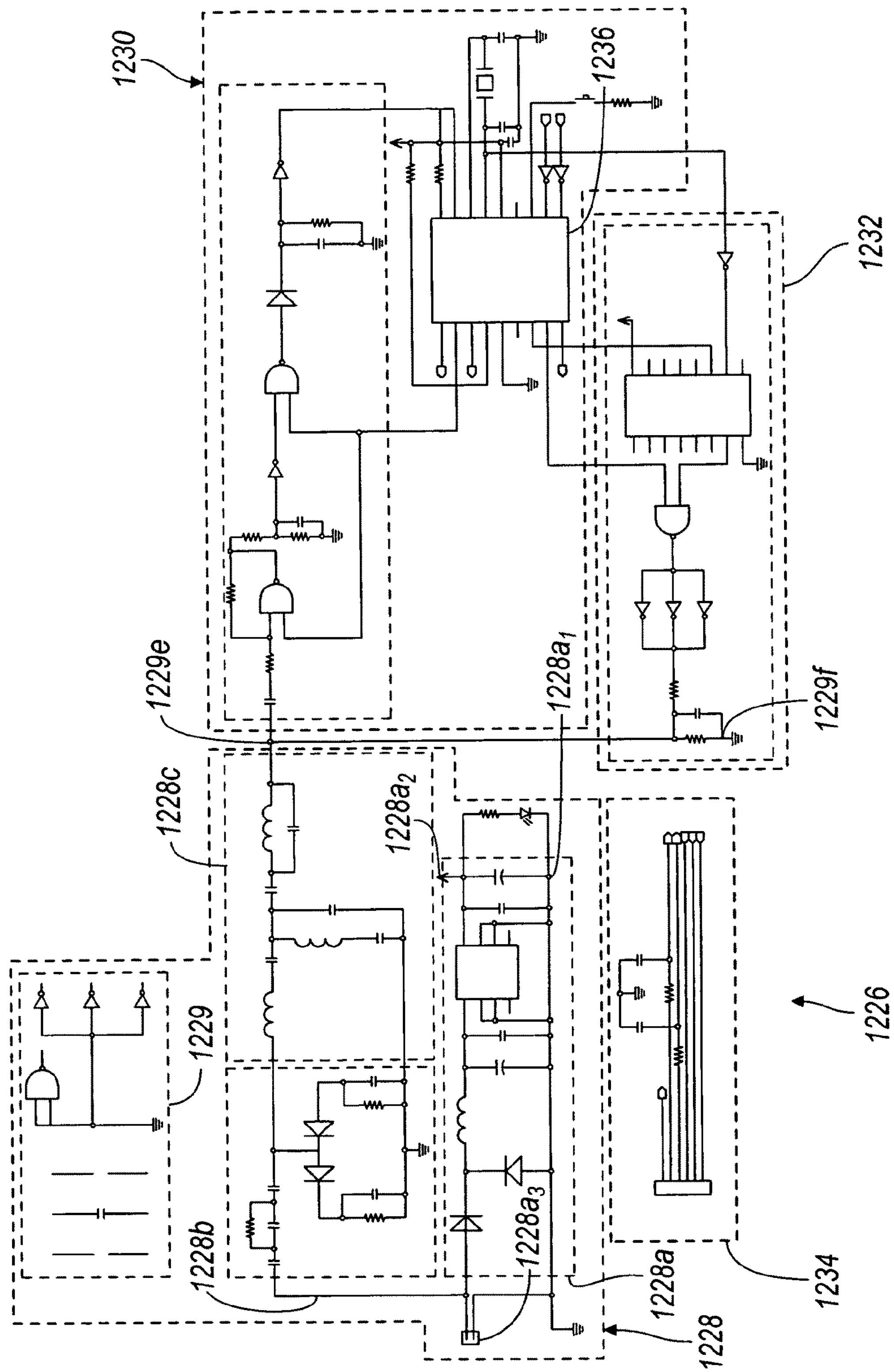
FIG. 70 is a detailed circuit diagram for the printed circuit board from a second perspective.

With reference now to FIGS. 69 and 70, the PCB 1202 is shown in detailed electrical schematic form. The illustration of FIG. 69 shows that which is visible from the first surface 1209 of the PCB 1202, as viewed from the front surface 44 of the compartment 24. FIG. 70 illustrates the components of the PCB 1202 visible from the second surface 1211 of the PCB 1202 (i.e., as viewed from the interior surface 110 of the compartment 24). Referring to FIG. 69, the PCB 1202 includes a power module or circuit 1228, a receive module or circuit 1230, a transmit module or circuit 1232, and a LED module or circuit 1234.

The power circuit 1228 receives the power from the conductor 131*a* and converts it into a regulated power output for the receive circuit 1230 and the transmit circuit 1232. The power circuit 1228 includes a power generating subsystem 1228*a*, a power protection subsystem 1228*b*, a filter 1228*c*, and a power conditioning subsystem 1229. The power generating subsystem 1228*a* forms a conventional regulated power supply that generates a regulated +5 volts (across circuit points 1228*a*1 and 1228*a*2), which is used to power the various integrated circuit components on the PCB 1202. The power protection subsystem 1228*b* is a conventional circuit that prevents current flow into the filter 1228*c*.

The power conditioning circuit 1229 provides power to pins of the integrated circuits on the PCB 1202, such as in the receive circuit 1230 and includes logic gates in communication with any unused pins in the digital chips on the PCB 1202 to prevent interference from the unused pins, as is generally known. The power conditioning circuit 1229 also includes the filter 1228*c*. The filter 1228*c* is a conventional filter that provides a filtered +0v output across points 1229*e* and 1229*f* if no data is transmitted over the positive polarity connection 1216. Thus, the filter 1228*c* blocks the direct current component from the positive polarity connection 1216 and enables the extraction of data from the supplied power. The data extracted by the filter 1228*c* is transmitted to the receive circuit 1230.

The receive circuit 1230 includes a communication over power lines (COPL) processor 1236. The receive circuit 1230 converts the data extracted from the filter 1228*c* into +5v and 0v logic that is interpreted by the COPL processor 1236. The COPL processor 1236 is a direct current (DC) COPL processor commercially available from Yamar Electronics Ltd. of Tel Aviv, Israel. The COPL processor 1236 receives both the power and any indicator data 236 from the compartment controller 30 via the conductors 131, 131*a* and converts the indicator data into signals that are used by the COPL processor 1236 to drive the LED circuit 1234. Based on the signals generated from the indicator data 236, the COPL processor 1236 transmits signals to the LED circuit 1234 to selectively illuminate the LEDs 52*a*, 52*b* accordingly.

The COPL processor 1236 also transmits over the conductors 131*a* input data from the obstruction sensor 36 received via the conductor 131*a* to the compartment controller 30 via the conductors 131*a*, 131. In addition, the COPL processor 1236 receives as input signals the depression of either of the first or second user input devices 1208, 1210 (i.e., a local input). The depression of the first or second user input devices 1208, 1210 generates the operational signal that a request to move the compartment 24 into the opened or closed positions has been made. Once the operational signal is received by the COPL processor 1236, the COPL processor 1236 provides an increased magnitude current signal to the respective LEDs 52*a*, 52*b* on the LED circuit 1234 to increase the intensity of the illumination of the LEDs 52*a*, 52*b*. This provides a visual indicator that one of the first and second user input devices 1208, 1210 has been depressed.

Further, the operational signal generated from the depression of either the first or second user input devices 1208, 1210 is transmitted by the COPL processor 1236 over the conductors 131*a*, 131 to the compartment controller 30. The compartment controller 30 transmits compartment status data 238 to the central controller 32 indicating that a request to move the compartment 24 into the opened or closed position has been made. If the compartment 24 is able to move (i.e., not blocked by an obstruction), then the compartment controller 30 transmits indicator data 236 over the conductors 131*a*, 131 indicative of the desired movement of the compartment 24, which is received by the COPL processor 1236 and used to illuminate the respective LEDs 52*a*, 52*b*, as described herein. If the compartment 24 is not able to move, then the compartment controller 30 transmits indicator data 236 to the COPL processor 1236 that the compartment 24 is unable to move, as also described herein.

The transmit circuit 1232 is in communication with the COPL processor 1236 of the receive circuit 1230. The transmit circuit 1232 receives data from the COPL processor 1236 and modulates this data onto the positive polarity connection 1216 using logic gates to amplify signals while also blocking incoming data signals that should be received by the receive circuit 1230.

Thus, the switch system 40' provides an easy to use and aesthetically pleasing system for enabling users to conveniently control opening and closing of a compartment 24. Advantageously, the switch system 40' provides both a visual signal and a tactile signal to the user to confirm for the user whether opening or closing of the compartment 24 has been selected.

Figure 71:
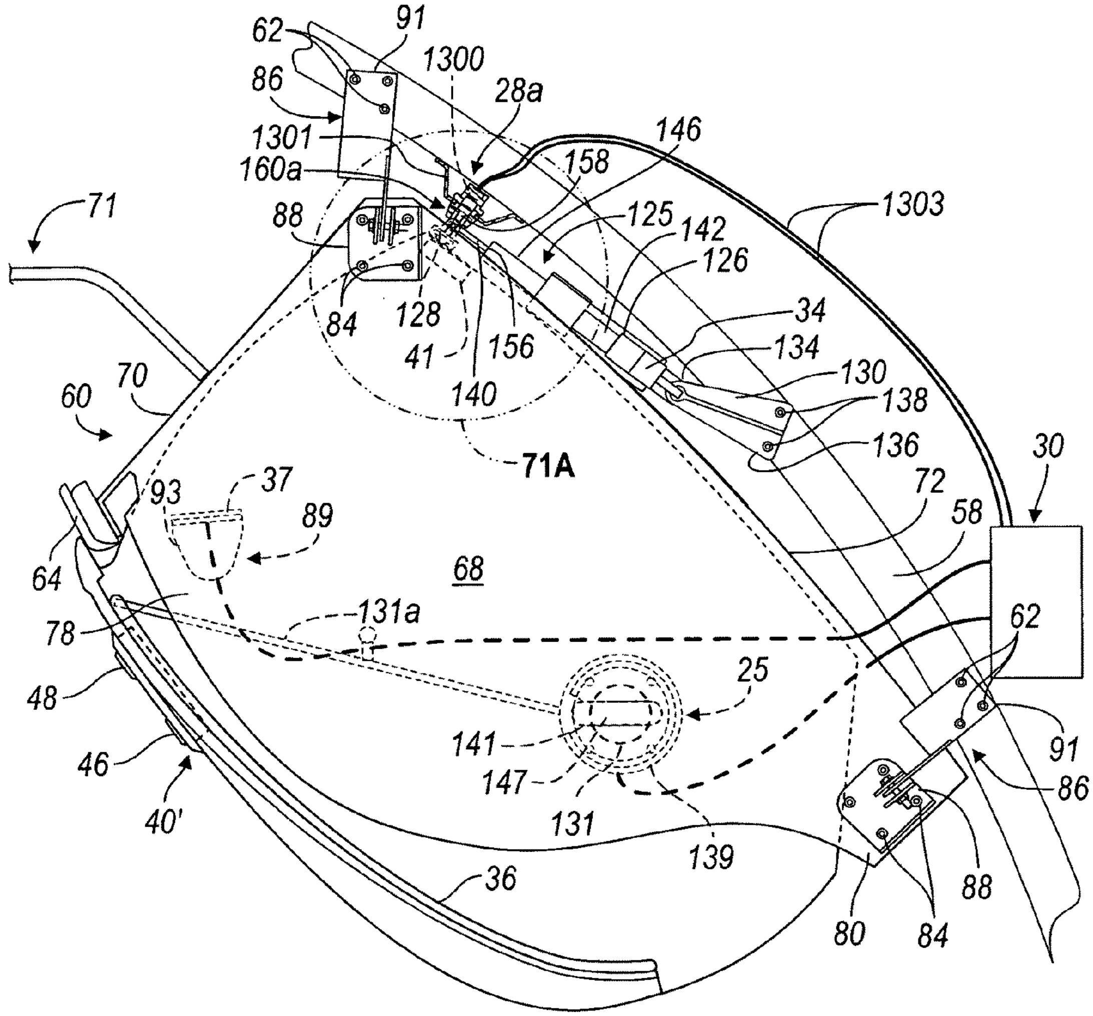
FIG. 71 is a side view of the power-assisted compartment of FIG. 3, including an electronic latch in accordance with one exemplary embodiment of the present disclosure.

With reference now to FIG. 71, an alternative latching system 28*a* is shown. The alternative latching system 28*a* includes the latch pin or pin 158, a receiver assembly 160*a*, the manual release 163 and a latch control system or latch controller 1300 for use with the compartment 24 described with regard to FIGS. 1-70. As will be appreciated, the remainder of the compartment 24 employed with the alternative latching system 28*a* is similar to that which is illustrated in and described in conjunction with FIGS. 1-70. Further, as the pin 158 and the manual release 163 of the alternative latching system 28*a* are substantially similar to the pin 158 and the manual release 163 of the latching system 28, the pin 158 and the manual release 163 will not be discussed in detail with regard to the alternative latching system 28*a*. It should be further noted that the same reference numerals will be used to denote the same or similar items discussed in regard to FIGS. 1-70.

Figure 71A:
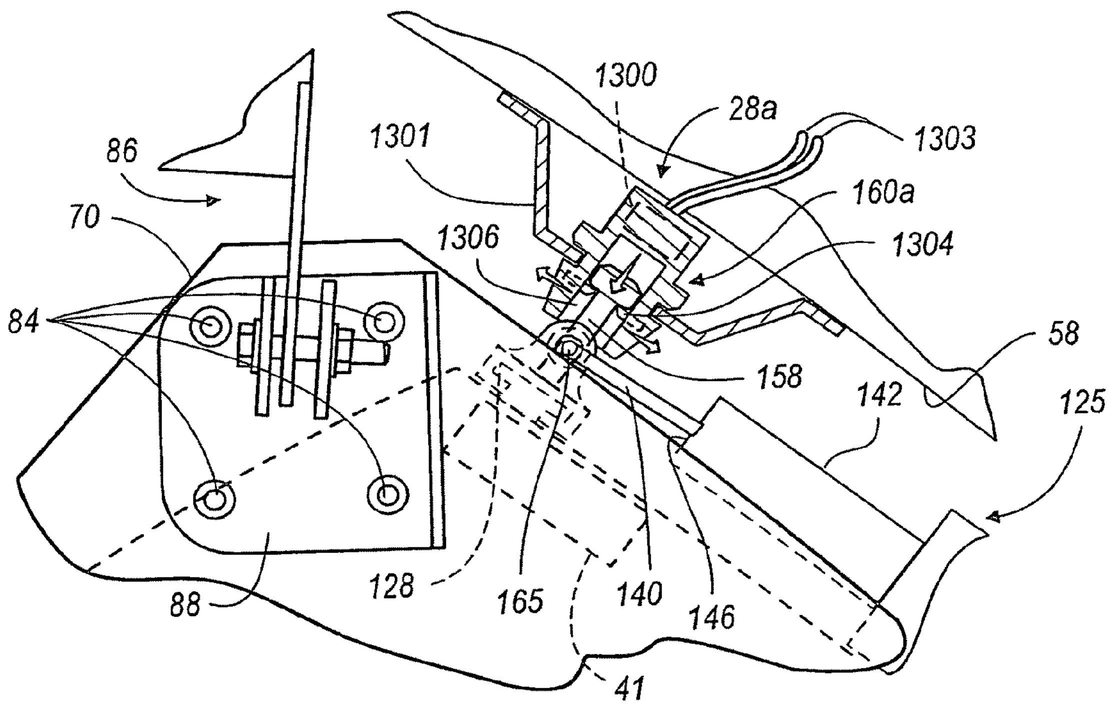
FIG. 71A is a detail side view of the electronic latch of the power-assisted compartment of FIG. 71 in a first, engaged position.
Figure 71B:
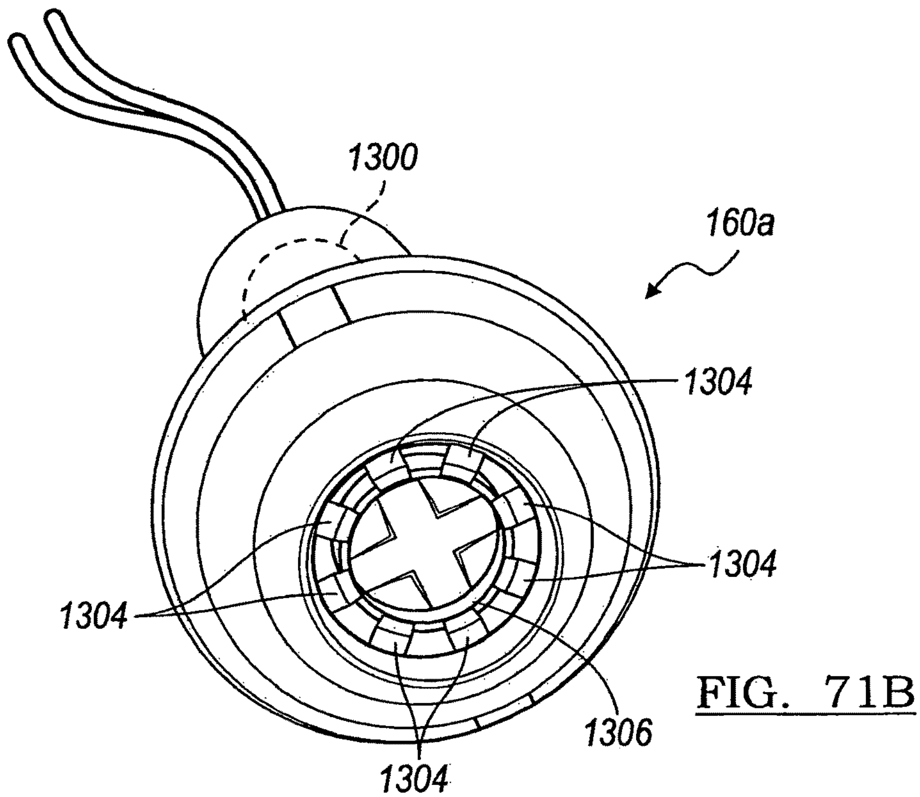
FIG. 71B is a detail perspective view of a portion of the latching system of FIG. 71A in a second, disengaged position.
Figure 71C:
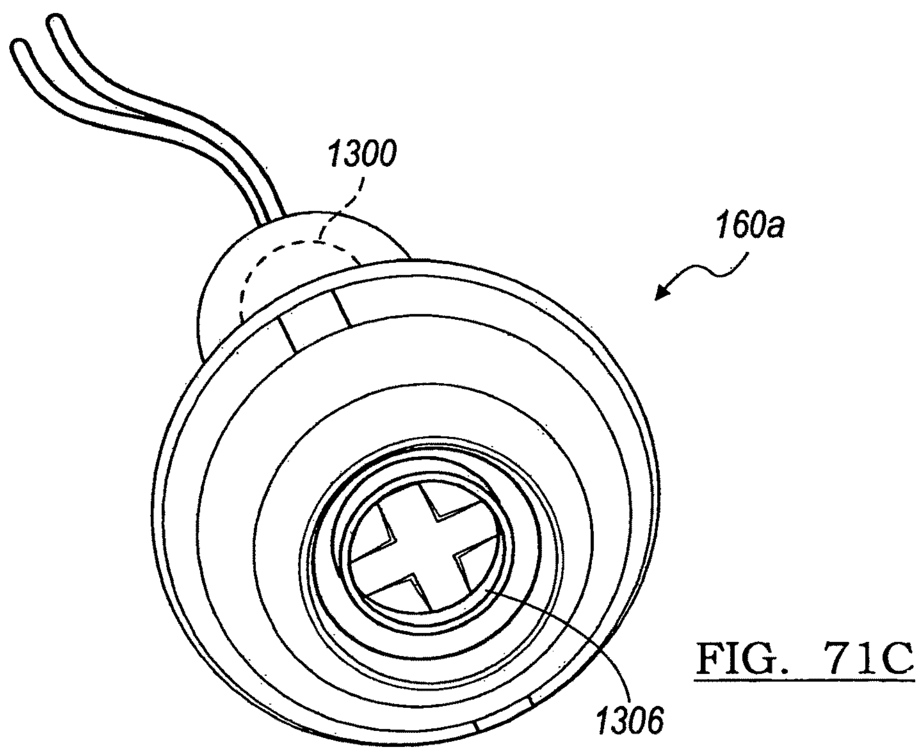
FIG. 71C is a detail perspective view of a portion of the latching system of FIG. 71A.
Figure 72:
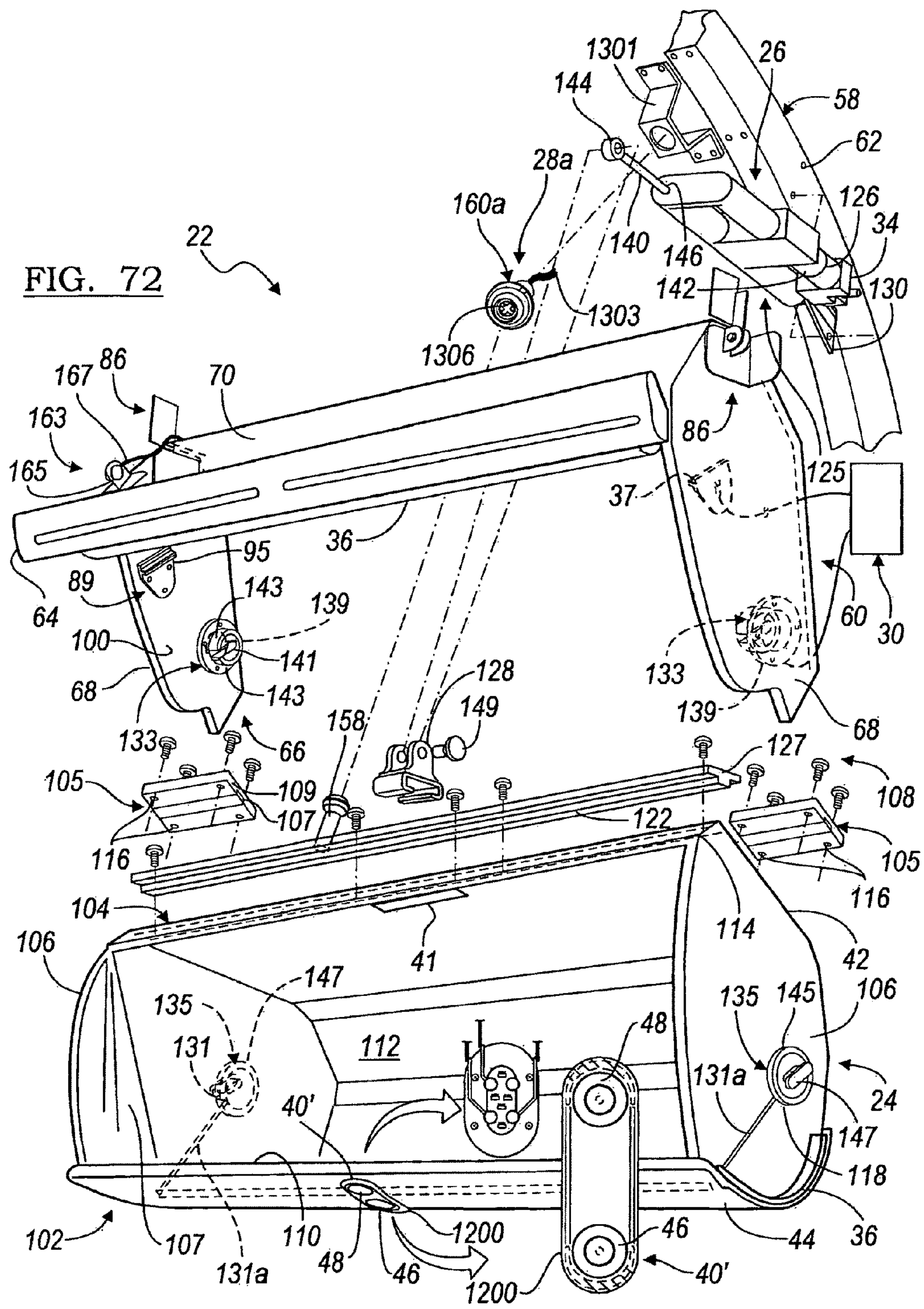
FIG. 72 is an exploded perspective view of the power-assisted compartment including the electronic latch of FIG. 71.
Figure 73:
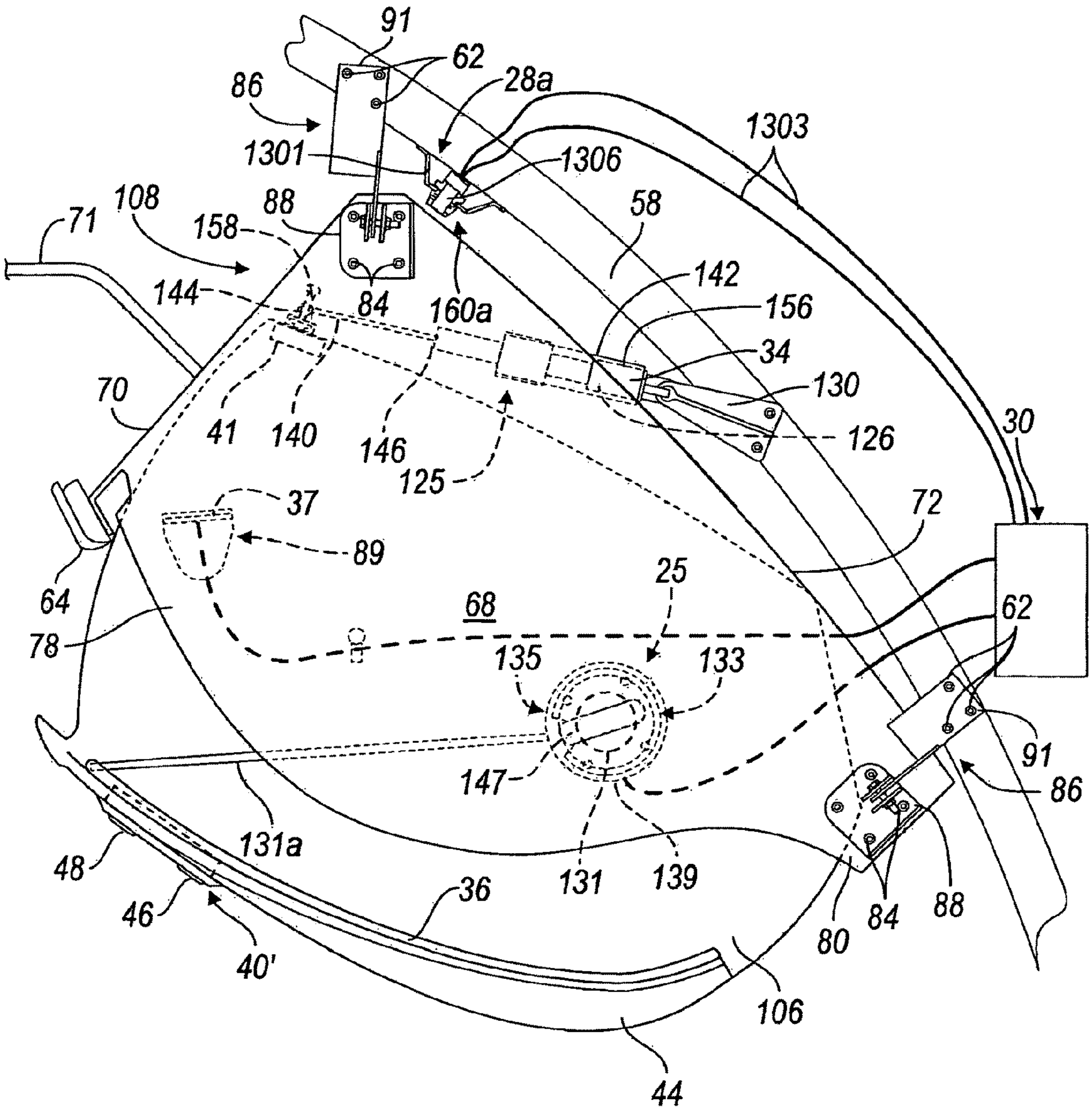
FIG. 73 is a side view of the power-assisted compartment in a partially opened and unlatched position, including the electronic latch of FIG. 71.

With additional reference to FIG. 71A, the receiver assembly 160*a* of the alternative latching system 28*a* is shown coupled to the frame 58. The receiver assembly 160*a* is shown coupled to the frame 58 via a bracket 1301, however, any suitable mounting technique could be employed to couple the receiver assembly 160*a* to the frame 58. Alternatively, the receiver assembly 160*a* could be coupled to the shell 66, if desired (not shown). As any suitable receiver assembly 160*a* could be employed to secure the pin 158, the receiver assembly 160*a* will not be discussed in detail herein. Briefly, a suitable receiver assembly 160*a* could be a radial fastener receiver assembly 160*a* available from Telezygology, Inc. of Chicago, Ill. The radial fastener receiver assembly 160*a* can include a cylindrical housing 1302 for receipt of the pin 158. With reference to FIG. 71B, the cylindrical housing 1302 includes teeth 1304, which are operable in a first, engaged position to extend into a bore 1306 formed in the cylindrical housing 1302 to secure the pin 158 to the receiver assembly 160*a*. With reference to FIG. 71C, the teeth 1304 are operable in a second, disengaged position to retract into the bore 1306 and release the pin 158 from the cylindrical housing 1302.

Alternatively, the receiver assembly 160*a* could be a shape memory alloy radial receiver assembly (not specifically shown), such as that available from Telezygology, Inc. of Chicago, Ill. The shape memory alloy radial receiver assembly includes a cylindrical shape memory alloy receiver, which in a first state retains the pin 158, and in a second state releases the pin 158 by the application of a current to the shape memory alloy receiver. The current heats the shape memory alloy receiver causing the receiver to expand and release the pin 158. When the current is removed, the receiver cools to the first state for receipt of the pin 158, as is generally known. The shape memory alloy radial receiver assembly 160*a* includes a cylindrical shape memory alloy receiver, which is operable in a first state to retain the pin 158, and is operable in a second state to release the pin 158, by the application of a current to the shape memory alloy receiver. The current heats the shape memory alloy receiver causing the receiver to expand and release the pin 158. When the current is removed, the receiver cools to the first state for receipt of the pin 158, as is generally known.

The latch controller 1300 of the receiver assembly 160*a* is coupled to the receiver assembly 160*a* and is in communication with the switch system 40'. The latch controller 1300 could be integrally formed with the receiver assembly 160*a* as shown, or could be a discrete component mechanically coupled to the receiver assembly 160*a*, if desired. The latch controller 1300 is in communication with the switch system 40' through a wired connection 1303, but could be in communication with the switch system 40' through a wireless connection, such as a Bluetooth (802.15.1), WiFi (802.11), or Zigby (802.15.4) or a conductor 131*a* via COPL or even via a separate dedicated conductor (not shown). The latch controller 1300 is in communication with the switch 40' to receive a signal that a request to unlatch the compartment 24 has been made via the switch 40'. In addition, the latch controller 1300 is responsive to the warning sign, such as the "Fasten Seatbelts" sign, to prevent the release of the pin 158 from the receiver assembly 160*a*. The latch controller 1300 can receive notice that the warning sign is active either through the compartment controller 30, or the latch controller 1300 can be in wireless communication with the central controller 32 for receipt of a signal that the warning sign is active (not specifically shown).

Specifically, the latch controller 1300 activates the receiver assembly 160*a* to release the pin 158 upon receipt of the signal from the switch system 40', or prevents the release of the pin 158. For example, if the OPEN button 46 is depressed, the switch system 40' transfers a signal, either wirelessly or through the compartment controller 30, to the latch controller 1300 that a request to lower the compartment 24 has been made. If the latch controller 1300 has not received the signal that the warning sign is active, then the latch controller 1300 will command or signal the receiver assembly 160*a* to release the pin 158. If the latch controller 1300 receives the signal that the warning sign is active, then the latch controller 1300, even upon receipt of the signal from the switch system 40', will prevent the release of the pin 158. However, if the warning sign is active, and the proper crew code is provided via the switch system 40', then the latch receiver 160*a* will release the pin 158, as discussed previously.

In addition, the latch controller 1300 provides the central controller 32 and compartment controller 30 with a real-time status of the receiver assembly 160*a*. The latch controller 1300 communicates its status (i.e. latched, unlatched) and any failure of the receiver assembly 160*a* to the compartment controller 30 via the wired connection 1303. Alternatively, the latch controller 1300 could communicate its status wirelessly through Bluetooth (802.15.1), WiFi (802.11), or Zigby (802.15.4), for example. Thus, the latch controller 1300 provides the same functionality as the latch sensor 156, but also controls the activation of the receiver assembly 160*a* while monitoring the receiver assembly 160*a* for failure.

Based on the input received from the switch system 40' and the latch controller 1300, the compartment controller 30 generates the indicator data 236 for the switch system 40', as shown in Table 1. It should be noted that the light output of the LEDs 52 of the indicator surface 1200 are merely exemplary, as any appropriate color light output could be employed, depending upon a desired lighting scheme.

TABLE 1

Exemplary Indicator Surface Outputs for Various Compartment Operations

| User | Operational Condition | ID# | Action/ Scenario | Position | Status Indicator (color) | Crew Panel |
|---|---|---|---|---|---|---|
| PAX | Enabled (NSFSB = 1) | P1a | Latched | 0° | Solid Blue | |
| | | P1b | Open (no motion, not latched) | <X° | Flashing Blue | |
| | | P1c | Open (no motion, not latched) | >X° | Solid Blue | |
| | | P1d | Opening | 0°-48° | Flashing Blue | |
| | | P1c | Closing | 0°-48° | Flashing Blue | |
| | | P1e | Impending Motion due to power delay | 0°-48° | Flashing Blue | |
| | Disabled (NSFFSB = 2) | P2a | Deferment Period | 0°-48° | Status remains ID#'s P1a-P1e | |
| | Disabled (NSFFSB = 3) | P3a | Latched | 0° | Solid Red | |
| | | P3b | Open (no motion, not latched) | 0°-48° | Flashing Red | Not latched signal |
| | | P3c | Opening or Closing | 0°-48° | Flashing Red | Not latched signal |
| CRW | Enabled (NSFSB = 1) | C1a | Open, Opening/ Closing, Impending | 0°-48° | Go to ID# P1b-P1e | |

TABLE 1-continued

Exemplary Indicator Surface Outputs for Various Compartment Operations

| User | Operational Condition | ID# | Action/ Scenario | Position | Status Indicator (color) | Crew Panel |
|---|---|---|---|---|---|---|
| | Disabled (NSFFSB = 3) | C3a | Motion Latched | 0° | Solid Red | |
| EMR | Enabled (NSFSB = 1) | E1a | Bin Latched | 0° | Solid Red | |
| | | E1b | Open, Opening/ Closing, Impending Motion | 0°-48° | Go to ID# P1b-P1e | |
| ALL | Obstruction | A1a | Opening or Closing | 0°-48° | Flashing Blue/Red | |
| | | A1b | Opening or Closing (1-2 attempts < P sec) | 0°-48° | Flashing Blue/Red | Obstr. signal |
| | Obstruction | A1c | Opening or Closing (>2 attempts < P sec) | 0°-48° | Flashing Blue/Red | Obstr. signal |
| | Overweight | A1d | Overloaded or weight unknown | 0°-48° | Flashing Blue/Red | Ovrwgt signal |
| | TTL-Disabled* | A3 | latched | 0°-48° | No illumination | |
| | TTL-Disabled* | A3 | not latched | 0°-48° | Flashing Red | Not latched signal |

In Table 1, the user "PAX" refers to operation of the compartment 24 by the passenger of the mobile platform 10, user "CREW" refers to operation of the compartment 24 by a crew member, for a compartment 24 that has access restricted to crew members, the user "EMER" refers to the use of the compartment 24 during an emergency situation, and the user "ALL" refers to output of the indicator surface 1200 during the use of the compartment 24 by all users. The column entitled "Crew Panel" can refer to the display on the GUI control panel 249.

Figure 74A:
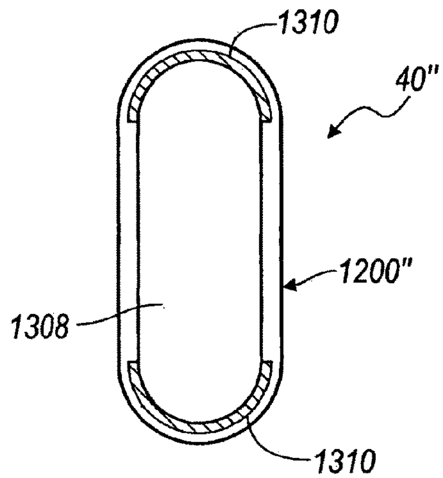
FIG. 74A is a front view of a second alternative embodiment of an electronic indicative switch.
Figure 74B:
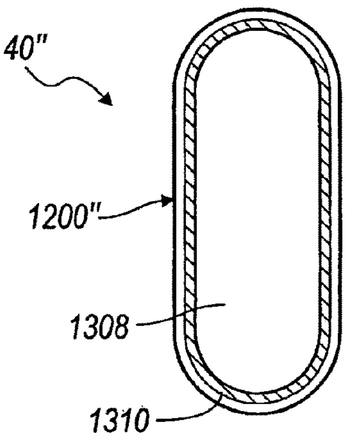
FIG. 74B is a front view of a third alternative embodiment of an electronic indicative switch.
Figure 74C:
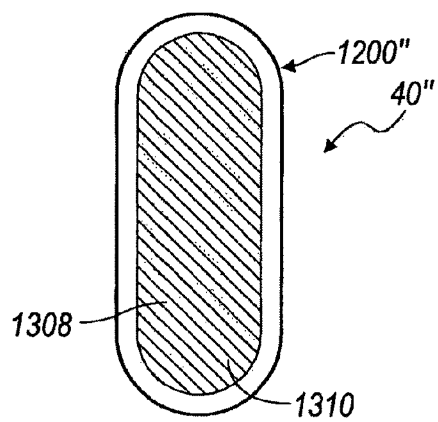
FIG. 74C is a front view of a fourth alternative embodiment of an electronic indicative switch.
Figure 74D:
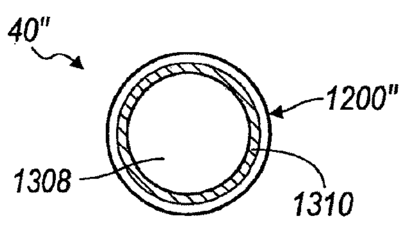
FIG. 74D is a front view of a fifth alternative embodiment of an electronic indicative switch.

With reference now to FIGS. 74A-74E, it should be noted that the switch system 40' employed with the latching system 28*a* could be an alternative switch system 40''', as shown in FIG. 74A. The alternative switch system 40" is similar to the switch system 40', however, instead of two switch contacts, the switch system 40" includes one switch contact 1308 that could be sized the same as the switch system 40', or could be smaller than the switch system 40', as shown in FIG. 74D. As the functionality of the switch contact 1308 and the switch system 40" is the same as the switch contacts 1219, 1221 and the switch system 40' discussed with regard to FIGS. 62-70, the switch contact 1308 and the switch system 40" will not be discussed in great detail herein. Briefly, however, as one switch contact 1308 is employed with the switch system 40", an indicator surface 1200" of the switch system 40" can include various configurations of indicator panel(s) 1310.

Figure 74E:
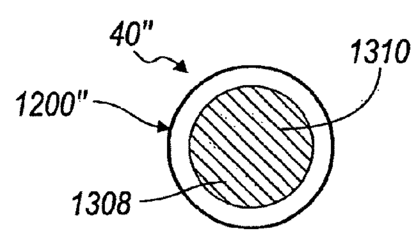
FIG. 74E is a front view of a sixth alternative embodiment of an electronic indicative switch.

As shown in FIG. 74A, the indicator surface 1200" includes two indicator panels 1310, similar to the indicator panels of the switch system 40', to enable the light energy from the LEDs 52*a*, 52*b* to pass therethrough. With reference to FIG. 74B, one indicator panel 1310 is employed that extends around a circumference of the switch contact 1308 to enable the light energy from the LEDs 52*a*, 52*b* to pass therethrough. As shown in FIG. 74C, the surface of the switch contact 1308 could itself be the indicator panel 1310, and thus, the area of the indicator surface 1200" covering the switch contact could be translucent to enable the light energy from the LEDs 52*a*, 52*b* to pass therethrough. In FIG. 74D, the smaller switch system 40" is shown to include an indicator panel that extends around a circumference of the switch contact 1308, for enabling the light energy from the LEDs 52*a*, 52*b* to pass therethrough. Alternatively, as shown in FIG. 74E, the surface of the switch contact 1308 of the smaller switch system 40" is employed as the indicator panel 1310, and thus, the area of the indicator surface 1200" covering the switch contact is translucent to enable the light energy from the LEDs 52*a*, 52*b* to pass therethrough.

Figure 75:
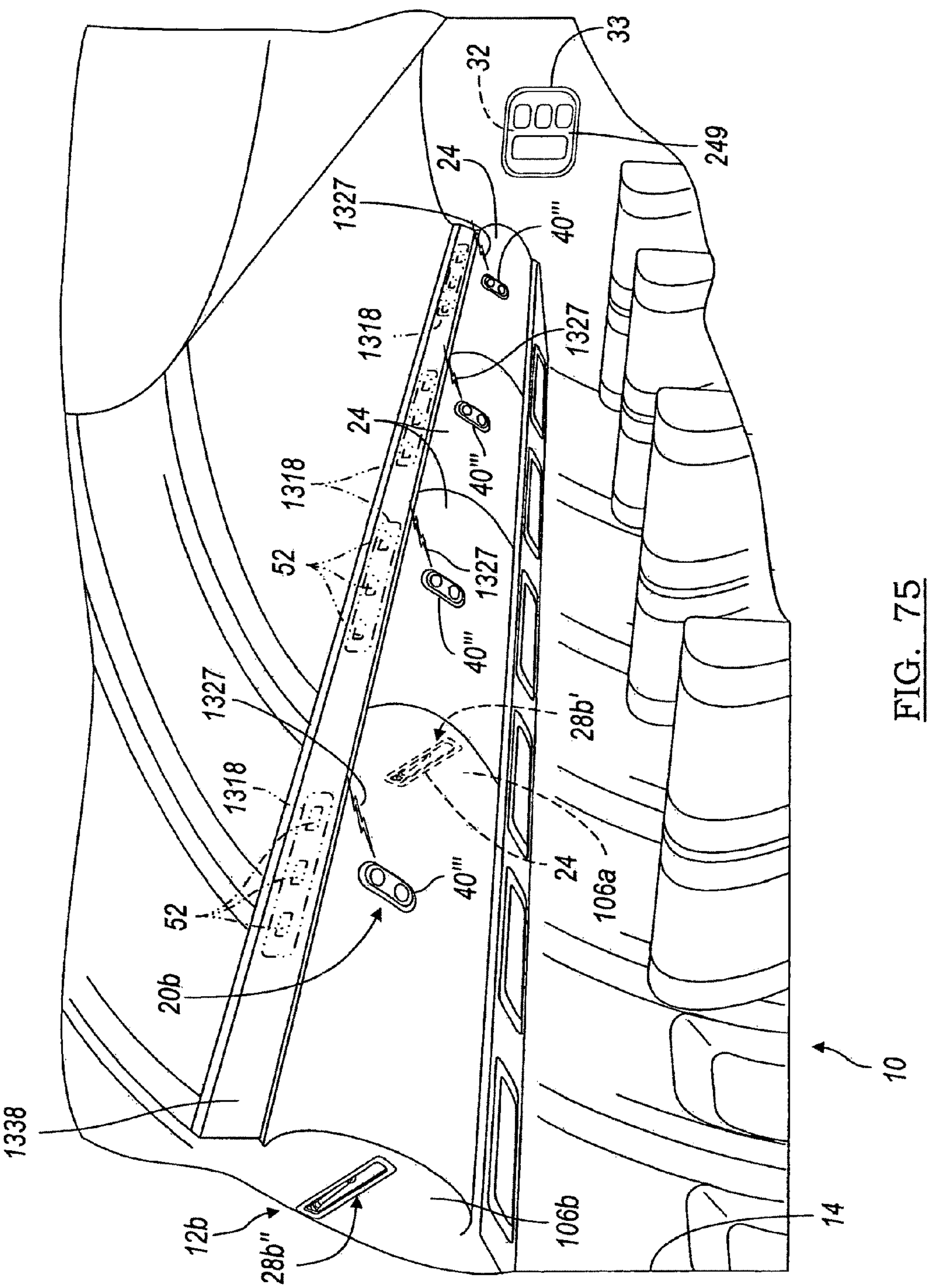
FIG. 75 is a perspective view of a portion of a mobile platform illustrating a plurality of alternative stowage compartments including an alternative electronic latch in accordance with one exemplary embodiment of the present disclosure.

With reference now to FIG. 75, an alternative compartment system 12*b* is shown. The alternative compartment system 12*b* is manually operated, and can be used in a mobile platform 10 in conjunction with the power-assisted compartment system 12, or mobile platform 10 could employ just the alternative compartment system 12*b*, if desired (not shown). As the alternative compartment system 12*b* is similar to the power-assisted compartment system 12 discussed with regard to FIGS. 1-74, the same reference numerals will be used to denote the same or similar components.

Figure 76:
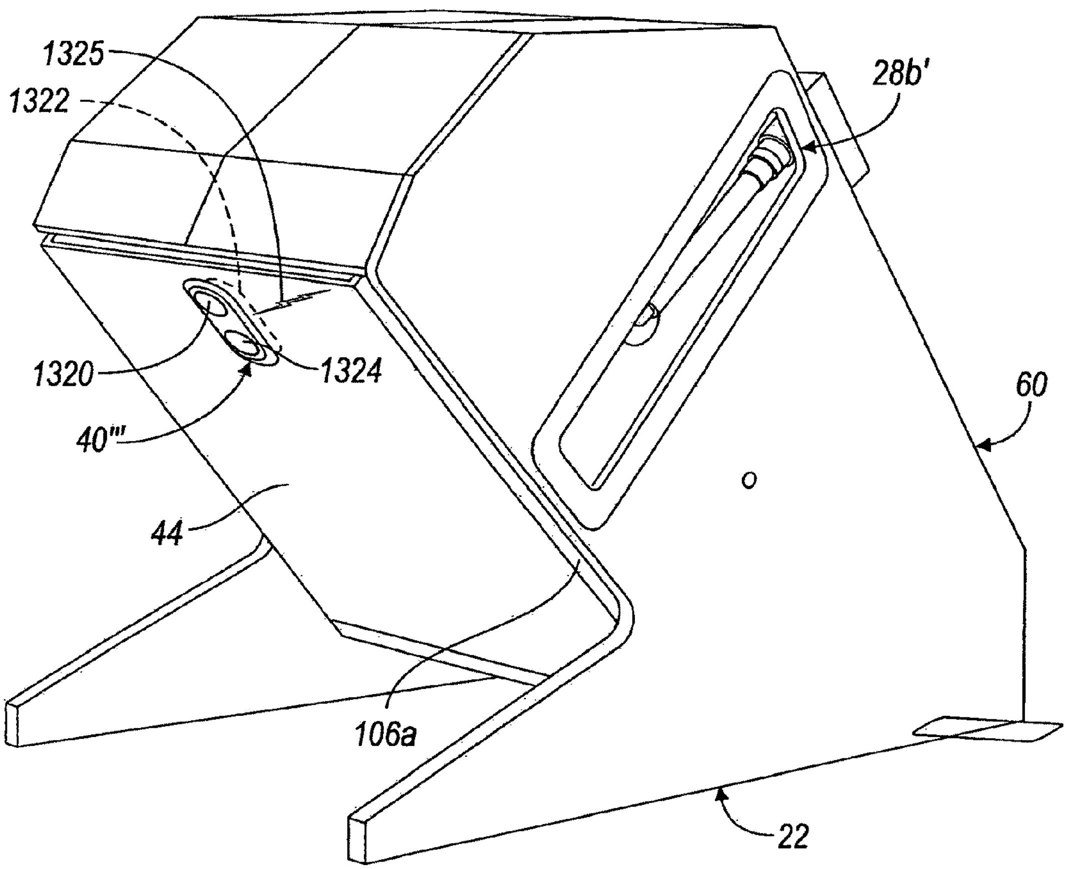
FIG. 76 is a perspective view of the alternative stowage compartment of FIG. 75 in a closed and latched position.
Figure 77:
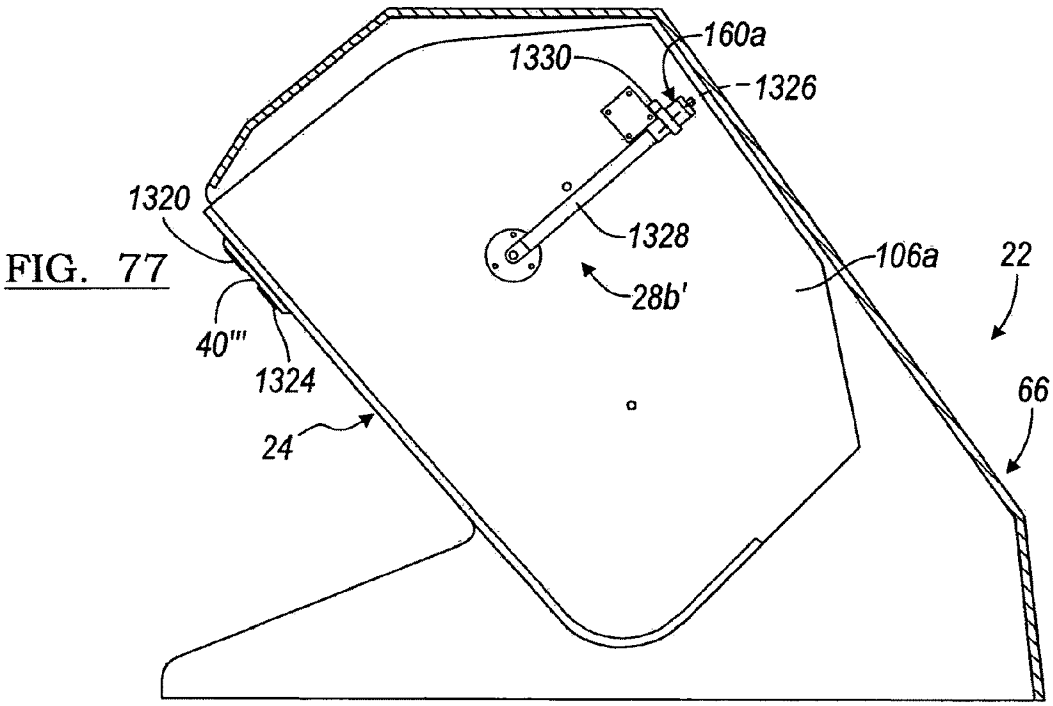
FIG. 77 is a partially broken away side view of the alternative stowage compartment of FIG. 75 illustrating the latching system in the closed and latched position.
Figure 78:
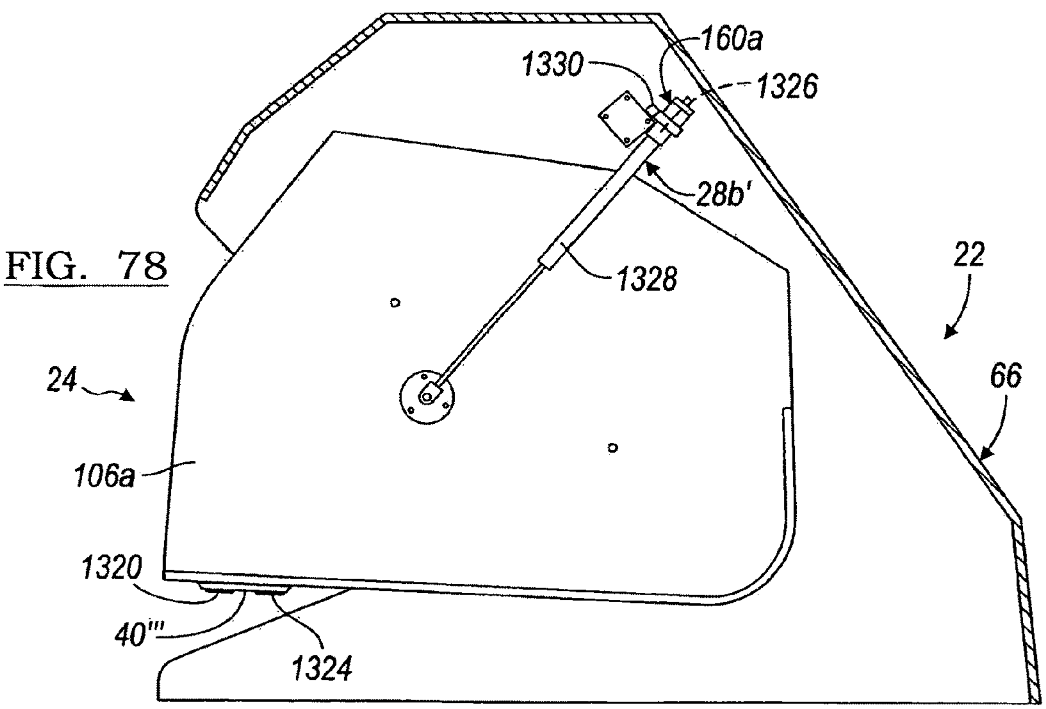
FIG. 78 is a partially broken away side view of the alternative stowage compartment of FIG. 75 illustrating the latching system in a partially opened and unlatched position.
Figure 79:
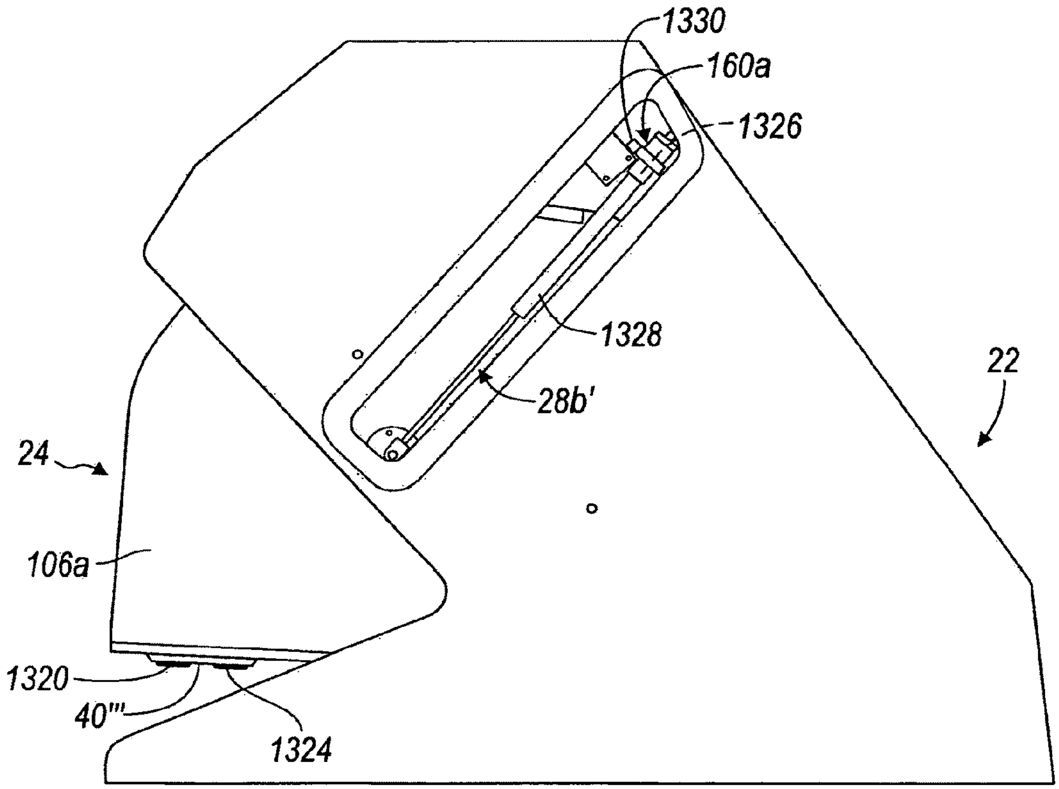
FIG. 79 is a side view of the alternative stowage compartment of FIG. 75 illustrating the latching system in an opened and unlatched position.

With additional reference to FIG. 76, the compartment system 12*b* includes a control system 20*b*, the support system 22, the compartments 24, a latching system 28*b*, and a display 1318. As the support system 22 and the compartments 24 of the compartment system 12*b* are substantially similar to the support system 22 and compartments 24 of the compartment system 12 discussed with regard to FIGS. 1-70, with the exception of the size, shape and orientation of the opened and closed positions, the support system 22 and compartments 24 of the compartment system 12*b* will not be discussed in great detail herein. In addition, the support system 22 and compartments 24 as illustrated herein are of the type generally known in the art.

The control system 20*b* includes the central controller 32 and a switch system 40'''. The control system 20*b* is in communication with the latching system 28*b*, as will be discussed herein. Generally, the central controller 32 is in communication with the latching system 28*b* through a wireless protocol, however, the central controller 32 could also be in communication with the latching system 28*b* through a wired connection, such as COPL through the use of conductors 131*a*, for example, or even via a separate dedicated conductor, as will be discussed herein. It should be noted that although the central controller 32 is shown in FIG. 75 with a GUI screen 249, any appropriate central controller 32 could be employed as discussed previously herein. The central controller 32 is also in communication with the display 1318, as will be discussed in greater detail herein.

With additional reference to FIG. 76, the control system 20*b* also includes the switch system 40'''. The switch system 40''' communicates with the latching system 28*b* to provide the latching system 28*b* with a signal that a request to unlatch the compartment 24 has been made. The switch system 40''' is similar to the switch system 40', and includes a first user input device 1320, second user input device 1322 and a PCB 1324 (not specifically shown). The first and second user input devices 1320, 1322 can be identical to the first and second user input devices 1208, 1210 of the switch system 40', however, any suitable switch contact could be employed. In addition, only one of the first and second user input devices 1320, 1322 could be employed, if desired, as discussed herein with regard to FIGS. 74A-74E. If, however, the first and second user input devices 1320, 1322 are employed, then the switch system 40''' can be used as a combination lock to restrict access to the compartment 24. In particular, the depression of the first and second user input devices 1320, 1322 in the pre-defined crew code pattern could enable the compartment 24 to be opened by authorized users only, as discussed previously herein. Further, if only one user input device 1320 or 1322 is employed, a sequence of hold times for the depression of the user input device 1320 or 1322 (i.e., short depression, long depression, long depression, short depression) could be employed as a combination lock to restrict access to the compartment 24.

The first and second user input devices 1320, 1322 are coupled to the PCB 1324. The PCB 1324 enables the transmission of the signal to the latching system 28*b* that either of the first and second user input devices 1320, 1322 has been depressed, indicating that a request to unlatch the compartment 24 has been made. Preferably, the PCB 1324 transmits the signal to the latching system 28*b* through a suitable wireless protocol 1325, such as Bluetooth (802.15.1), WiFi (802.11), or Zigby (802.15.4), however, the PCB 1324 could transmit the signal using COPL through a conductor 131*a*, for example, as discussed with regard to switch system 40' or even via a separate dedicated conductor (not shown).

It should be noted that the switch system 40''' does not include an indicator surface as described with regard to the switch system 40'. As the switch system 40''' does not include an indicator surface, the switch system 40''' could be an energy harvesting switch, such as an inductive or piezoelectric switch that is capable of self-generating energy to send the wireless signal to the latching system 28*b*. A suitable energy harvesting switch is commercially available from EnOcean GmbH, of Oberhaching, Germany.

The latching system 28*b* is in communication with the switch system 40''' of the control system 20*b* to receive the signal that a request has been made to unlatch the compartment 24. Preferably, one latching system 28*b* is coupled to a first sidewall 106*a* of the compartment 24 and another latching system 28*b* is coupled to a second sidewall 106*b* of the compartment 24 (best shown in FIG. 75), however, any number of latching systems 28*b*, including only one latching system 28*b*, could be employed. Generally, one of the latching systems 28*b* will serve as the master latching system 28*b'*, and will be in communication with the switch system 40''' for receipt of the signal to unlatch the compartment 24. The master latching system 28*b'* will also be in communication with a slave latching system 28*b''* to instruct the slave latching system 28*b''* to unlatch upon receipt of the signal from the switch system 40'''. The master latching system 28*b'* can be in wireless communication with the slave latching system 28*b''*, or could communicate with the slave latching system 28*b''* through a wired connection, such as COPL or even via a separate dedicated conductor. It should be noted, however, that the latching systems 28*b* could be independently in communication with the switch system 40''' to receive the signal to unlatch the compartment 24.

With reference to FIGS. 76-79, the latching system 28*b* is shown in simplified form. It will be appreciated that any suitable electronically controlled latching system 28*b* could be employed with the compartment 24. An exemplary latching system 28*b*, for example, could include a latch pin 1326, a telescoping arm 1328, a manual release 1330 and the receiver assembly 160*a*. The latch pin 1326 is coupled to the telescoping arm 1328, and is configured to be received in the receiver assembly 160*a* to secure the compartment 24 in the closed position. The telescoping arm 1328 is coupled to the receiver assembly 160*a* and the sidewall 106 of the compartment 24 to enable the compartment 24 to pivot from the closed position (FIG. 77) to the opened position (FIG. 79) upon the release of the latch pin 1326 from the receiver assembly 160*a*. The manual release 1330 is coupled to the receiver assembly 160*a* to enable the release of the latch pin 1326 from the receiver assembly 160*a*, and can be similar to the manual release 163 of the latching system 28.

With regard to the receiver assembly 160*a*, as the receiver assembly 160*a* was discussed with regard to FIGS. 71-74E, it will not be discussed in detail with regard to compartment 24. Briefly, however, the receiver assembly 160*a* is coupled to the support system 22 to enable the compartment 24 to pivot with respect to the support system 22 into the opened and the closed positions. The receiver assembly 160*a* used with the alternative compartment system 12*b* includes the latch controller 1300. Generally, the latch controller 1300 is in communication with the switch system 40''' of the control system 20*b*. The latch controller 1300 is preferably in communication with the switch system 40''' through the wireless connection 1325, but could be in communication with the switch system 40''' through a suitable wired connection, such as through a conductor 131*a* (not shown).

The latch controller 1300 activates the receiver assembly 160*a* to release the pin 158 upon receipt of a signal from the switch system 40''', or prevents the release of the pin 158. For example, if either of first and second user input devices 1320, 1322 is depressed, the switch system 40''' transfers a signal wirelessly to the latch controller 1300 that a request to lower the compartment 24 has been made. If the latch controller 1300 has not received a signal that the warning sign is active, then the latch controller 1300 will command or activate the receiver assembly 160*a* to release the locking stud 1326. If the latch controller 1300 receives a signal that the warning sign is active, then the latch controller 1300, even upon receipt of the signal from the switch system 40''', will prevent the release of the locking stud 1326. However, if the warning sign is active, and the proper crew code is provided via the first and second user input devices 1320, 1322 of the switch system 40''', then the receiver assembly 160*a* will release the locking stud 1326, as discussed previously. It should be noted, however, that any suitable mechanism could be used to enable the latch controller 1300 to respond to the warning signal, such as an independent controller in communication with the latch controller 1300 (not shown).

In this embodiment, the latch controller 1300 provides the central controller 32 with a real-time status of the receiver assembly 160*a*. With reference to FIG. 75, the latch controller 1300 communicates its status (i.e. latched, unlatched) and any failure of the receiver assembly 160*a*, either wirelessly via a wireless connection 1327, such as Bluetooth (802.15.1), WiFi (802.11), or Zigby (802.15.4), or over the conductor 131*a* to the central controller 32 (not shown). Then, based on the input received from the latch controller 1300, the central controller 32 generates indicator data 236*b* for the display 1318.

With continuing reference to FIG. 75, the display 1318 is arranged to be visible in the cabin 14 of the mobile platform 10, and can be mounted to a trim panel 1338 coupled to the support system 22. Generally, the display 1318 comprises at least one, or a plurality of LEDs 52 coupled to a PCB (not shown) that can display the status of the compartments 24, similar to the first and second indicator panels 1204, 1206 of the switch system 40'. Alternatively, the display 1318 could be a liquid crystal display (LCD) display or any other suitable display. Generally, the display 1318 is in wired communication with the central controller 32, through COPL for example, however, the display 1318 could be in wireless or another form of wired communication with the central controller 32 for receipt of the indicator data 236*b*, while receiving power from a secondary source, such as the pivot system 25 (not shown). Exemplary light output for the display 1318 of the compartment system 12*b* is provided in Table 2. It should be noted that the light output of the LEDs 52 of the display 1318 are merely exemplary, as any appropriate color light output could be employed, depending upon a desired lighting scheme.

TABLE 2

Exemplary Display Output for Various Compartment Operations

| Bin User | Operational Condition | ID# | Action/ Scenario | Status Indicator (color) | Crew Panel |
|---|---|---|---|---|---|
| PAX | Enabled (NSFSB = 1) | P1a | Bin Latched | Solid Blue | |
| | | P1b | Bin Open (not latched) | Flashing Blue (1 per sec until next action) | |
| | Disabled (NSFFSB = 2) | P2a | Deferment Period | Status remains ID#'s P1a-P1e | |
| | Disabled (NSFFSB = 3) | P3a | Bin Latched | Solid Red | |
| | | P3b | Bin Open (not latched) | Flashing Red (1 per sec until "bin latched" or ID# 12) | Not latched signal |
| CRW | Enabled (NSFSB = 1) | C1a | Open | Go to ID# P1b-P1b | |
| | Disabled (NSFFSB = 3) | C3a | Bin Latched | Solid Red | |
| EMR | Enabled (NSFSB = 1) | E1a | Bin Latched | Solid Red | |
| | | E1b | Open | | |
| ALL | TTL-Disabled* | A1 | Bin latched | No illumination | |
| | TTL-Disabled* | A2 | Bin not latched | Flashing Red | Not latched signal |

In Table 2, the user "PAX" refers to operation of the compartment 24 by the passenger of the mobile platform 10, user "CREW" refers to operation of the compartment 24 by a crew member, for a compartment 24 that has access restricted to crew members, the user "EMER" refers to the use of the compartment 24 during an emergency situation, and the user "ALL" refers to output of the indicator surface 1200 during the use of the compartment 24 by all users. The column entitled "Crew Panel" can refer to the display on the GUI control panel 249.

Thus, the latching system 28*a*, 28*b* provides a robust system for enabling users to conveniently control opening and closing of a compartment 24. Advantageously, the latching system 28*a*, 28*b* is responsive to warning signal to prevent the release of the compartment 24, thereby providing an additional layer of protection against the release of the compartment 24 when the warning sign is active.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be strictly limited to the particular examples illustrated by the drawings and described in the specification, but that the scope of the present disclosure will include any embodiments falling within the foregoing description and the appended claims.

What is claimed is:

1. An interactive switch system comprising:

a control system including:

a first side and a second side;

a first switch contact and a second switch contact on the first side of the control system, each of the first and second switch contacts providing an electrical connection, a tactile signal and an auditory signal when actuated; and a first light-generating system and a second light-generating system, each arranged in a predetermined configuration on the first side of the control system and operatively coupled with the first and the second switch contacts, respectively; and an indicator surface including:

a first user input device and a second user input device operatively coupled with the first and the second switch contacts, respectively, each of the first and the second user input devices having, instantaneously, either a first or a second tactile state;

the first and second user input devices each having a central recessed portion which assists the user in precisely orientating a fingertip on either one of the first or second user input devices;

a first translucent display surface and a second translucent display surface, adjacent the first and the second user input devices, respectively, and optically coupled with the first and the second light-generating systems, respectively, to emit a light energy at a first level, associated with the first tactile state, or at a second level, associated with the second tactile state; and wherein a change from the first tactile state to the second tactile state of each of the user input devices produces the audible signal.

2. The system of claim 1, wherein the first light-generating system comprises two different groups of differently colored light emitting elements disposed adjacent the first translucent display surface, in an arcuate configuration, to illuminate the first translucent display surface in one of two different colors when at least one of:

the first user input device is pressed, and system related information is received by the control system.

3. The system of claim 1, wherein the second light generating system comprises two different groups of differently colored light emitting elements disposed adjacent the second translucent display surface, in an arcuate configuration, to illuminate the second translucent display surface in one of two different colors when at least one of:

the second user input device is pressed, and system related information is received by the control system.

4. The system of claim 1, wherein the first and second translucent display surfaces each form arrows when illuminated.

5. The system of claim 1, wherein the first and second translucent display surfaces are arranged to point in directions 180 degrees opposite from one another.

6. The system of claim 1, wherein:

the indicator surface comprises a single piece component;

the first light-generating system comprises first and second groups of light emitting diodes, and the first user input device is translucent; and the second light-generating system comprises first and second groups of light emitting diodes, and the second user input device is translucent.

7. The interactive switch system of claim 1, wherein the indicator surface is integrally formed of a material.

8. The interactive switch system of claim 7 wherein the material is a flexible polymeric material.

9. An interactive switch system comprising:

a control system;

a first switch contact and a second switch contact;

a first light-generating system and a second light-generating system, each arranged in a predetermined configuration and operatively coupled with the first and the second switch contacts, respectively; and an indicator surface integrally formed of a material, the indicator surface including:

a first user input device and a second user input device operatively coupled with the first and the second switch contacts, respectively, each of the first and the second user input devices having, instantaneously, either a first tactile state or a second tactile state; and a first translucent display surface and a second translucent display surface, adjacent the first and the second user input devices, respectively, and optically coupled with the first and the second light-generating systems, respectively, to emit a light energy at a first level, associated with the first tactile state, or at a second level, associated with the second tactile state;

wherein an intensity of the light generated by the first and second light-generating systems is further varied in accordance with a signal received from the control system;

the first and second user input devices each having a central recessed portion which assists the user in precisely orientating a fingertip on either one of the first or second user input devices; and wherein a change from the first tactile state to the second tactile state of each of the user input devices produces the audible signal.

10. An interactive switch system comprising:

a control system including:

a first side and a second side;

a first and a second switch contact on the first side of the control system; and a first and a second light-generating system, each arranged in an arcuate configuration on the first side of the control system and operatively coupled with the first and the second switch contact, respectively, each of the first and the second light-generating systems including a first and a second light-generating subsystem, the first light-generating subsystem producing a first color, the second light-generating subsystem producing a second color; and an indicator surface integrally formed of a flexible polymeric material, the indicator surface including:

a speaker configured to communicate a status to a user of the interactive switch system based on an audible signal;

a first and a second end;

a first and a second opaque user-input device adjacent the first and the second end, respectively, the first and the second opaque user-input device operatively coupled with the first and the second switch contact, respectively, each of the first and the second opaque user-input devices having, instantaneously, either a first or a second tactile state, wherein an audible signal is associated with a change between the first and the second tactile state; and a first and a second arcuate translucent display surface, adjacent the first and the second opaque user-input device, respectively, and optically coupled with the first and the second light-generating system, respectively, to emit a light energy at a first level, associated with the first tactile state, or at a second level, associated with the second tactile state, wherein each of the first and the second levels of the light energy further varies responsive to an external signal received by the control system and wherein the light energy is emitted in an arc of 120° by each of the first and the second arcuate translucent display surfaces;

the first and second opaque user input devices each having a central recessed portion which assist a user in orientating a fingertip on either one of the first or second opaque user input devices; and wherein the first arcuate translucent display surface and the first opaque user-input device produce a first arrow when the first opaque user-input device is in the second tactile state, and wherein the second arcuate translucent display surface and the second opaque user-input device produce a second arrow when the second opaque user-input device is in the second tactile state.

* * * * *